United States Patent [19]
Brown et al.

[11] Patent Number: 6,157,621
[45] Date of Patent: *Dec. 5, 2000

[54] SATELLITE COMMUNICATION SYSTEM

[75] Inventors: Alison K. Brown, Monument, Colo.; Edward Fenton Tuck, West Covina, Calif.; David Palmer Patterson, Los Altos, Calif.; Douglas Gene Lockie, Monte Sereno, Calif.; Vilnis G. Grencions, Santa Clara, Calif.; Asu Ram Jha, Cerritos, Calif.; Donald A. Ashford, San Francisco, Calif.; Mark Alan Sturza, Woodland Hills, Calif.; James R. Stuart, Louisville, Colo.; Moshe Lerner Liron, Palo Alto, Calif.; H. Beat Wackernagel, deceased, late of Colorado Springs, Colo., by Irene E. Wackernagel, legal representative

[73] Assignee: Teledesic LLC, Bellevue, Wash.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/938,015

[22] Filed: Sep. 10, 1997

Related U.S. Application Data

[63] Continuation of application No. 08/203,140, Feb. 28, 1994, abandoned, which is a continuation-in-part of application No. 07/783,754, Oct. 28, 1991, abandoned.

[51] Int. Cl.[7] ................................ H04L 12/28; H04J 3/24

[52] U.S. Cl. .......................... 370/310; 370/400; 370/474; 370/394

[58] Field of Search ...................................... 370/315, 310, 370/316, 323, 325, 328, 238, 394, 400, 474, 351, 389; 342/368, 372, 425, 354, 357, 351, 352; 455/12.1, 13.1, 13.2, 17

[56] References Cited

U.S. PATENT DOCUMENTS

| | | | |
|---|---|---|---|
| 4,722,083 | 1/1988 | Tirro et al. | 370/104.1 |
| 4,905,233 | 2/1990 | Cain et al. | 370/238 |

(List continued on next page.)

OTHER PUBLICATIONS

"A Forecast of Space Technology 1980–2000"; NASA, Jan. 1976, NASA SP–387.

(List continued on next page.)

*Primary Examiner*—Chau Nguyen
*Assistant Examiner*—Phuongchau Ba Ngyuen
*Attorney, Agent, or Firm*—Christensen O'Connor Johnson & Kindness PLLC

[57] ABSTRACT

The Satellite Communication System disclosed in the specification is a dynamic constellation (C) of satellites (S). The present invention is capable of offering continuous voice, data and video service to customers across the globe on the land, on the sea, or in the air. The preferred embodiment of the invention comprises a low Earth orbit satellite system that includes 40 spacecraft (S) traveling in each of 21 orbital planes at an altitude of 700 km (435 miles). This relatively large number of satellites employed by the preferred embodiment was selected to provide continuous coverage of the Earth's surface at a high minimum mask angle (1230*a*) of forty degrees. Each of the individual 840 spacecraft (S) functions as an independent sovereign switch of equal rank which knows the position of its neighbors, and independently handles traffic without ground control. The satellites (S) are capable of transporting calls to millions of customers using portable (P), mobile (M) and fixed (F) residential and business terminals, and gateways (G) to public phone networks. The constellation uses the 20 and 30 GHz frequency bands for communications between Earth and the constellation (C), and the 60 GHz band for communicating among the satellites (S). The present invention is designed to support in excess of 2,000,000 simultaneous connections, representing over 20,000,000 users at typical business usage levels, and over 350 billion minutes of use per year. Only a system such as the preferred embodiment, which utilizes 840 satellites at a preferred minimum mask angle of forty degrees, can accomplish these challenging objectives.

11 Claims, 99 Drawing Sheets

U.S. PATENT DOCUMENTS

| | | | |
|---|---|---|---|
| 5,003,534 | 3/1991 | Gerhardt et al. | 370/60 |
| 5,017,925 | 5/1991 | Bertiger et al. | 342/352 |
| 5,187,805 | 2/1993 | Bertiger et al. | 455/12.1 |
| 5,239,670 | 8/1993 | Schwendeman et al. | 455/13.1 |
| 5,303,286 | 4/1994 | Wiedeman | 455/13.1 |
| 5,367,304 | 11/1994 | Jan et al. | 455/13.1 |
| 5,408,237 | 4/1995 | Patterson et al. | 342/354 |
| 5,410,728 | 4/1995 | Bertiger et al. | 455/13.1 |
| 5,415,368 | 5/1995 | Horstein et al. | 244/158 R |
| 5,515,376 | 5/1996 | Murthy et al. | 370/402 |
| 5,574,788 | 11/1996 | Childress et al. | 455/17 |
| 5,584,046 | 12/1996 | Martinez et al. | 455/13.1 |

OTHER PUBLICATIONS

"18 and 30 GHz Fixed Service Communication Satellite System Study", Hughes Aircraft Company, Sep. 1979, NASA Contract No. NAS3–21367.

"Concepts for 18/30 GHz Satellite Communication System Study—vol. I, Final Report", Ford Aerospace and Communications Corp. for NASA Lewis Research Center, Nov. 1, 1979, NASA Contract No. NAS3–21362.

"Concepts for 18/30 GHz Satellite Communication System Study"—vol. 1A, Appendix to Final Report, Ford Aerospace & Communications Corp. for NASA Lewis Research Center, Nov. 1, 1979, NASA Contract NAS3–213.

"Communication Satellite Technology: State of the Art and Development Opportunities", Aerospace Corp., Jul. 1978, NASA Contract No. NAS5–24489.

"The 18 and 30 GHz Fixed Service Communications Satellite System", Hughes Aircraft Company, no date, NASA Contract No. NASA–CR–159627–2.

"30/20 GHz Fixed Communications Systems Service Demand Assessment", U.S. Telephone and Telegraph Corp. for NASA Lewis Research Center, Aug. 1979, NASA Contract No. NAS3–21366.

"Preliminary Definition and Evaluation of Advanced Space Concepts—vol. II: Analyses and Results", Advanced Orbital System Division for NASA, Jun. 30, 1978, NASA Contract No. NASW3030.

Staelin et al., "Future Large Broadband Switched Satellite Communications Networks", Dec. 1979, NASA 5–25091.

Davenport, Jr. et al., "Federal Research and Development for Satellite Communications", 1977, published by National Academy of Sciences, Washington, D.C.

E.A. Ohm, "A Proposed Multiple–Beam Microwave Antenna for Earth Stations and Satelllites", pp. 1657–65, published in The Bell System Technical Journal, vol. 53, No. 8, Oct. 1974.

V.H. MacDonald, "Advanced Mobile Phone Service: The Cellular Concept", 1979, pp. 15–41, published in The Bell System Technical Journal, vol. 58, No. 1, Jan. 1979.

R.E. Kahn et al., "Advances in Packet Radio Technology", Nov. 1978, published in Proceedings of the IEEE, vol. 66, No. 11, pp. 1468–1496.

A.S. Acampora et al., "A Satellite System with Limited Scan Spot Beams", Oct. 1979, published in IEEE Transctions on Communications, vol. Com–27, No. 10, pp. 1406–1415.

E.A. Ohm, "System Aspects of a Multibeam Antenna for Full U.S. Coverage", Jun. 1979, published at International Conference on Communications, vol. 1. pp. 49.2.1–49.2.5.

R.L. Harvey et al., "Architectures and Economics for Pervasive Broadband Satellite Networks", 1979, published at International Conference on Communications, vol. 1, pp. 35.4.1–35.4.7.

I.M. Jacobs et al., "General Purpose Packet Satellite Neworks", Nov. 1978, published in Proceedings of the IEEE, vol. 66, No. 11, pp. 1448–1467.

R. Binder et al., "Crosslink Architectures for a Multiple Satellite System", Jan. 1987, published in Proceedings of the IEEE, vol. 75, No. 1, pp. 74–82.

Dodel, Hans & Baumgart, M., Satellitensysteme fur Kommunikation, Fernsehen und Rundfunk, 1986, pp. 21–23.

"Multiple Satellite System Program", Ball Aerospace Corp. for the Department of Defense, Mar. 20, 1987.

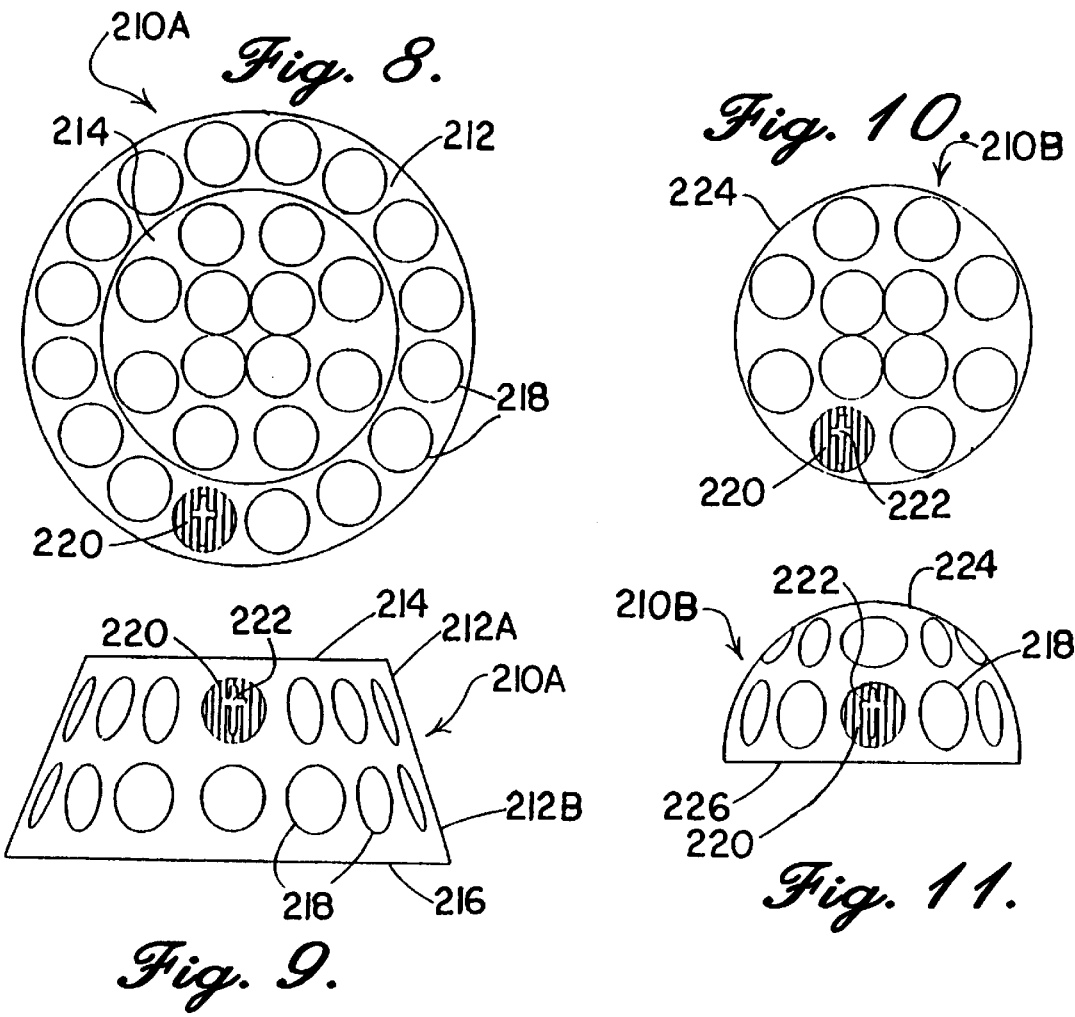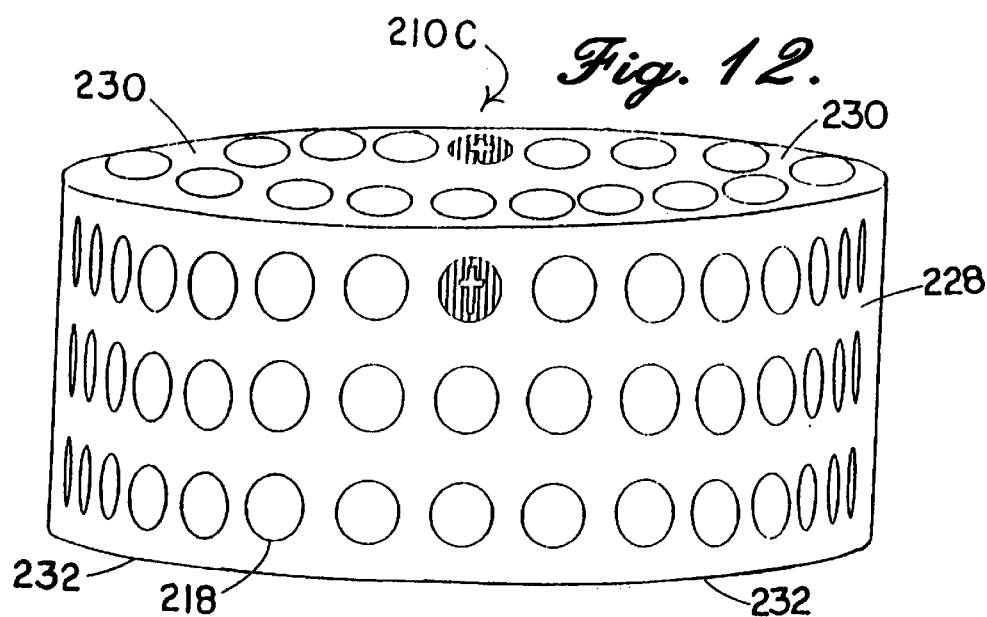

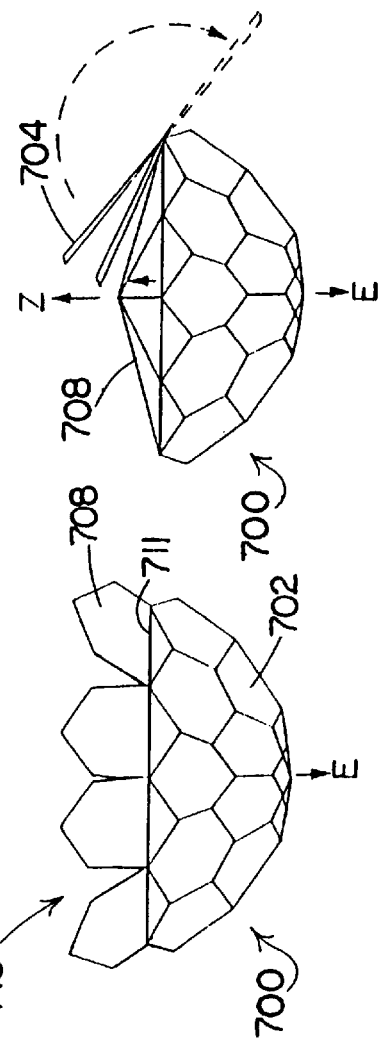
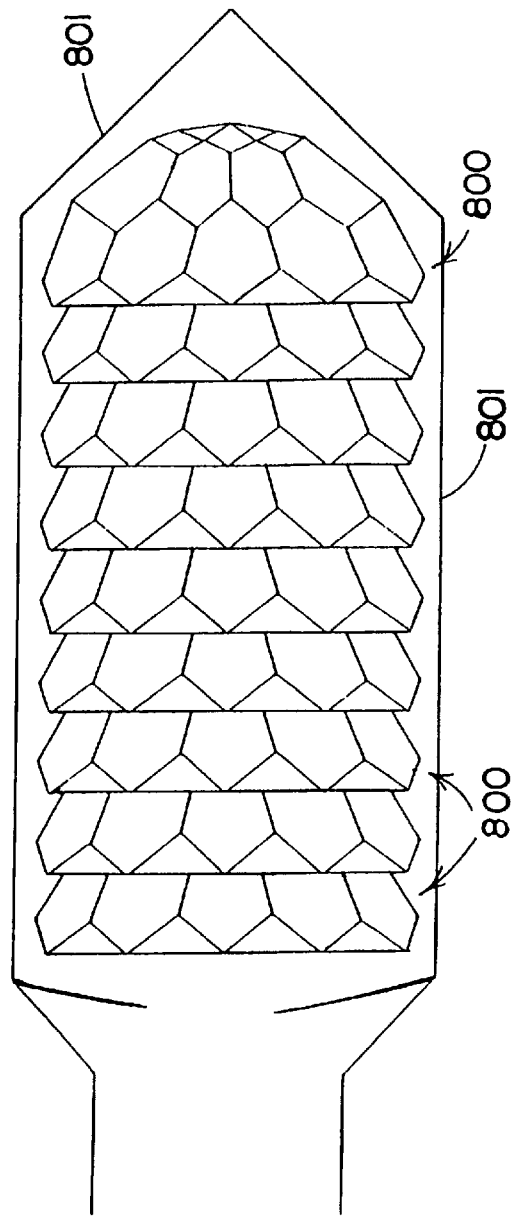
Fig. 57. Fig. 58. Fig. 59. Fig. 60.

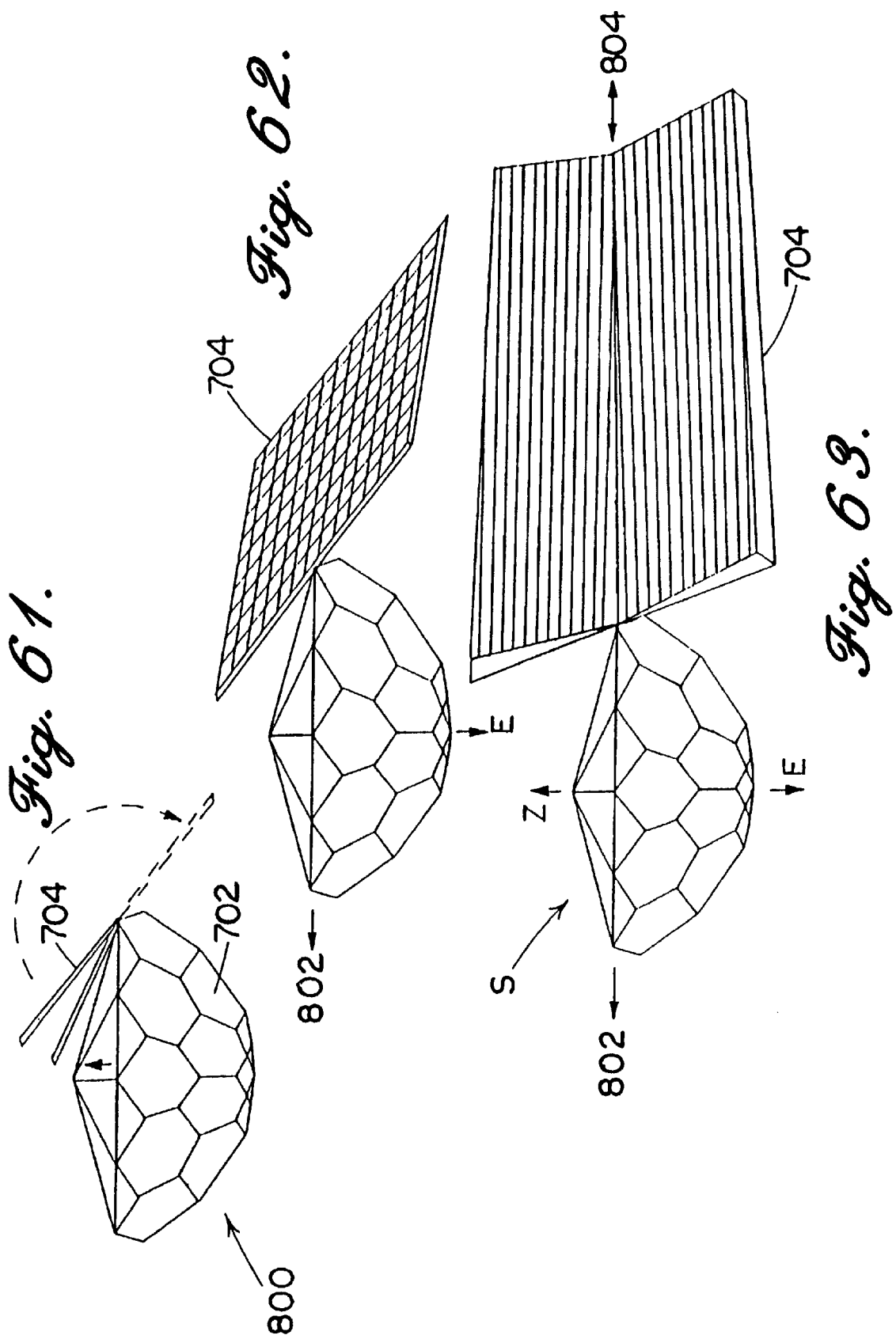

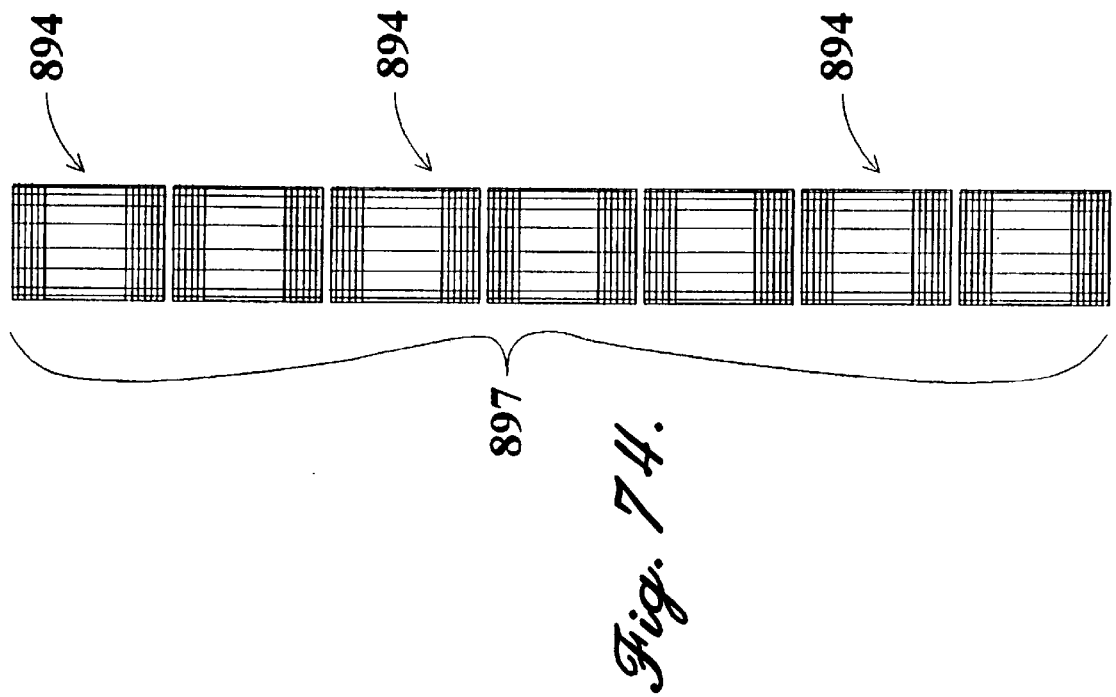
Fig. 74.
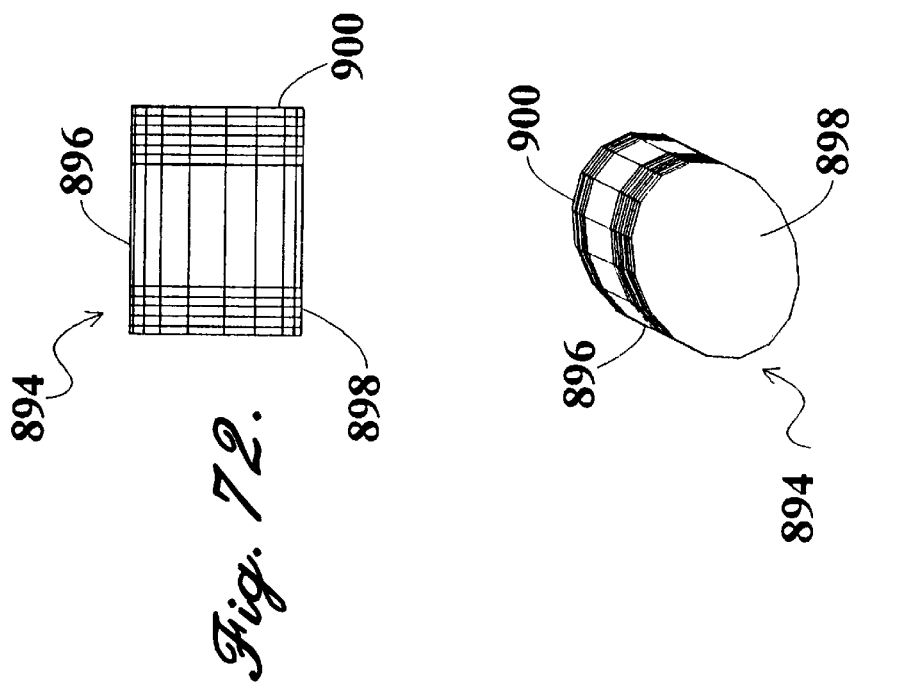
Fig. 72.
Fig. 73.

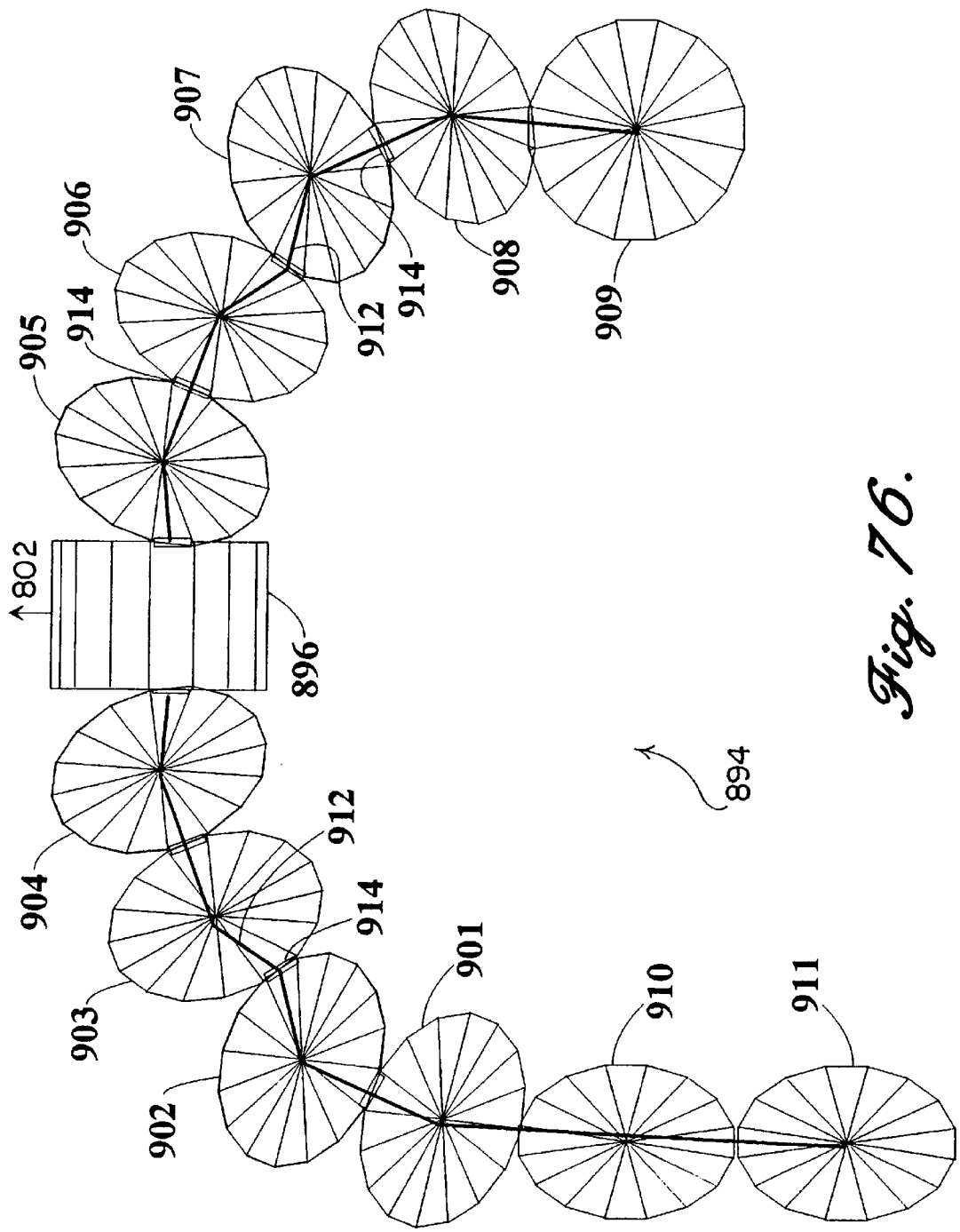

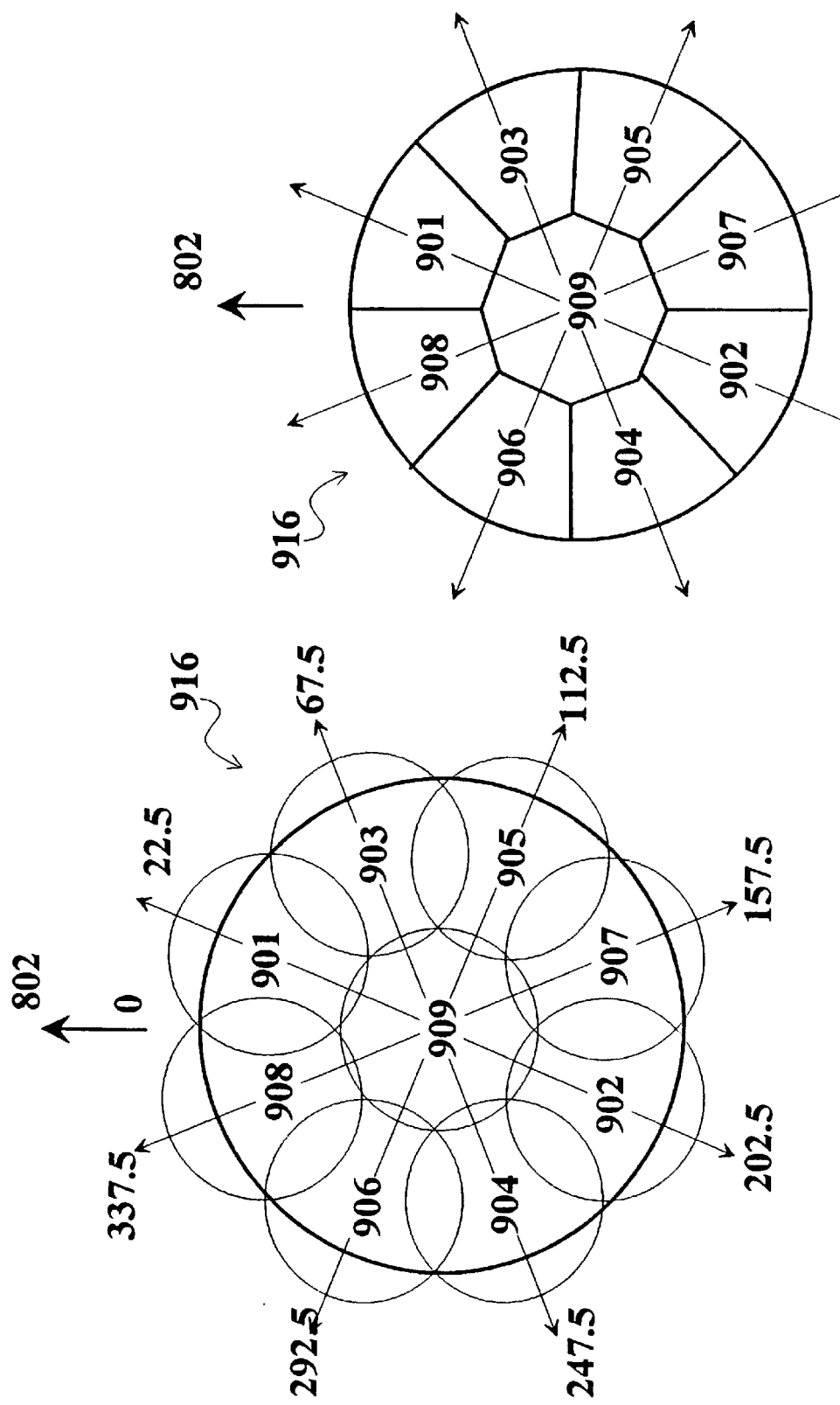

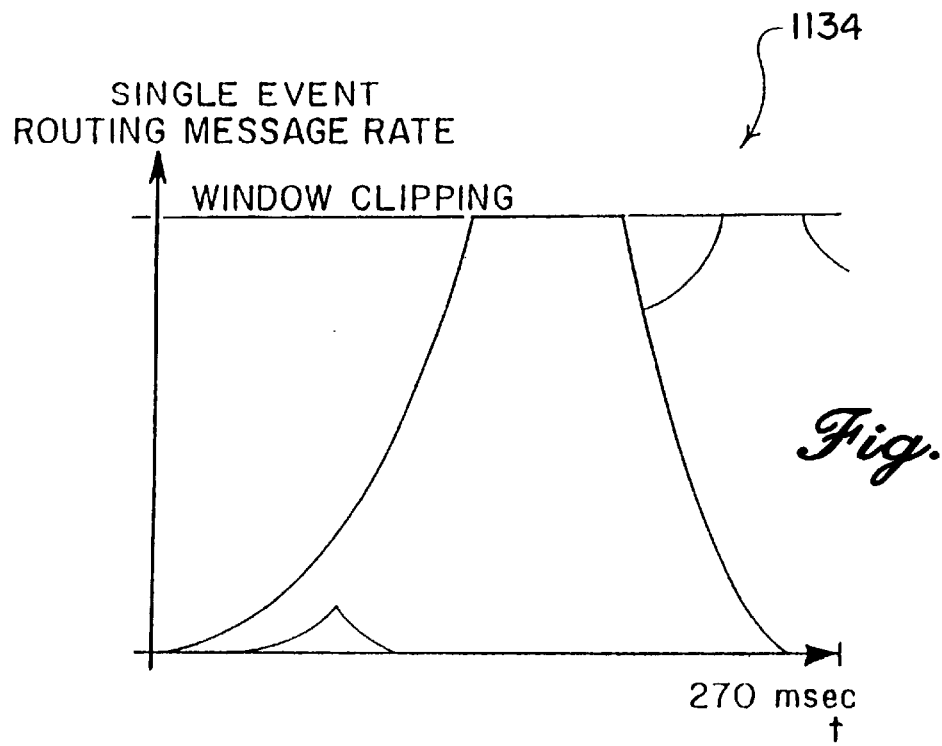
Fig. 87.
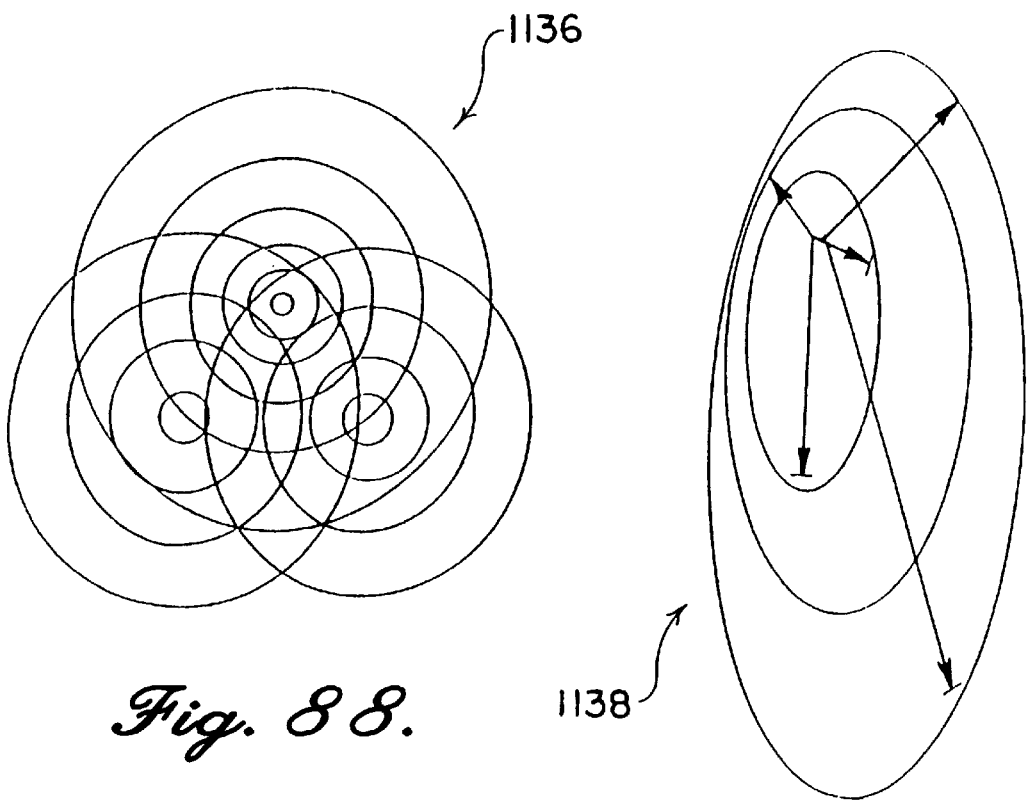
Fig. 88.
Fig. 89.

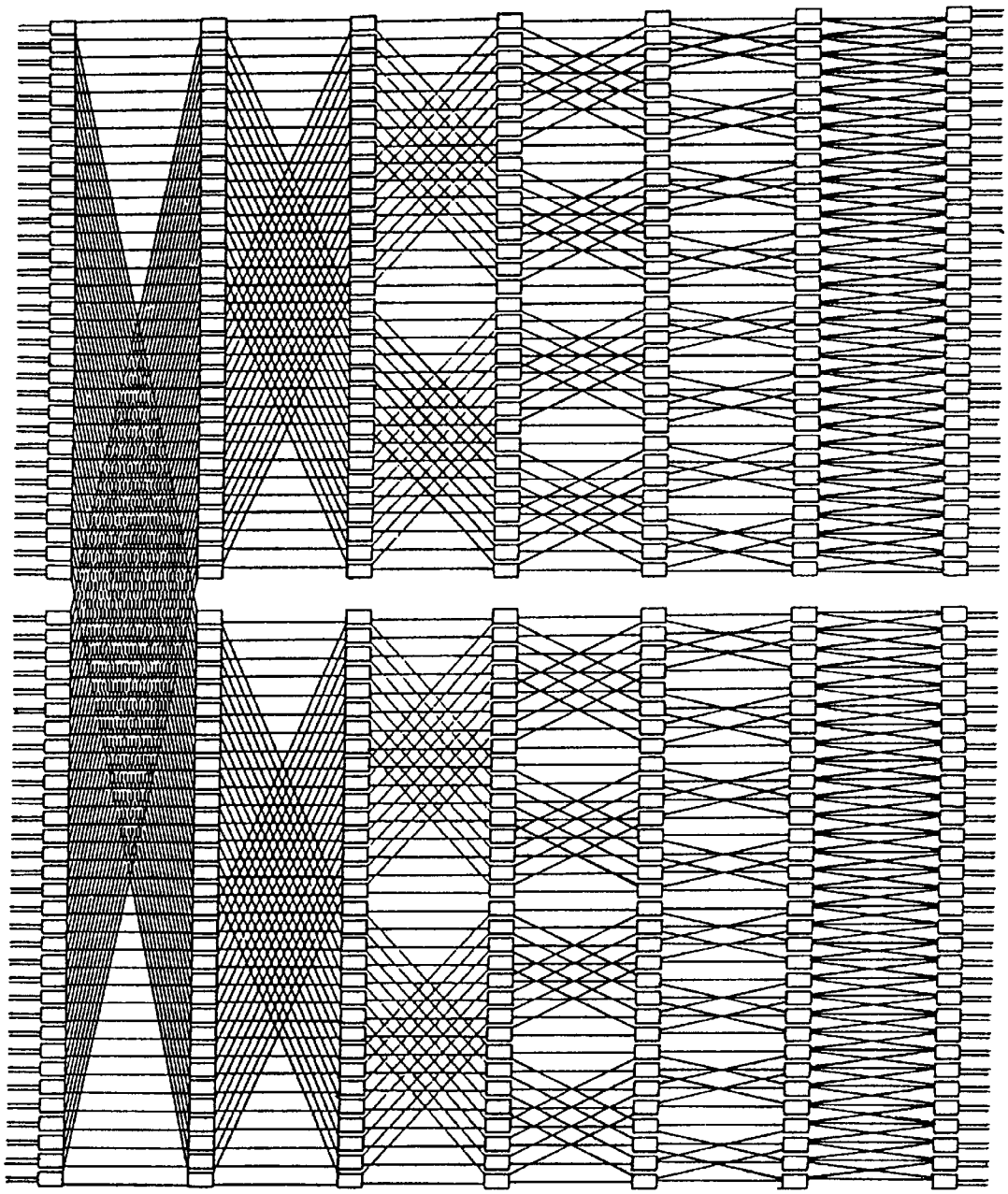
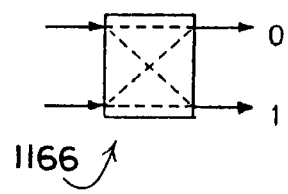
Fig. 103.
Fig. 102.

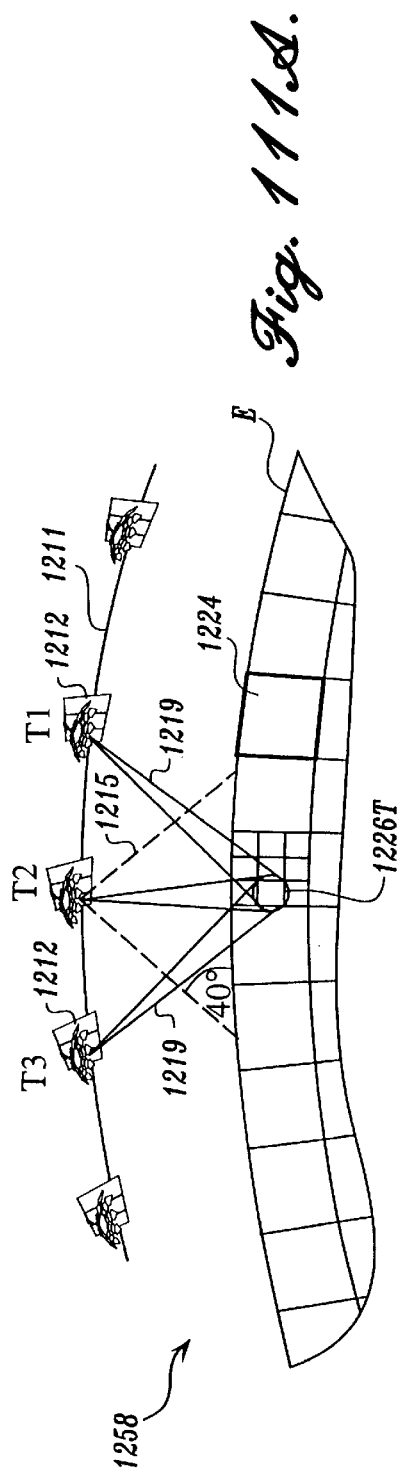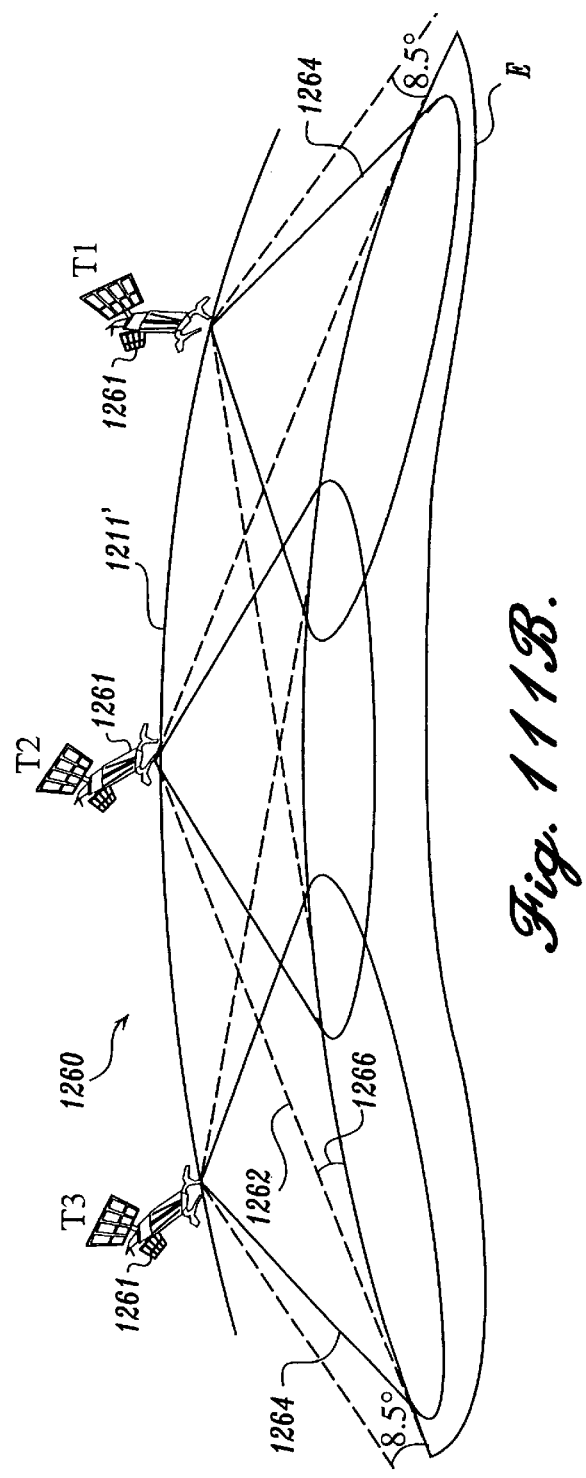

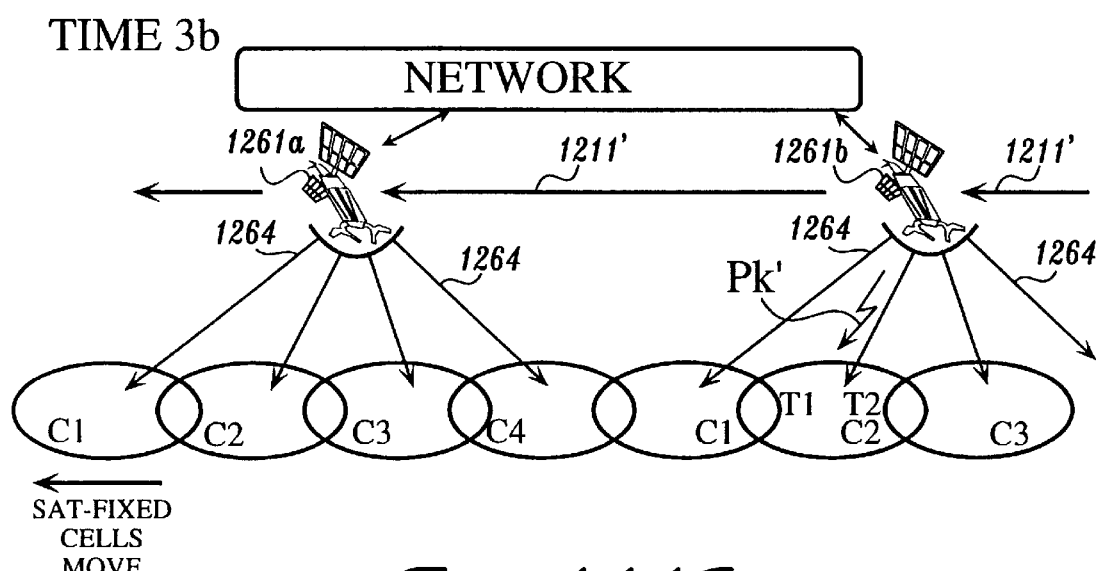
Fig. 1119.

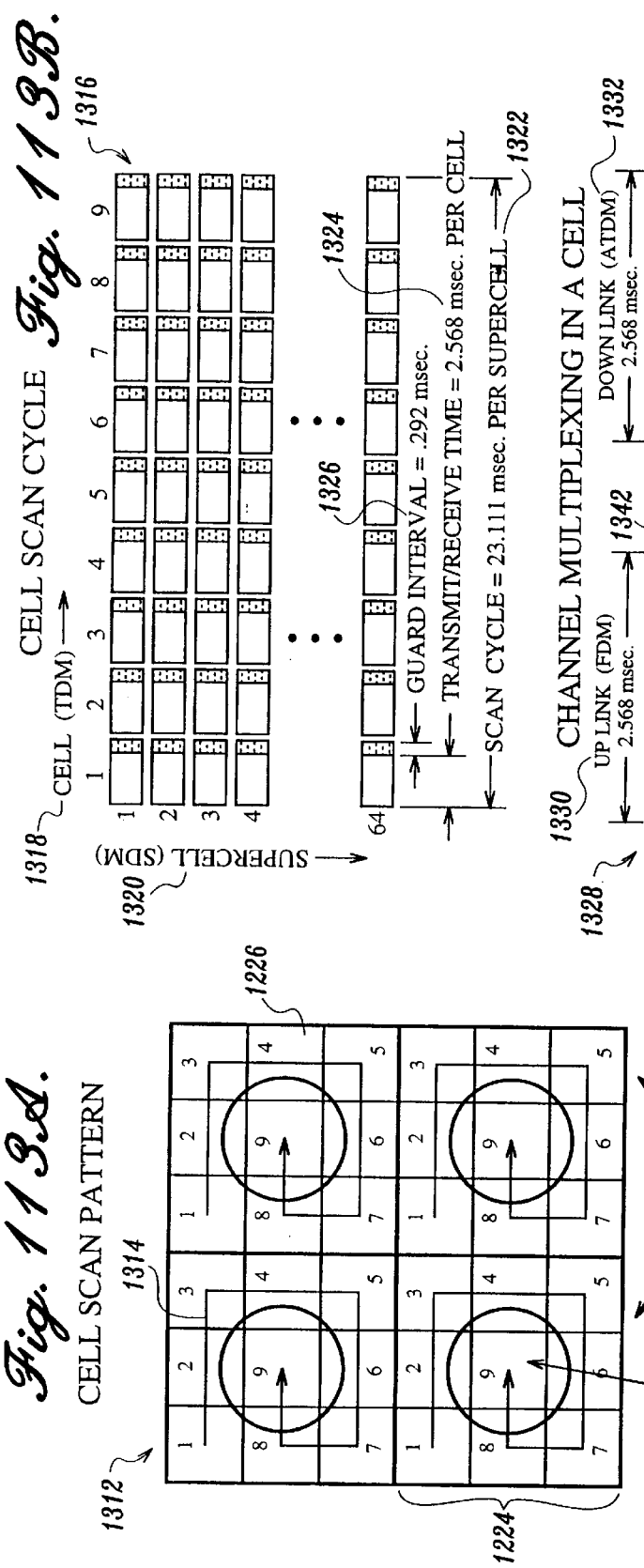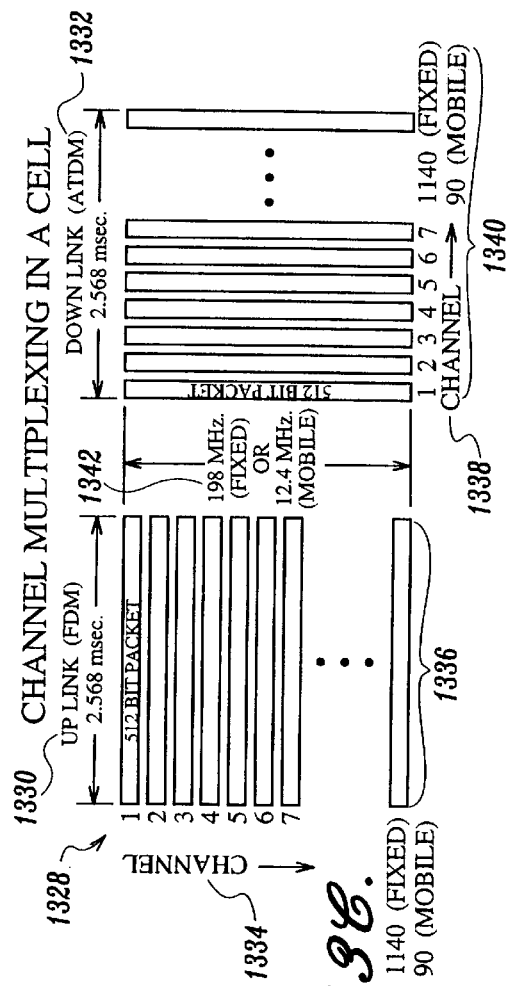
Fig. 113B. CELL SCAN CYCLE
Fig. 113C. CHANNEL MULTIPLEXING IN A CELL
Fig. 113A. CELL SCAN PATTERN
Cell 9 Illuminated in all supercells

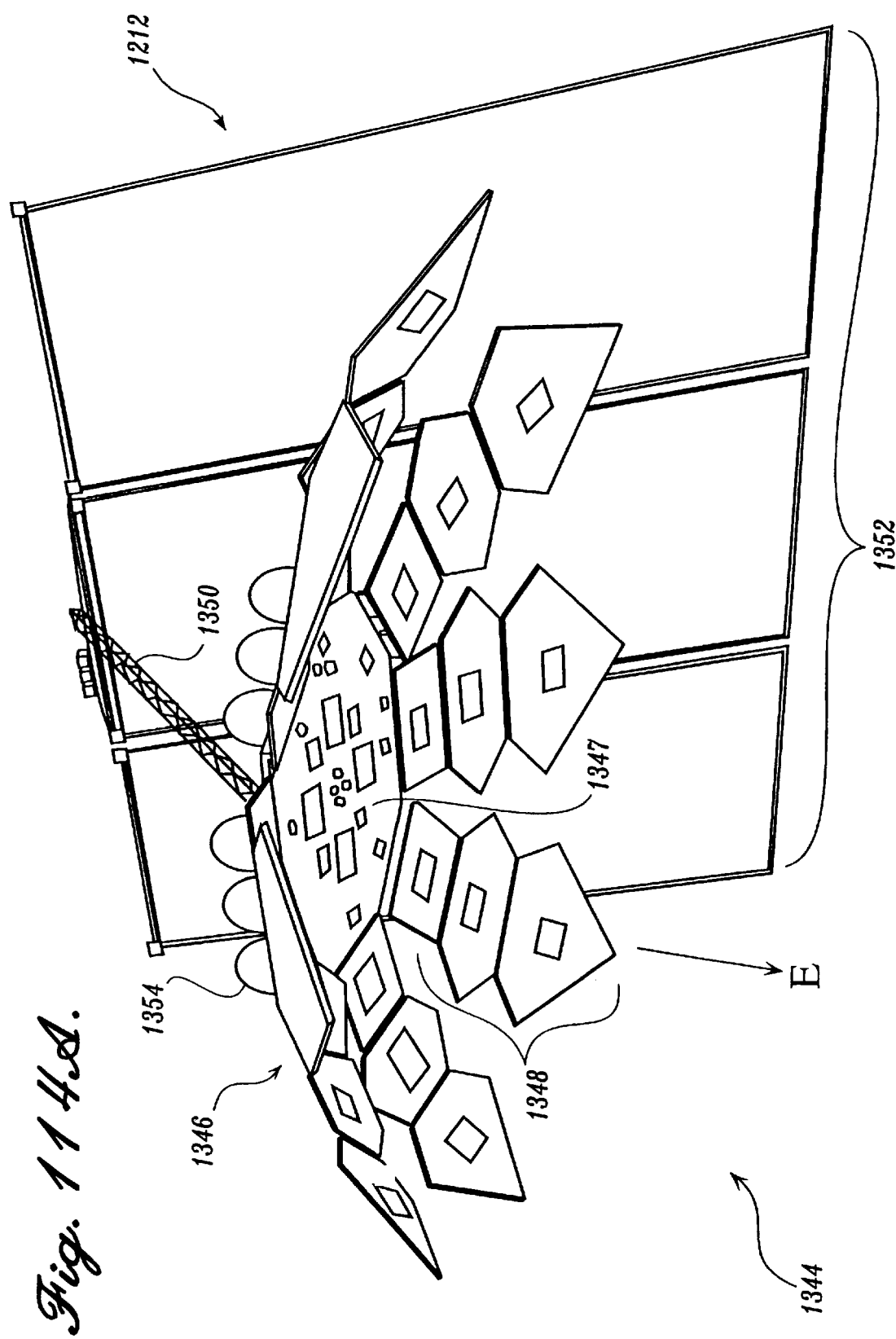
Fig. 1144A.

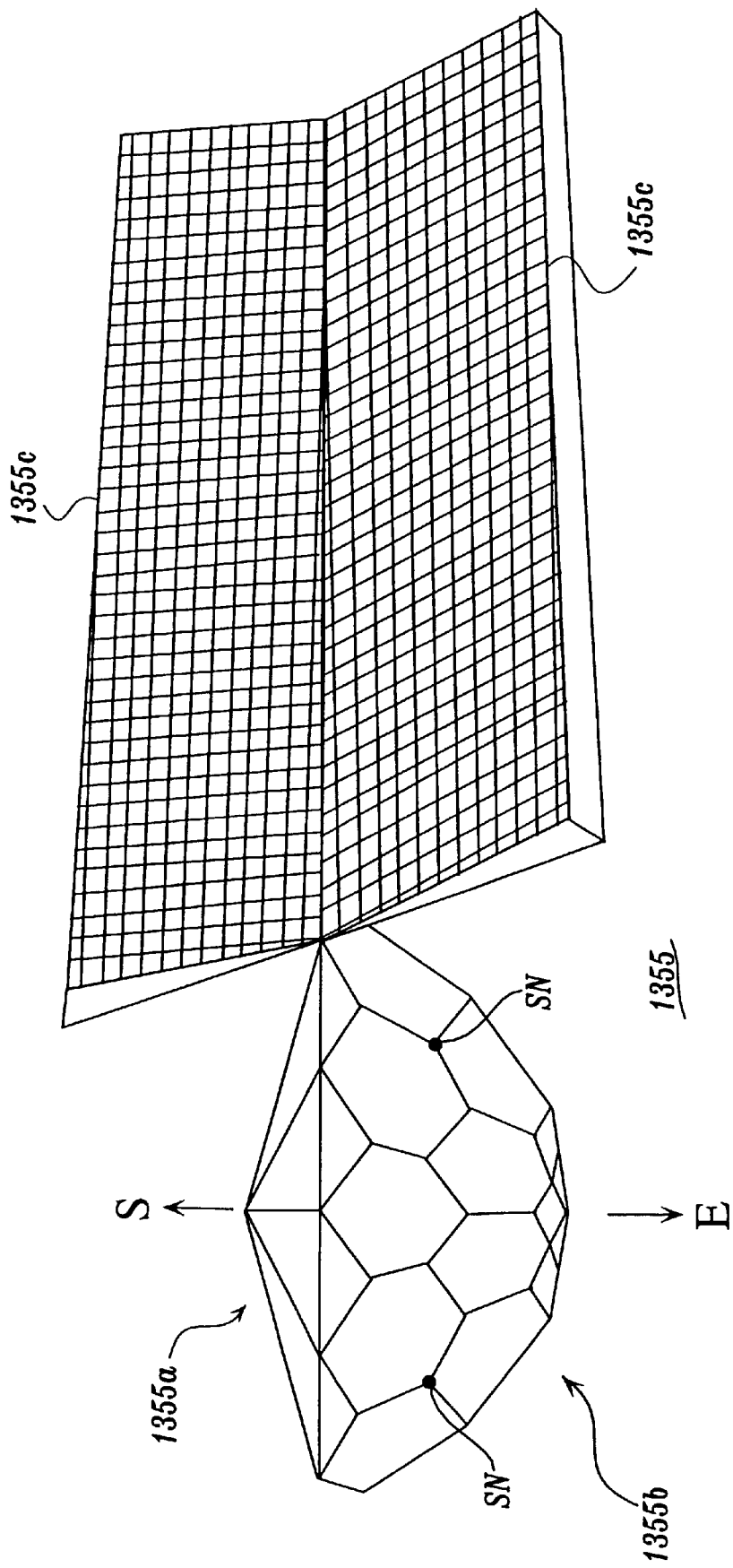

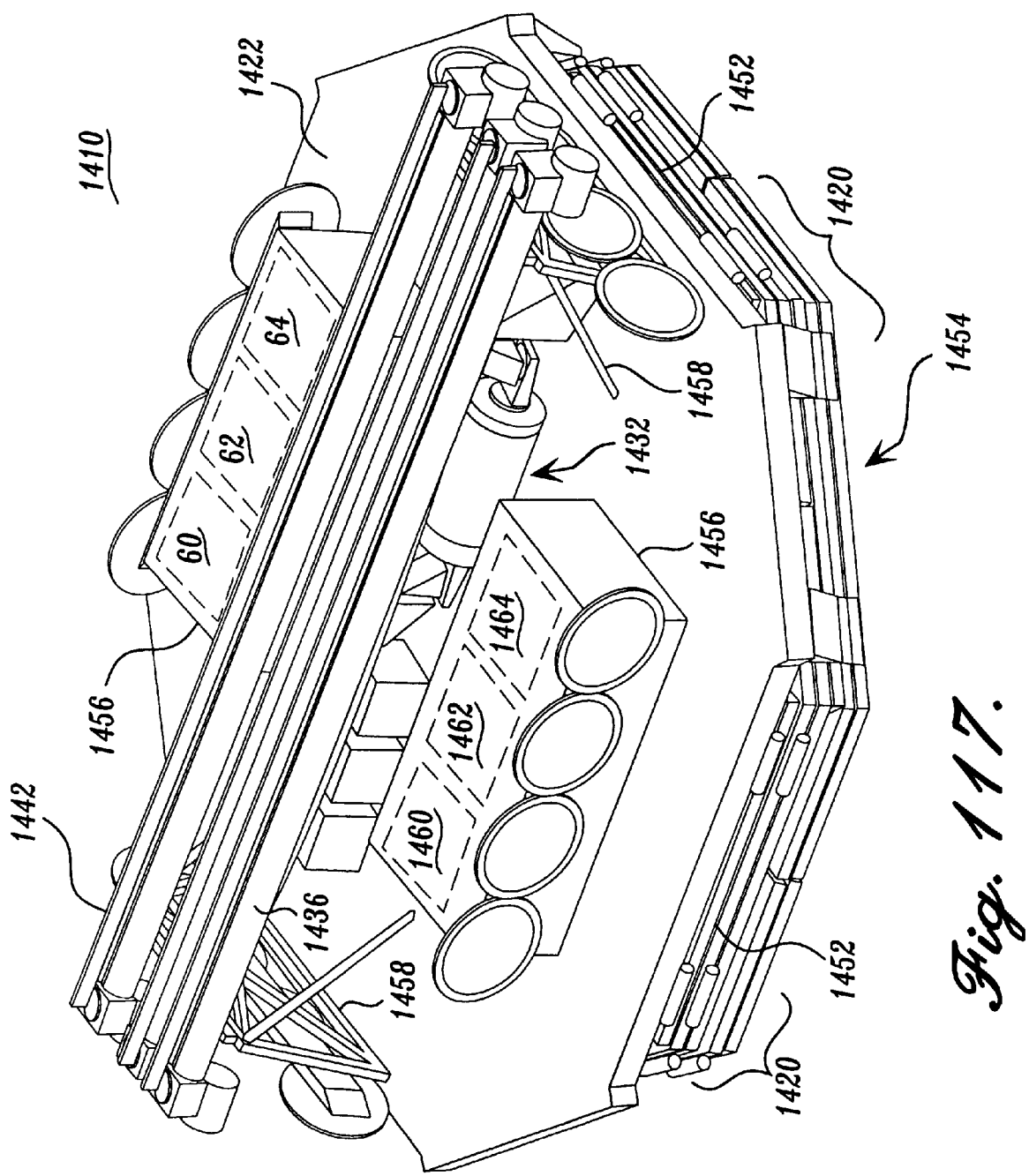
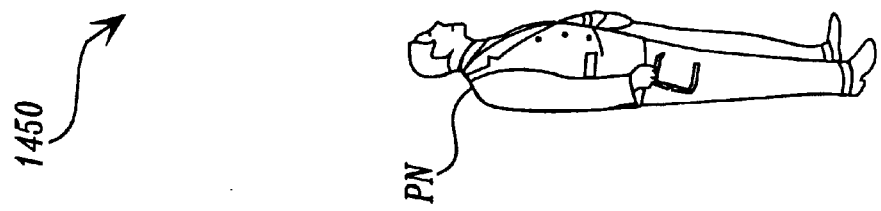
Fig. 117.

(NEAR SIDE SPECECRAFT MODULE
REMOVED TO EXPOSE DETAIL)

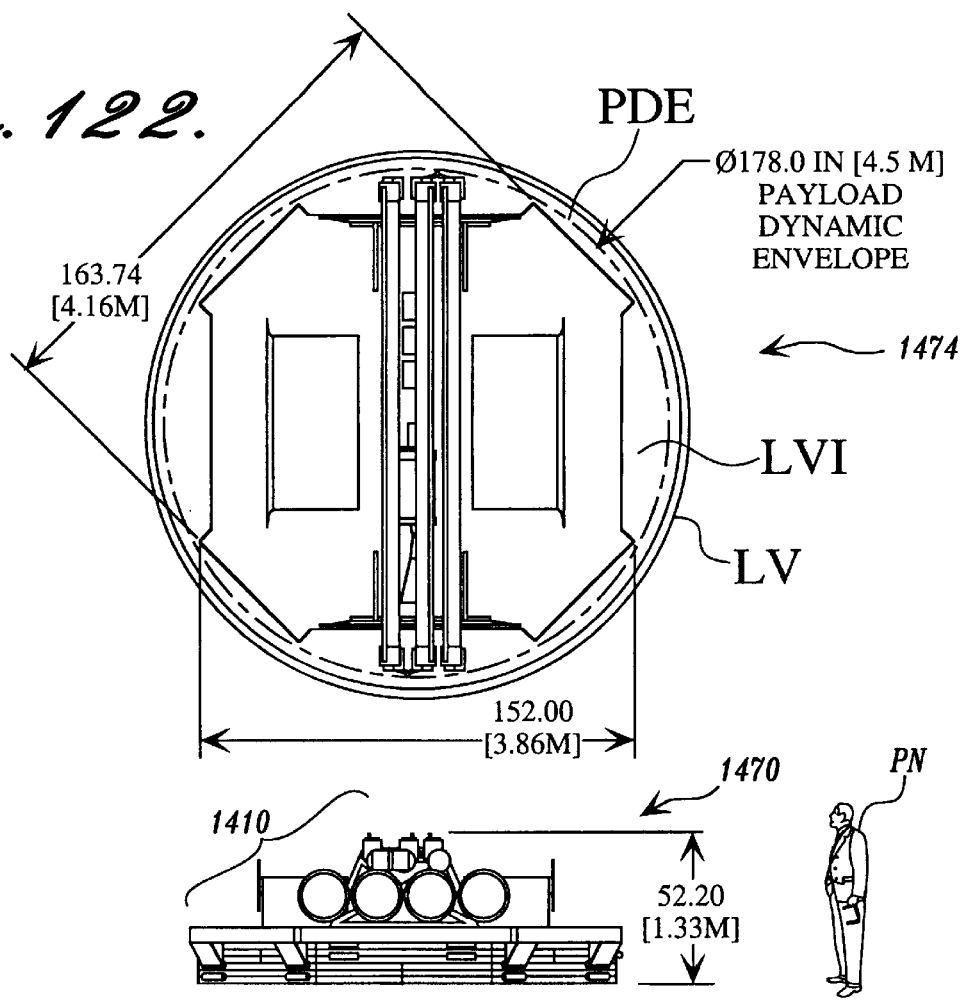
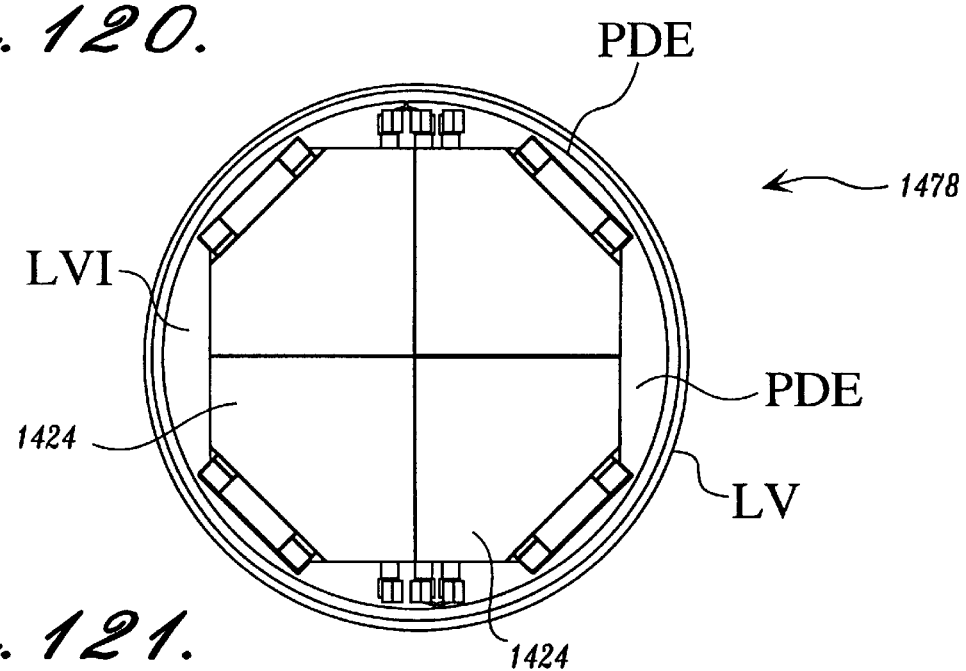

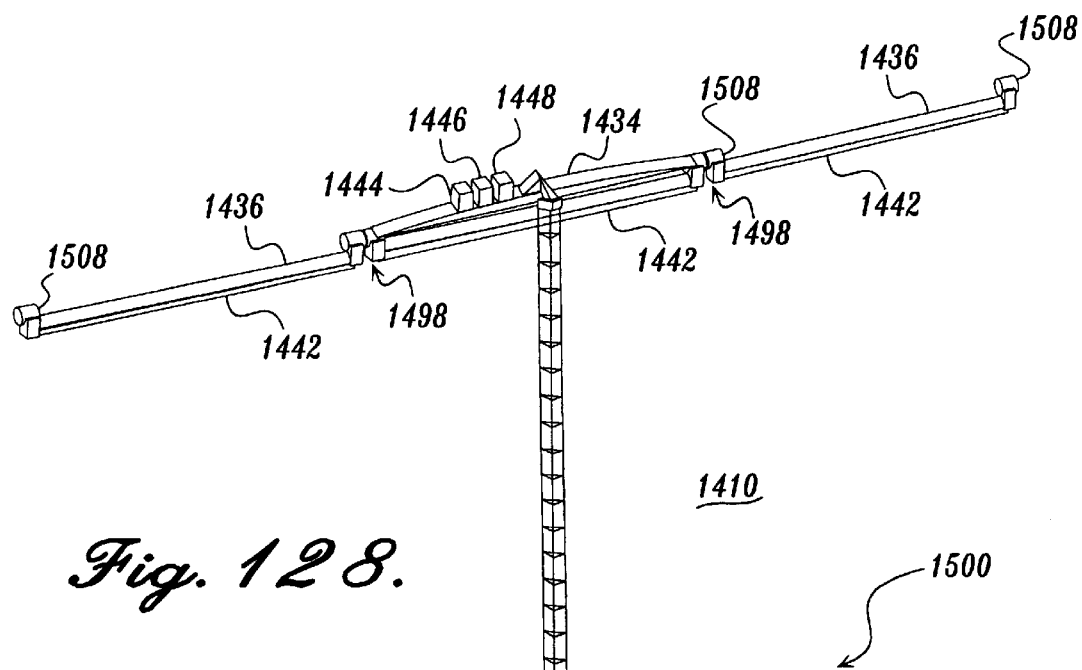
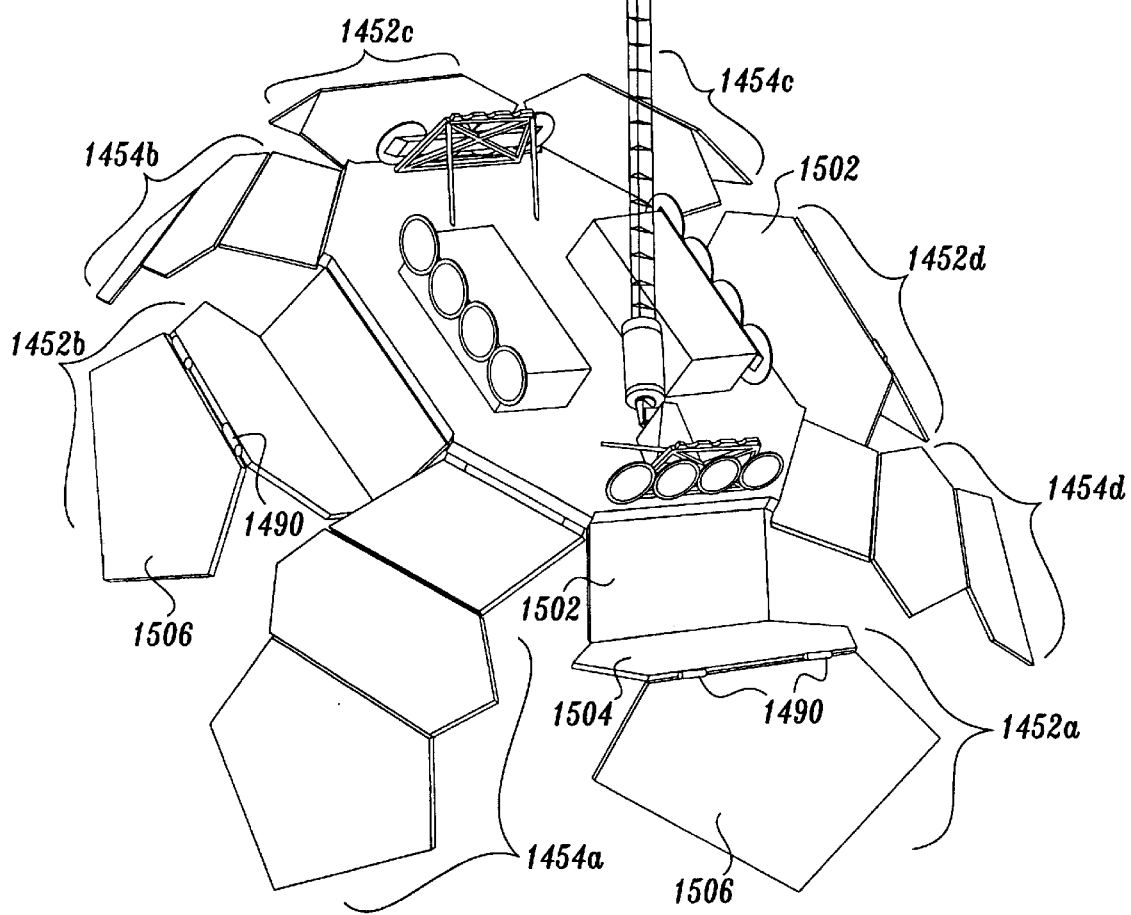
Fig. 128.

| TRANSMIT | RECEIVE | # ELEMENTS | GAIN (dB) | # ARRAYS |
|---|---|---|---|---|
| ⊕ | ○ | 316 | 31.7 | 10 |
| ⊕ | ○ | 320 | 31.7 | 32 |
| ⊕ | ○ | 484 | 33.4 | 48 |
| ⊕ | ⊕ | 684 | 35.0 | 48 |
| ⊕ | ⊕ | 2128 | 41.0 | 64 |
|  | ⊕ | 1020 | 38.0 | 68 |

| TRANSMIT | RECEIVE | # ELEMENTS | GAIN (dB) | # ARRAYS |
|---|---|---|---|---|
| ⊕ | ⊕ | 316 | 31.7 | 10 |
| ⊕ | ⊕ | 320 | 31.7 | 32 |
| ⊕ | ⊕ | 484 | 33.4 | 48 |
| ⊕ | ⊕ | 684 | 35.0 | 48 |
| ⊕ | ⊕ | 2128 | 41.0 | 64 |

SATELLITE COMMUNICATION SYSTEM

This application is a continuation application of application Ser. No. 08/203,140, filed on Feb. 28, 1994, abandoned as of the filing date of this application, which is a continuation-in-part of application Ser. No. 07/783,754, filed on Oct. 28, 1991, now abandoned

FIELD OF THE INVENTION

The present invention relates to the field of satellite communications. More particularly, this invention comprises a dynamic geodesic constellation of 840 autonomous satellites in low Earth orbit. Each satellite in the distributed, non-hierarchical constellation is an equally important node in the network, possesses independent switching intelligence and is capable of communicating directly with a broad variety of subscribers using portable, mobile and fixed terminals. The system will provide continuous world-wide service for voice, data and video signals. This novel satellite network has the ability to bypass traditional land-based networks and will offer a revolutionary expansion of global communications potential.

CROSS-REFERENCES TO RELATED PATENT APPLICATIONS

The present patent application is related to the following commonly-owned and commonly-assigned pending patent applications:

Terrestrial Antennas for Satellite Communication System by Asu Ram Jha, filed on Dec. 2, 1993 and assigned U.S. Ser. No. 07/984,609, and claiming the benefit of priority of a parent application entitled Terrestrial Antennas for Satellite Communication System by Asu Ram Jha, filed on Nov. 8, 1991, and assigned U.S. Ser. No. 07/790,273;

Switching Methods for Satellite Communication System by David Palmer Patterson & Moshe Lerner Liron, filed on Nov. 8, 1991 and assigned U.S. Ser. No. 07/790,805;

Beam Compensation Methods for Satellite Communication System by David Palmer Patterson and Mark Alan Sturza, filed on Jul. 8, 1993 and assigned U.S. Serial No. 08/088,714, and claiming the benefit of priority of a parent application entitled Earth Fixed Cells Beam Compensation for Satellite Communication System by David P. Patterson and Mark Alan Sturza, filed on Nov. 8, 1991 and assigned U.S. Ser. No. 07/790,318 now U.S. Pat. No. 5,408,237;

Spacecraft Antennas & Beam Steering Methods for Satellite Communication System by Douglas Gene Lockie, filed on Oct. 28, 1992 and assigned U.S. Ser. No. 07/967,988 and claiming the benefit of priority of a parent application entitled Spacecraft Antennas & Beam Steering Methods for Satellite Communication System by Douglas Gene Lockie, filed on Nov. 8, 1991 and assigned U.S. Ser. No. 07/790,271;

Spacecraft Designs for Satellite Communication System by James R. Stuart and David P. Patterson, filed on Aug. 18, 1992 and assigned U.S. Ser. No. 07/931,625 and claiming the benefit of priority of a parent application entitled Spacecraft Designs for Satellite Communication System by James R. Stuart filed on Nov. 8, 1991 and assigned U.S. Ser. No. 07/790,748;

Spacecraft Intersatellite Link for Satellite Communication System by Douglas G. Lockie et al., filed on Jul. 16, 1992 and assigned U.S. Ser. No. 07/915,172;

Method of Conducting a Telecommunications Business Implemented on a Computer by Edward F. Tuck, filed on Jun. 8, 1992 and assigned U.S. Ser. No. 07/895,295;

Traffic Routing for Satellite Communication System by Moshe Lerner Liron, filed on Feb. 9, 1993 and assigned U.S. Ser. No. 08/016,204; and Modular Communication Satellite by James R. Stuart, filed on Jun. 11, 1993 and assigned U.S. Ser. No. 08/075,425.

CLAIM FOR PRIORITY

The present application is a Continuation in Part application. The inventors hereby claim the benefit of priority under Section 120 of Title 35 of the United States Code of Laws for any and all subject matter which is commonly disclosed in the present application and in a pending patent application entitled Satellite Communication System by Edward F. Tuck et al., filed on Oct. 28, 1991 and assigned U.S. Ser. No. 07/783,754.

REFERENCE TO MICROFICHE APPENDICES

This specification is accompanied by two Appendices, A and B, recorded on two sheets of microfiche which contain software that may be employed to practice the invention. The first software listing may be used to implement that portion of the present invention which pertains to Autonomous Orbit Position Determination. The second software listing may be used to implement that portion of the present invention which pertains to Adaptive Routing. Both software programs were written for conventional personal computers and may be run on IBM Compatible systems employing a conventional DOS operating system. These software programs simulate selected embodiments of the present invention which are described below in full detail. The programs enable a person of ordinary skill in the arts to which the present invention pertains to practice the invention without undue experimentation.

BACKGROUND OF THE INVENTION

Public telephone systems have generally used the same system architecture for over one hundred years. Conventional systems employ highly centralized and hierarchical switching facilities as nodes that tie together a complex web of connected links. While a very small portion of their subscribers use direct links to geostationary satellites, the vast majority of the links that couple the conventional phone network comprise a bewildering and dissimilar assortment of cables, wires, fibers and microwave repeaters. Like all hierarchical systems, conventional telephone networks are extremely vulnerable when the performance of any high-ranking node in the hierarchy is impaired. For example, a fire in a Hinsdale, Ill. wire center denied long-distance service to the Chicago area for several days. Relatively minor software failures can disrupt or even suspend service in large, densely-populated urban areas. This vulnerability to localized failure is compounded by the limits which a centralized architecture imposes on the expansion potential of the network. On average, every time a new subscriber is added to a conventional land-based communication network, expensive additions to switching hardware and connecting wires must be installed. The marginal cost of adding each new subscriber is extremely high, and the cost of raising that capital is a drain on telephone subscribers and on the economy at large. Conventional telephone systems are inherently circumscribed by their hierarchical design, and these limits now impose critical barriers to the enormous augmentation of capacity which the previous networks must provide to meet the burgeoning world demand for communications services in the coming decades.

Several attempts to bypass these inherent limits have met with mixed results. Large consumers of phone services have begun to install their own private networks to carry large volumes of voice messages, video, and broadband data calls. While some of these expensive and awkward enhancements provide partial solutions, the unalterable constraints imposed by a centralized switching topology continue to confine the future growth of existing networks.

Some extension of the century-old centralized telephone switching infrastructure has been achieved using geostationary satellites. These spacecraft, however, offer additional communications capabilities that are quite limited. Since these satellites operate in equatorial orbits, they are not accessible to customers located in high latitudes. Because they must share their orbit with many other services, their number is restricted to a relatively small population. Since all of these spacecraft occupy a single circular orbit, they can not be connected together in a geodesic network. A geodesic network, which could provide enormously greater capacity, must be generally spherical in shape. Geostationary satellites also suffer from a very serious disadvantage—the distant altitude of their orbits. These satellites are so far from Earth that the signal takes about one-quarter of a second to traverse the nearly 50,000 miles (80,000 km) along the round trip from the ground up to the satellite, and back to the ground. The delays sensed by the telephone user's ear that are introduced by this long round trip are not only annoying, but can render some conversations which are relayed between more than one geostationary satellite virtually unintelligible. Radio signals which are exchanged between a ground station and a geosynchronous satellite may also be impaired by this great round trip distance. A telephone customer on the ground using a portable phone who wanted to communicate directly with a satellite in geostationary orbit would need a telephone capable of producing an output in excess of hundreds of Watts. Generating this power output is not only thoroughly impractical for users of portable phones, but may also create a radiation hazard for the individual wielding the telephone.

Geostationary satellites do not supply an adequate solution to the formidable expansion needs of conventional telephone networks. Although cellular service has grown rapidly over the past decade, even greatly expanded cellular service would not provide an adequate solution. Cellular systems are plagued by poor performance, and are ultimately constrained by the same structural limits that circumscribe the future of land-based systems. Cellular customers are still limited to geographic regions served by radio towers called "cell sites." Even in the United States, these cell sites are not universally prevalent, since market forces restrict cellular service to only the most densely populated urban portions of our country. Cellular service is available to only a small minority of privileged users in wealthy countries, and is virtually non-existent in lesser developed parts of the world.

The publications noted below disclose various systems that pertain to communication systems that are designed to operate on the Earth's surface or in conjunction with satellites flying in low Earth orbits.

Bertiger, Leopold and Peterson describe a "Satellite Cellular Telephone and Data Communication System" in European Patent Application No. 891 184 58.2. This application sets out some of the details of Motorola's proposed Iridium™ communication system. The Iridium™ system is currently designed to utilize sixty-six (66) satellites in low Earth orbit which would generate relatively large footprints of radio beams due to their extremely low mask angle of eight and one half degrees (8½°). Because of these very large footprints, the communications capacity that may be offered by the Motorola network would be substantially constrained. In addition, this system would employ "satellite-fixed cells" which are not defined by any constant boundaries on the Earth. These cells would sweep over vast regions of the Earth at very high speeds as the Iridium™ satellites fly overhead. This method of using satellite-fixed cells introduces extremely complicated "hand-off" problems when one satellite moves out of range of supplying service with a subscriber. At that time, another satellite must assume the responsibility of supporting the subscriber's call without interruption.

In U.S. Pat. No. 5,107,925, Bertiger et al. disclose a multiple beam space antenna system for facilitating communications between a satellite switch and a plurality of Earth-based stations.

No system that is currently available to the general public is capable of taking advantage of the enormous enrichment of communications capacity that could be achieved if the traditional centralized grid of terrestrial switches, and their connecting cables, wires, fibers and microwave repeaters could be completely bypassed. Public phone companies are not presently able to sell continuous global service to customers who wish to use phones that are not coupled to the land-based network. The problem of providing an economically feasible network for voice, data and video which can be used by subscribers all over the world has presented a major challenge to the communications business. The development of a communications system that offers a solution to the immutable obstacles to growth which bind conventional phone networks would constitute a major technological advance and would satisfy a long felt need within the telephone industry.

SUMMARY OF THE INVENTION

The Satellite Communication System disclosed and claimed in this patent application overcomes the limits that circumscribe the performance and potential of existing telephone systems. The present invention is capable of offering continuous voice, data and video service to customers across the globe on the land, on the sea, or in the air. Instead of merely improving upon or expanding existing land-based systems, the present invention bypasses centralized terrestrial switching hardware by placing all the intelligence of the network in orbit. Unlike conventional hierarchical systems, which are linked together by a complex web of wires, cables, glass fibers, and microwave repeaters that are very expensive to build and maintain, the present invention liberates the true communications potential of existing land-based networks by routing signals through spacecraft in low Earth orbit.

The essence of the system disclosed in this application is a dynamic constellation of satellites. Each satellite functions as a communications node of equal rank and importance that is linked to its nearest neighbors. The topology of the constellation resembles a geodesic dome, which offers several advantages over the topology of conventional networks. In previous systems, some call traffic is diverted through distant nodes when the most direct routes between the origin and destination of a call are completely saturated with traffic. These lengthy diversions greatly impair the quality of the connection by introducing time delays, echoes, and additional noise. In the geodesic network of the present invention, such a low-quality diversion becomes unnecessary, since a parallel route can be found which only increases delays by a relatively small amount.

The novel constellation of satellites not only offers a graceful response to overloads by minimizing deleterious diversions of traffic, but also eliminates the devastating consequences of the failure of a node. In current systems, when a node fails, service for entire sections of the network is disrupted. In dramatic contrast, the failure of a node in a geodesic system can be compensated by simply removing the inoperative satellite from the network. Adjacent spacecraft in the web then share the workload of their disabled neighbor until it can be repaired or replaced.

The preferred embodiment of the invention comprises a low Earth orbit satellite system that includes 40 spacecraft traveling in each of 21 orbital planes at an altitude of 700 km (435 miles). This relatively large number of satellites in the constellation was selected to provide continuous coverage of the Earth's surface at a high minimum mask angle of forty degrees with respect to the Earth's surface, thus avoiding foliage, terrain, and minimizing the length of the signal's passage through rain. Each of the individual 840 spacecraft functions as a sovereign switch which knows the position of its neighbors, and independently handles traffic without ground control. The satellites are capable of transporting calls to millions of customers using portable, mobile and fixed residential and business terminals, and gateways to public phone networks. The constellation uses the 20 and 30 GHz frequency bands for communications between Earth and the constellation, and the 60 GHz band for communicating among the satellites. The use of these extremely high frequencies allows for the use of relatively low power, miniaturized antenna components both on the ground and aboard the satellites. The entire constellation is designed to serve over twenty million subscribers and 60,000 full time DS-0 (64 kbps) circuits. The satellites will be coupled to traditional public and private phone systems on the ground through gateways which each utilize relatively large antennas and handle large volumes of call traffic. In the preferred embodiment of the invention, this interface between the terrestrial systems gateway and the terrestrial network is based on current standard ISDN interfaces to preserve compatibility.

Unlike presently available cellular systems which relay calls to subscribers from local radio towers, the present invention offers direct communication between the satellites of the constellation and individuals using lightweight portable, mobile and fixed telephones. This direct link is made possible by innovative miniature antennas coupled to handheld phones. The antennas can be integrally formed as part of the housing of portable phones or may be used as separate components mounted on the outside of a vehicle. They are designed to communicate with satellites that are more than forty degrees above the user's horizon so that interference and shadowing caused by terrain and nearby buildings is substantially eliminated. The handheld antennas comprise multi-element, electronically steerable phased arrays that measure only a few inches in diameter and are less than two inches (5.1 cm) high. While the signals from these antennas are sufficiently powerful to provide dependable service virtually anywhere on land, sea or in the air, the radiated power is low enough to insure that the telephone does not pose significant radiation hazards.

One of the embodiments of the invention includes a faceted, high-gain, antenna array on each satellite. This electronically steered array is formed from a number of flat antenna panels which are fabricated from ultra-lightweight honeycomb materials and advanced composites. The interior of the dome-shaped antenna array contains electronic equipment and batteries, and is used to store solar cell panels which unfurl when the spacecraft reaches its final orbit. Each panel contains a large number of gallium-arsenide (GaAs) monolithic microwave integrated circuits (MMIC) which comprise its antenna array elements, power amplifiers and low-noise receiver pre-amplifiers. The cup-like shape of the satellite allows several satellites to be nested in a compact arrangement that fits within the payload bay of a launch vehicle. Each antenna array simultaneously generates 256 beams which are electronically steered to 4,096 positions on the surface of the Earth. Each individual beam illuminates a region on the ground called a "cell" that measures roughly 400 (20×20) square kilometers. Since the cells are small and the satellite moves rapidly over the Earth's surface, a system in which the cells were fixed relative to the satellite would cause a terminal to be "handed-off" from cell to cell every few seconds. To avoid this, an innovative logical/physical cell mapping scheme is utilized to create "Earth-fixed cells" which enhances the efficiency of the system and eliminates click noise during telephone calls that might result from a constant series of handoffs between satellites.

The present invention also incorporates novel software which runs on a processor onboard each satellite in the network. Autonomous Orbit Determination (AOD) algorithms provide each spacecraft with location information about its own position and the position of every other satellite in the network. This position information is used to determine the optimum pathway for routing call traffic among the satellites in the constellation. These data are also used to maintain each spacecraft in its proper orbital position, to steer antennas that receive and transmit signals from neighboring satellites, and may be used to offer Radio Determination Satellite Service (RDSS) which is superior to service currently available from the Global Positioning Systems (GPS) service. One embodiment of the AOD software employs a ranging algorithm that calculates distances between spacecraft or between spacecraft and ground stations by measuring time delays that are inherent in the radio transmissions conveyed by the network. A second embodiment of the AOD software incorporates an algorithm which fixes spacecraft position by measuring the Doppler shifts of satellite or ground station transmissions. The AOD software also determines the attitude of the spacecraft using data from the antenna steering function. A third embodiment uses signals from known, fixed location ground terminals to determine both satellite location and attitude with great accuracy. Appendix A, which accompanies this specification, contains a complete computer program that embodies the AOD software.

The AOD software generates position information that is used by a second computer program that utilizes a novel Adaptive Routing Algorithm (ARA). Like the AOD software, the ARA runs continuously on a processor on board each satellite. The output produced by the AOD program enables the ARA software to monitor the constantly-changing topology of the constellation. The ARA is also responsible for keeping track of the flow of call traffic through the nodes and links of the constellation and to compensate for traffic congestion and node failures. Appendix B, which accompanies this specification, contains a complete computer program that embodies the ARA software.

Each satellite carries fast packet switch circuitry to direct calls among other satellites and to customers on Earth using portable, mobile and fixed terminals. The voice, data and video information within the communication signals or telephone calls is arranged in a digital format called a "packet." A single call may include thousands, millions, or even billions of packets. The packets comprise a sequence of several hundred ones and zeroes, and are divided into two general groups or strings of bits: the first called a "header," the second referred to as a "payload." The header includes the address of the destination of the packet, while the payload contains the digitized substance of the call itself. The present invention utilizes a "datagram" approach that routes every packet conveyed by the system independently at every node in the network. The packets are directed along an optimized pathway through the network by a fast packet switch that directs traffic based on instructions from the processor that continuously runs the Adaptive Routing Algorithm. The innovative switching methods employed by the fast packet switch present on each satellite optimize the utilization of the network facilities and minimize transmission delays.

The present invention will not only supply an enormous expansion of telephone capacity, but will also offer a broad range of services that will meet rising world demand in the next century. By liberating conventional land-based systems from the tyranny of hierarchical and centralized switching facilities on the ground, the Satellite Communication System will revolutionize the telecommunications industry.

An appreciation of other aims and objectives of the present invention and a more complete and comprehensive understanding of this invention may be achieved by studying the following description of preferred and alternative embodiments and by referring to the accompanying drawings.

BRIEF DESCRIPTION OF THE DRAWINGS

FIGS. 8 and 9 supply side and top views of a generally trapezoidal, semi-conical embodiment of the antennas.

FIGS. 10 and 11 present side and top views of a hemispherical embodiment of an antenna.

FIG. 12 is a perspective view of an embodiment of an antenna which takes the shape of right circular cylinder.

FIG. 13 is a top view and FIG. 14 is a cross-sectional view.

FIGS. 27 and 28 reveal schematic block diagrams of the receive and transmit circuits utilized in one of the several embodiments of the invention.

FIG. 50 also reveals three sets of electronically steered beams produced by the hexagonal antennas and the circular and elliptical footprints which the beams illuminate on the Earth's surface.

FIG. 57 is a side view of the Earth-facing antenna array and space-facing segments of the present invention of an embodiment called Domesat™.

FIG. 58 reveals the space-facing segments in an opened configuration, which allows for the deployment of solar panels that are stored within the spacecraft interior during the flight to low Earth orbit.

FIG. 59 shows the circular arc depicting the movement of the rolled-up solar panels as they are deployed after orbit has been achieved.

FIG. 60 portrays a number of satellites produced in accordance with the present invention stored in a launch vehicle.

FIGS. 61, 62, and 63 depict the sequential deployment of the solar panels.

FIGS. 72, 73, 74, 75, 76, 77, and 78 illustrate an alternative embodiment of spacecraft designs referred to as Batsat™.

FIGS. 87, 88, and 89 are schematics that show routing information diffusion rates.

FIG. 102 is another schematic diagram of a 128 by 128 switch.

FIG. 103 is a schematic diagram of a switching cell.

FIGS. 113a, b and c depict a cell scan pattern, a cell scan cycle, and channel multiplexing in a cell.

FIG. 114a is a perspective view of a Callingsat™ in orbit. This satellite, which is designed for use in the preferred embodiment of the invention, includes eight arms which unfold and extend from a central octagonal panel. Transmit and receive antennas are located on the sides of the arms that face the Earth. An array of solar cells is attached to the body of the satellite by an extendable mast. The solar cells not only supply all on-board power, but also shield the amplifiers and antennas from solar radiation.

FIG. 114b is perspective view of a Domesat™ satellite that is intended for use in an alternate embodiment of the present invention. Domesat™ includes a hemispherical array of hexagonal antenna facets and rectangular solar panels.

FIG. 117 is a perspective view of the assembled Callingsat™, before being launched and deployed into low Earth orbit.

FIG. 120 is a front view of an assembled Callingsat™ before being placed into a launch vehicle.

FIG. 121 is a top view of a Callingsat™ within a launch vehicle.

FIG. 122 is a bottom view of a Callingsat™ within a launch vehicle.

FIG. 128 shows the fully extended solar array storage booms and extension of the inner antenna arrays.

FIG. 132 is a front view of fully deployed Callingsat™.

A DETAILED DESCRIPTION OF PREFERRED AND ALTERNATIVE EMBODIMENTS

System Overview & Architecture

Figure 1:
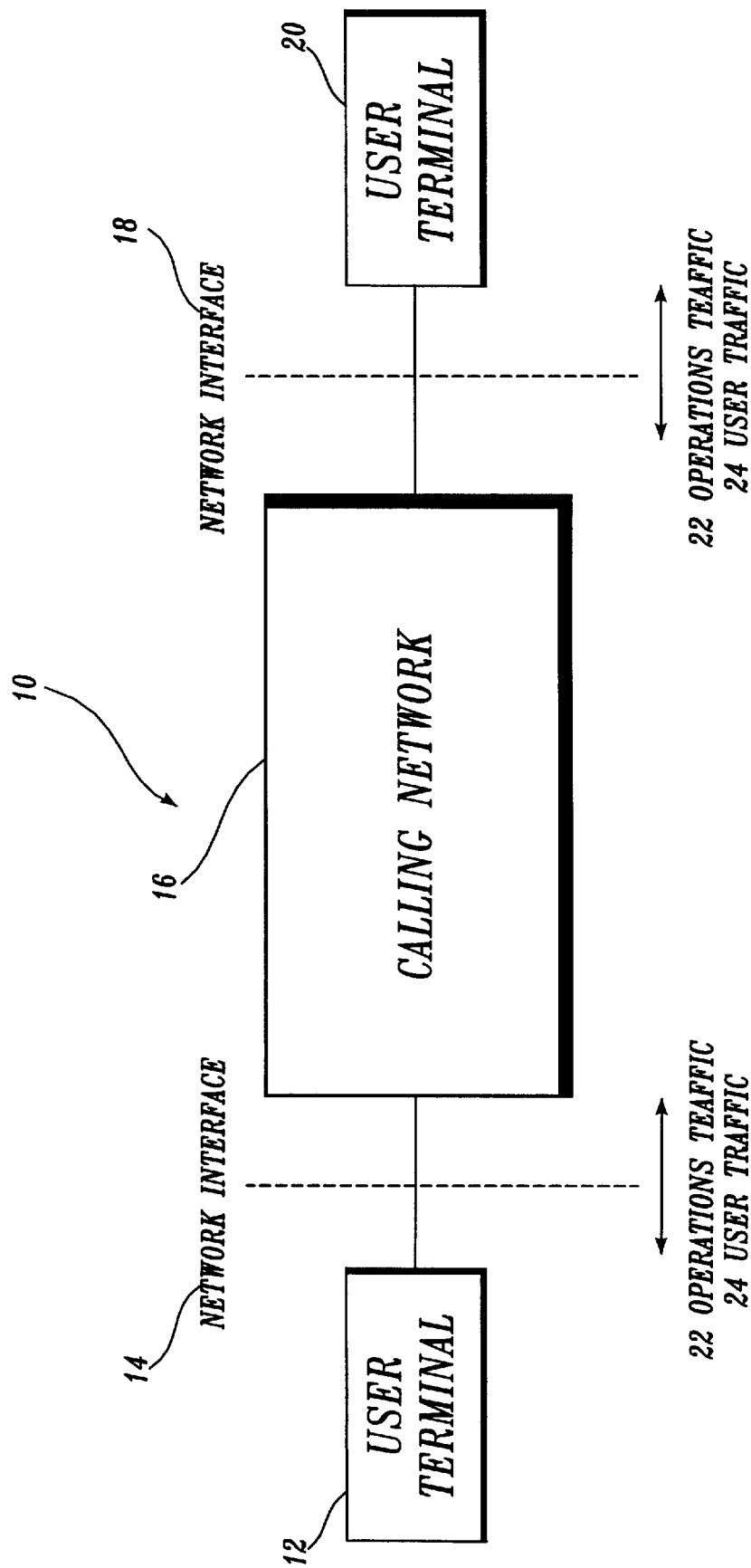
FIG. 1 is schematic diagram which shows a model of the network provided by the present invention.

FIG. 1 is a conceptual block diagram which outlines the fundamental architecture of the preferred embodiment of the present invention. The end-to-end network model 10 shown in FIG. 1 extends from a first generalized user terminal 12, and includes a first network interface 14, the "Calling Network" 16, a second network interface 18 and a second generalized user terminal 20. This system 10 comprises a fast packet network having only a single interface to and from the network which transports two general kinds of messages. These two types of messages are Operations Traffic 22 and User Traffic 24. This architectural configuration contrasts with earlier conventional networks which incorporate separate interfaces and networks for signaling and call handling. The user terminals 12 and 20 depicted in FIG. 1 are generalized terminals that define a particular communications pathway through the system 10. The entire communication system 10 is designed to serve many millions or even billions of terminals.

Figure 2:
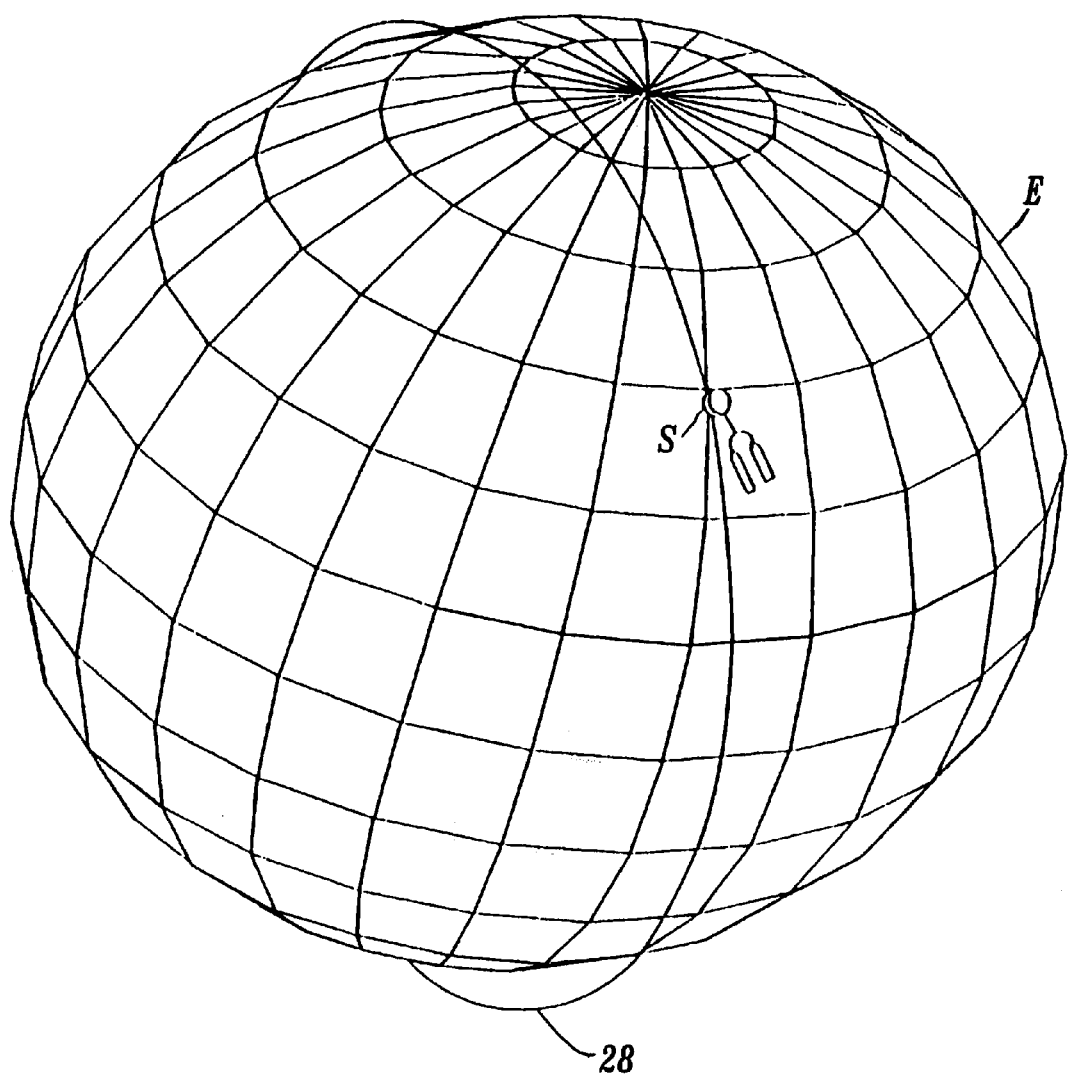
FIG. 2 illustrates a single element of the satellite constellation through the depiction of a single inclined orbital plane occupied by one satellite.
Figure 104:
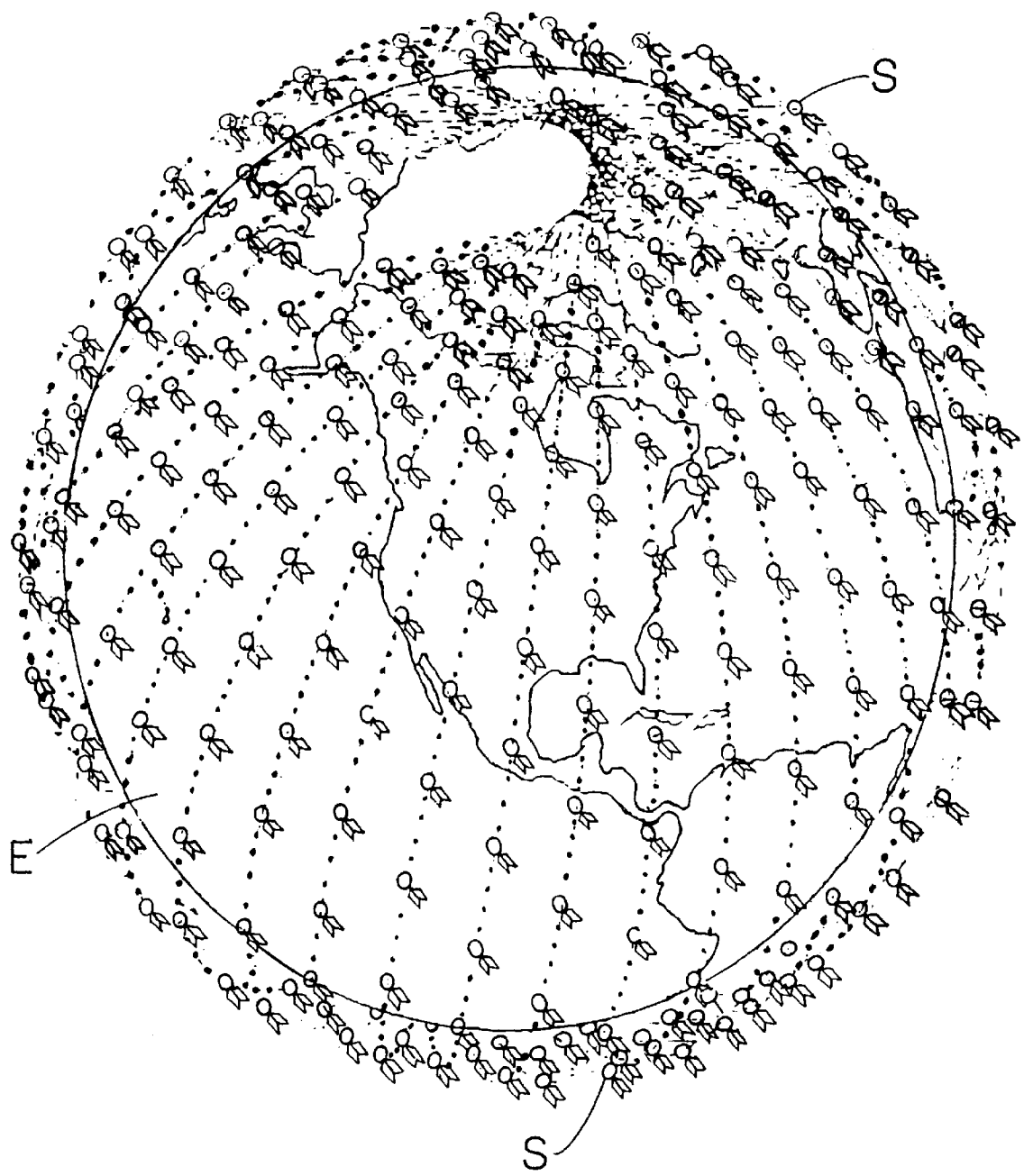
FIG. 104 is a conceptual view of the satellite constellation orbiting the Earth.

FIG. 2 is a schematic depiction of a single satellite (S) of the constellation operating in one of the twenty-one orbits 28 that circle the Earth (E). A conceptual view of a more densely populated constellation (C) is shown orbiting the Earth in FIG. 104.

Figure 3:
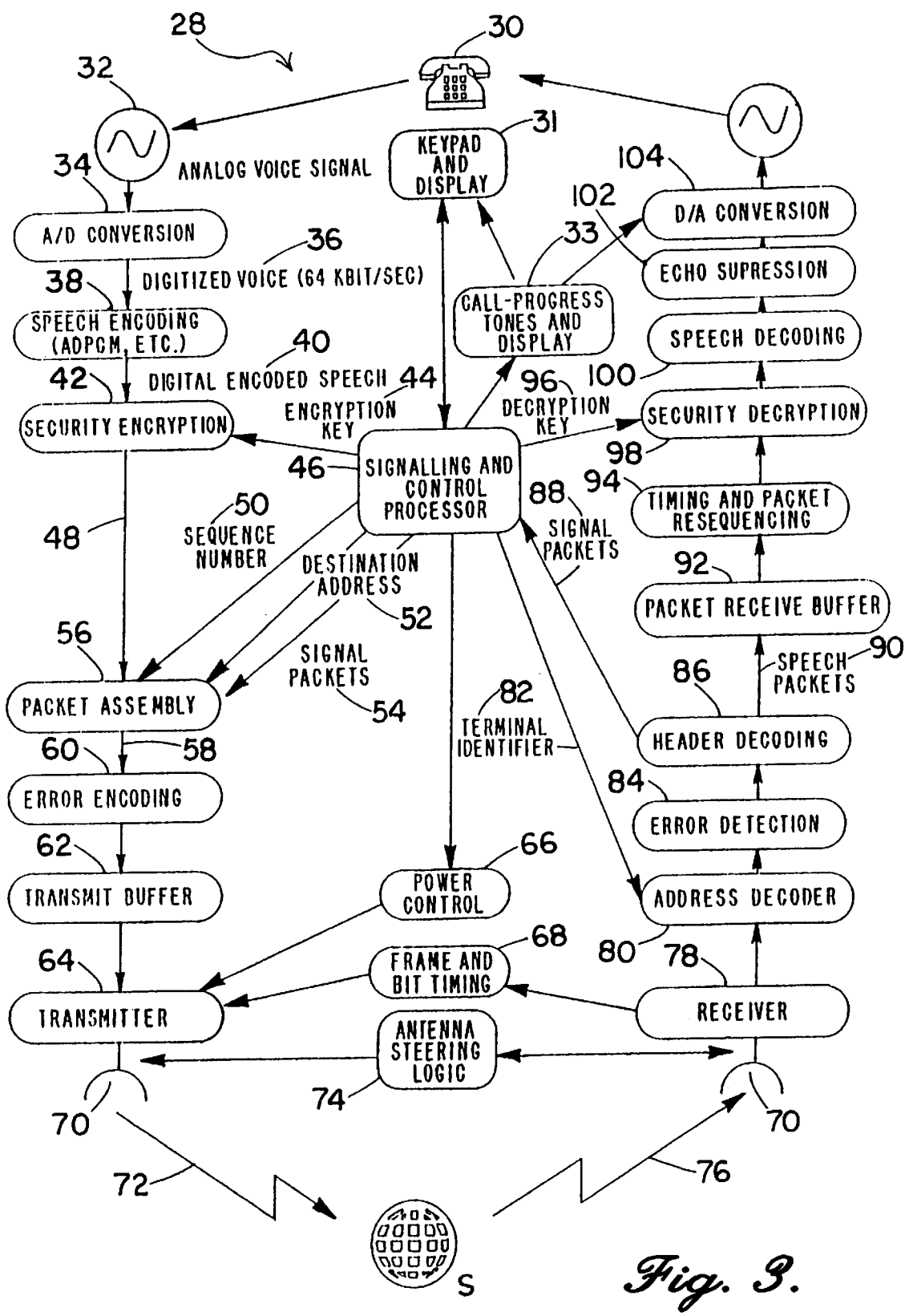
FIG. 3 is a block diagram that reveals the network concepts embodied by the present invention.

FIG. 3 presents functional blocks that each provide specialized signal processing. The components portrayed in FIG. 3 may reside in a hand-held personal phone (P), a mobile phone (M), fixed phone (F), or may be located at a gateway (G). Each of these blocks occupies a particular position along a communications pathway that extends up to one or more satellites S via an antenna, and then back down through the antenna to the terminal 30. Although this network 28 is capable of conveying virtually any form of information, including audio, video or data signals, FIG. 3 emphasizes a telephone call in which voices from either end of the call are transmitted through the network. The user gains access to the network by using the keypad and display 31 on terminal 30. Tones and text appearing on display 31 that help guide the user through the access procedure are generated by circuitry in stage 33. Once the call is established, the user's voice, which is represented in the drawing as an analog voice signal 32, is processed by an Analog-to-Digital "A/D" Converter 34. The digitized output 36 produced by converter 34 is a stream of ones and zeroes which are generated at the rate of 64,000 bits per second (KBIT/sec). The digital signal 36 is then processed by a speech encoder 38, yielding digital encoded speech 40. To protect telephone calls from eavesdroppers, the signal is then passed to encryption equipment 42, which utilizes an encryption key 44 from a signalling and control processor 46. Encrypted output 48 is then combined with sequence numbers 50, destination addresses 52, and signal packets 54 generated by processor 46. All these signals are merged together by a packet assembler 56 that composes packets 58. An error encoder 60 adds information to the packets 58 which enables the packets 58 to be checked for transmission-induced errors farther downstream. The packets 58 that are ready to be transported wait in a transmit buffer 62. In the last processing stage associated with the uplink portion of the journey, packets 58 are forwarded to transmitter 64, which is coupled to power control circuitry 66 and frame and bit timing circuitry 68. Finally, radio signals 72 are emitted from an antenna 70 which may be controlled by steering logic circuits 74.

Signals 76 dispatched from a satellite S may be sensed by the same antenna 70, and are processed by a receiver 78 and an address decoder 80, which receives terminal identifier information 82 from the signalling and control processor 46. After any errors have been discovered by an error detector 84, the header portion of the packet is read by header decoding stage 86. Once the headers are decoded, signal packets 88 are sent to signalling and control processor 46, and speech packets 90, which carry the voice "cargo," are passed to a packet receive buffer 92. These packets 90 are resequenced at stage 94 and decrypted using key 96 at stage 98. At this point, the digital signal undergoes speech decoding 100, echo suppression 102, and is reconstituted as an analog signal at converter 104 that may be perceived by the user at terminal 30.

Figure 4:
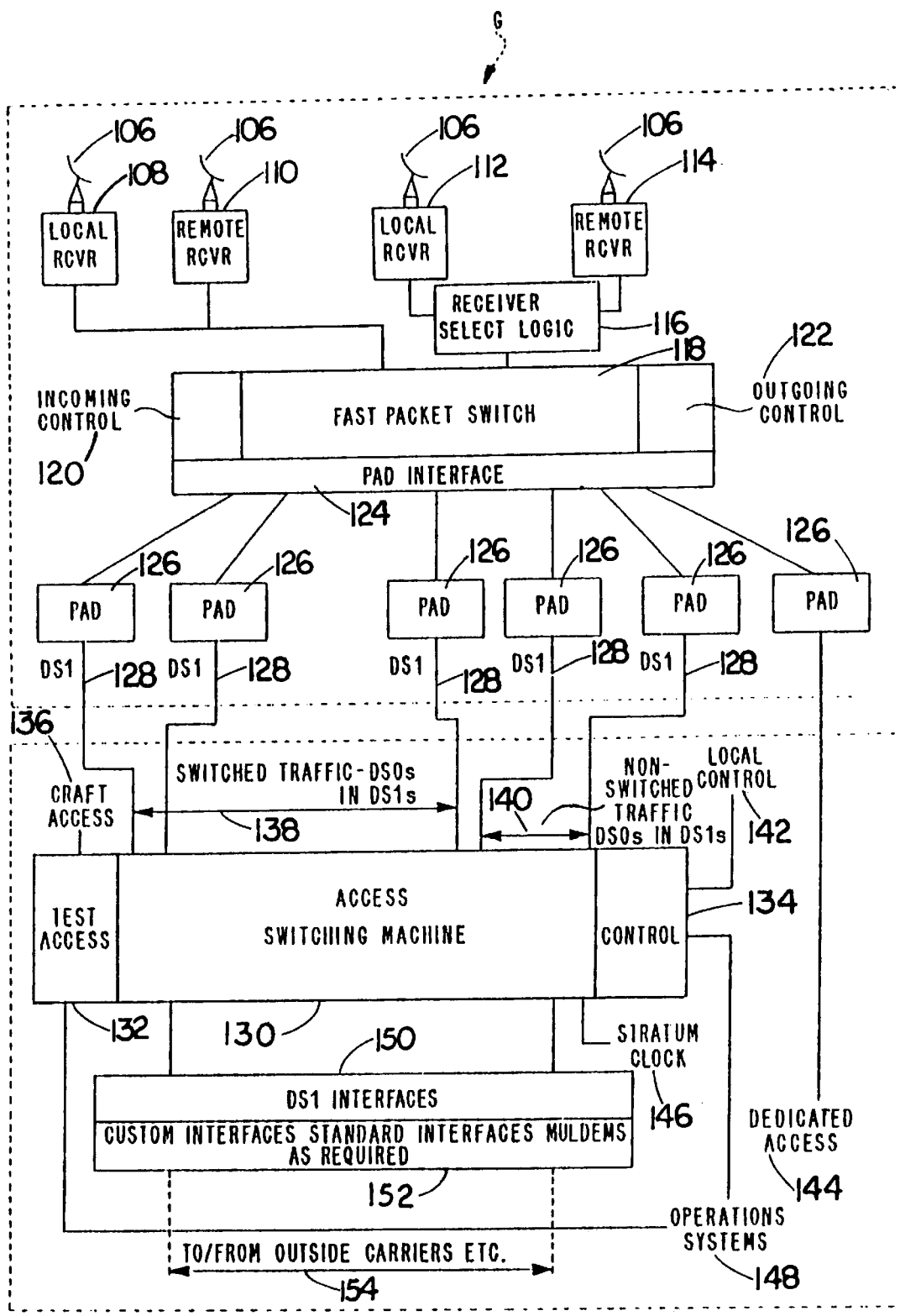
FIG. 4 is a block diagram of a gateway.

FIG. 4 presents a block diagram of an Earth station or gateway G. The gateway G includes antennas 106 which convey signals to local and remote receivers 108 and 110. These antennas 106 are capable of communicating directly with the satellites S in the network. One group of local and remote receivers 108 and 110 are coupled directly to a fast packet switch 118, while another group 112 and 114 are coupled to the fast packet switch 118 through receiver select logic 116. The fast packet switch 118 includes incoming control circuitry 120, outgoing control circuitry 122 and a Packet Assembly and Disassembly interface 124. A series of Packet Assembly and Disassembly (PAD) stages 126 connect the fast packet switch 118 to an access switching machine 130 via DS-1 links 128. The access switching machine 130 comprises test access circuitry 132, which includes a link for spacecraft access 136, control circuitry 134, and a clock 146. Both switched and unswitched traffic 138 and 10 is carried over DS-0 links that are, in turn, conveyed by larger DS-1 links. Local control of the access switching machine 130 in gateway G is maintained over link 142. Dedicated access to one of the PADs 126 is supplied via link 144. Outside telephone carriers 154 are coupled to the access switching machine 130 through operating systems 148, DS-1 interfaces 150, and custom or standard interfaces 152.

Figure 5:
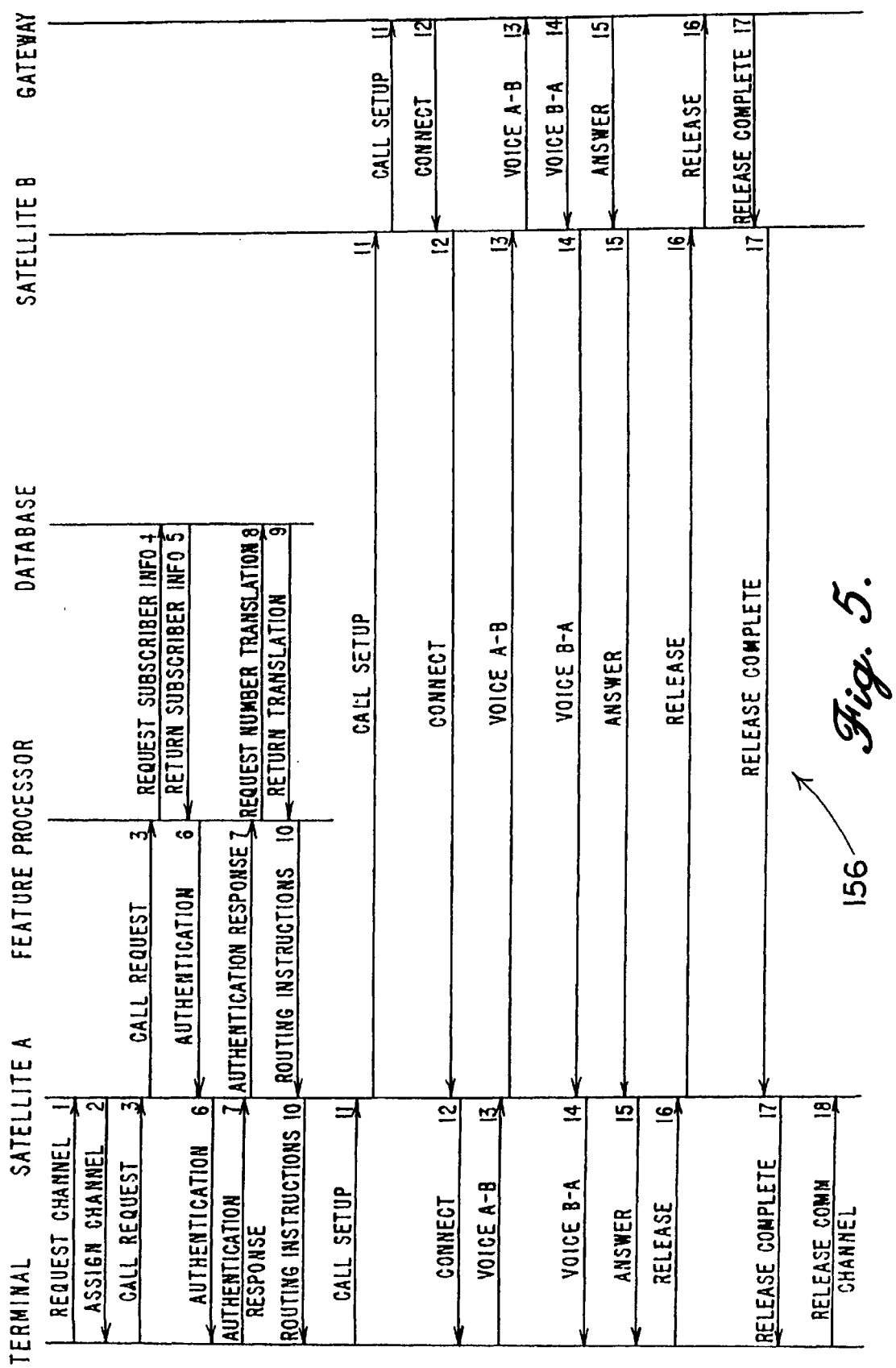
FIG. 5 is a "ping-pong" diagram that portrays the sequence of events that occur when a call is initiated.

FIG. 5 presents a "ping-pong" diagram 156 that portrays the sequence of events that occur when a call is placed between a terminal and a land line. Different portions of the diagram show steps which occur at the terminal and in various satellites and gateways. The chart reveals a sequence of events in which a terminal first requests and is then assigned a communications channel. After subscriber information is authenticated, a call is configured or "setup", and eventually terminated or "released".

Figure 6:
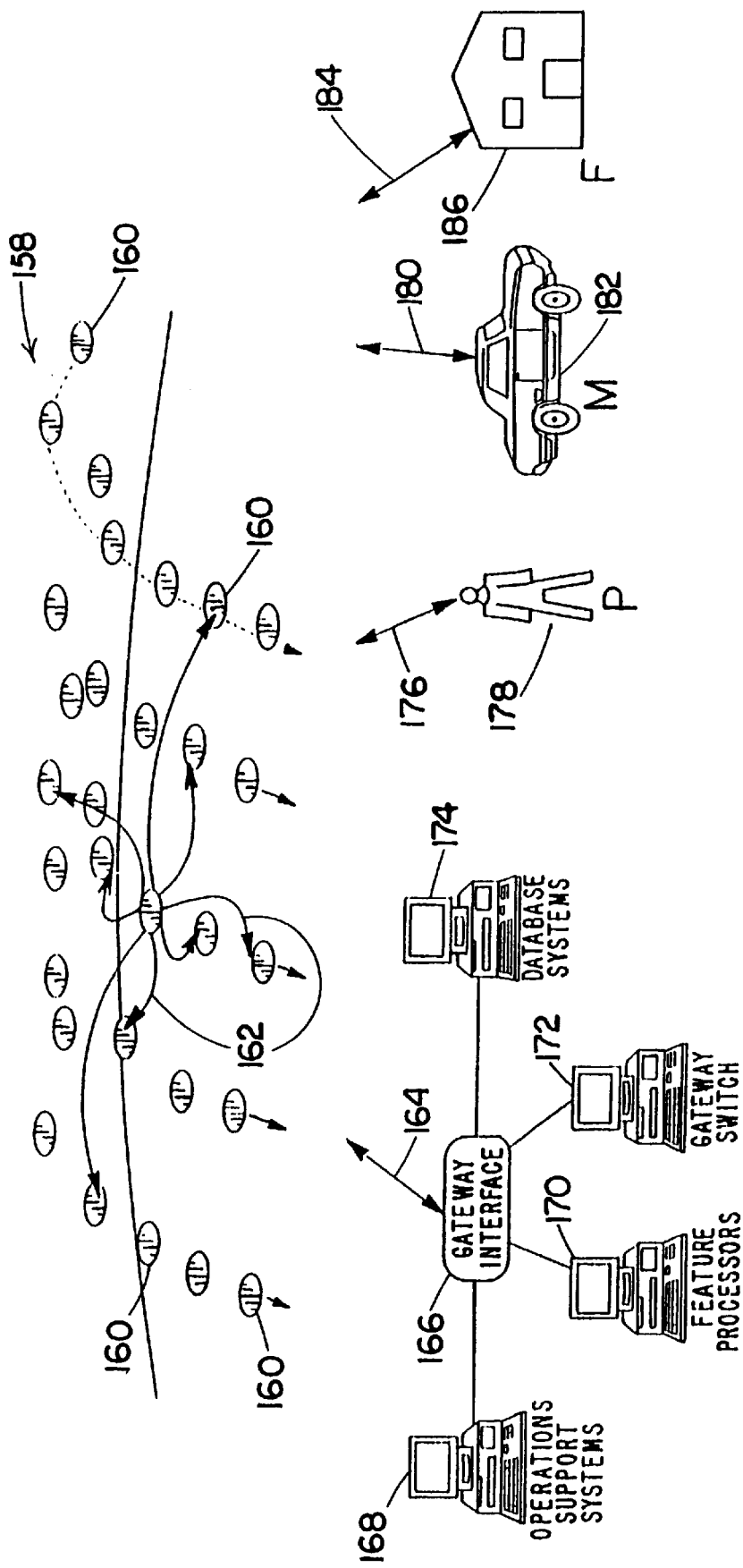
FIG. 6 is a schematic diagram that reveals the fundamental architecture of the present invention.

FIG. 6 is a schematic diagram that reveals the fundamental architecture of the present invention. A portion of the network 158 includes satellite nodes 160, which communicate over inter-satellite links 162. Signals are passed between the orbiting nodes 160 and gateway interfaces 166 over gateway-satellite links (GSLs) 164. The gateway interfaces 166 are, in turn, connected to operation support systems 168, feature processors 170, gateway switches 172 and database systems 174. As shown schematically in FIG. 6, the network 158 also communicates directly with customers 178 using hand-held phones and car phones 182 over mobile terminal satellite links (MTSL's) 176 and 180 that are capable of carrying 16 kilobits of voice or data signals per second (kbps). Subscribers 186 using fixed terminal satellite links (FTSL's) 184 will be able to communicate at the rate of 64 kbps. The apparatus and methods depicted in FIGS. 3, 4, 5 and 6 are explained in greater detail in the sections appearing below entitled System Communication Links and Call Handling.

Terrestrial Antennas

Figure 7:
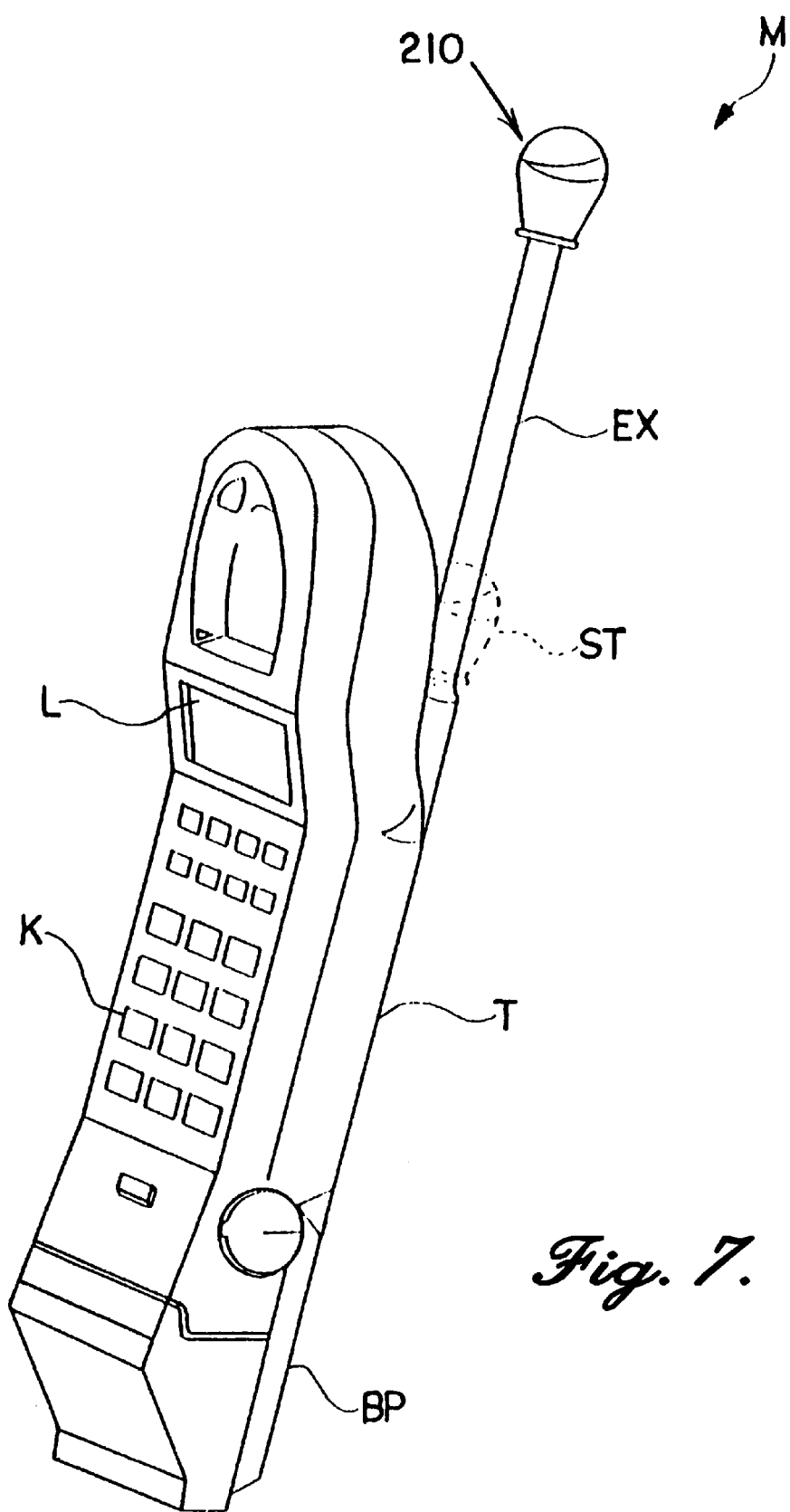
FIG. 7 is a perspective view of a hand-held portable phone. In the preferred embodiment, a hemispherical microwave antenna extends from the body of the phone on a collapsible mast.

FIG. 7 illustrates a hand-held portable phone that includes a Terrestrial Antenna for a Satellite Communication System. In the preferred embodiment, a hemispherical millimeter wave antenna 210 is used in conjunction with a portable telephone T that includes an LCD display screen L, a keypad K, and a battery pack B. In this version of a compact hand-held transceiver T, the antenna 210 is mounted on a collapsible mast M, which is shown in both the extended and stowed positions, EX and ST. FIGS. 8 and 9 exhibit top and side views of the invention 210A, which incorporates a generally trapezoidal, semi-conical housing. An inclined exterior surface 212 includes an upper and a lower portion 212a and 212b. This slanted ring 212 is attached to both a top circular surface 214 and a bottom circular surface 216. Both the side and top surfaces 212 and 214 provide support for a number of generally circular antenna elements 218. The patches 218 on the side 212 of the antenna 210A form an azimuth array, while those situated on the top 214 belong to an elevation array. These elements 218 utilize a conductive patch 220 bearing a cross-slot 222 that is formed from two individual perpendicular slots 222a and 222b. In one embodiment that is designed for use with the 20 GHz band, the diameter of the top surface 214 is 1.5 inches (3.8 cm).

The side surface 212 is 1.0 inch (2.5 cm) high, and the bottom surface 216 is 2.5 inches (6.4 cm) wide. The nominal gain of this embodiment is approximately 20 dB. For the 30 GHz band, the diameter of the radiating patches shrink to about seventy percent of the larger 20 GHz antenna patch. For a trapezoidal geometry where the ratio of the bottom 216 and top 214 surfaces is 5/3, beams emanated by this embodiment are capable of being steered electronically over 360 degrees in the azimuth plane and plus or minus 60 degrees in the elevation plane. Active and passive microwave components are located within the housing attached to a ground plane.

FIGS. 10 and 11 depict another embodiment of the invention 210B, which makes use of dual-frequency radiating elements located on a hemispherical or dome-shaped surface. A hemispherical surface 224, which is mated to a bottom circular surface 226, is covered by antenna elements 218. The preferred embodiment of this configuration 210B utilizes a dome having a diameter of about 2.5 inches (1 cm). The nominal gain of the hemispherical antenna is about 20 dB over the desired range of scan angles. The radiating elements, along with their integrated phase shifter, provide beam steering over 360 degrees in the azimuth plane and plus or minus 60 degrees in the elevation plane. A variation of the dome embodiment 210B is characterized by a flattened or truncated surface at the top of the dome.

FIG. 12 shows a perspective view of an embodiment of the invention 210C that takes the shape of a right circular cylinder having a curved cylindrical surface 228, a top circular surface 230, and a bottom circular surface 232. Like the hemisphere 210B, the cylindrical antenna 210C has a nominal gain of 20 dB, and offers beam steering over 360 degrees in the azimuth plane and plus or minus 70 degrees in the elevation plane. For 20 GHz operation, this antenna is designed to measure three inches (7.6 cm) across and one inch (2.5 cm) high. A reduction of thirty to forty per cent can be achieved if the 30 GHz frequency is utilized.

Figure 13:
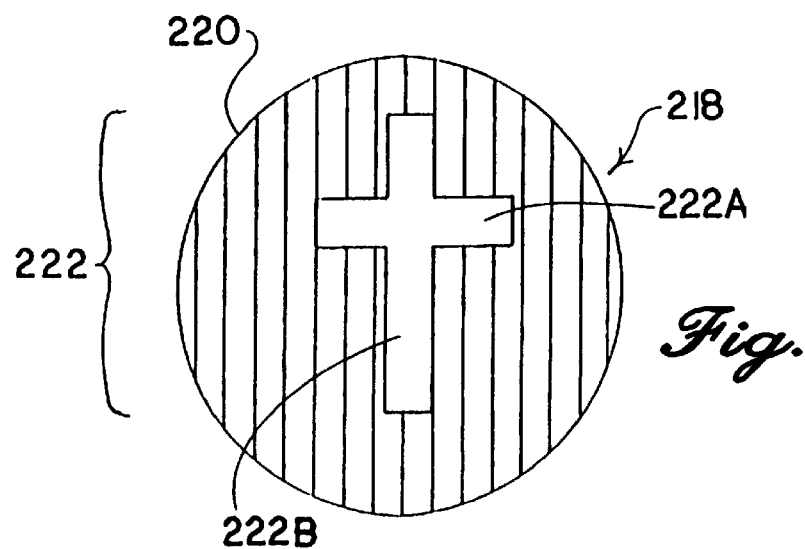
FIGS. 13 and 14 provide enlarged illustrations of one of the circular antenna elements.
Figure 14:
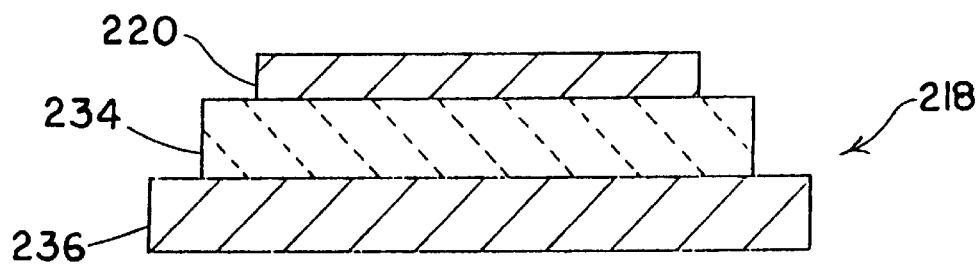
Figure 15:
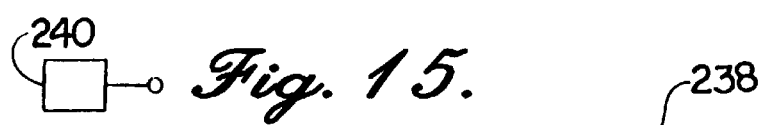
FIGS. 15, 16, 17, 18, and 19 are schematic representations of a five bit, time delay phase shifter.
Figure 16:
Figure 17:
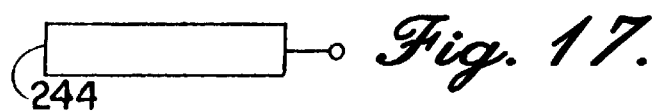
Figure 18:
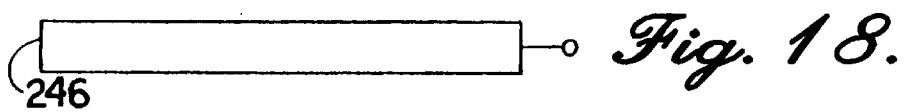
Figure 19:
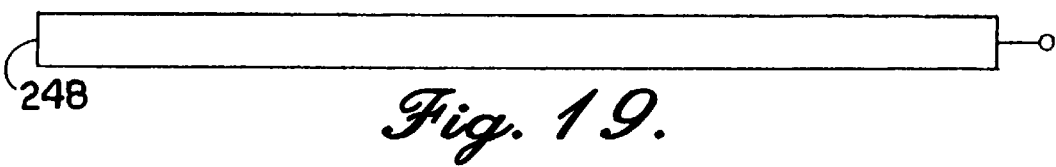

FIGS. 13 and 14 supply detailed renditions of one of the circular antenna elements 218. FIG. 13 is a top view which includes a conductive patch layer 220 that has been milled, molded, or etched so that it bears two intersecting slots 222a and 222b. The resulting cross-slot 222 comprises two perpendicular slots which do not have equal lengths. The dissimilar lengths insure that the radiation emitted from the antenna 210 will be circularly polarized. FIG. 14 portrays a cross-section of element 218. A copper patch 220 that includes cross-slot 222 sits atop a nonconductive substrate layer 234, which resides above a ground plane layer 236. Each conductive patch 220 is 233 mils in diameter and from 0.25 to 1.00 mil thick.

FIGS. 15, 16, 17, 18 and 19 supply schematic diagrams of a five bit, time delay phase shifter 238. Each printed circuit delay line 240, 242, 244, 246, and 248 provides the necessary phase shift depending on the line length. In one embodiment of the invention, these lines 240, 242, 244, 246, and 248 provide phase shifts of 11.25, 22.50, 25.00, 90.00, and 180.00 degrees, respectively. The present invention utilizes these conductive pathways to select the appropriate delay for steering the antenna beams. Each antenna element 218 is coupled to its own phase shifter 238. The series-resonant printed circuit patch arrays are formed by connecting rows of patches through high impedance microstrip lines. The radiating patch elements are excited by low-loss microstrip lines arranged perpendicular to the resonant arrays. Each feed line will excite all the resonant arrays, forming a pencil beam in the broadside direction. The direction of the beam is steered by the low-loss, phase shifting elements with solid state switches located in the feed line. The present invention combines the phased array section and using a common aperture beamformer into a compact, low-loss, low-profile antenna structure.

Figure 20:
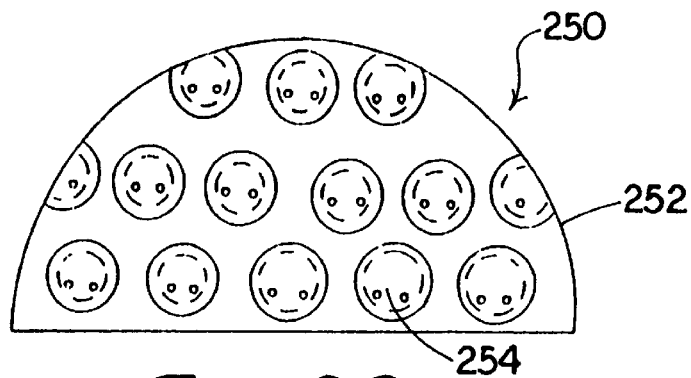
FIGS. 20, 21, and 22 reveal side, cross-sectional, and top views of an alternate embodiment of the invention which incorporates dual frequency antenna elements.
Figure 22:
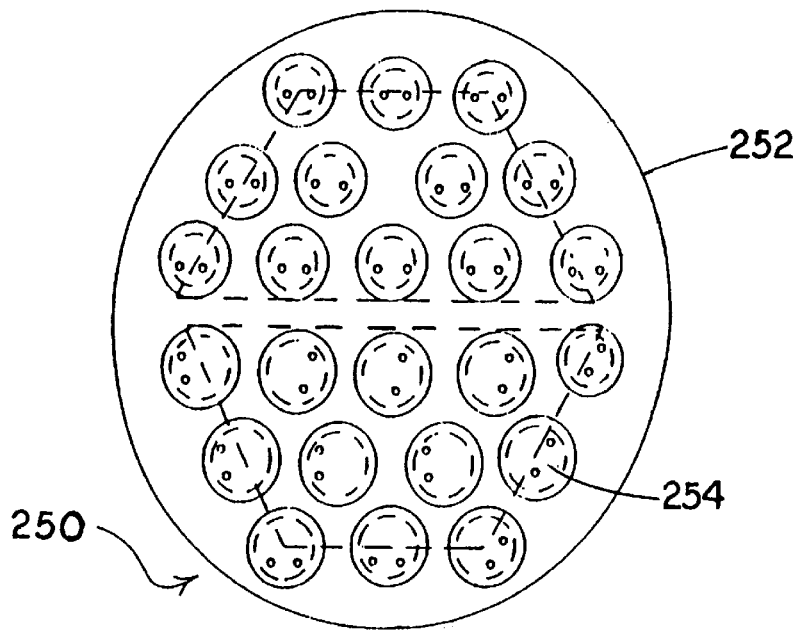
Figure 21:
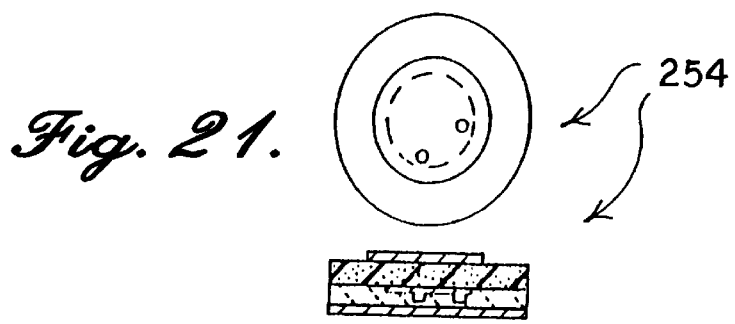
Figure 23:
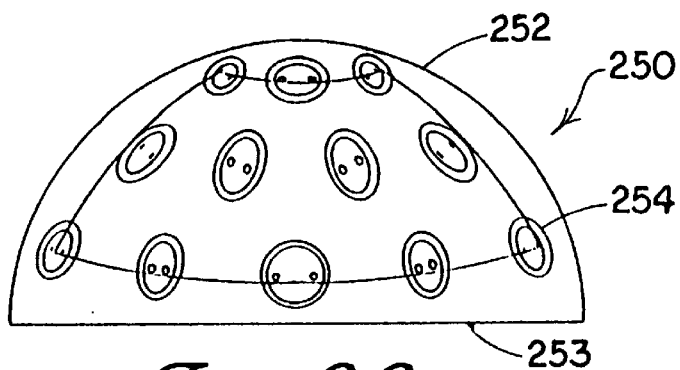
FIGS. 23 and 24 show enlarged side and top views of one of the alternative embodiments of the dual frequency antennas.
Figure 24:
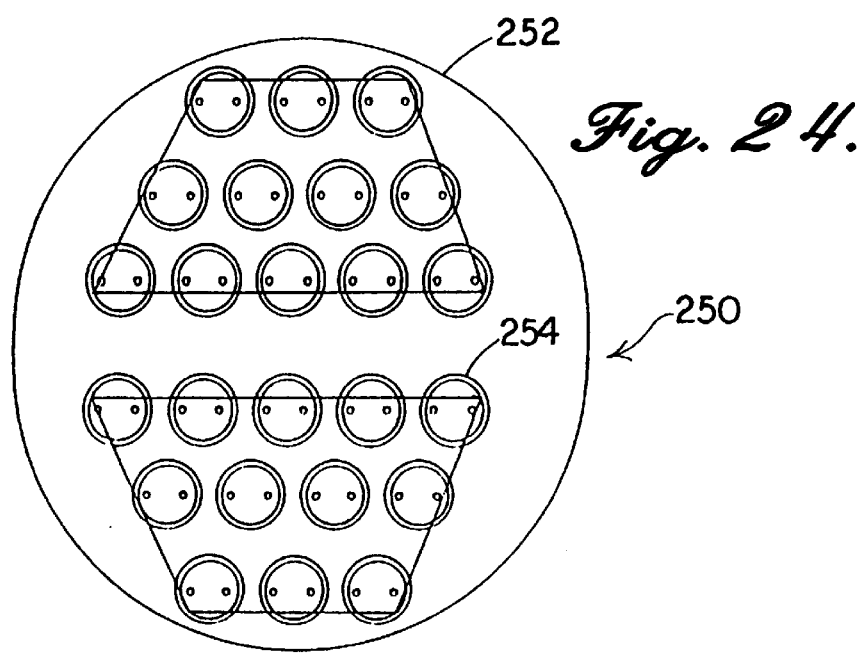
Figure 25:
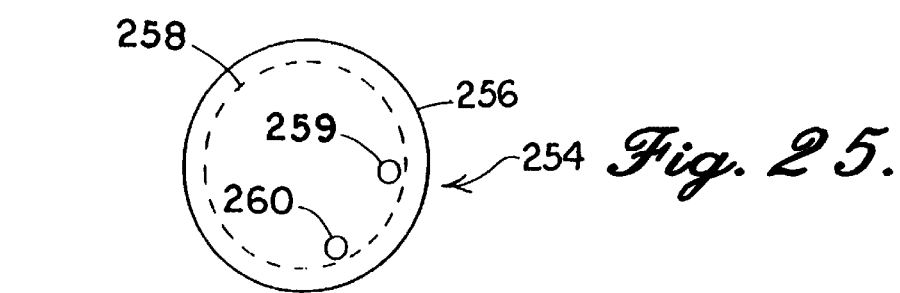
FIGS. 25 and 26 depict enlarged top and cross-sectional views of one of the dual frequency antenna elements.
Figure 26:
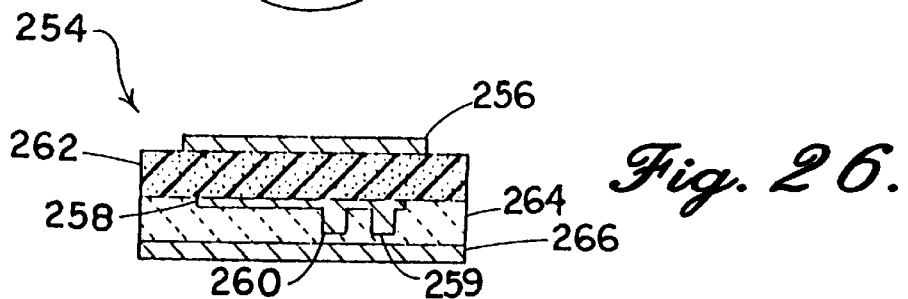

FIGS. 20, 21 and 22 reveal side, cross-sectional and top views of an embodiment of the invention 250 which incorporates a hemispherical structure 252 covered by dual frequency antenna elements 254. FIGS. 23 and 24 show enlarged side and top views of one of the alternative embodiments of the dual frequency antennas. The edge of lower circular surface 253 is visible in FIG. 23. FIGS. 25 and 26 show enlarged top and cross-sectional views of one of the dual frequency antenna elements 254 which includes an upper conductive layer 256, a lower conductive layer 258, and two conductive vias 259 and 260. The cross-sectional view in FIG. 26 also depicts a foam layer 262, a dielectric layer 264, and a ground plane layer 266. The radiating elements are printed on a high performance substrate. The feed networks and distribution circuits are printed on the lower side of the substrate. The active microwave components are located below the dielectric substrate. The entire antenna structure is secured to the ground plate 266.

Figures 27, 28:
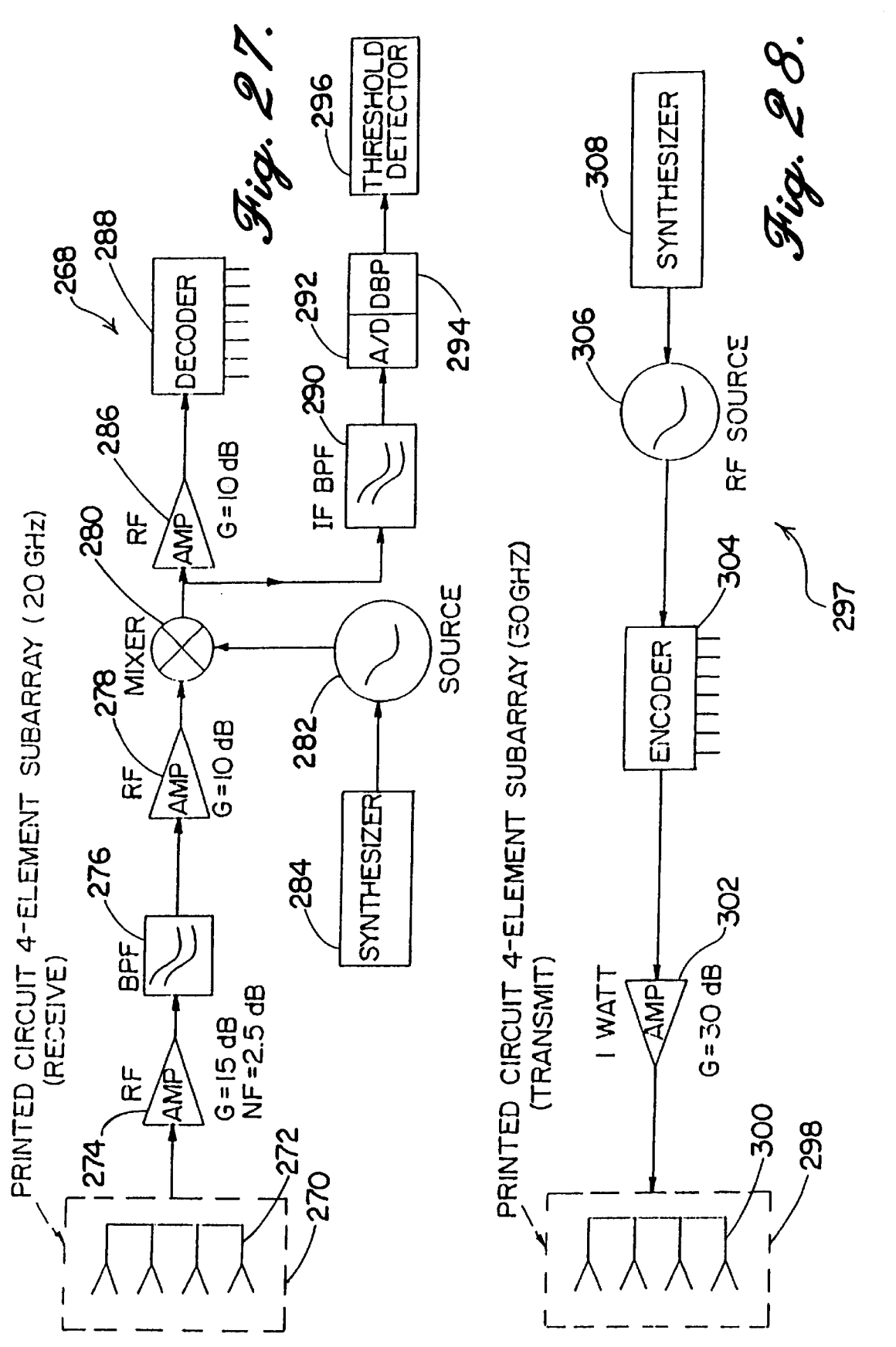

FIGS. 27 and 28 reveal schematic block diagrams of the receive and transmit circuits 268 and 297 utilized in one of the several embodiments of the invention. The receive circuit 268 comprises a 20 GHz printed circuit four element subarray 270 which includes feeds 272. The feeds 272 convey signals to a first radio frequency (RF) amplifier 274, a first band pass filter (BPF) 276, a second RF amplifier 278, and a mixer 280. The mixer 280 combines the output of the second RF amplifier 278 and a source 282, which, in turn, receives the output of a synthesizer 284. The output of the mixer 280 is fed to a third RF amplifier 286 and to an intermediate frequency (IF) band pass filter (BPF) 290, an analog-to-digital (A/D) converter 292, a digital band pass filter (DBP) 294, and a threshold detector 296. A decoder 288 is connected to the output lead of RF amplifier 286. The transmit circuit 297 shown in FIG. 28 contains a 30 GHz printed circuit four element subarray 298 which has feeds 300 coupled to an amplifier 302, an encoder 304, an RF source 306 and a synthesizer 308.

Figure 29:
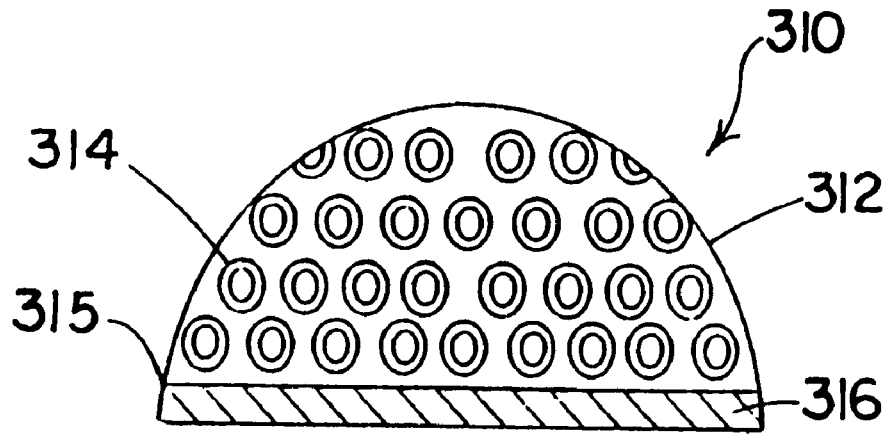
FIGS. 29 and 30 depict side and top views of another embodiment of the miniaturized antenna.
Figure 30:
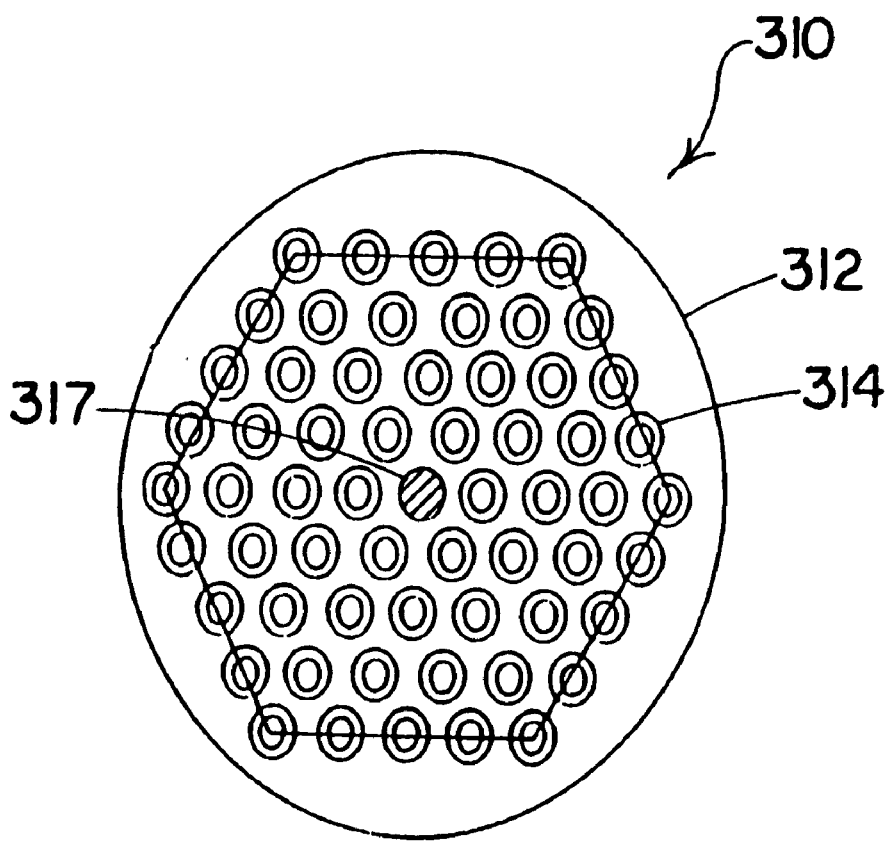

FIGS. 29 and 30 depict side and top views of another embodiment 310 of the miniaturized antenna that is characterized by a top element 312, radiating elements 314, a soft substrate 315, a ground plane 316 and a dummy element 317. The radiating elements 314 are arranged in a hexagonal lattice pattern and are separated by approximately 0.075 inches (0.19 cm).

Figure 31:
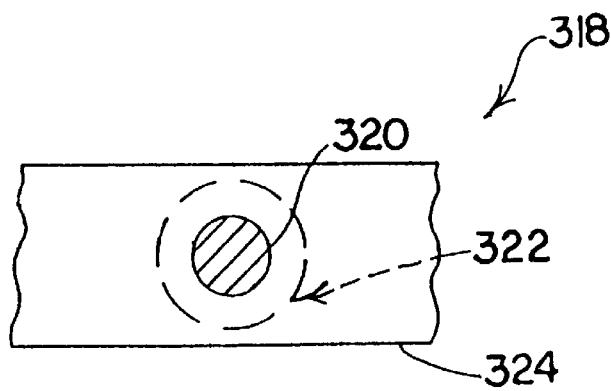
FIGS. 31, 32, 33, and 34 are plan and sectional views of dual frequency antennas.
Figure 32:
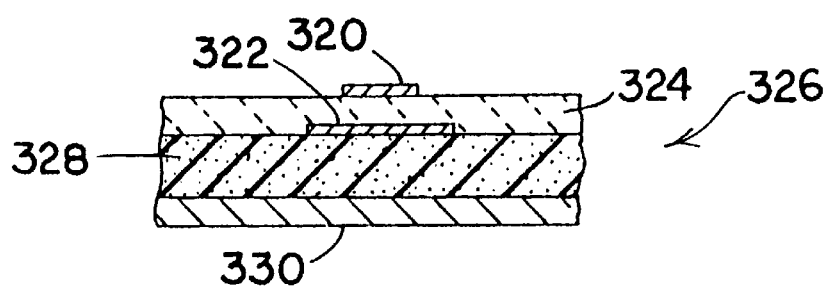
Figure 33:
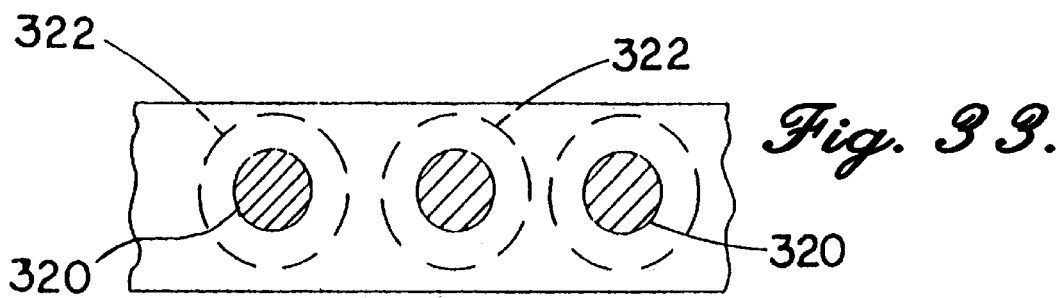
Figure 34:
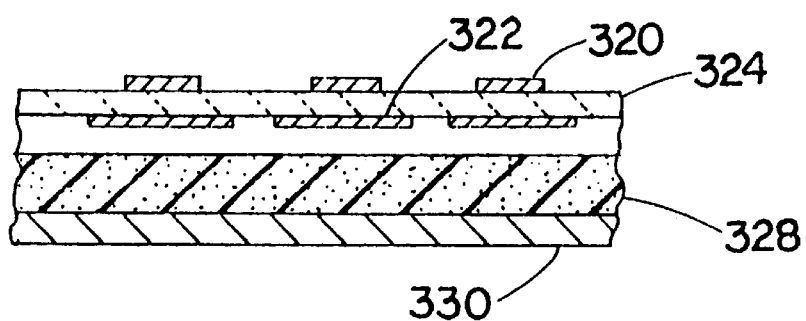

FIGS. 31, 32, 33, and 34 are plan and sectional views of dual frequency antennas. FIG. 31 exhibits a top view 318 of a 30 GHz printed circuit patch element 320 above a 20 GHz patch element 322. FIG. 32 shows the same hardware in a cross-sectional side view 326 that reveals the substrate layer 324 that separates the 20 GHz and 30 GHz elements 320 and 322, as well as a layer of foam 328 and a ground plane 330. FIG. 33 shows a series of 20 and 30 GHz patches residing together on a portion of an antenna. FIGS. 33 and 34 portray an alternative arrangement in which the active patches 320 and 322 are situated on either side of the substrate 324, as opposed to having element 322 embedded within substrate 324 as shown in FIG. 32.

Figure 35:
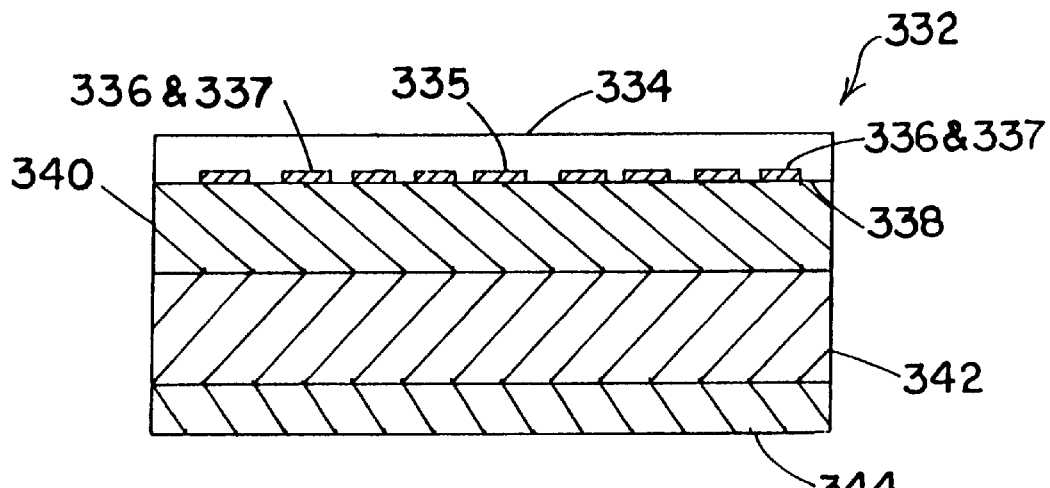
FIGS. 35 and 36 show cross-sectional and plan views of an antenna with a hexagonal lattice.
Figure 36:
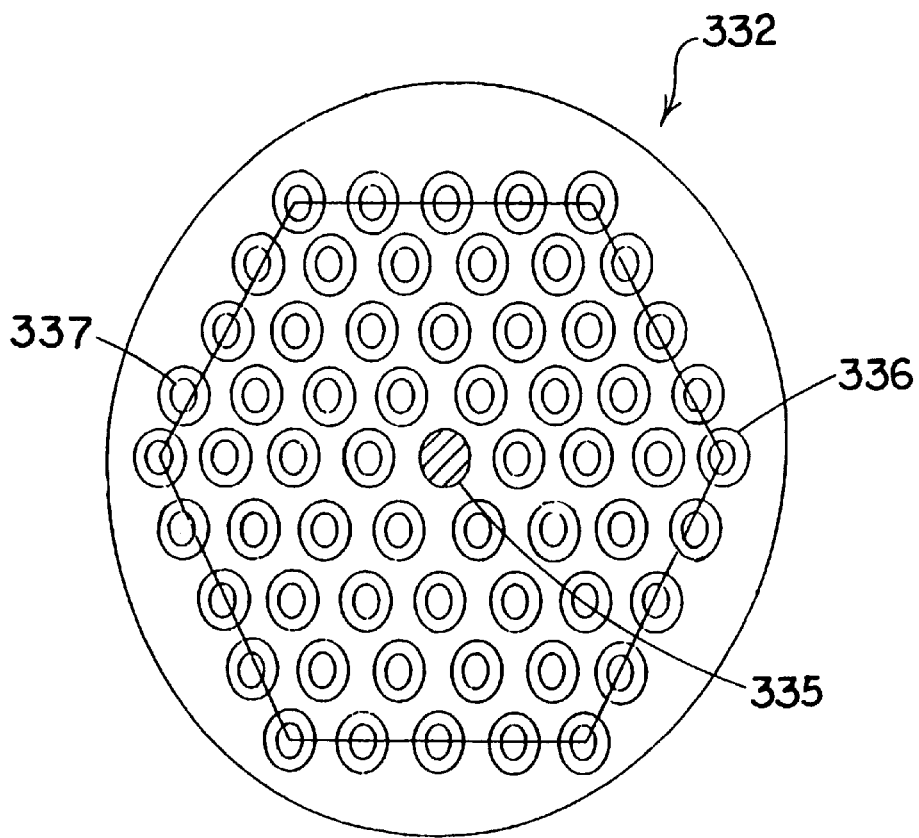

FIGS. 35 and 36 show cross-sectional and plan views of an antenna with a hexagonal lattice. FIG. 35 comprises a cross-sectional view 332 that includes a radome 334 covering a dummy element 335, dual frequency printed circuit elements 336 and 337, a microwave substrate 338, feed networks and distribution circuits 340, active microwave components 342, and a ground plane and support structure 344. The top view shown in FIG. 36 reveals an array of 20 and 30 GHz patches 336 and 337 deployed in a hexagonal lattice with the dummy element 335 at its center.

The Terrestrial Antennas disclosed above may be used for voice or data communications. The portable transceiver unit T that incorporates the present invention 210 will provide a direct ground to satellite link (GSL) to a constellation of 840 spacecraft in low Earth orbit. The compact antennas 210 are designed to send and receive signals to satellites that are within a cone having a vertical axis that point toward the zenith which measures 80 degrees across. The angle from the terminal to the satellite, called the "mask angle," is sufficiently wide to insure that there are always at least two satellites in the constellation flying overhead to service portable units, but is also high enough above the horizon to virtually eliminate occultation by terrain, buildings, or trees. The 40 degree mask angle also limits the path length of the signal, protects link margins and thus reduces power requirements.

For optimal performance, the vertical axis of the antenna 210 should point at the zenith, but the beam steering capabilities of the antenna 210 can overcome the effects of using the transceiver T at different angles, as long as the signal from the portable phone remains pointed somewhere within the mask angle. If the orientation of the antenna 210 presents a problem for the subscriber, the hand-held unit can be connected to an external antenna which is mounted at a fixed angle or which is more sensitive. The low power design of the present invention substantially eliminates any radiation hazards.

The number of elements 218 which are deployed on the antennas 210 is directly proportional to the total gain achieved by the array. The number, N, for a hexagonal lattice is given by the expression:

$$N = ((1.5 * D/\lambda))^2$$

where D is the aperture and λ is the wavelength at the highest frequency. This expression indicates that about 61 elements having two inch (5.1 cm) aperture should be used for a frequency of 30 GHz. The appropriate phase shift, φ, that is electronically selected to steer the beams using the various microstrip phase delay lines is determined by the following equation:

$$\phi = \frac{2\pi\lambda}{d} \sin\theta$$

where θ is the scan angle.

The design choices for the selection of materials is largely determined by the performance requirements that are encountered using the 20 GHz the 30 GHz frequency bands. Three commercially available materials would be suitable for the substrates for the present invention. These include Rohacell™ rigid styrofoam material and Roger RT/5870 and RT/5880 materials, which are both glass microfiber-reinforced PTFE composite substrates. While Teflon™ fiberglass is an extremely rigid material, which is a desirable property for the substrate, its cost is nearly twice that of styrofoam. The dielectric constant, $e_r$, for each of these substrates ranges from 1.35 to 2.55. Although styrofoam is the least expensive material, it is far less rigid than either RT/5870 or RT/5880. One quarter ounce copper is used for the printed circuit antenna elements. The housing enclosure can be fabricated from a lightweight aluminum alloy.

Fast Packet Switch

The fast packet switch aboard each satellite in the constellation provides novel fast packet switching for a network having a rapidly changing topology. Each packet moved through the network is routed independently at each network node along an optimum route that is determined by an innovative adaptive routing algorithm.

The switching methods disclosed and claimed in this patent application overcome the limitations encountered by conventional packet switching using virtual circuits. The fast packet switch utilizes a "datagram" approach that routes every packet conveyed by the system independently at every node in the network. The packets are directed along an optimized pathway through the network by a fast packet switch that directs traffic based on instructions from a microprocessor that continuously runs an adaptive routing algorithm. This microprocessor uses orbital position information generated aboard each spacecraft to monitor the rapidly changing topology of the constellation and the distribution of traffic among its nodes and links. The self-routing fast packet switch works in combination with an input packet processor, a routing cache memory, and an adaptive routing processor. The input packet processor functions like a gatekeeper or guide that extracts the destination node address from each packet and uses it to access routing information stored in the routing cache memory. The adaptive routing processor constantly updates the routing cache memory so each satellite has an accurate "knowledge" of the whereabouts of all its neighbors, and of the expected packet delay from adjacent nodes to all possible destination nodes. Based upon this position and expected delay information, the adaptive routing processor selects the best pathway from a particular satellite to a single neighboring satellite, and the packet is then moved through internal switch circuitry onboard the satellite on its way to other spacecraft in its journey to some eventual destination on Earth. The switching methods of the present invention optimize the utilization of the network facilities and minimizes transmission delays and variances of transmission delays. By precalculating the optimal route for each packet one step at a time at each satellite, the amount of time required to process individual packets is greatly reduced.

Figure 37:
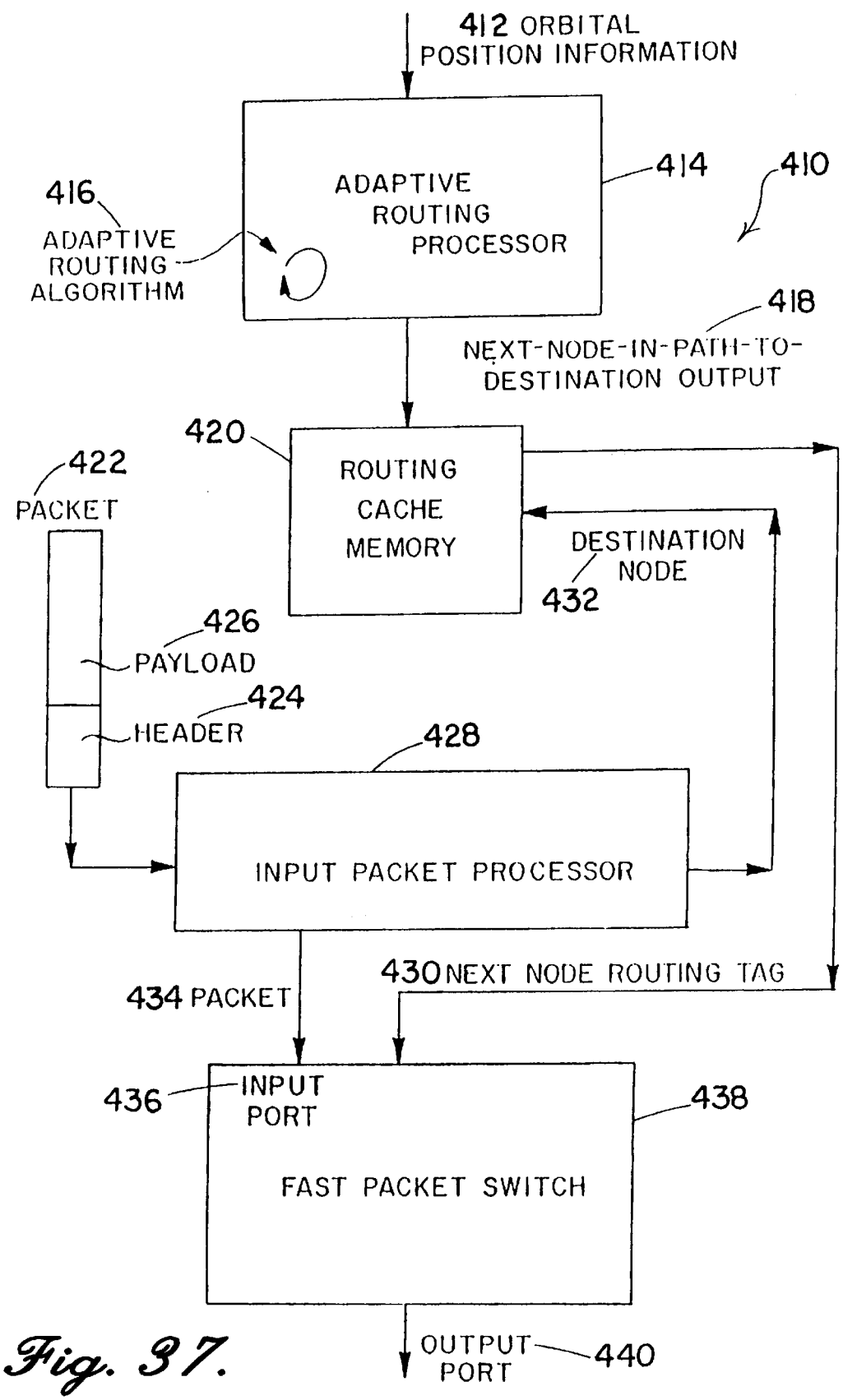
FIG. 37 is a flowchart of the preferred embodiment of the fast packet switch.

FIG. 37 is a flow chart 410 that explains the switching process as it occurs on each satellite S in the constellation C. Orbital position information 412 is an input to an adaptive routing processor 414 which runs an adaptive routing algorithm (ARA) 416. The ARA 416 constantly monitors the changing locations of all the spacecraft S in the network, and also keeps track of communications traffic congestion among the links and nodes of the system. The adaptive routing processor 414 produces an output called "Next-node-in-path-to-destination" 418. As the name implies, this output 418 contains information and provides instructions for moving communications data through the network one node at a time.

Packets 422 generated by a packetizing circuit (not shown) arrive at one of the satellites S from a portable P, mobile M or fixed F terminal or gateway G or from another satellite S. Packeting circuits may include analog-to-digital converters that are well known in the electronic arts which translate audio signals to streams of digital bits. Each packet 422 comprises a string of one's and zero's and is divided into two general sections called a header 424 and a payload 426. The header 424 includes the address of the packet's destination, and information called a destination node 432, which refers more particularly to the location in the network where the packet must be delivered. An input packet processor 428 receives an asynchronous sequence of packets in a serial transmission format. Each packet 422 contains information in its header section 424 that enables circuitry aboard the satellites S to route the packets 422. The input packet processor 428 extracts the destination node information from each packet 422 and forwards the destination node 432 as an input to a routing cache memory 420. This memory 420 is also the recipient of next-node-in-path-to-destination output 418 produced by the adaptive routing processor 414. Since the routing cache memory 420 is used by more than one input packet processor 428, a time-sequencer or multiple cache memories can be used to eliminate contention problems that occur when more than one input packet processor 428 seeks the services of the cache 420.

The input packet processor 428 receives a next node routing tag 430 from the routing cache memory 420 prepends the tag 430 to the processed packet 434, and forwards the packet 434 to a fast packet switch 438. The switch 438 receives the processed packet 434 through one of its many input ports 436, and conveys it to one of many multi-stage self-routing switch sections (MSSRSS) within it. The tag 430 is read by an MSSRSS, and the MSSRSS automatically routes it to an asynchronous packet multiplexing section (APMS). The multiplexing section multiplexes the packets 434 received in parallel from various input ports 436 into a serial output stream at one of its output ports 440.

Figure 38:
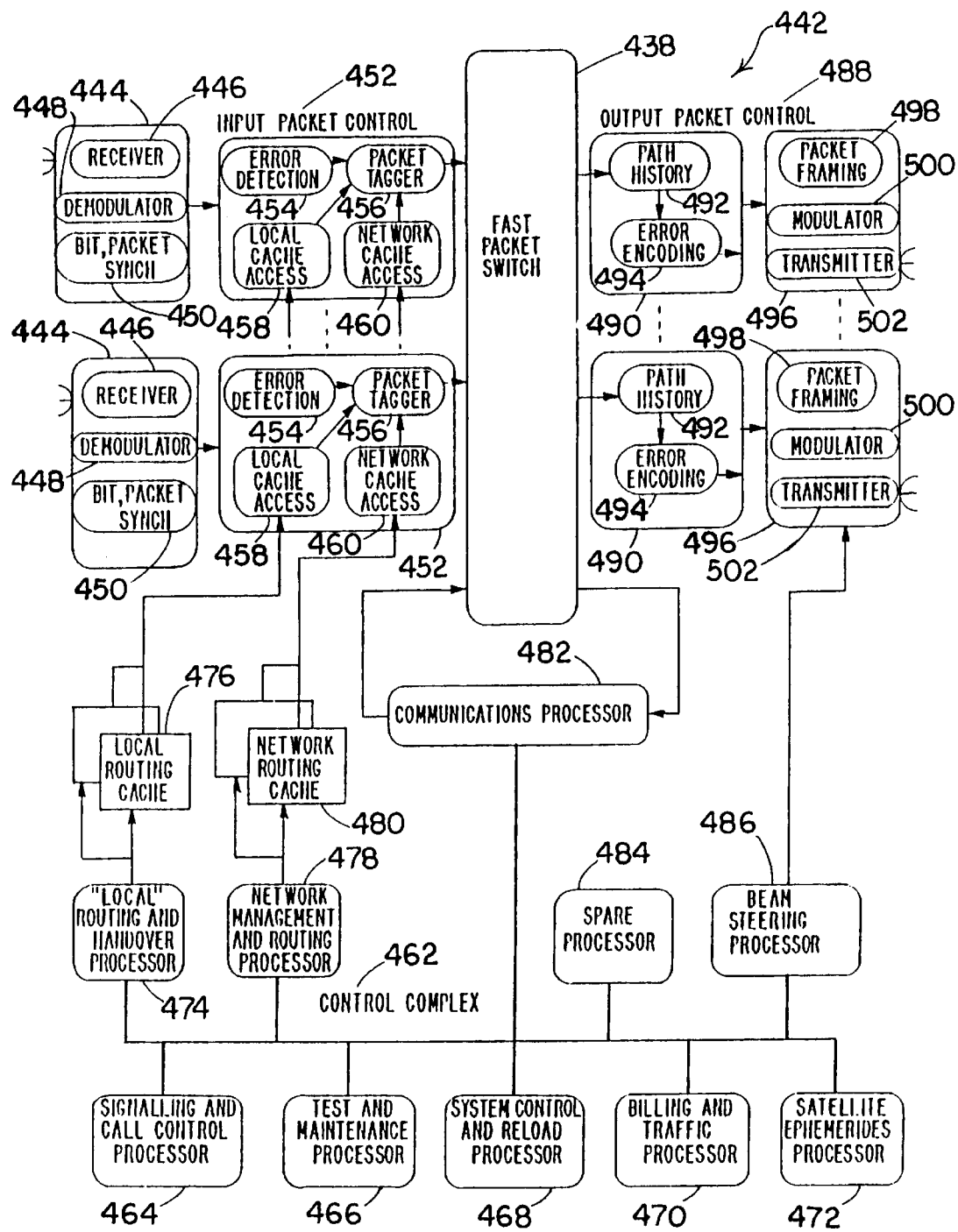
FIG. 38 presents a block diagram of a satellite switch node.

FIG. 38 presents a block diagram of a satellite switch node 442. One fast packet switch 438 is shown in the upper portion of the diagram, and receives signals from a series of circuit modules 444 and 452. Module 444 includes a receiver 446 coupled to receive antennas (not shown in FIG. 38), a demodulator 448, and a bit/packet synchronizer 450. Module 452 provides input packet control, and comprises circuits for error detection 454, packet tagging 456, local cache access 458 and network cache access 460. The series of input packet control modules 452 are also connected to control complex 462 through a local routing cache 476 and a local routing and handover processor 474. Another link to the input packet control modules 452 are coupled to the control complex 462 through a network routing cache 480 and a network management and routing processor 478. The control complex 462 is an array of circuit stages that include a signalling and call control processor 464, a test and maintenance processor 466, a system control and reload processor 468, a billing and traffic processor 470 and a satellite ephemerides processor 472. The control complex 462 is coupled to a communications processor 482, a spare processor 484 and a beam steering processor 486, which is connected to output packet control modules 490 and 496. Modules 490 comprise circuits that keep track of path history 492 and that are responsible for error encoding 494. Modules 496 include packet framing circuits 498, modulators 500 and transmitters 502 connected to transmit antennas (not shown in FIG. 38).

Figure 39:
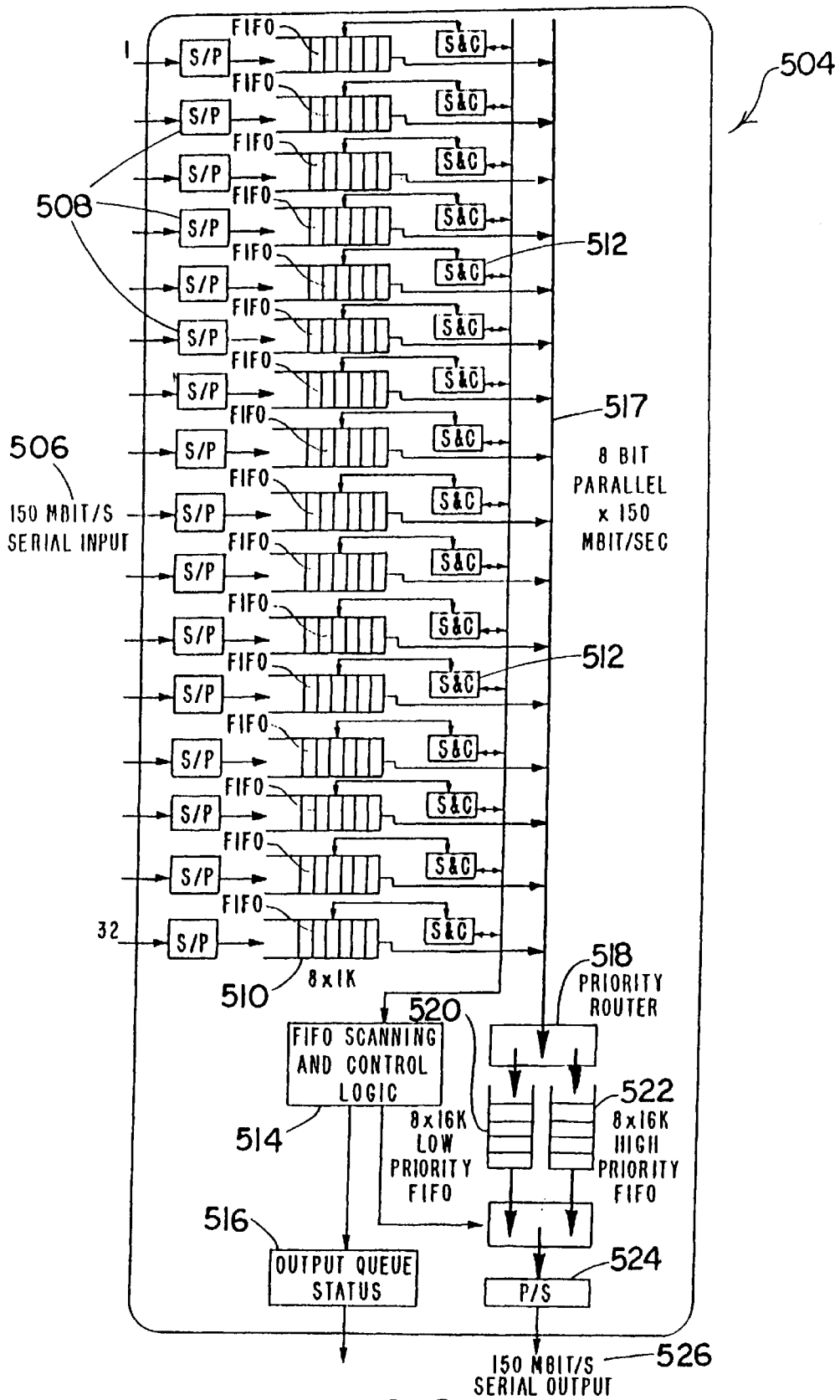
FIG. 39 is a block diagram of a 32 by 1 packet priority multiplexor.

FIG. 39 supplies a schematic illustration of a 32 by 1 packet priority multiplexor 504. Serial input signals 506 are fed to the multiplexor 504 at the rate of 150 megabits per second (MBIT/S) through a series of serial-to-parallel (S/P) converters 508. The S/P converters 508 are coupled to first-in, first-out (FIFO) buffering circuits 510, which are also connected to status and control (S&C) circuits 512. All the S&C circuits 512 are linked to FIFO scanning and control logic circuitry 514 and an output queue status stage 516. An eight bit parallel bus 517 receives the output of the FIFO circuits 510, and are conveyed to a priority router 518, 8 by 16K low and high priority FIFO circuits 520 and 522, and through a parallel-to-serial converter (P/S) 524 to provide a 150 MBIT/S serial output 526.

Figure 40:
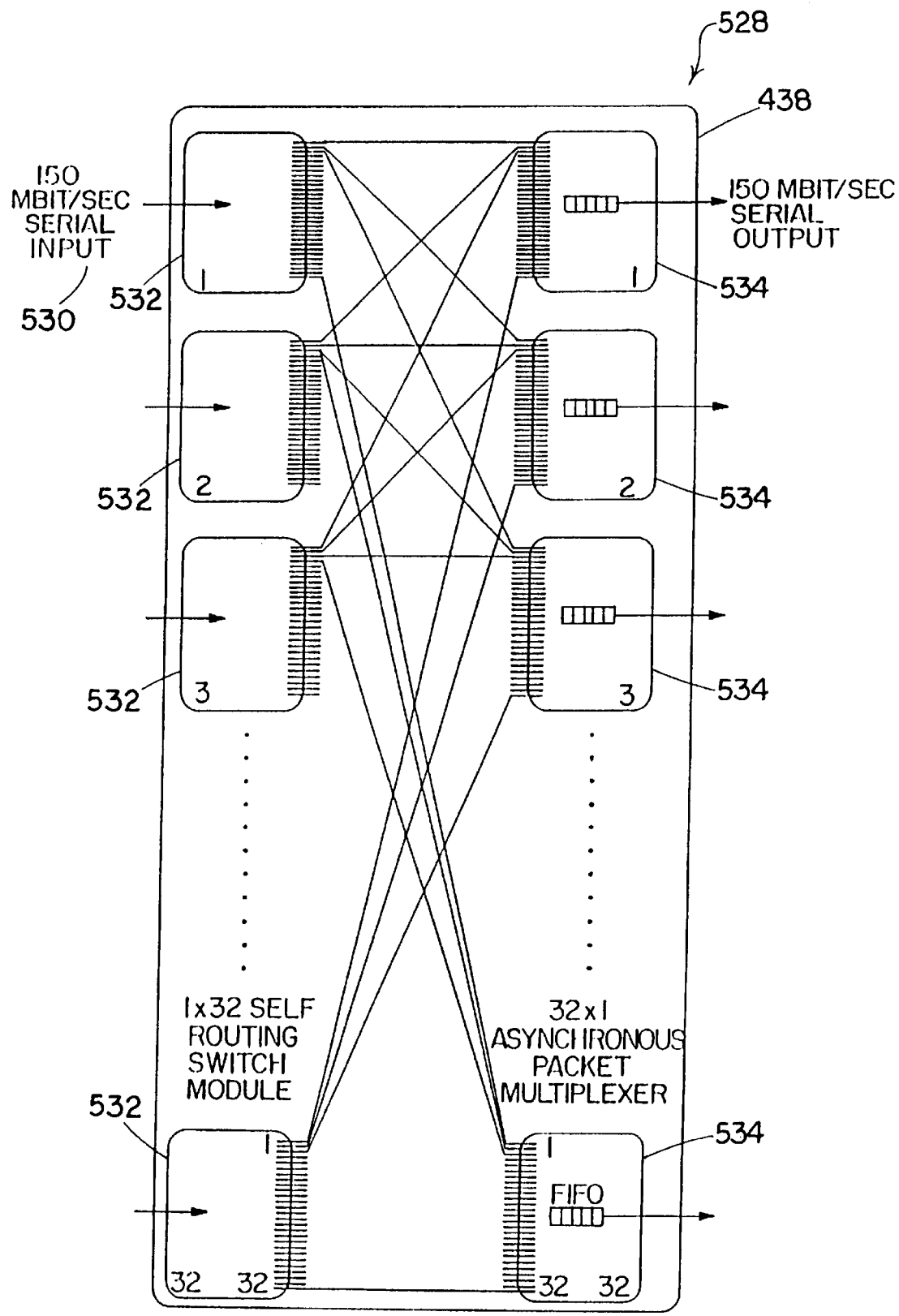
FIG. 40 reveals a block diagram of a fast packet switch.
Figure 41:
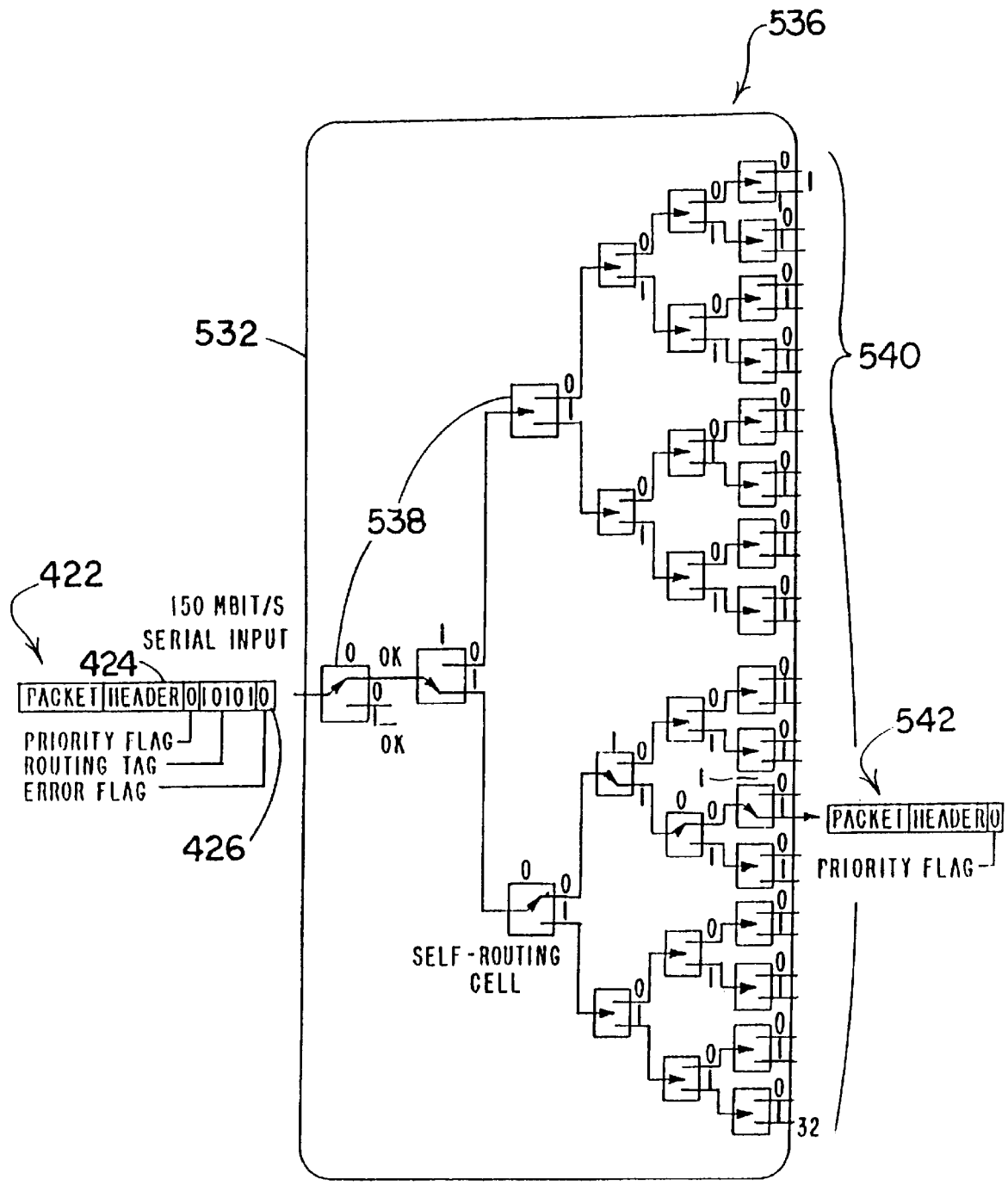
FIG. 41 shows a 1 by 32 self-routing switch module.

FIG. 40 is a block diagram 528 which reveals the details of a fast packet switch 438. Serial inputs 530 are transported into the switch 438 via a series of 1×32 self-routing switch modules 532 that are, in turn, associated with a series of 32×1 asynchronous packet multiplexors 534. FIG. 41 is a schematic diagram 536 that shows the details of the 1×32 self-routing switch module 532 illustrated in FIG. 40. Packets 422 having headers 424 and payloads 426 are fed into the module 532 at the rate of 150 MBIT/S. The packet 422 comprises a string of ones and zeroes, and includes a priority flag, a routing tag and an error flag. A series of self-routing cells 538 read the bits in the header 424, and direct routed packets 542 with their payloads of data 426 to the output side 540 of the module 532.

Figure 42:
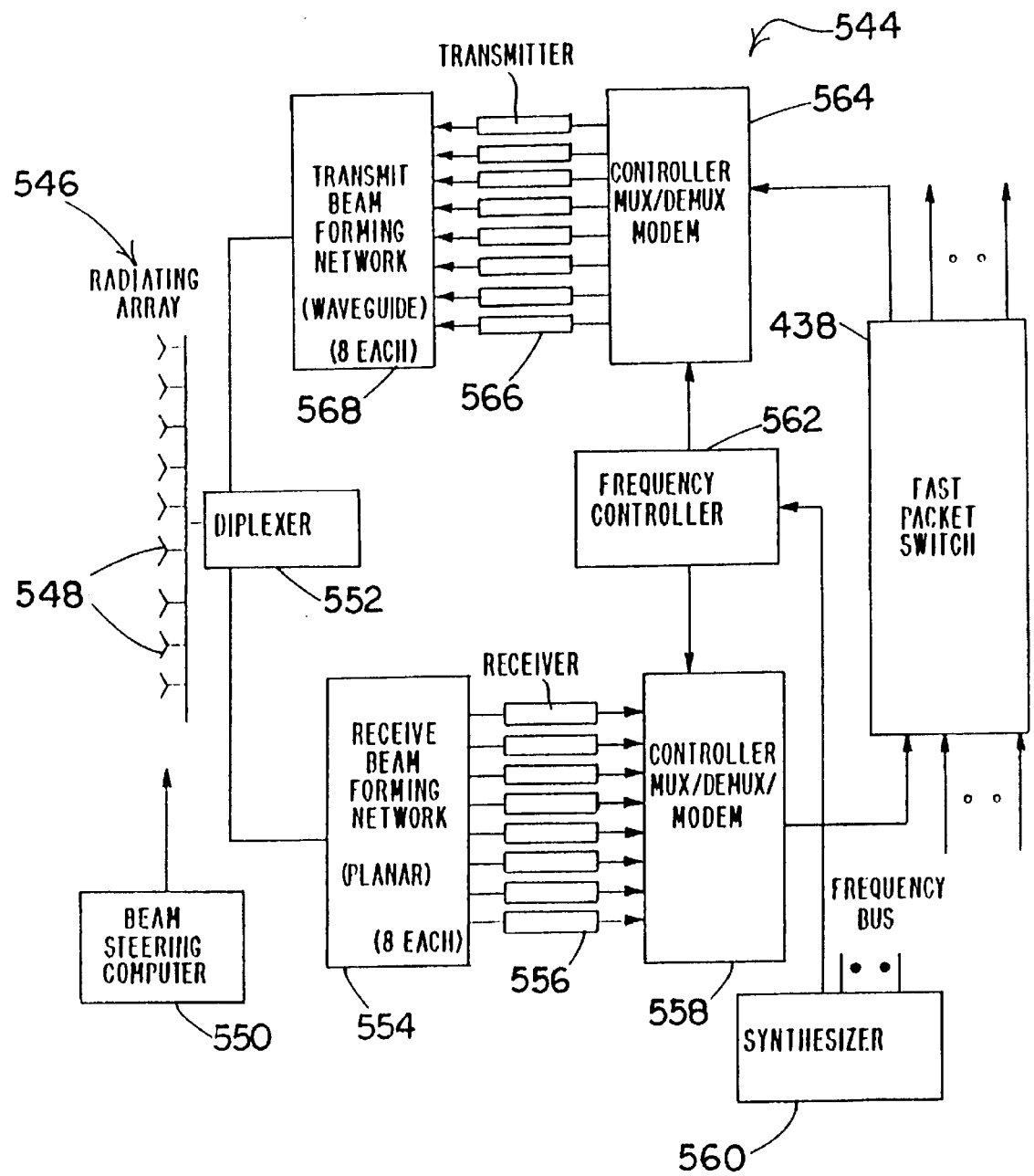
FIG. 42 depicts a block diagram of a mobile/fixed satellite link.

FIG. 42 is an illustration which presents a block diagram of a mobile/fixed satellite link 544. A radiating array 546 which both receives and transmits signals through feeds 548 is controlled by a beam steering computer 550. Incoming signals pass through a diplexer 552 on their way to a receive beam forming network 554 and a bank of receivers 556 that are all linked to controller mux/demux/modem 558 that provides input to the fast packet switch 438. A synthesizer 560 generates signals that are fed to a frequency controller 562, which provides an input to a second controller mux/demux/modem 564 that processes signals for transmission from the fast packet switch 438. A bank of transmitters 566 furnishes signals to a transmit beam forming network 568, which are then passed through the diplexer 552 before they are emitted from the satellite through the radiating array 546.

Beam Compensation

Beam compensation pertains to the assignment of individual radio beams from the constellation of satellites to delineated regions on the ground with fixed boundaries called "cells." This beam management system offers enhanced frequency coordination and communication reliability. Beam compensation substantially eliminates the problem of rapid "hand-offs" of a communication channel among the multiple beams of one satellite or between satellites as one satellite moves as one satellite moves out of range of subscribers within the cell and another takes over to supply service to the cell.

The system allocates the radio beams which are generated by the satellites. These beams are precisely controlled so that they illuminate "Earth-fixed cells" as opposed to "satellite-fixed cells." In previous satellite communication schemes, spacecraft which are not held stationary over one particular location on the Earth in geo-synchronous orbits fly over large regions of the Earth very rapidly. The radio beams generated by these fast moving spacecraft sweep across vast regions of the Earth's surface at the same rate of speed. If these beams were visible to the eye, they would paint bright circular and elliptical patches of light on the ground beneath the satellite which emitted them. In a system that employs satellite-fixed cells, the "footprint" of the radio beams propagated by the spacecraft defines the zone on the ground called a "cell" which is illuminated by the spacecraft. This satellite-fixed cell moves constantly as the spacecraft moves around the globe. In sharp contrast, an "Earth-fixed cell" is a stationary region mapped onto the surface of the Earth that has permanent fixed boundaries, just like a city or a state. Although the rapidly moving satellites still shine their radio beams over the ground in rapidly moving footprints, the locations of the footprints at any given time do not determine the location of the unchanging Earth-fixed cells. The great advantage provided by using cells having boundaries that are fixed to the Earth is realized when a subscriber being served by one satellite must switch to another beam in the same satellite or to a second satellite because the first is moving out of range below the local horizon. With satellite-fixed cells, this "handover" involves the assignment to the terminal of a new communication channel within the new beam or new satellite. This assignment process takes time and consumes processing capacity at both the terminal and the satellite. It is also subject to blocking, call interruption, and call dropping if there is not an idle communication channel in the next serving beam or satellite. The Earth-fixed cell method avoids these problems by allocating communication channels (frequency, code, and/or time slot) on an Earth-fixed cell basis rather than on a satellite-fixed cell basis. Regardless of which satellite/beam is currently serving a particular cell, the terminal maintains the same channel assignment, thus eliminating the "handover" problem.

Beam compensation is accomplished in conjunction with innovative Spacecraft Antennas, which are described in the text presented below. The beam compensation methods described in this section comprise the original embodiment of the invention. An improved preferred embodiment is described below in the section entitled "Earth Fixed Cell Beam Management". These antennas comprise advanced active element phased arrays that utilize electronic beam steering to provide extremely high gain signals. One of the embodiments of these spacecraft antennas employs a hemispherical configuration of hexagonal antenna facets fabricated from ultra-light weight honeycomb materials and advanced composites. Gallium-arsenide (GaAs) millimeter wave integrated circuits (MMIC) coupled to each antenna panel handle call traffic. Each antenna simultaneously generates 256 beams which are electronically steered to over 4,000 positions on the surface of the Earth. At any instance, each individual beam illuminates a region on the ground called an "Earth-fixed cell". A beam illuminates each of the cells in the supercell on a pre-determined sequence and time schedule. In the original Earth-fixed cell embodiment, a four by four matrix of cells forms an "Earth-fixed supercell." The entire surface of the Earth is mapped into 80,000 Earth-fixed supercells (80 km×80 km).

Figure 43:
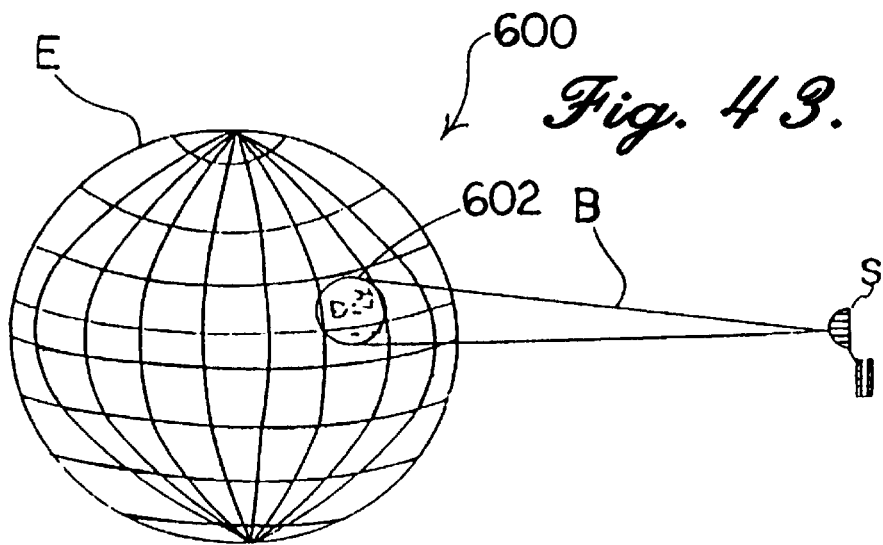
FIGS. 43, 44, and 45 disclose the Earth-fixed cell method.
Figure 44:
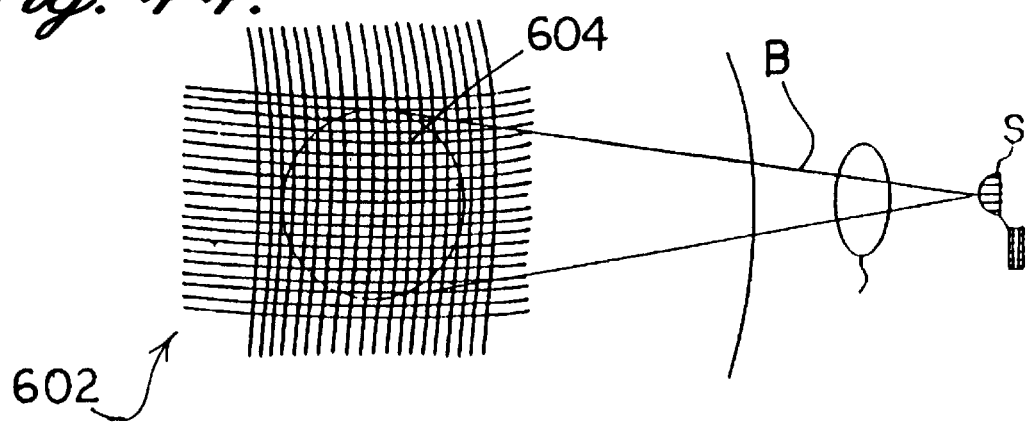
Figure 45:
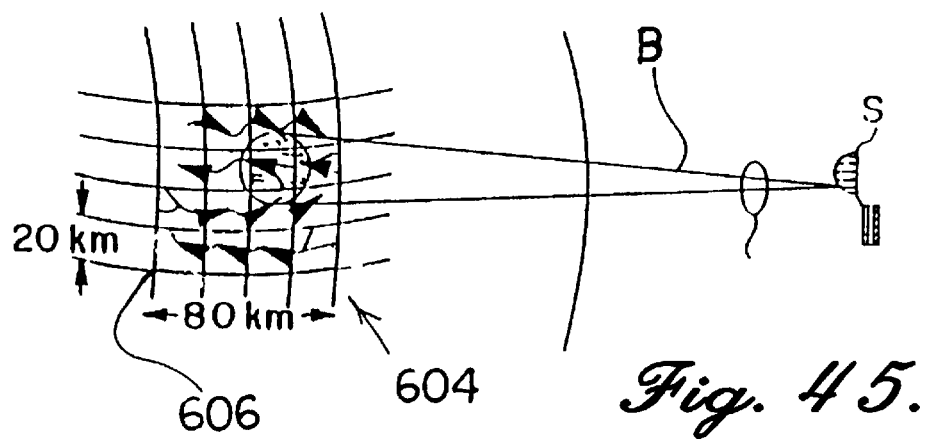

FIGS. 43, 44, and 45 present schematic illustrations of the original embodiment that exhibit the relationships among the spherical surface of the Earth E, a satellite footprint 602, an Earth-fixed super cell 604, an Earth-fixed cell 606, and radio beams B emitted from a satellite S that provides service for users within the Earth-fixed cells 606. FIG. 43 reveals the geometric and numerical relationships that have been established to implement beam compensation. The beams B emanating from a constellation C of satellites S illuminate generally circular footprints 602 on the surface of the Earth E. These footprints 602, which have a radius of about 700 kilometers, are associated with a grid of approximately 80,000 Earth-fixed supercells 604 that span the entire globe. Each footprint 602 is served by 256 supercells 604. Each supercell 604 is divided into a four by four matrix comprising four Earth-fixed cells 606 on a side. Every Earth-fixed cell 606 is twenty kilometers wide and twenty kilometers high. There are approximately 1.28 million Earth-fixed cells 606 covering the surface of the world. The upper and lower boundaries of each Earth-fixed supercell 604 are parallel to lines of latitude. The Earth-fixed supercells 604 circle the Earth in bands, with the largest bands residing at the equator. The number of Earth-fixed supercells 604 in an Earth-circling band decreases toward the poles. Earth-fixed supercells 604 in adjacent bands are not necessarily aligned. In the text below, the terms "supercells" 604 and "cells" 606 are employed as a shorthand reference to the more technically correct terms "Earth-fixed supercells" 604 and "Earth-fixed cell" 606. The cells 606 and supercells 604 defined and utilized by the present invention are different from the topography of previous communication systems because they are literally fixed to the Earth like a permanent grid of lines of longitude and latitude. In earlier systems, the perimeter of the beam footprint determined the instantaneous location of a cell.

Figure 46:
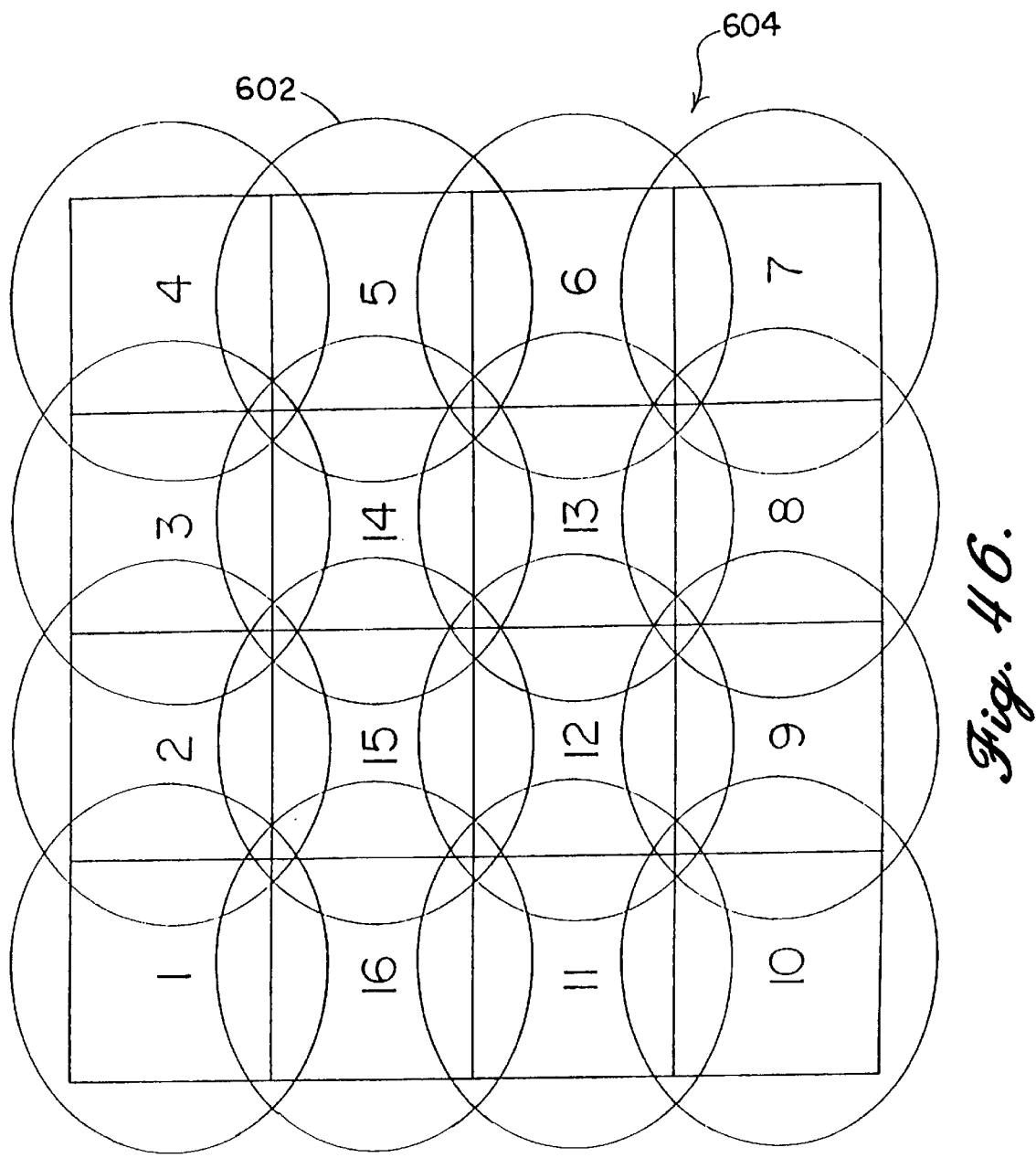
FIG. 46 shows a supercell containing 16 cells.

FIG. 46 exhibits a pattern 608 that reveals how the original embodiment of an Earth-fixed supercell 604 is mapped into sixteen Earth-fixed cells 606, and how the circular footprints 602 from the satellites S cover the square cell regions. The cells 606 in this diagram are also numbered from one to sixteen. These numerals indicate the timing assignments that represent the schedule of sequential satellite transmissions that serve each cell. This cell pattern 608 insures that three inactive cells are always present between every two active cells during normal operations. In the event of a timing skew between satellites servicing adjacent supercells 604, this pattern still provides for a minimum of two inactive cells 606 between active cells 606. This separation is sufficient to eliminate signal interference between two cells 606 which are being illuminated at the same time.

Figure 47:
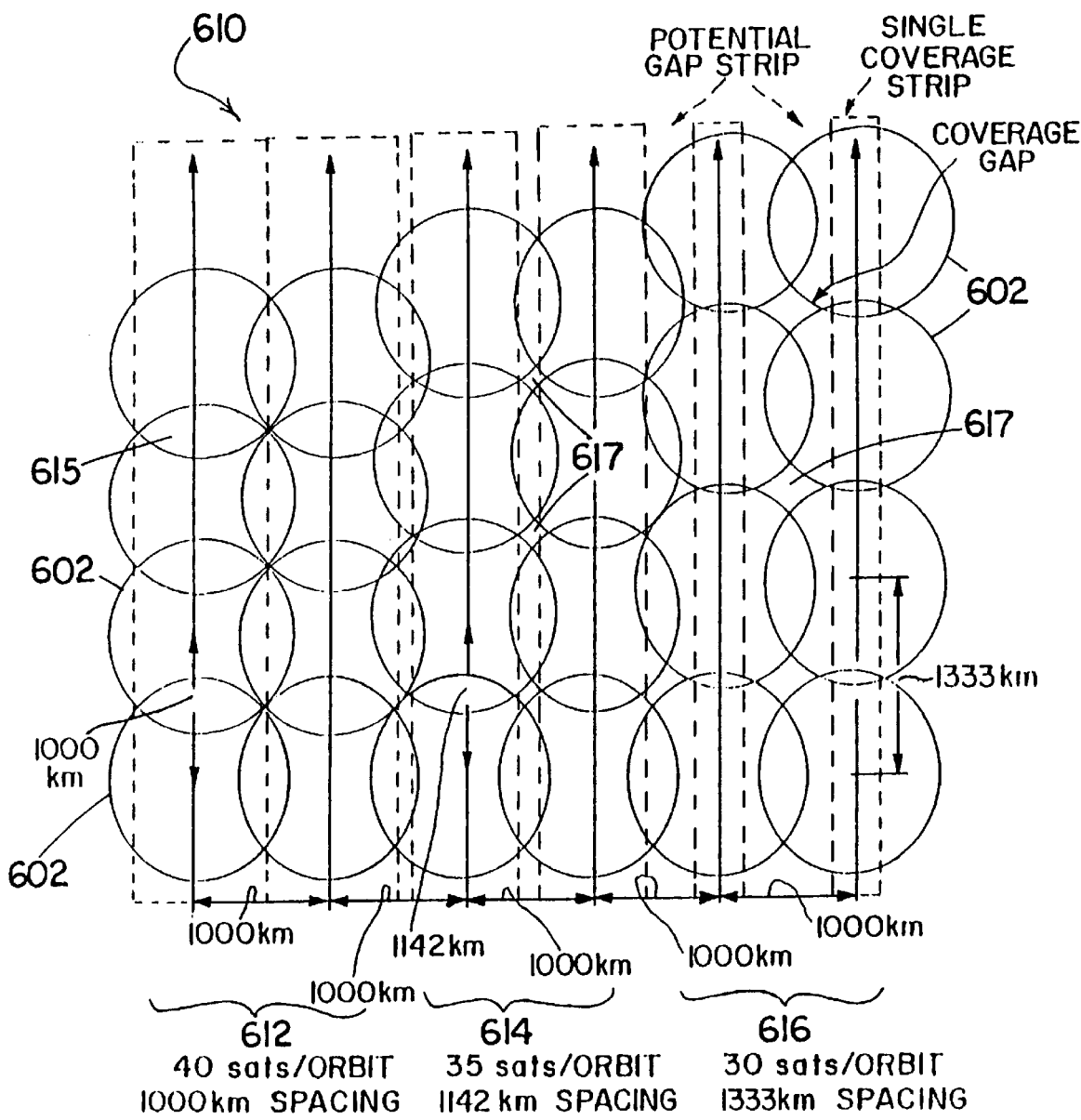
FIG. 47 shows satellite footprints, overlaps, and gaps at the equator.

FIG. 47 is a diagram 610 that depicts satellite footprint overlaps 615 and gaps 617 at the equator for three different orbit populations for the original embodiment. Each footprint has a radius of 700 km, and the orbital planes are spaced at nine degrees, which results in 1000 km spacing at the equator. FIG. 47 presents six columns of overlapping circles. Three pairs of adjacent columns 612, 614 and 616 reveal the coverage gaps that result from different orbit populations. If each orbit in the constellation C has 40 satellites, virtually no gaps 617 are encountered, as shown by column pair 612. In this first instance, the footprints 602 are closely packed, being deployed only 1000 km apart from center to center. The second and central pair of adjoining columns 614 represent the footprints 602 generated when each orbit has only 35 satellites. The footprints 602 depicted in the middle pair of columns are 1142 km apart when measured from center to center along the path of the orbit. The footprints shown in column pair 614 are separated by small gaps 617. The last pair of columns 616 shows what happens when each orbit has 30 satellites. The spacing between footprints 602, measuring along the orbit path, is now 1333 km. Consequently, large gaps 617 separate some of the footprints 602 shown in the rightmost pair of columns 616.

Figure 48:
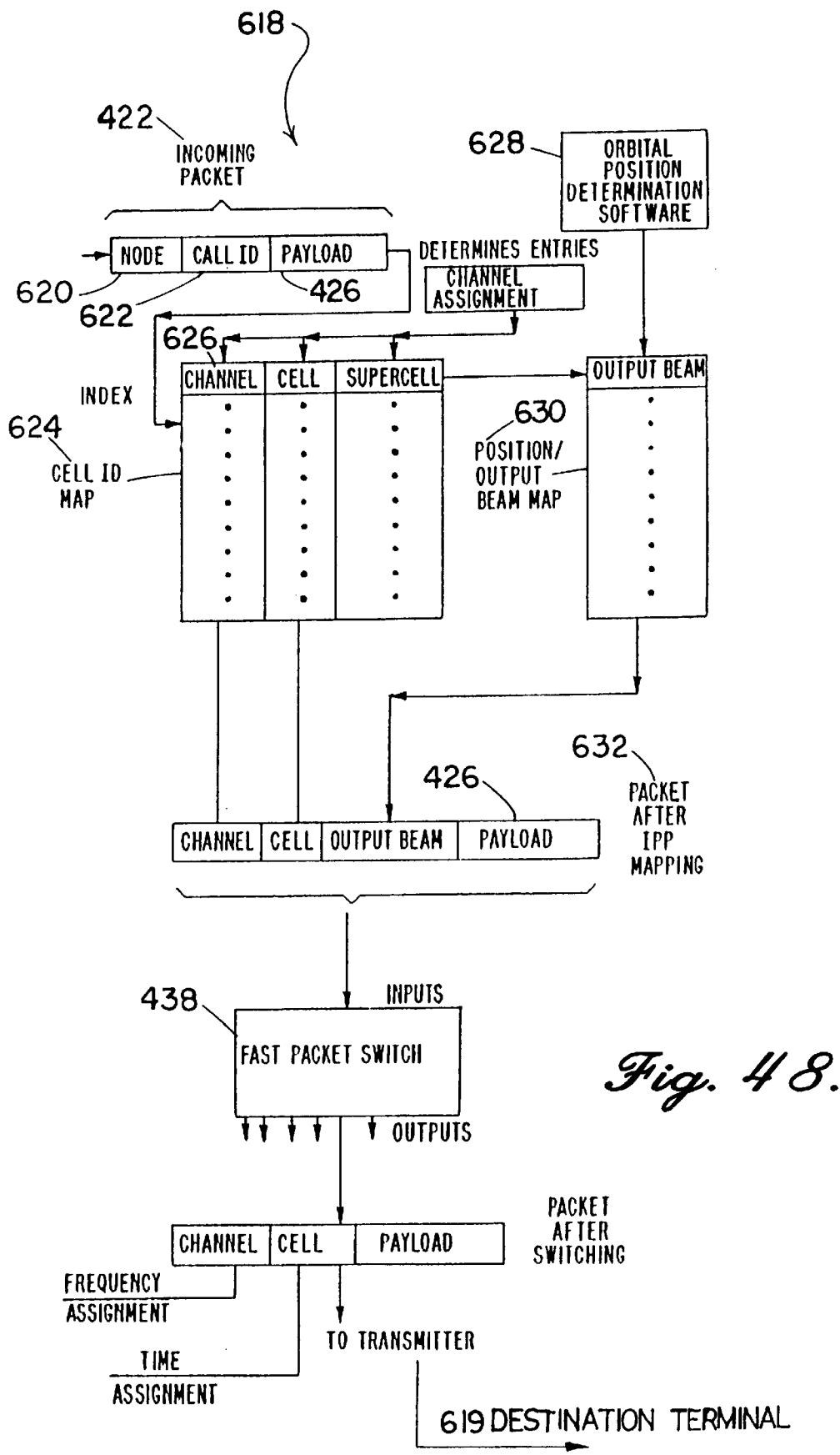
FIG. 48 is a flow diagram for processing incoming packets that may be utilized to implement the Earth-fixed cell method.

FIG. 48 is a flow chart 618 which discloses one implementation of the preferred embodiment of beam compensation. A packet 422 is shown as it progresses through mapping and switching hardware which directs the packet 422 to the beam which is currently serving the Earth-fixed supercell 604 and cell 606 in which the destination terminal 619 resides. The incoming packet 422 possesses "node" 620 and "call identification (ID)" 622 bits that comprise a terrestrial location identification about the terminal where the call originated. The substance of the phone call, such as voice or video information, has been digitized and is carried as the payload portion 426 of the packet 422. The node 620 identifies the satellite S currently serving the destination terminal 619. The call ID 622 is used as an input to a cell ID map 624, which is used as a translation device for a fast packet switch 438 that actually selects the beam B that will be used to deliver the payload 426. The call ID map 624 identifies the supercell 604, cell 606, and channel 626 assigned to the destination terminal 619 within this node 620 as identified by the call ID 622 in the incoming packet 422. In the present context, a channel 626 is a portion of beam B that has been allocated into several frequencies. Output beams are recorded in a position/output beam map 630. The satellite beam B which is currently assigned to serve a particular supercell 604 is also a function of the instantaneous position of the satellite S which is generating beams B to handle a given call. This position information is produced by autonomous orbit position determination software 628. Once the channel 626, cell 606, and beam assignments have been derived, these assignments are appended to the payload 426 of the packet 422, replacing the call ID 622. After mapping, the modified packet 632 is then transmitted to the fast packet switch 438, which uses this information to direct the packet 422 to the appropriate buffer slot in the beam B currently serving this supercell 604. The transmission system determines the frequency that will be used for the transmission of the packet 422 based on the selected channel, and picks the time slot for transmission based on the selected cell 606. In the original embodiment of the beam compensation invention, the time slot is 1.444 milliseconds in duration, and the frequency domain modulation (FDM) cycle for the beams is 23.111 milliseconds long. The time required for communication is 1.156 milliseconds, and 0.289 milliseconds of guard time is provided. The receive beams lag the transmit beams by twice the time encountered by the transit delay between the user and the satellite. This lag time varies from 6.8 milliseconds for supercells at the edge of the footprint to 4.7 milliseconds for supercells directly below the satellite. The variation over a supercell 604 ranges from 0.04 milliseconds for cells 606 directly below the satellite to 0.7 milliseconds for cells 606 at the edge of the footprint.

The beams B generated by antenna facets (not shown in FIG. 48, but shown below in FIGS. 49 and 50) on the satellites S include 256 transmit and 256 receive scanning beams. The satellites travel at an orbital height of 700 km and service cells within a 40 degree terminal elevation mask angle footprint. The satellite footprint 602 measures approximately 1.6 million square kilometers. The satellite antenna beams B that service cells 606 directly below the satellite S have a gain of 37.7 dB and half power beamwidths of 2.6 degrees. The beams B that service cells 606 at the edge of the satellite footprint 602 have a gain of 40 dB and half power beamwidth of 1.8 degrees. The beams illuminate circular spots on the Earth's surface of approximately 800 square kilometers. The square inscribed within this circular spot has an area of 512 square kilometers (22.6 km sides). This geometry provides 1.84 km (13%) of overlap at the cell corners. The overlap 615 mitigates the effects of satellite position errors and beam pointing errors. The tolerable error limits are 300 meters maximum for satellite position determination error and 1.5 km (0.17 degree) maximum for beam pointing errors. The movement of the beam footprint 602 on the Earth's surface due to the motion of the satellite S is less than 12 meters over the 1.444 millisecond dwell time, and less than 200 meters during the 23.111 millisecond supercell timing cycle. Instead of computing the required pointing angles for each spot beam every 1.444 milliseconds, the pointing angles for the center of the supercell may be computed every 23.111 milliseconds, and the beam B is then positioned relative to this center for each cell. The rotation of the Earth contributes an error to this computation, but is less than 6% of the effect of satellite motion, and the same method can be used to compensate for this motion. The same method can also be used to compensate for satellite attitude motion (roll, pitch, and yaw). When a supercell 604 is contained within the footprints 602 of two or more satellites, then the satellites S negotiate among themselves as to which ones will service that supercell 604. One satellite may be assigned complete responsibility or the frequency allocation may be divided among several satellites. Each cell 606 is designed to provide service for up to 720 16-kilobit per second subscribers using portable terminals, and 360 terminals operating at 64-kilobits per second.

The beam compensation invention described above offers several advantages over previous beam allocation systems. Terminals are served by the footprint 602 of the satellite that happens to be passing overhead at the time a particular call flows through a given terminal. By allocating the beams to Earth-fixed cells as opposed to satellite-fixed cells, the problem of performing frequent "hand-offs" from satellite to satellite is substantially eliminated, since a terminal keeps the same frequency (channel) and time slot (cell) for the duration of the call even though it communicates via different beams and satellites during the call. A similar system using satellite-fixed cells with each satellite footprint partitioned into approximately four thousand cells would require a cell hand-off approximately every five seconds. The utilization of the beam compensation invention described above requires these undesirable hand-offs only when a subscriber using a portable P or mobile M terminal actually transits across a cell boundary. The Earth-fixed cell method also avoids the danger of accidentally terminating a call if all of the channels in the cell to which the beams are switched are already occupied. The allocation method of the present invention that switches a call from the beams of one satellite to another is completely transparent to the customer. The Earth-fixed cell technique also offers enormous spectral efficiency, since 100% of the frequencies between the cells and between the satellites are constantly reused. Similar systems using satellite-fixed cells often divide the assigned frequencies into bands assigned to satellites to avoid frequency conflicts, but that procedure is an inefficient use of the valuable frequency spectrum.

Spacecraft Antennas

The antennas aboard each satellite in the constellation provide advanced, steerable, active element, phased array antennas that supply extremely high gain, and which also use the available spectrum with great efficiency.

The antennas utilize electronic beam steering to provide extremely high gain signals. By incorporating these novel antenna systems on a constellation of spacecraft, phone customers across the globe will be able communicate through a communication system whose switching intelligence resides on orbit. This unique configuration bypasses traditional land-based networks, and offers a revolutionary expansion of communications potential.

The innovative design of one embodiment employs a hemispherical configuration of hexagonal antenna facets fabricated from ultra-light weight honeycomb materials and advanced composites. Gallium-arsenide (GaAs) millimeter wave integrated circuits (MMIC) coupled to each antenna panel handle call traffic. Each antenna simultaneously generates 256 beams which are electronically steered to 4,096 positions on the surface of the Earth. Each individual beam illuminates a region on the ground that measures roughly 20 km by 20 km.

Figure 49:
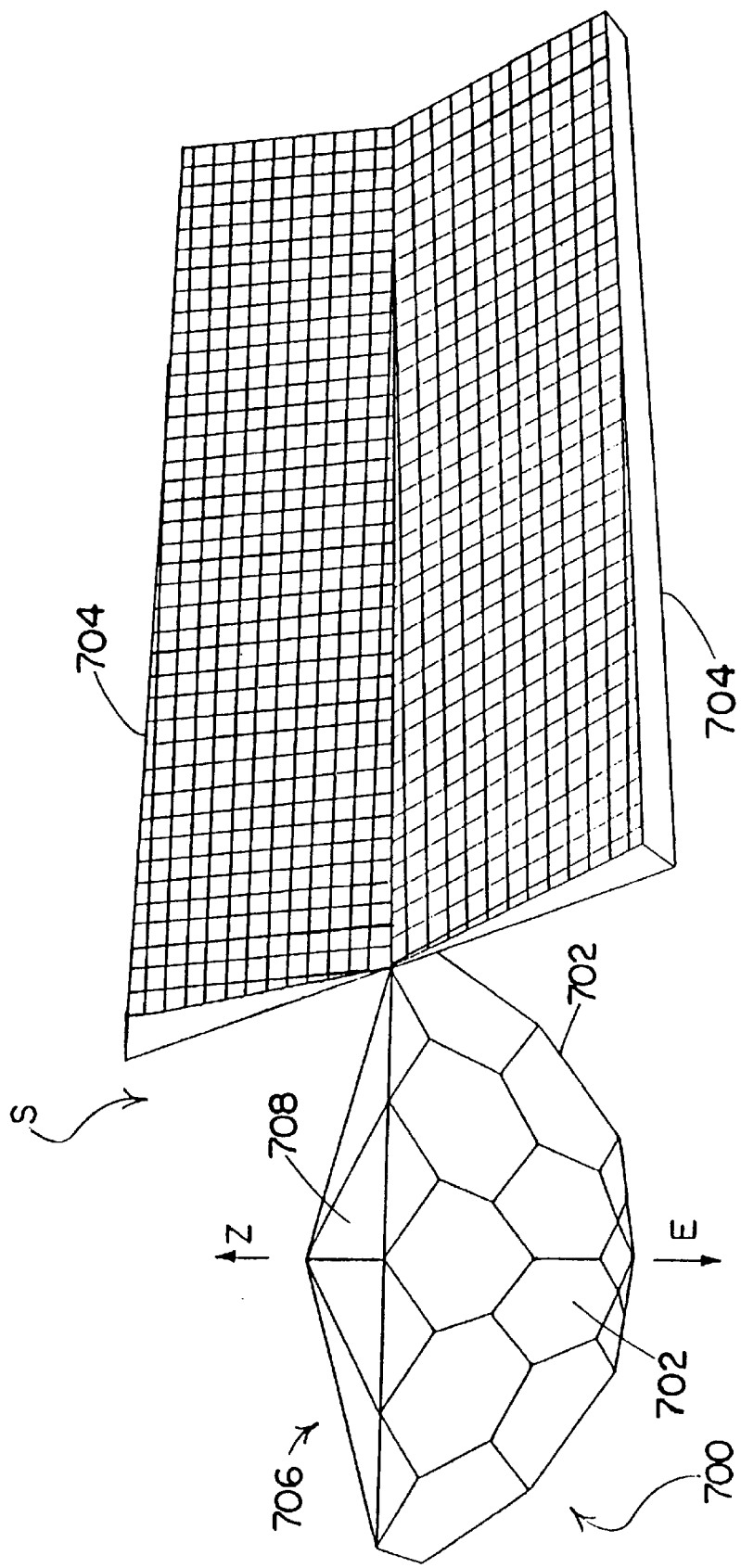
FIG. 49 is perspective view of a satellite that includes a hemispherical array of antenna facets and fully extended rectangular solar panels.

FIG. 49 depicts one embodiment of the antennas. This perspective schematic view shows a satellite S that includes an array 700 of generally hexagonal antenna Earth-facing facets 702 that are mated together along their six-sided boundaries to form a slightly flattened, hemispherical shell. An array of space facing facets 706 including panels 708 is mated to the Earth facing array 700. The antenna shell is connected to two generally rectilinear, unfurled, solar panels 704 which trail the body of the spacecraft S.

Figure 50:
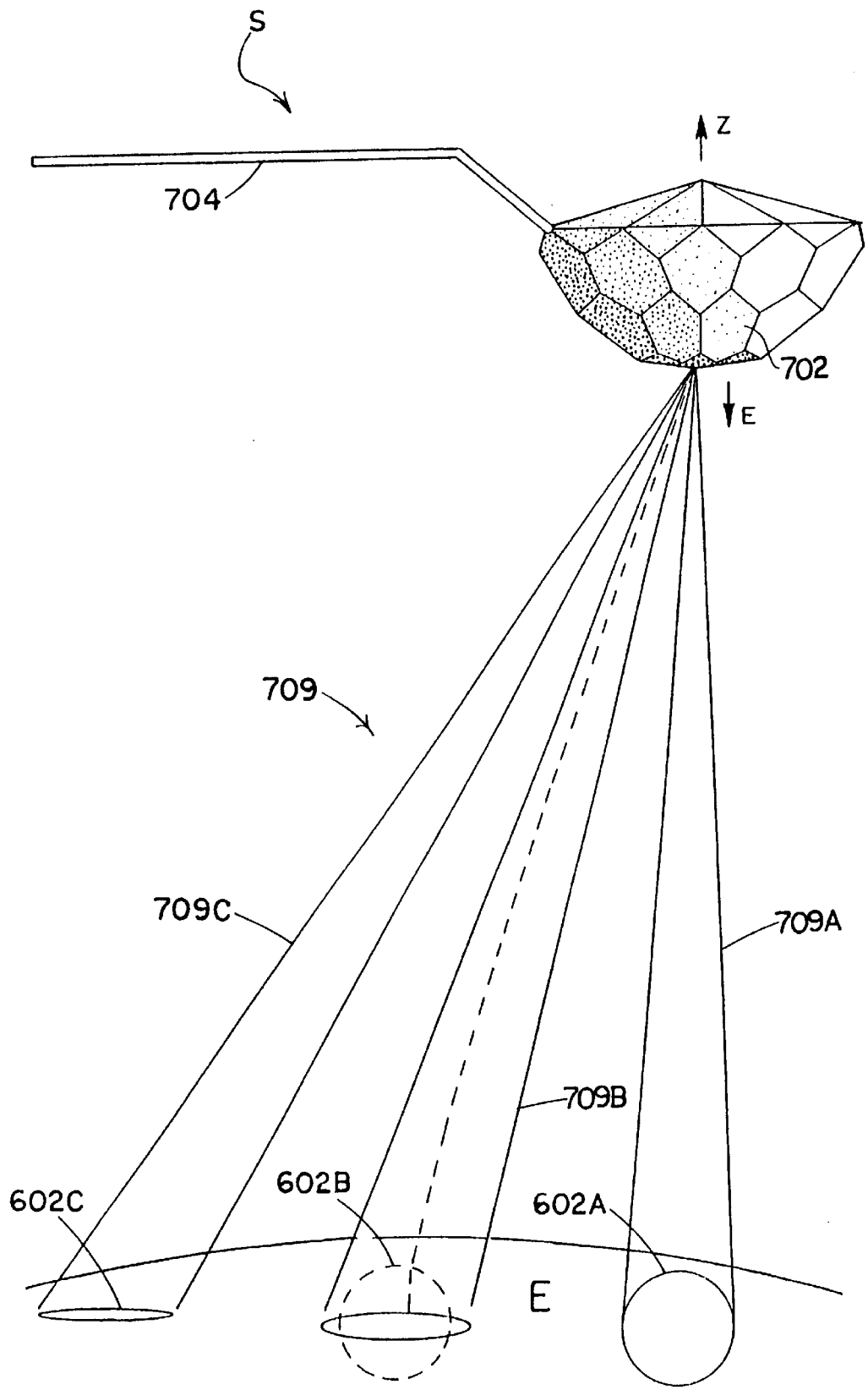
FIG. 50 depicts a schematic diagram of the satellite similar to the one illustrated in FIG. 49.

FIG. 50 depicts a schematic diagram of a similar satellite S, and also reveals three sets of electronically steered beams 709 produced by the hexagonal antennas 702 and the circular and elliptical footprints 602 which the beams 709 illuminate on the Earth's surface. The footprints 602 of the radio beams 709 are shown as regions of "illumination" on various portions of the Earth's surface E. The set of beams marked 709a travel the shortest possible distance from the spacecraft S to the Earth E because these beams 709a travel along a pathway which runs from the ground to the zenith Z and back. The area on the surface illuminated by this set of beams 709a results in a generally circular footprint 602a. Other sets of beams, like those marked 709b and 709c, are more inclined to the line that runs from the center of the Earth toward the zenith Z, and the areas 602b and 602c irradiated by these beams 709b and 709c become progressively more elliptical as the angle of inclination becomes larger.

Figure 51:
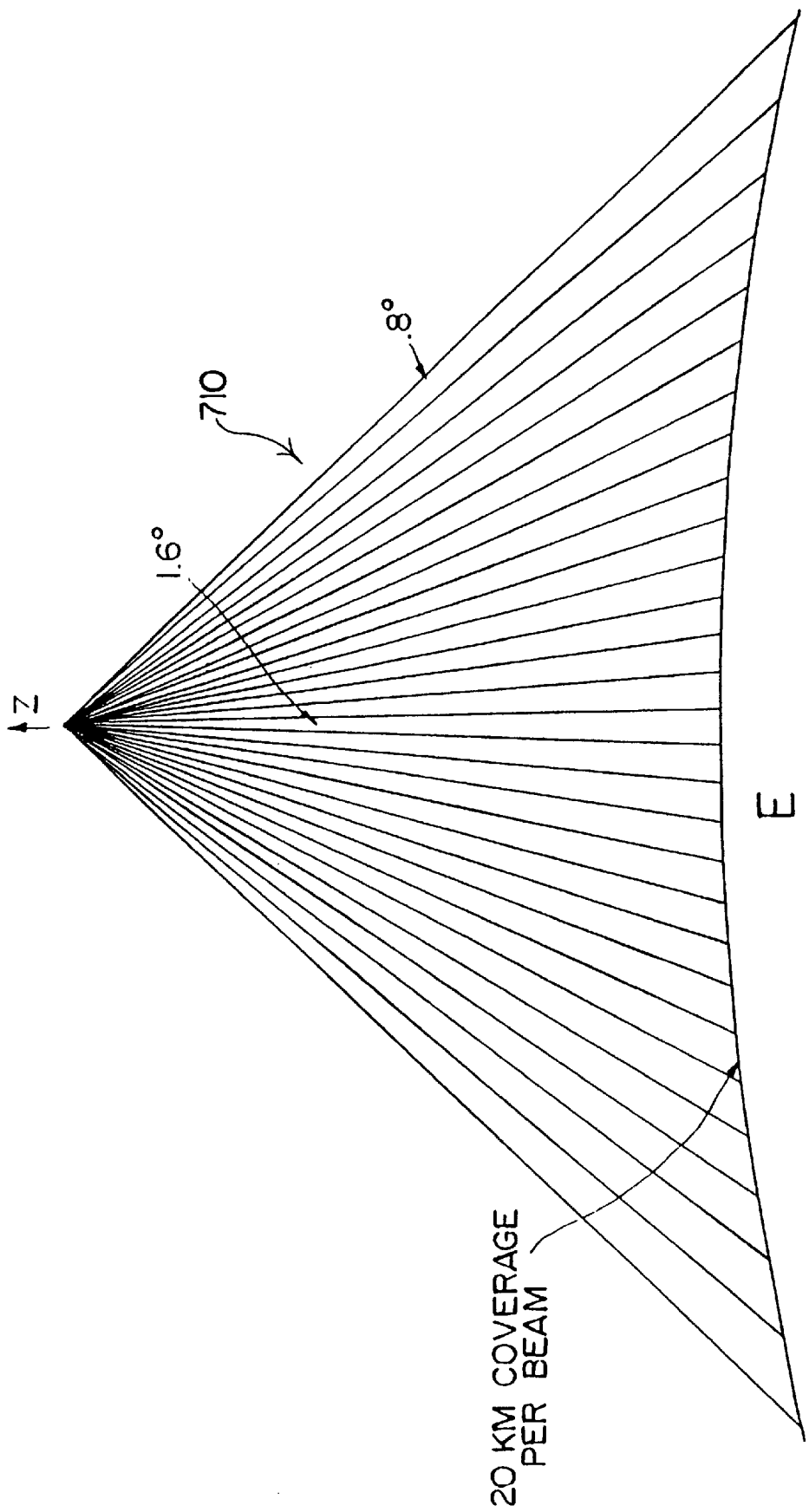
FIG. 51 presents a schematic depiction of the pattern of multiple beams generated by the satellite shown in FIGS. 49 and 50.
Figure 52:
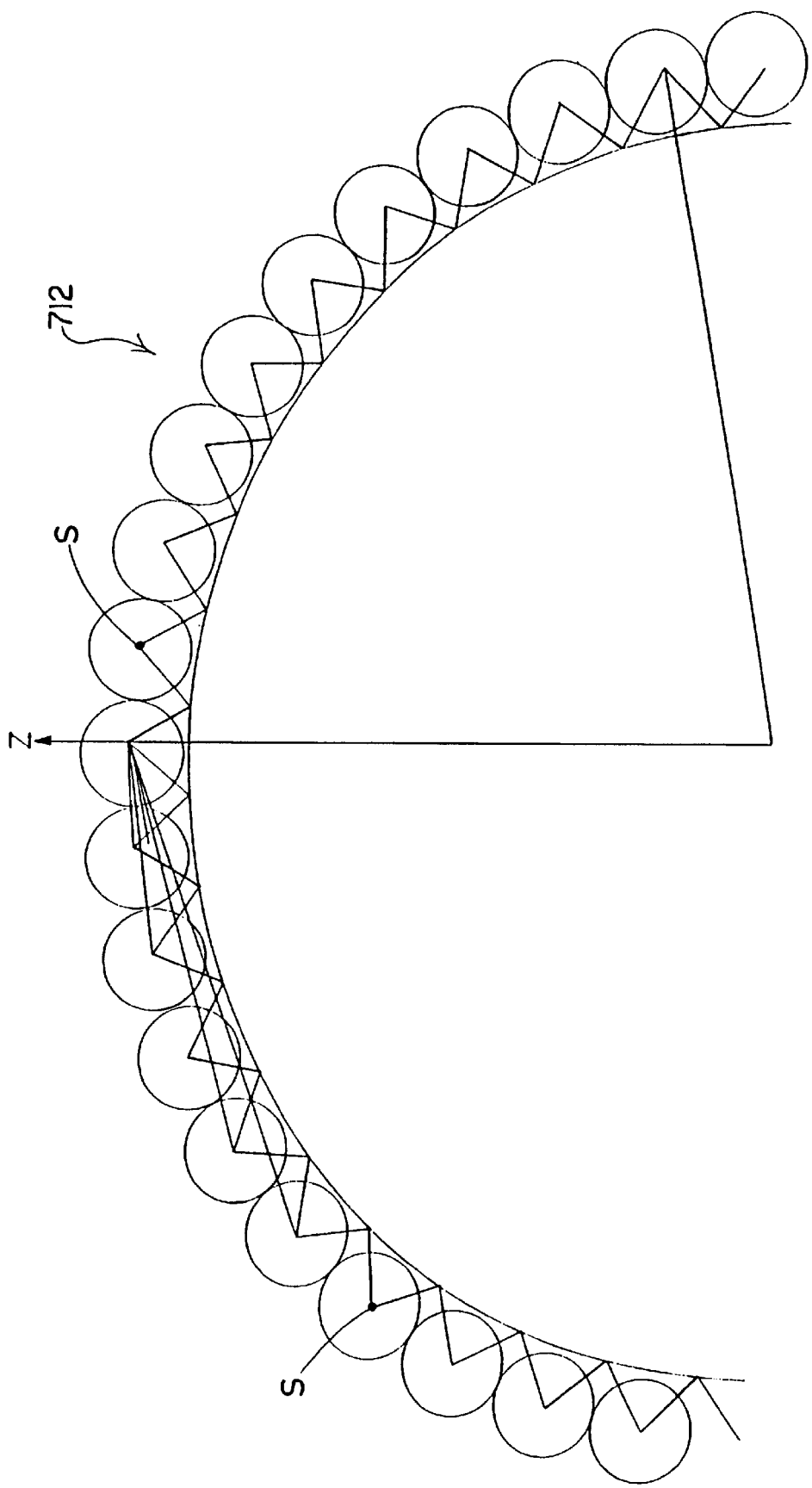
FIGS. 52 and 53 are plots that reveal the geometric relationship of several spacecraft traveling in one of the many orbital planes in the satellite constellation. The pathways between neighboring satellites that are not occluded by the limb of the Earth provide communication links between spacecraft in the same orbit.
Figure 53:
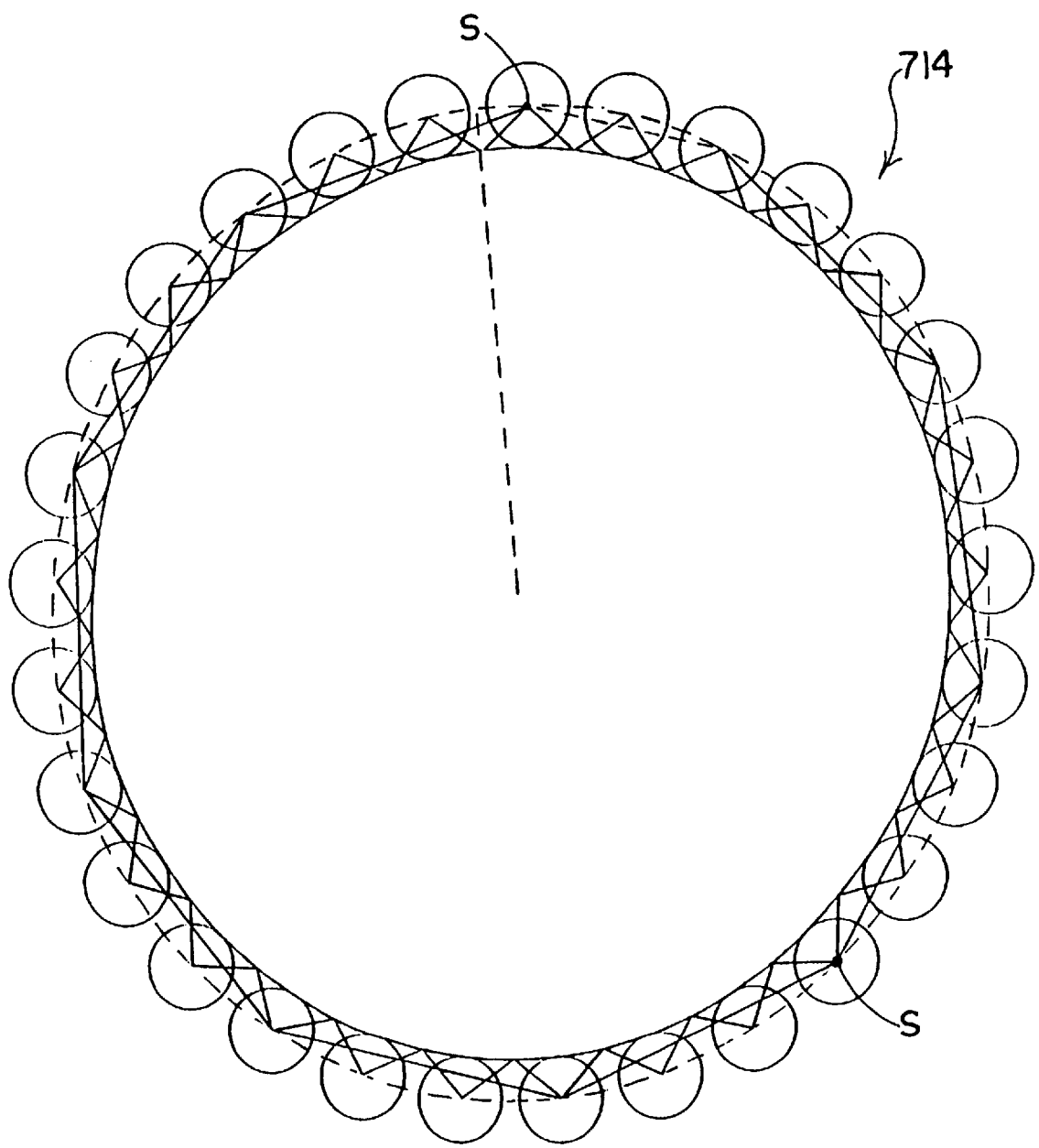

FIG. 51 combines many sets of beams and portrays a complete set of line-of-sight radio waves 710 generated by one spacecraft. FIGS. 52 and 53 are geometric plots 712 and 714 which include sight lines between neighboring satellites that travel along the same orbit. These plots 712 and 714 reveal the geometric relationship of several spacecraft S traveling in one of the many orbital planes in the satellite constellation C. The pathways between neighboring satellites that are not occluded by the limb of the Earth provide communication links between spacecraft S in the same orbit.

In one of the alternative embodiments of the invention, the satellites shown in FIGS. 49 and 50 operate in a constellation which includes 29 sets of spacecraft flying in 29 orbits. The entire fleet travels around the Earth at a height of 700 km (435 miles). In this alternative embodiment, the antennas 702 are designed to transmit and receive signals from terrestrial units that are located within the footprints 602 produced by the electronically steered beams 709. Only those terrestrial units that are within the conical line-of-sight region that is defined by a minimum elevation angle, or "mask angle," of 40 degrees can be serviced by a particular spacecraft. The hexagonal antenna facets 702 and their related signal processing circuitry produce hexagonal coverage pattern. In one embodiment of this invention, the radius to the center of each of the six sides of each facet 702 is 6.2 degrees, while the radius to the six corners of the hexagon subtends 7.16 degrees. A spacing of 12.41 degrees allows for 29 hexagonal coverage patterns in each orbital plane. A similar spacing along the equator results in 29 orbital planes. This configuration of hexagonal facets 702 offers double coverage in the equatorial regions and up to eight-fold coverage at higher latitudes, where larger numbers of subscribers are located. By selecting an odd number of satellites and planes, the center of the descending patterns will fall on the seams of the ascending patterns. This selection insures that virtually every region on the surface between the latitudes of 70 degrees North and South will be serviced by the constellation.

In general, and allowing for the somewhat inaccurate assumption that the Earth is spherical, the coverage angle of each satellite is given by the expression:

$$2a = 2\arcsin\left(\frac{r\cos\theta}{r+h}\right)$$

where
  a is the half angle of the cone of Earth coverage in radians;
  θ is the user antenna mask angle in radians;
  r is the radius of the Earth (6378 km); and
  d is the height of the orbit (700 km).

Orbits of 700 km and a 40 degree user antenna mask angle yield a coverage of 87.3 degrees. The slant range at the edge of the Earth coverage cone is determined by the equation:

$$d=\sqrt{(r+h)^2-r^2)\cos^2\theta)}-r\sin\theta=1022 \text{ km}$$

The Earth coverage area of the cone is:

$$A=\pi(d^2+h^2-2dh\cos(a))=1,568,000 \text{ km}^2$$

This quantity represents the Earth coverage area of each satellite if the entire circular footprint is utilized. As described above in the section describing Beam Compensation, this area is divided into 256 supercells 604 and each supercell 604 is further divided into 16 smaller individual cells 606. The total number of cells 606 created by each spacecraft is then 256×16, or 4096. Each of these 4,096 cells has an area of 383 km². If each cell 606 is square, they measure approximately 19.6 km on a side. Although the original embodiment of the invention utilizes circular footprints 602, the footprints created by the satellites need not be circular. Any regular polygon inscribed in the circle may be effectively employed. Other alternative embodiments employ inscribed squares and inscribed hexagons. The area of the square is 63.7% of the total area, while the area of the hexagon is 82.7% of the total area. If the cell size is maintained constant, then the resulting numbers of cells 606 are 2609 for the square and 3387 for the hexagon.

The spaceborne antennas 702 are capable of providing a gain of 45 dB at the periphery of each footprint and 42 dB at the nadir position. Because the beams generated by the spaceborne antennas 702 are so powerful, Earth-based terminals can incorporate low power antenna designs which substantially eliminate any radiation hazards that might otherwise harm the user. Each antenna uses a combination of the 20 and 30 GHz frequency bands for satellite to ground communications, and propagates 256 simultaneous beams, which are multiplexed to 4,096 positions. Beams aimed at the horizon possess an elliptical, as opposed to a circular or polygonal, shape to compensate for the low grazing angle, so that a constant Earth coverage footprint is maintained. Uncorrected beams have an elliptical ground pattern which degrades spectral reuse efficiency. Electronic beam steering also permits the independent control of directivity gain and power gain. The beam steering provides a convenient method of correcting power levels during rain fades. The transmitted power gain from the satellite can be increased on transmit to overcome downlink fading. Satellite receive power gain can be increased during receive to overcome uplink fading. The use of these two techniques overcomes possibly poor communication performance during rainy weather conditions.

Figure 54:
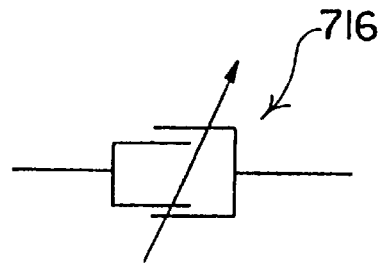
FIG. 54 reveals a schematic diagram of a GaAs MMIC time delay network.
Figure 55:
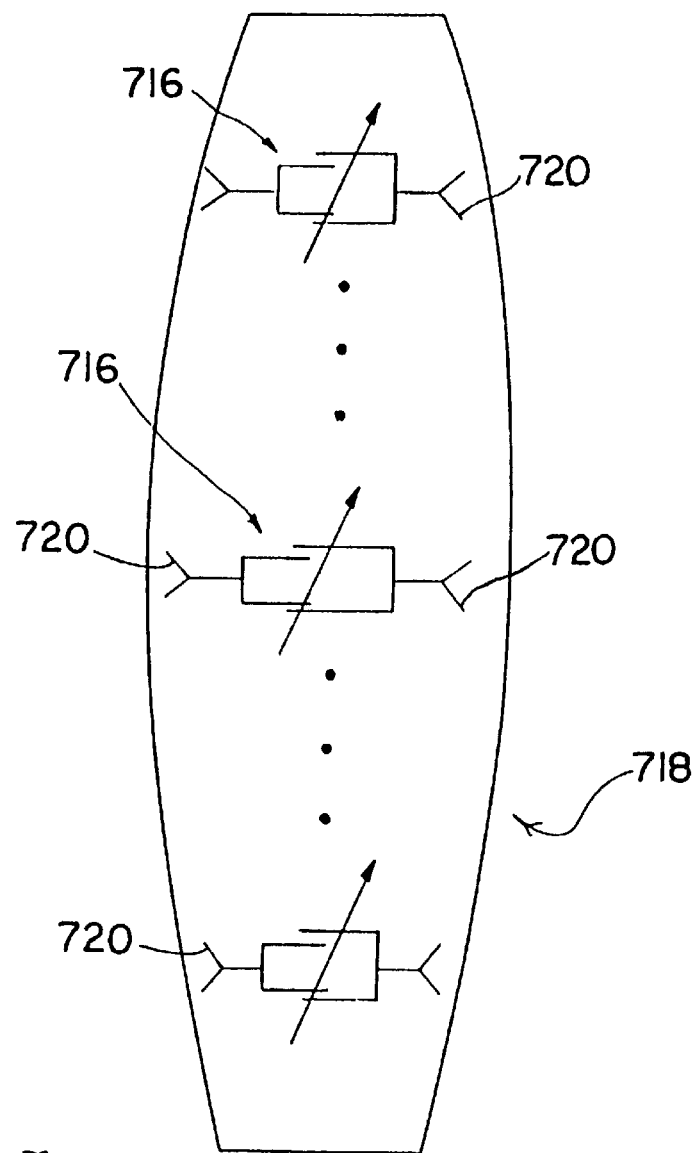
FIG. 55 shows a schematic of the active lens, which includes a large number of the time delay networks shown in FIG. 54.

Signal processing components residing in the spacecraft include GaAs MMIC filters and are responsible for electronically steering active antenna arrays on board each satellite. FIG. 54 reveals a schematic diagram of a GaAs MMIC time delay network 716. FIG. 55 shows a schematic of the active lens 718, which includes a large number of the time delay networks 716 coupled to radiating elements 720. In an embodiment of the present invention, a circuit Model No. TD101 produced by Pacific Monolithics, Inc. in California is employed as the time delay network. Other more conventional time delay networks may also be employed. The electronic steering is accomplished by using these time delay networks 716 to create an active lens 718. The focal point of the lens 718 is related to the directivity gain of the antenna 702 and can be controlled electronically. The ability to control the directivity gain is important for communications satellites in low Earth orbit because less gain is needed when a cell 606 is addressed at the satellite nadir than when a cell is addressed at the periphery of the satellite footprint 602. It is also desirable to increase the directivity gain in the elevation plane when addressing a cell at the satellite footprint periphery. The active lens 718 incorporated in the antennas 702 allows these variable directivity gains to be implemented without the reduction in efficiency that is associated with conventional antenna arrays. The active lens 718 illustrated in FIG. 55 is the microwave analog of an optical lens. By increasing the time delay for the signal paths in the center of the lens with respect to the edge of the lens, the focal length of the lens can be changed electronically, which, in turn, changes the directivity gain of the antenna 702.

The antennas 702 provide electronic steering which is sufficiently accurate to implement a practical gain variation in the 42 dB to 45 dB regime. For example, changing the radius of a radiation pattern by 200 meters at a range of 1200 kilometers requires a time delay control of 4 picoseconds for a 45 dB gain antenna array with dimensions of 1.2 meters on a side. Active lens control for the 42 to 45 dB range (in a 20/30 GHz system) requires time delays on the order of 4 picoseconds to 35 picoseconds.

Figure 56:
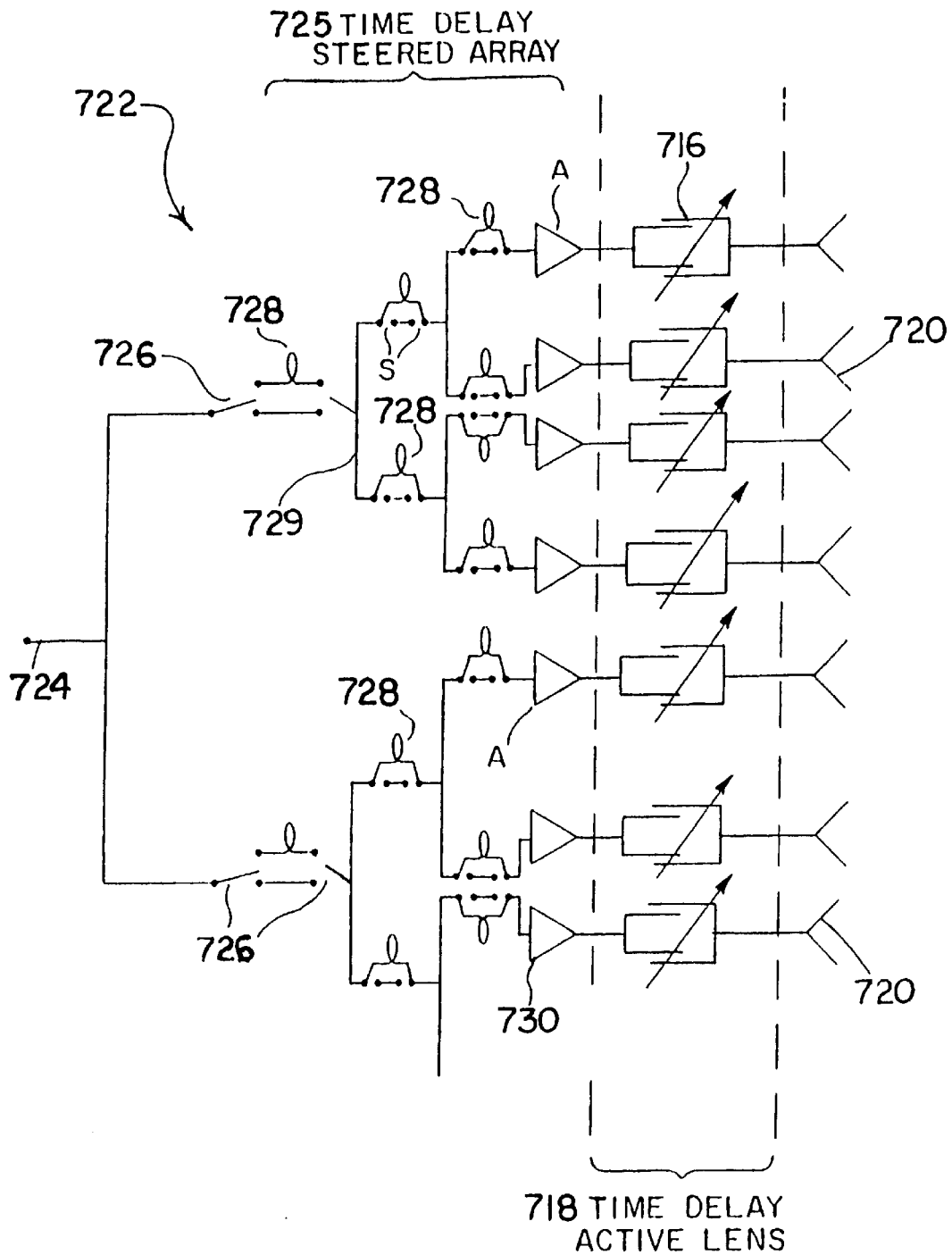
FIG. 56 is a schematic illustration of an active lens which incorporates a time delay steered antenna array.

The active lens 718 can be constructed using one of two techniques. The first, which is depicted in FIG. 55, utilizes a conventional lens that includes many pairs of receive and transmit antennas that are each connected in series with an active time delay network. The second technique, which comprises an embodiment of the invention, is a time delay circuit 722 exhibited in FIG. 56. This circuit 722 includes a feed 724 coupled to a time delay steered array 725 which comprises a series of switches 726, time delay paths 728, transmission lines 729 and amplifiers 730. The time delay steered array 725 is connected to the time delay active lens 718 and to radiating elements 720.

The switched time delay networks 716 in the corporate feed accomplish beam steering functions. The time delay networks 716 can be adjusted for either fine gain beam steering (a few degrees) or for changing the directivity gain of the antenna (focal length of the lens).

Every satellite S controls the assignment of channels to terminals requesting services. When a terminal has more than one satellite in view, the satellites monitor the signal quality and select which one is best suited to handle the call to the terminal. The receive beam from the ground terminal lags the transmit beam emitted from the satellite by a fixed interval. The terminal transmits its data to the satellite at a delay specified by the satellite in its preceding scan. This method is used to compensate for delay differences caused by variations in path lengths. The scan pattern among beams is coordinated to insure that all cells being scanned at one instant are separated by sufficient distance to eliminate interference among many closely-spaced customers. An electronic pushbroom carries the beams through one beam position in the direction of satellite travel, and then performs a flyback. Each beam carries a pilot tone which identifies each beam for terrestrial terminals. Components on board each satellite measure time delay and Doppler shift of each subscriber signal to determine the location of the subscriber within a particular beam footprint. Because the satellite antennas operate at a relatively high gain, the footprints on the ground are relatively small. Since the cells are small and the satellite footprint moves rapidly over the Earth's surface, any particular terminal remains in the same cell for only a few seconds. To avoid the rapid handoff from satellite to satellite every few seconds, the innovative logical/physical cell mapping scheme described above as Beam Compensation is utilized in conjunction with the present invention.

Several spacecraft in a single orbital plane can communicate with each other if they are located above the horizon of the Earth. Satellites communicate among one another using a 60 GHz inter-satellite frequency band. In one embodiment, a 1.5 foot antenna provides approximately 45 Db of gain which supports a practical inter-satellite link (ISL). Four fixed and two electronically steerable antennas are used on each satellite for ISL links. Optional links in the orbital plane may increase the number of ISL antennas to ten, eight of which would be fixed and two of which would be steerable.

The preferred embodiment comprises satellites circling in 21 orbital planes with 40 satellites in each orbit. This 21×40 embodiment can be implemented using the same antennas 702 which may be modified to account for the increased population of the constellation.

The electronic beam steering methods described in this specification may be utilized in combination with a wide variety of satellites, including the embodiments disclosed below.

Spacecraft Designs

The constellation comprises 840 extremely high power and ultra-lightweight spacecraft grouped in sets of 40 which circle the globe in 21 separate low Earth orbits. The satellites operate in 700 km (435 mile) circular, sun-synchronous orbits which are inclined approximately 98.2 degrees to the equator.

These innovative satellites will be capable of providing direct links among users across the world without using conventional land-based networks. One embodiment of the invention called Domesat™ includes a hemispherical, high-gain, antenna array that is always pointed toward the Earth. This electronically steered array is formed from a number of hexagonal antenna panels which are fabricated from ultra-lightweight honeycomb materials and advanced composites. The panels are held together by tubular and spherical connectors. The interior of the dome-shaped antenna array is used to store solar cell panels made from amorphous silicon which unfurl through an opening in a space-facing array when the spacecraft reaches its final orbit. Each panel is coupled to its own Gallium-arsenide (GaAs) millimeter wave integrated circuits (MMIC) which maintain the satellite's internal control systems and coordinate communications with other satellites and ground terminals. The hemispherical contour of the antenna array allows several satellites to be nested in a compact arrangement that fits within the payload bay of a launch vehicle.

Another alternative embodiment of the invention, Gearsat™, includes an inflatable torus. When viewed from the side along its circumference, the torus looks like two flattened pyramids that share a common base. Phased array antenna panels are deployed across the top of the pyramid, while arrays of amorphous silicon solar cells cover the slanted surfaces. The satellite rotates about its center, and individual portions of the antenna panels are specifically dedicated to transmit and receive signals from pre-defined regions on the ground. Another alternative embodiment, which is generally referred to as Batsat™, comprises a central cylindrical body and a plurality of substantially circular, foldable, linked panels which carry antennas and solar/thermal arrays.

Domesat™

FIGS. 57, 58, and 59 depict side views of the Earth-facing antenna array and space-facing segments of the present invention called Domesat™ 800. A satellite S having a partially hollow interior 715 includes a concave, geodesic antenna array 700 which is always pointed in the direction of the Earth E. The array 700 is formed from individual panels or facets 702 which are each coupled to active beam-steering circuitry that handles and manages call traffic. A space-facing array 706 includes individual polygonal sections 708 that look away from the Earth E. As viewed by a terminal on the ground, the space-facing array 706 is always oriented in the direction of the local zenith Z. Each space-facing section 708 has one fixed edge connected to the Earth-facing antenna array 700 by a hinge 711. All the other edges of each space-facing section 708 are free to move, so that the "top" of the spacecraft S can be opened once it attains orbit. When the sections 708 of the space-facing array 706 are moved apart, solar panels 704 are swung out from the interior 715 and are unfurled to their fully extended positions in a direction opposite the direction of travel 802 of the spacecraft S. The sun-facing surfaces of the rectangular solar panels 704 are covered with amorphous, thin-film silicon, and can be "canted" or rotated about their longitudinal axis 804 to gather the maximum amount of light from the sun. FIG. 60 portrays several satellites 800 stored coaxially in a compact, nested arrangement within the payload bay of a launch vehicle 801. Before the satellite is opened and the solar panels 704 are unfurled, the spacecraft resembles a cup which measures about four meters across. In one embodiment, the satellites S can be stacked inside launchers which are 4.4 meters wide.

FIGS. 61, 62 and 63 reveal a sequence of views showing the deployment of the solar panels 704. In an embodiment of the invention, panels 704 are coupled to nickel metal-hydride batteries that can store over 300 AH of energy. This configuration of solar panels 704 and batteries work together to provide over three KW of continuously-available power. As an alternative, the Domesat™ embodiment 800 could use solar panels deployed around its circumference or trailing streamers covered with solar cells instead of the panels 704.

Figure 64:
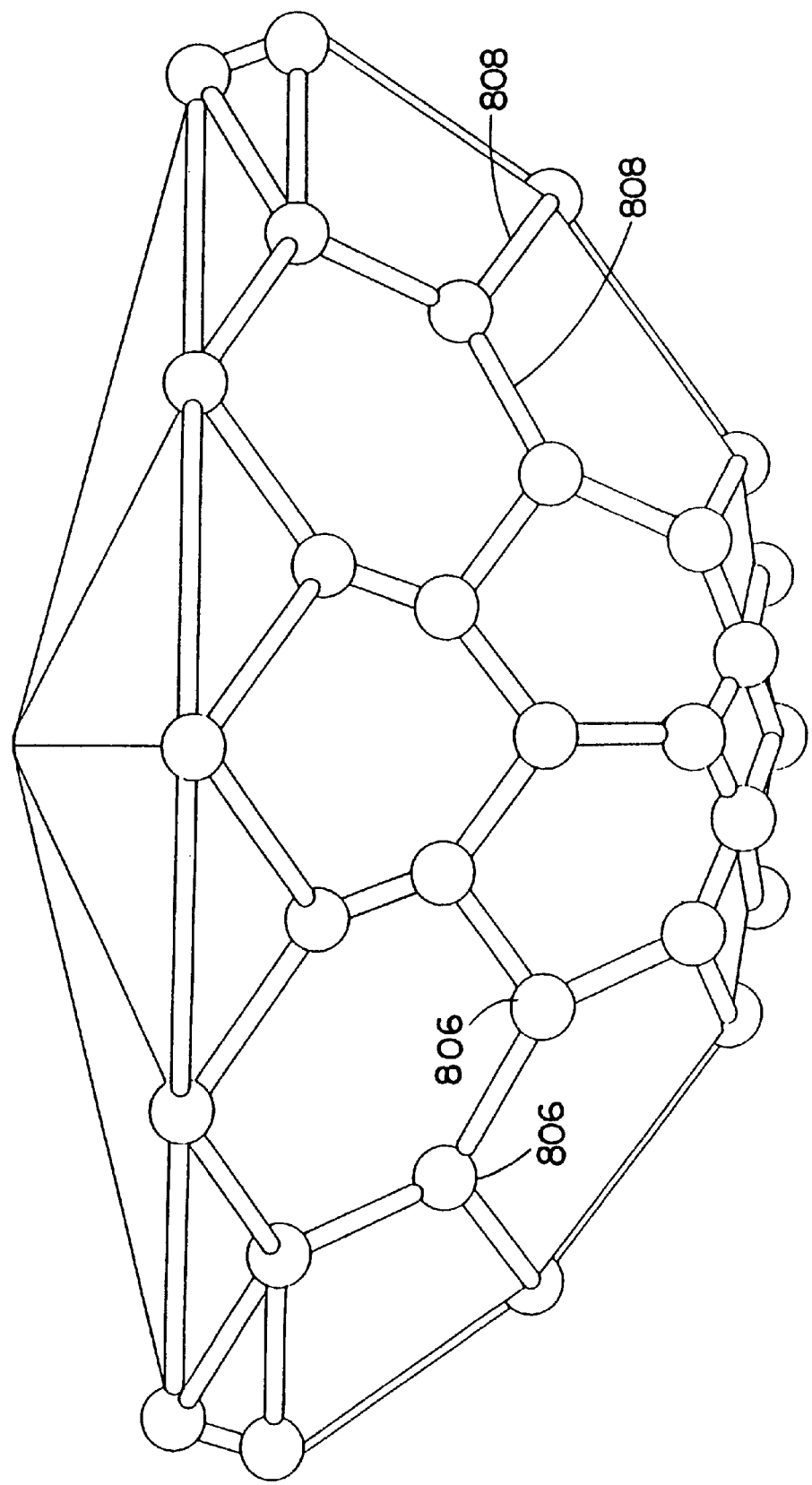
FIG. 64 supplies a detailed side view of the tubular and spherical elements which are employed to connect the individual panels of the antenna array.

FIG. 64 exhibits spherical and tubular connectors 806 and 808 which hold the antenna panels 702 in place. The antenna panels 702 are each coupled to their receivers, transmitters, beam steering and call switching electronics (shown in FIG. 68 and also described in the section concerning Satellite Antennas presented above). These on-board circuit components are located within the interior 715 and are held in place by the spherical and tubular connectors 806 and 808.

Gearsat™

Figure 65:
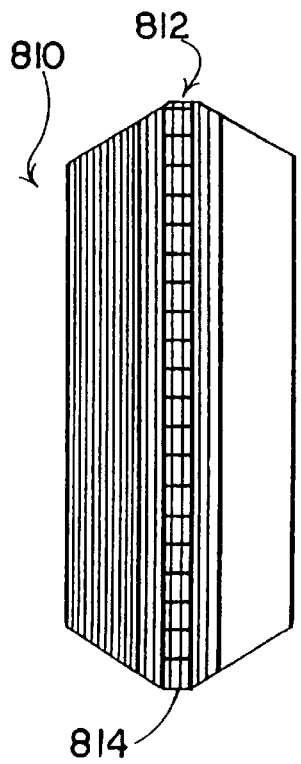
FIGS. 65, 66, and 67 illustrate three views of an alternative embodiment of the invention called Gearsat™.
Figure 66:
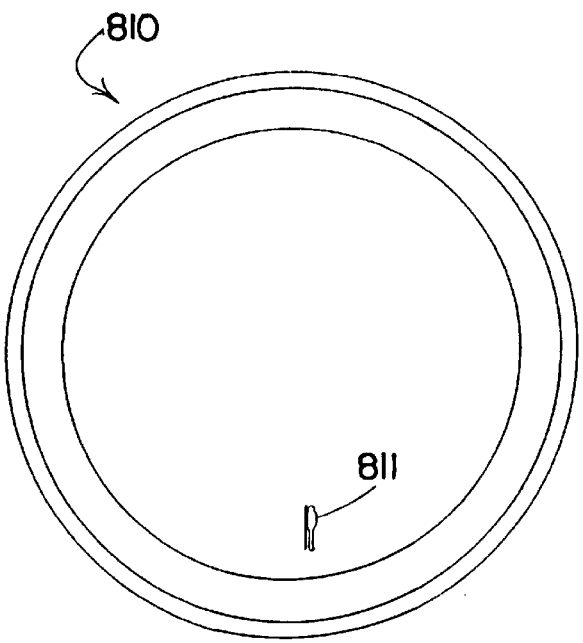
Figure 67:
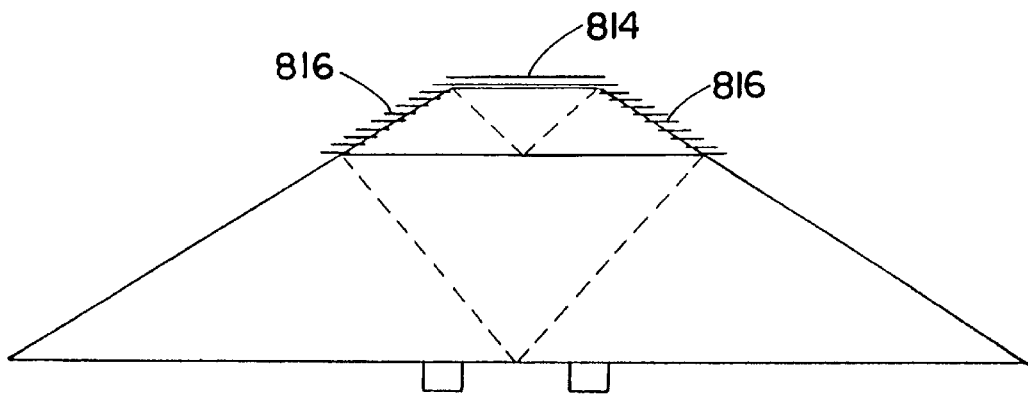

FIGS. 65, 66, and 67 illustrate three views of an alternative embodiment of the invention called Gearsat™. One embodiment of Gearsat™ 810 is shown schematically in a side view in FIG. 65, and comprises an inflatable torus having a radius of approximately ten (10) meters. The scale of the torus 810 is suggested in a different side view by FIG. 66, which includes a schematic representation of a person 811 standing two meters tall. Once deployed in orbit, Gearsat™ 810 revolves about its center at a rate of roughly 0.1 revolutions per minute, turning slowly like a rolling pin whose longest dimension extends perpendicular to its direction of travel. The axis of rotation of the satellite 810 is always normal to its orbital pathway. An outermost surface 812 that generally defines a cylinder lies at the periphery of the satellite 810. This cylindrical surface 812 bears an array of antennas 814 which transmit and receive radio signals to and from other satellites in the constellation and to and from personal, mobile and fixed terminals and gateways. The antenna array 814 includes sixty (60) adjacent rectangular panels, each measuring approximately one meter square. As best seen in the partial side view presented in FIG. 67, two rows of solar cells 816 lie adjacent to the antennas 814. The sixty antenna panels comprise an active, electronically steered phase array.

At any given time, three of the sixty antenna panels 814 are pointed toward the Earth's surface and are transmitting and receiving signals. As the satellite 810 revolves, antenna panels 814 become active as they move into position facing the Earth E, and also terminate their activity as they turn away from the Earth. This continuous hand-off of the communication operation from one set of antenna panels 814 to another is controlled by Earth sensors, and insures that radio beams B from the satellite 810 are always illuminating the footprints 602 on the surface. The Gearsat™ embodiment 810 derives its name from the spatial synchronization of the antenna panels 814 with specific regions of the ground that are illuminated by the beams generated by the antennas. Like the engaged teeth of two mechanical gears, particular antenna panels 814 in the array are matched with particular regions on the ground. Radio beams B emanating from the sixty panels 814 are essentially "locked" or dedicated to specific footprints 602 or cells below it on the Earth's surface. While the text above specifies one particular satellite configuration that offers this form of spatial synchronization among antennas 814 and beam footprints 602, the reader will appreciate that the central objective of providing a dedicated relationship among many antennas and footprints may be carried out using a wide variety of various implementations without departing from the spirit and scope of the invention claimed below. For example, an alternative embodiment of Gearsat™ could simply wobble, rock or nutate periodically to provide a partial rotation motion that would direct antennas beams across predetermined regions on the ground. The Gearsat™ motion need not be a complete rotation through 360 degrees of arc. Any spatial synchronization of moving antennas which maps antenna beams to particular areas on the Earth's surface would implement the Gearsat™ invention.

In the preferred embodiment of the invention, the satellites shown in the figures operate in a constellation of 840 spacecraft which includes 21 sets of 40 equally-spaced satellites flying in 21 orbits. The entire fleet travels around the Earth in sun-synchronous orbits 700 km (435 miles) above the Earth. The circular orbits are inclined 98.2 degrees to the equator. There are 21 orbit planes at different fixed longitude-of-ascending-nodes. Each plane is separated approximately 8.6 degrees (34.3 minutes) from its neighbors. Every plane is occupied by 40 equally spaced satellites. All ascending nodes are grouped together between 6 AM and 6 PM. Satellites in adjacent orbits travel in the same direction except at the "seams" between north-going and south-going portions of the orbits. The satellite system is 3-axis stabilized and momentum biased. Magnetic torquers, reaction wheels and passive aerodynamic pressure provide the required autonomous control torques that keep the antenna panels 702 pointed toward the Earth E and the satellite 800 pointed toward the direction of travel 802 as shown in FIG. 63.

FIGS. 68, 69, 70 and 71 are block diagrams of on-board internal systems that control the satellite and that handle traffic among other satellites and terminals on the ground. The systems illustrated in FIGS. 68, 69, 70 and 71 may be generally incorporated in any of the embodiments of Domesat™ 800, Gearsat™ 810, Batsat™ 894 or Callingsat™ 1410, which is described below. For the purpose of simplicity, the following description relates the components shown in FIGS. 68, 69, 70 and 71 to the Domesat™ 800 embodiment.

Figure 68:
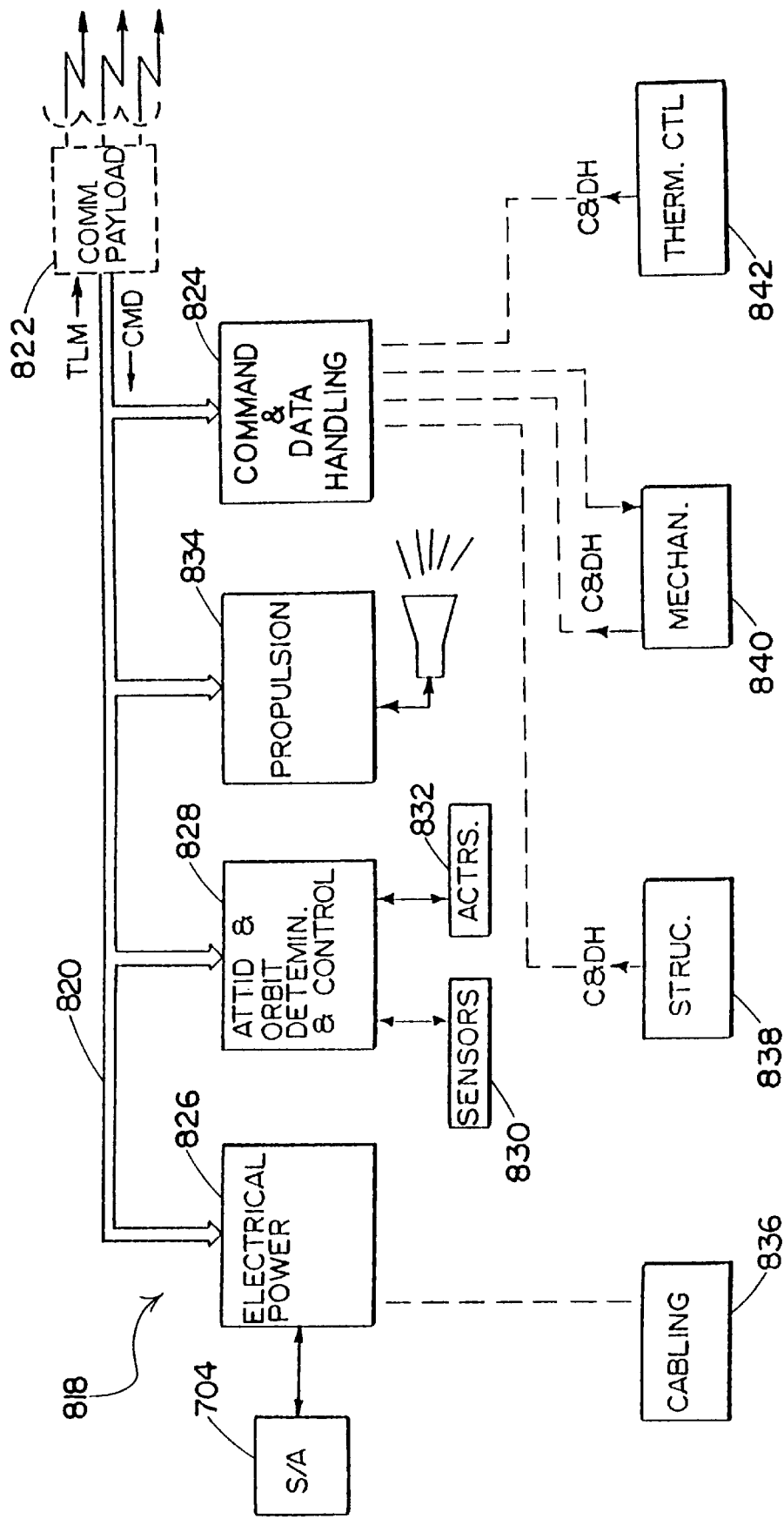
FIGS. 68, 69, 70, and 71 are schematic diagrams of on-board internal systems that control the satellite and that handle traffic among other satellites and terminals on the ground.

The diagram 818 shown in FIG. 68 reveals subsystems that provide Electrical Power 826; Attitude and Orbit Determination and Control 828; Propulsion 834; and Command and Data Handling 824. Each of these subsystems are connected to a bus 820 that is also coupled to a Communications Payload Subsystem 822, which includes the fast packet switch 438 and its related circuitry. The Electrical Power Subsystem 826 (EPS) derives energy from the photovoltaic cells covering panels 704 (solar arrays S/A), and power is stored in nickel metal-hydride batteries. The Attitude and Orbit Determination and Control Subsystem (AODC) 828 maintains the orientation of the spacecraft using three axis stabilization methods. Actuators (ACTRS) 832 are employed to perform the stabilization process. Sun sensors 830 are used as an initial reference once the satellite achieves orbit. Afterwards, inertial measuring units, magnetometers, and information gathered from call traffic is used to keep the craft on course and steady in its desired position. Each satellite "knows" its own position and the positions of all the other satellites in the constellation, as well as all the positions of terminals on the ground. A Propulsion Subsystem 834 uses redundant pulse-plasma thrusters which accomplish maneuvers that include orbit insertion, drag make-up, stationkeeping and deorbit at the end of the satellites lifetime. A Command and Data Handling Subsystem (C&DH) 824 acquires, conditions and formats all satellite data and decodes, stores and distributes all satellite commands. The C&DH 824 comprises a processor with a 4 Gb solid-state RAM memory that is coupled to a local area network (LAN). A microprocessor analyzes, interprets and compresses on-board data, and another microprocessor, running at 20 million instructions per second (MIPS), is dedicated to processing traffic. A Cabling Subsystem 836 contains all the conductors that unite the power and signal electronics on the ship. A Structure Subsystem 838 comprises the geodesic, concave, stackable support skeleton which bears the antenna array 700. A Mechanisms Subsystem 840 includes components that deploy and orient the solar panels 704. A Thermal Control Subsystem 842 includes blankets and coats of paint that manage the thermal conditions of the satellite S.

Figure 69:
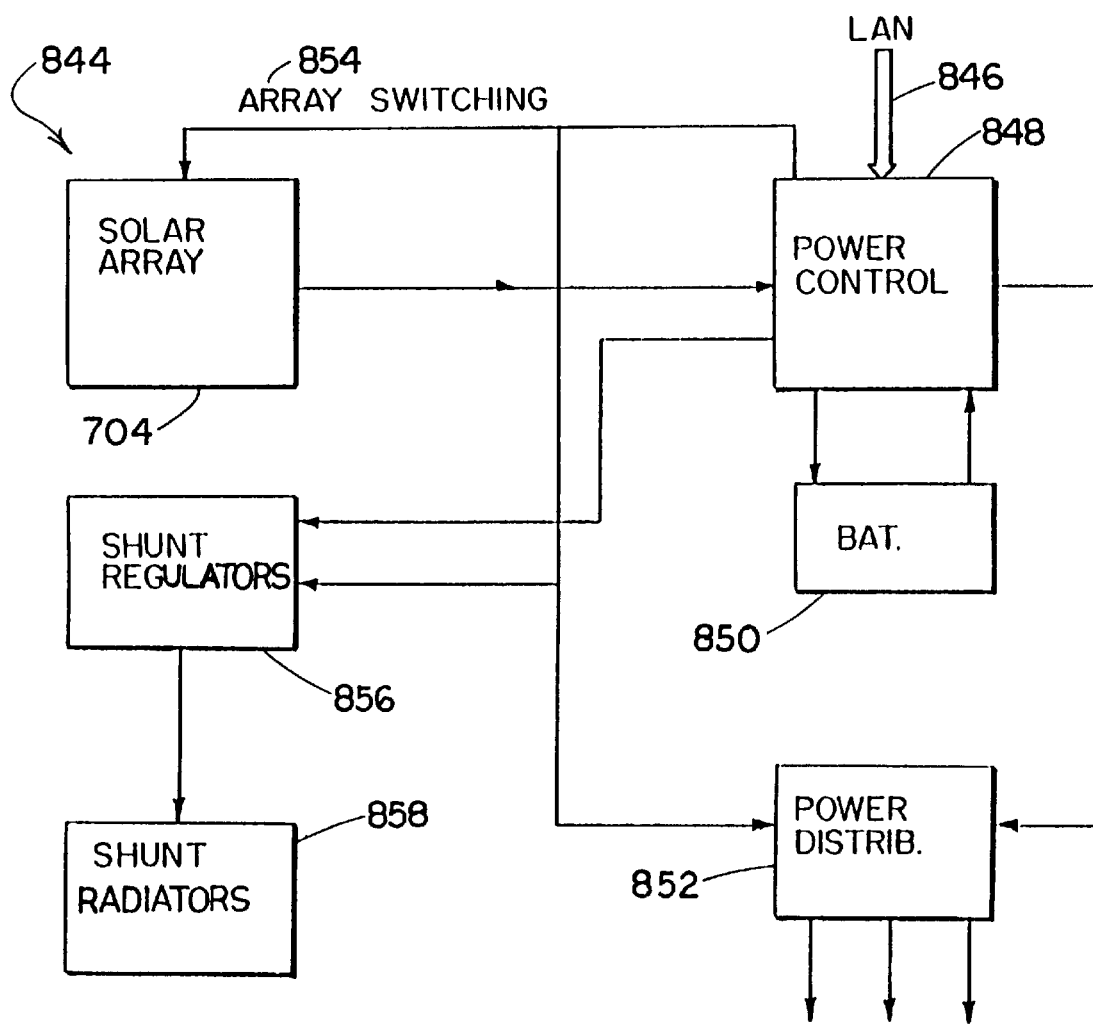

FIG. 69 supplies a block diagram 844 of internal circuitry that resides within the interior 715 of the Domesat™ embodiment 800. A local area network (LAN) 846 is coupled to a Power Control Subsystem 848 that receives power from batteries 850. A Power Distribution Subsystem 852 is coupled to the Power Control Subsystem 848, and to the solar arrays 704 through an array switching link 854. Shunt regulators 856 and radiators 858 are provided to manage the energy distribution onboard each spacecraft.

Figure 70:
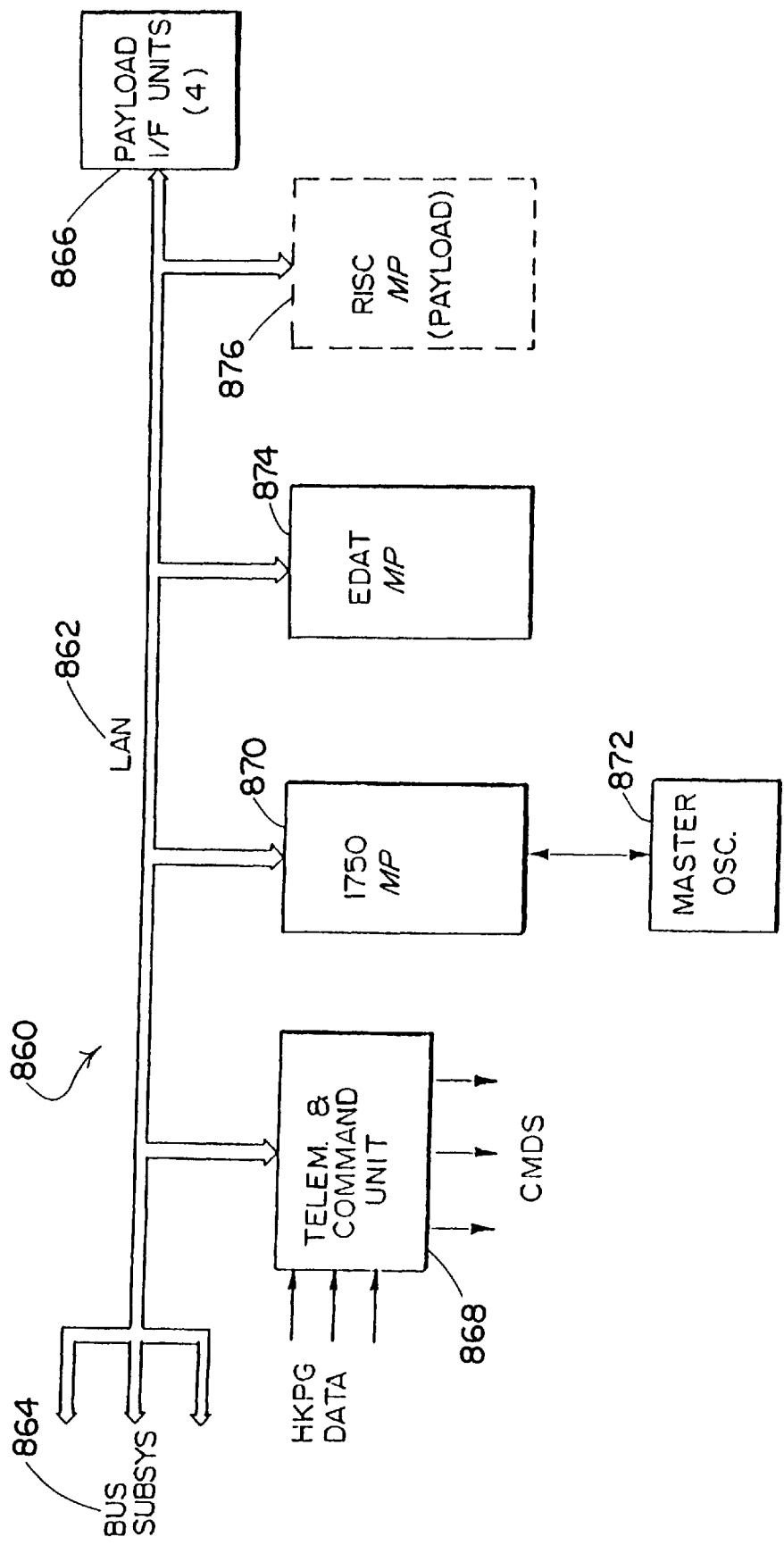

FIG. 70 shows another block diagram 860 comprising a local area network 862, a bus 864 that connects to other subsystems, a payload 866, a telemetry and command unit 868, a "1750" microprocessor 870 for data control and an associated master oscillator 872, an "EDAT" (Engineering Diagnostic and Trending) microprocessor 874 developed by the Martin Marietta Corporation and a "RISC" (Reduced Instruction Set Computer) microprocessor 876. The EDAT processor 874 is a power autonomous operations controller that monitors all telemetry to determine the current "health" status of each spacecraft. It performs detailed diagnostic procedures and reports the health of each spacecraft to ground controllers.

Figure 71:
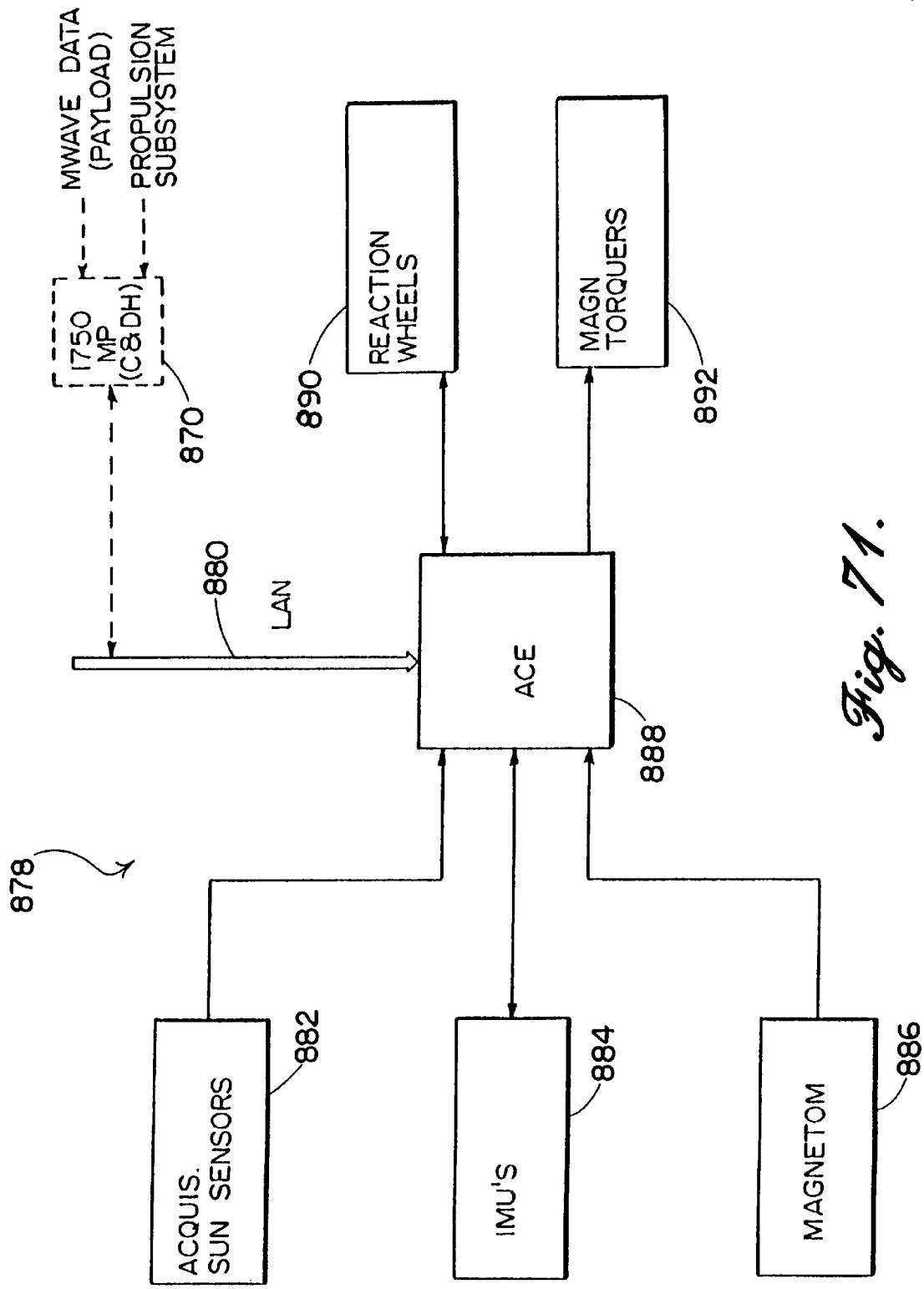

FIG. 71 presents another block diagram 878 comprising a LAN 880, acquisition sun sensors 882, inertial measurement units (IMU's) 884, magnetometers 886, reaction wheels 890 and magnetic torquers 892, all of which work in concert with an Attitude Control Electronics Unit (ACE) 888.

Batsat™

Figure 75:
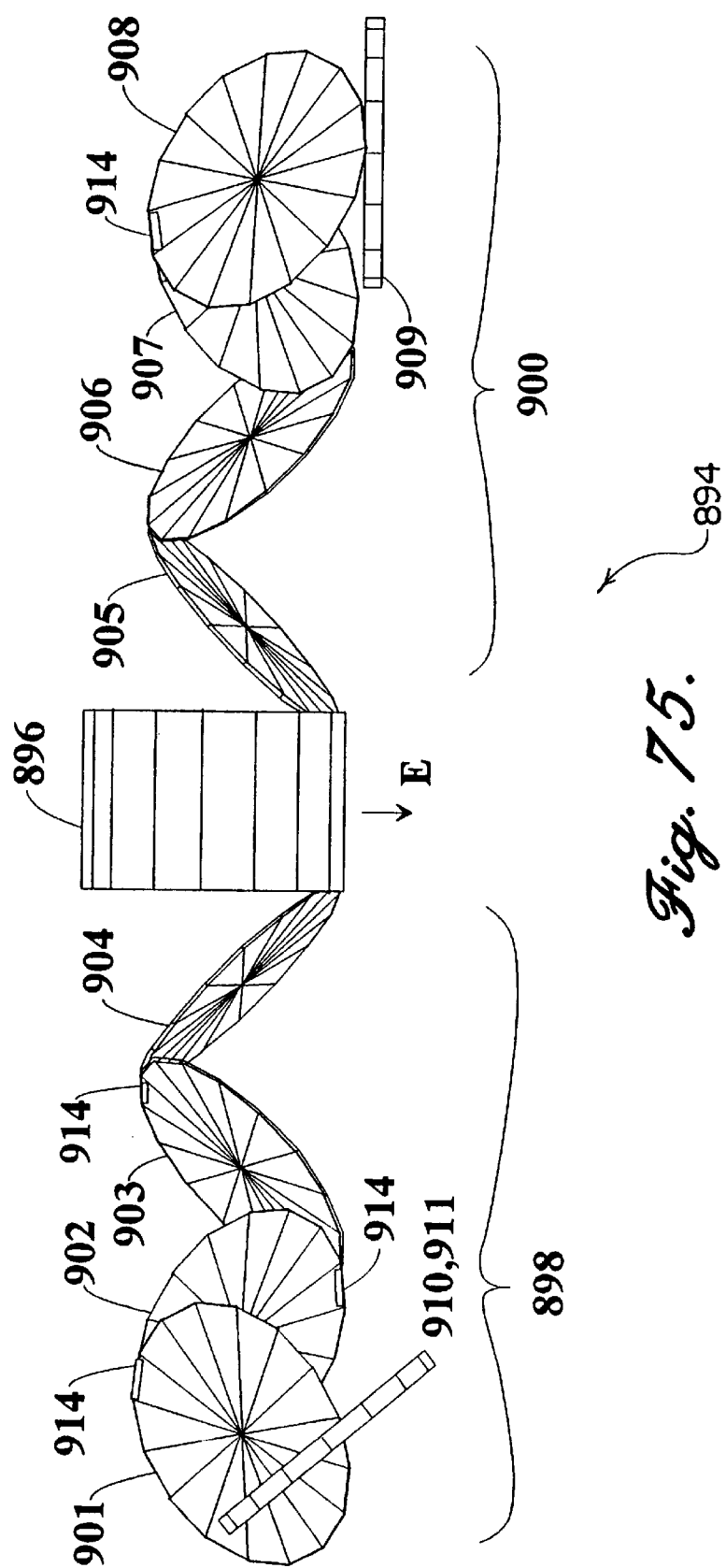
Figure 79:
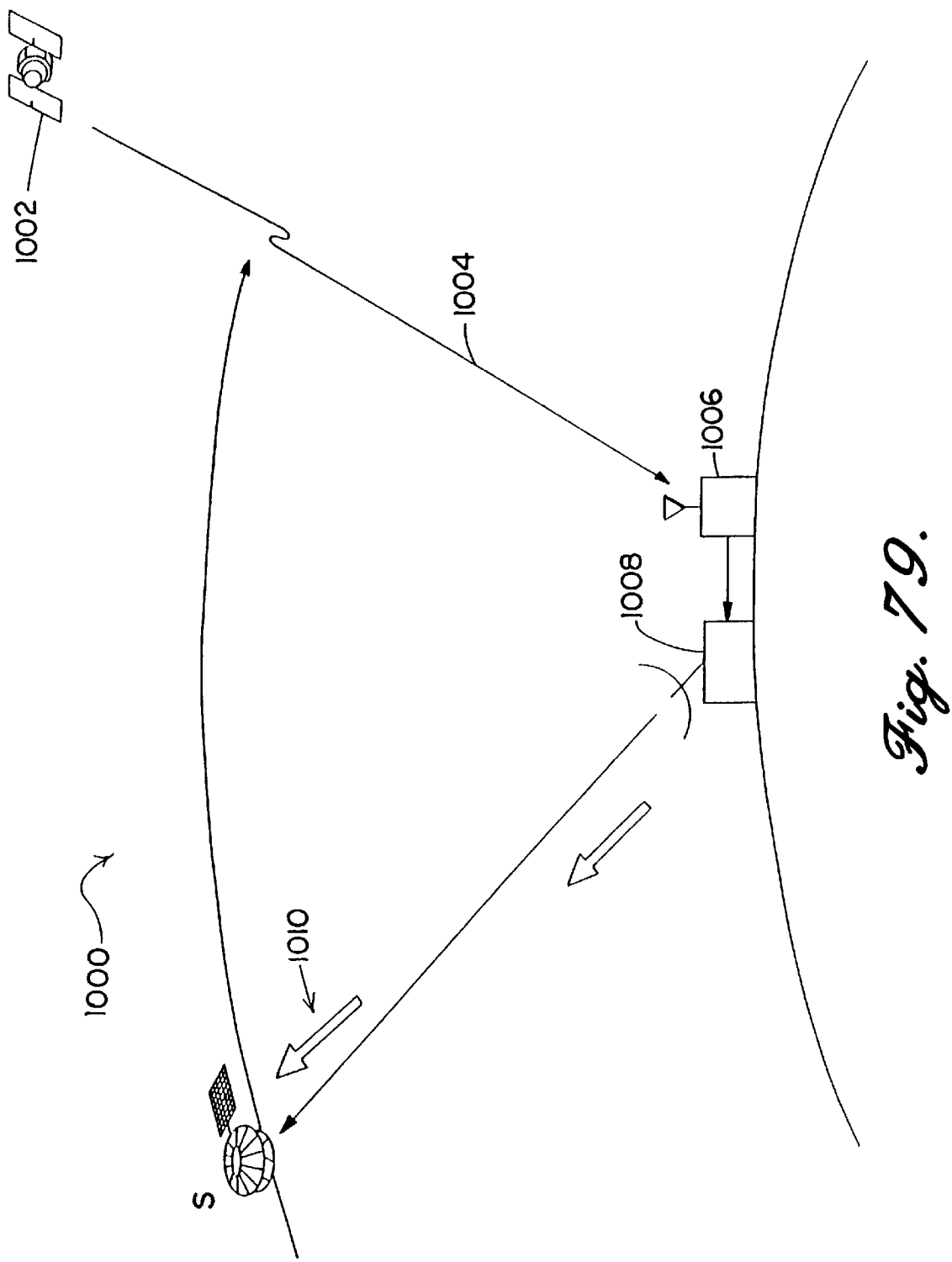
FIG. 79 is schematic depiction of a low Earth orbit satellite using transmissions of communications packets from a ground station to compute its orbital position.

FIGS. 72, 73, 74, 75, 76, 77 and 78 depict another embodiment of the invention which is generally referred to as Batsat™ 894. FIGS. 72 and 73 show the satellite 894 in its folded and stowed configuration, in which arrays 898 and 900 of disc-shaped antenna and solar and thermal panels are collapsed together against a central body 896. FIG. 74 portrays a group 897 several folded Batsat's 894 stacked together in preparation for launch. FIGS. 75 and 76 supply schematic rear and top views of the Batsat™ embodiment 894 after it has reached orbit and has been completely unfolded and locked into its operational configuration. FIGS. 75 and 76 reveal antennas 901, 902, 903, 904, 905, 906, 907, 908 and 909 and solar/thermal surfaces 910 and 911. The panels are held together by cables 912 and hinges 914.

FIG. 77 illustrates the potential antenna panel coverage areas generated by radio beams emitted by Batsat™, while FIG. 78 depicts actual antenna panel coverage areas. FIG. 77 illustrates the footprint coverage capability for each panel, while FIG. 78 illustrates the primary coverage areas without overlap. The preferred embodiment of Batsat™ 894 includes a central cylindrical body 896 and two arms of panels 898 and 900 that extend away from the central body 896 in generally opposite directions. The arms comprise nine substantially circular, disc-shaped antenna panels 901 through 909, and a pair of solar/thermal panels 910 and 911. The central body 896 has a generally cylindrical shape, and includes two flat faces which receive antenna panels 904 and 905 when the satellite 894 is in its folded and stowed configuration. When deployed after reaching orbit, the two flat faces of the body 896 are positioned perpendicular to the direction of the Nadir. As best seen in FIG. 76, four antenna panels 901, 902, 903 and 904 are connected in series to and extend from one side of central body 896, while the other five antenna panels 905, 906, 907, 908 and 909 are similarly connected in series and extend in the opposite direction. The two solar/thermal panels 910 and 911 are connected in series to antenna panel 901. Each antenna or solar/thermal panel is coupled to its neighbor or neighbors with power, control and communication cables 912 and spring-loaded self-latching hinges 914. Each panel has two generally circular flat faces. The face of each antenna panel 901–909 which is oriented toward the Earth's surface carries a set of hexagonal antenna surfaces. The faces of the two solar/thermal panels 910 and 911 carry both hexagonal areas of solar cells and thermal radiators. When Batsat™ 894 is fully deployed, all the connected antenna panels 901–909 and solar/thermal panels 910 and 911 are spaced as far apart as the hinges 914 and cables 912 allow. In this configuration, the spacecraft resembles a bat with its wings fully extended in two opposing arcs, and the elements of the satellite reside at their "maximum possible unfolded distances" from central body 896. When the Batsat™ panels are folded together like an accordion, the elements of the ship reside at their "minimum possible folded distances" from central body 896.

Batsat™ incorporates high-gain, electronically-steered, phased-array antennas to provide telecommunication links over a contiguous surface area within view of the satellite. The problem faced by nearly all satellite systems concerns the limited amount of frequency spectrum available for communication links between a satellite communication system and communication terminals on the Earth. Previous systems employ various multiple access schemes which divide the footprint generated by the satellite's illumination into multiple spots or cells. These cells are organized into patterns which allow the same frequencies to be reused many times within a particular footprint. When the frequencies are physically separated, the reuse technique is called "space division", and is represented by the acronym "SDMA", or space division multiple access. When the codes are different, the method is called "code division" and the abbreviation "CDMA" is used as a shorthand expression for "code division multiple access". The acronym "TDMA" stands for "time division multiple access", and indicates that many beams having the same frequency are emitted at different times. Each of these techniques help to eliminate interference between cells using the same frequencies. As a general rule, the smaller the cell, the more the set of frequencies can be reused within the footprint. The reuse of frequencies leads to spectral efficiency and the potential for higher capacity for the satellite and network as a whole.

To achieve full footprint coverage, the number of cells in a satellite footprint is selected to be inversely proportional to the area of the cell. Assuming each satellite antenna 901–909 produces one transmit or receive beam which is multiplexed over a fixed number of cells, the number of antennas on the satellite then also increases as the cell size decreases. The cell size is primarily a function of the directivity, or antenna gain, of the satellite antenna—the smaller the cell size, the higher the required gain.

For a given frequency, the gain of an antenna is proportional to its effective area of the antenna in the direction of the source (destination) of the received (transmitted) signal. The effective area of a flat surface phased array antenna is greatest along the zenith, which is colinear with the line perpendicular to the surface of the antenna. The effective area, and thus the gain, decreases in proportion to the cosine of the angle between the zenith and a line to the communication source/destination. For the best antenna performance, the required beam steering angle needs to be kept small so that the antenna's effective area is close to its actual area. For this reason, Batsat™ is designed to achieve high spectral efficiency and system capacity. The present invention includes a large number of high-gain antennas and a corresponding large amount of antenna surface area. The antenna surfaces are arranged to keep the beam steering requirements to a few degrees.

Batsat™ not only offers high spectral efficiency and system capacity, but does so at a minimal launch cost. Because the present invention can be folded, stacked and packed into a relatively small launch vehicle 801, the cost of placing each satellite into orbit is relatively low.

Each antenna panel 901–909 is responsible for one portion of the satellite footprint. In its fully deployed configuration, the antenna panels 901–909 are arranged at angles with respect to the Earth which limit the beam steering angle of each antenna beam to a few degrees, yet allow full coverage of the footprint area by the plurality of antennas. Two panels 910 and 911 at the end of each arm provide solar arrays on the side facing the sun and thermal radiators on the opposite side. These panels are deployed at an angle which is the optimal angle for both solar energy collection and thermal radiating for the sun-synchronous orbit in which the satellite operates. The hinges H are spring loaded latching hinges. Once released from their restraints, the panels 901–909, 910 and 911 deploy automatically. The springs push the panels apart, and the locking mechanism locks them into the correct deployment angle. The hinges on each panel which join that panel to the previous panel or satellite body 896 and to the next panel are offset from each other. The combination of offset angle and the hinge locking angle determines the deployment angle of each panel. For example, if the offset angle is 180 degrees and the locking angle is 90 degrees, the deployed wings would extend straight along the axis of the central body in a series of perpendicular panels. By changing the offset angle of the hinges, the panels can be deployed in an arc extending from each end of the central body such that each panel points at a different angle (azimuth and elevation) with respect to the Earth. The flexible cables 912 may include optical fibers or copper wires, and connect the panels with each other and to the central body for passing control, data, power, etc.

Since the preferred embodiment of the Batsat™ invention is deployed in a sun-synchronous orbit, there is an optimum deployment angle for solar arrays and thermal radiators. For example, in the terminator orbit (6 AM–6 PM), a vertically oriented array will always have one face to the sun and one to cold space. A panel with solar collection on one side and thermal radiators on the other can be deployed at one angle which is the optimal angle for both functions for the life of the satellite. In this design, the solar/thermal panels are the last panel(s) on the arms and are designed to be rotated about an axis parallel to the direction vector of the satellite and latched to the angle correct angle. The solar array is stowed as a panel of the same diameter as the other panels for packing efficiency, but may include deployment mechanisms if the surface area required exceeds that of one or two panels.

Although the preferred embodiment of Batsat™ has been described as comprising the central body, nine antenna panels and two solar/thermal panels, additional small panels may used for intersatellite links. The antenna panels comprise multiple antenna facets, each capable of generating a single transmit or receive beam. Each beam can be steered ±15° from its zenith in all directions. Table One supplies the antenna deployment angles with respect to the satellite nadir. One panel points in the nadir direction, while the other eight antenna panels point in directions which are displaced 30° in elevation from the nadir and evenly spaced at 45° increments in azimuth.

TABLE One

| Reference | Element | Elevation | Azimuth |
|---|---|---|---|
| 896 | Satellite Body | NA | NA |
| 901 | Antenna Panel 1 | 45 | 22.5 |
| 902 | Antenna Panel 2 | 45 | 02.5 |
| 903 | Antenna Panel 3 | 45 | 67.5 |
| 904 | Antenna Panel 4 | 45 | 247.5 |
| 905 | Antenna Panel 5 | 45 | 112.5 |
| 906 | Antenna Panel 6 | 45 | 292.5 |
| 907 | Antenna Panel 7 | 45 | 157.5 |
| 908 | Antenna Panel 8 | 45 | 337.5 |
| 909 | Antenna Panel 9 (Nadir) | 0 | NA |
| 910 | Solar/Thermal Panel 1 | 45 | 90 |
| 911 | Solar/Thermal Panel 2 | 45 | 90 |
| 912 | Power, Control, and Communication Cables | NA | NA |
| 914 | Spring Loaded, Self-Latching Hinges | NA | NA |

The values presented below the column labeled "Elevation" are angles measured in degrees with respect to the direction of the Nadir. The values presented below the column labeled "Azimuth" are angles measured in degrees with respect to the direction of the Velocity Vector 802, as shown in FIGS. 77 and 78.

Each of the embodiments of the invention, Domesat™, Gearsat™, Batsat™ and Callingsat™ may incorporate teflon thrusters for precise altitude, attitude and position control. These thrusters use small pieces of a material such as teflon as fuel. Extremely small amounts of the teflon are expelled from miniature nozzles, and the slight reactions of the spacecraft provide highly precise position control.

The Batsat™ design is limited to two extending arms. One alternative embodiment of the Batsat™ invention could employ a single extending arm of panels, or more than two.

System Communication Links

Unlike prior conventional systems, the present invention utilizes a fast packet switch as an input to the gateways. Another feature of the Satellite Communication System which distinguishes it from earlier systems is that the control of calls is separated from the hardware that performs the call switching functions.

The satellite antennas 700 are divided into four subsystems. The first supports the links between the satellite and mobile terminals (MTSLs) and links between the fixed terminals and satellites (FSLs). Portable terminals, which include hand-held and mobile phones installed in vehicles, the term fixed terminals F refers to terminals that are installed in fixed locations like office buildings or residences. They may range from fixed terminals serving a single telephone to fixed terminals F providing up to 30 trunks serving groups of phones within a single building or in a rural town. In one embodiment of the invention, the FT antenna system includes a steerable transmit antenna and a steerable receive antenna which provide 30 dB of gain and 27 dB of gain, respectively. These antennas automatically track a fixed frequency pilot carrier tone from the satellites. They are steerable over a 100 full angle cone. Antennas used on MTs have 18 dB of transmit gain and 15 dB of receive gain.

MTSL data is transmitted at a burst data rate of 450 KBPS and a duty cycle of 6.25%. The uplink uses the 29.5 to 31 GHz band and the downlink uses the 19.7 to 21.2 GHz band. One-fourth DS-0 capacity (16 KBPS) is provided. The modulation format used is 8-PSK with ⅔ rate coding. Assuming a bandwidth efficiency factor of 1.5, each MTSL requires 0.28 MHz. Average terminal transmit power is 16 mW (0.26 W peak) and average satellite transmit power is 12 mW (0.19 W peak). Assuming a 512 bit packet, the beams would dwell on each cell for 1.138 millisecond (512 BPS/ 450 KBPS). Thus they come back to the same cell every 23.111 milliseconds (16×1.444 millisecond). When a transmit beam switches to a cell it sends a message saying, in effect, "beam on cell N" on a fixed beam identification frequency that all MTs monitor. The satellite also sends any packets addressed to MTs in cell N on the frequency assigned to that MT. Finally the satellite sends any paging requests on a fixed paging frequency that all MTs monitor. All of these transmissions occur simultaneously (FDMA).

Active MTs can be in one of three modes: waiting for call, ready to initiate call, or call in progress. An MT waiting for calls monitors the paging channel and periodically sends a "Here I am" message in response to a "Beam on cell N" message on the fixed frequency assigned for this purpose. The "Here I am" message is short relative to a packet and the MT randomly selects one of the ten 100 microsecond slots from 0 to 1 milliseconds after the receipt of the "Beam on cell N" message to send the "Here I am" message. This minimizes the probability of collision. The "Here I am" message allows the system to update a database of the current location of PTs.

An MT ready to initiate a call or an MT that has been paged responds to the "Beam on cell N" message by sending a "Request for assignment" message on the fixed frequency assigned to the calling channel. The "Request for assignment" message is short relative to a packet and the MT randomly selects one of the ten 100 microsecond slots from 0 to 1 milliseconds after the receipt of the "Beam on cell N" message to send the "Request for assignment". This minimizes the probability of collision. After sending a "Request for assignment" message, the MT monitors the fixed frequency assignment channel for an assignment message. The assignment message tells the MT which satellite and cell to respond to, and which frequency to use. If an MT does receive an assignment within 40 msec of sending a request, it assumes that the request was blocked and re-requests. On the average it will take 120 msec to obtain an assignment.

An MT in the call in progress mode has already been assigned a cell number and frequency slot. When it receives the "Beam on cell N" message for its cell it transmits any packet it has waiting on the assigned frequency slot and receives any packet from the satellite on the assigned receive frequency slot. If the MT does not have a packet ready it transmits an empty packet. Whenever an MT in the "call in progress" mode sends a packet to the satellite it includes, in the header, information which can be used to identify the satellite ID and cell number from which it has received "Beam on cell N" messages and the channel (frequency) assigned as a result of the "Request for Assignment" message. This information is used by the destination terminal to address its packets to this terminal.

Another option for receiving calls is for the satellites to carry a VHF pager payload. The satellites would then page the terminal similarly to a conventional pager. The terminal user would then know to enable the terminal to receive his call. The Fixed Terminal/Satellite link is substantially similar to the MT/Satellite link. Similar, but more powerful satellite antennas are used. The FSLs use a different frequency allocation and employ separate paging, calling, and assignment channels.

The second antenna subsystem supports the links between the satellites S and gateways G (GSLs), and includes eight electronically steerable arrays pointed towards the Earth. The third antenna subsystem supports the links among the satellites (ISLs), and includes of a band of electronically steerable antennas around the circumference of the satellite. The fourth antenna subsystem consists of an Earth coverage antenna for the satellite GSL, FTSL, and PTSL pilot tone. The gateways are the interfaces between the present invention and public telephone networks. They are dedicated fixed sites consisting of two antenna subsystems separated by 30 to 50 KM. The sites are connected by line-of-sight microwave or fiber optic links. This separation provides spatial diversity that virtually eliminates rain outages. Each gateway antenna subsystem includes a steerable receive antenna and a steerable transmit antenna. The receive antenna provides 41 dB of gain and the transmit antenna provides 41 dB of gain. These antenna are steerable over a 100 degree full angle cone.

FIG. 4 shows the basic design of a gateway terminal. Gateway terminals provide network services such as billing, network database, administration, maintenance, and satellite operations. The GSL uplink uses the 27.5 to 29.5 GHz band and the downlink uses the 17.7 to 19.7 GHz band. The GSLs are dedicated, and the constellation supports all authorized GSLs on a continuous basis. The gateway transmit antennas provide 45 dB of gain and autotrack the satellite pilot carrier signal. Gateway receive antennas provide 42 dB of gain and also autotrack the pilot carrier signal. Satellite gateway antennas provide 41 dB of gain. The nominal uplink and downlink transmit powers are 0.48W and 0.36W continuous, respectively. The data rate is 170 MBPS with 32-CROSS modulation and rate 4/5 coding. The GSL channel density is 1 GSL channel/51 Mhz. Each satellite can support up to 8 GSLs simultaneously and each GSL can support up to 12 GSL channels. The required frequency allocation is 612 Mhz. Spatial multiplexing allows all satellites to share the same allocation (100% reuse). The satellites cooperatively assign each gateway to one of the satellites. A standard ISL link communication packet stream is used for this purpose and for reassignments as the satellite geometry changes. The GSL is robust enough to support operation in high humidity (95% RH, 35 degrees C) environments with rain clouds and rain at the 99.9th percentile for sub-tropical wet temperate continental areas region D2. Spatial diversity is used to virtually eliminate rain outages.

Each Inter-satellite Link (ISL) channel is 170 MBPS with 32-CROSS modulation and rate 4/5 coding. The channel density is 1 ISL channel/51 MHz. Each satellite can support up to 8 ISLs simultaneously and each ISL can support up to 12 duplex ISL channels. Thus the required frequency allocation is 1,224 MHz. Spatial diversity allows all satellites to share the same allocation (100% reuse). The ISL antennas provide 35 to 50 dB gain and autotrack. The nominal transmit power is 0.5 W. The ISLs use the 59 to 64 GHz band, or may use optical frequencies.

All of the links utilize electronic power control of the RF transmitters to ensure that only the minimum amount of power necessary to carry out the desired communication is used. Thus minimum transmit power is used for unobstructed links and clear sky. Transmit power is increased to compensate for shadowing and rain.

TABLE 1A

Frequency Allocation
The RF bandwidth requirements are given by:

| LINK | CHANNELS | Bandwidth/Channels | Bandwidth Required |
| --- | --- | --- | --- |
| MTSL(u) | 720/cell | 0.275 MHz | 198 MHz |
| FTSL(u) | 360/cell | 1.1 MHz | 396 MHz |
| GSL(u) | 12 | 51 MHz | 612 MHz |
| MTSL(d) | 720/cell | 0.275 MHz | 198 MHz |
| FTSL(d) | 360/cell | 1.1 MHz | 396 MHz |
| GSL(d) | 12 | 51 MHz | 612 MHz |
| ISL | 24 | 51 MHz | 1224 MHz |

The GSL and ISL bandwidth can be reused 100% from satellite to satellite because of the small antenna beamwidths. The MTSL and FTSL bandwidth can be re-used 100% from Earth fixed cell 606 to Earth fixed cell 606 because of the TDMA scanning pattern.

Call Handling

FIG. 5 provides a schematic illustration that is commonly referred to as a "ping-pong" diagram in the telephone business. This figure represents the sequence of events which occur when a call is placed and handled by the present invention. Once a terminal has been assigned a communication channel as described previously, it sends a "Call Request" message to the satellite $S_A$ which assigned it a channel. This satellite forwards this message to one of a set of "Feature Processor" systems F which may be located on the ground or within another satellite. Included in the Call Request message is the identity of the terminal requesting to make the call $T_A$ and the identity of the called terminal $T_B$. The Feature Processor communicates with one of a set of "Database" Processors (which may be located on the ground or in a satellite node) to update the terminal's current location information and to obtain information including the services the terminal can use and the terminal's "Authentication" Key $N_A$.

The Feature Processor uses the terminal's Authentication Key $N_A$ to encrypt a 128-bit random number N which is composed of two 64-bit fields, $N_K$ (the Link key), and $N_R$ (the Response key). A private key encryption and decryption Algorithm A can be used, such as the well-known DES standard. The Feature Processor sends the encrypted number $N_E$ to the terminal. The terminal decrypts $N_E$ using its own Authentication key $N_{AT}$ and Algorithm A at to derive the two 64-bit numbers $N_{KT}$ and $N_{RT}$. It uses the derived key $N_{KT}$ to encrypt $N_{RT}$ (using Algorithm A) and sends this to the Feature Processor. The Feature Processor decrypts $N_{RT}$ using the previously derived key $N_K$ and Algorithm A. If the result matches the previously derived $N_R$, this proves that the terminal possesses the correct Authentication Key, and the terminal is allowed to use the system services. All future packets transmitted by this terminal during this call are encrypted using the derived Key $N_K$ (which is equal to $N_{KT}$) and the Algorithm A.

A similar process is used to validate and encrypt other system communication links. This method prevents the fraudulent use of system services and the "eavesdropping" on terminal-to-satellite links, both of which are serious problems in similar systems.

Following the authentication of the originating terminal $T_A$, the Feature Processor interrogates a Database Processor to determine the last known location, Authentication Key, and Service Features of the called terminal $T_B$ (if TB is a subscriber to this network), or the identity of the Gateway System serving $T_B$ (if $T_B$ is a subscriber of another network). The Feature Processor uses the Autonomous Orbit Determination (AOD) algorithm to determine the identity of the Satellite $S_B$ currently serving the location of Terminal $T_B$ or the corresponding Gateway. The location information (referred to in FIG. 5 as Routing Instructions) is returned to $T_A$.

Terminal $T_A$ sends a Call Setup Request packet to Satellite $S_B$. This packet identifies the called Terminal $T_B$ or associated Gateway G. If $T_B$ is served by a Gateway, Satellite $S_B$ sends the Call Setup packet to the Gateway, which then completes the call setup to Terminal $T_B$ and returns the Connect packet to Terminal $T_A$ once $T_B$ has answered the call. If $T_B$ is not served by a Gateway, Satellite $S_B$ broadcasts a paging message to alert $T_B$. Terminal $T_B$ responds to the page by sending a "Request for Assignment" message to Satellite $S_B$ as detailed previously. In a manner similar to that described for Terminal $T_A$, Satellite $S_B$ assigns $T_B$ a communication channel, and initiates the Authentication and Link Encryption procedures using Feature Processor F. At the successful completion of these procedures, the Connect packet is returned to $T_A$, and the connection is established.

Packets transmitted between $T_A$ and $T_B$ contain a Node and Call Identifier field used to route the packet through the fast packet switch nodes to their destination. If the Node or Call Identifier associated with a Terminal changes during a call, the new information is transmitted to the other Terminal in subsequent packets to prevent a disruption of the call.

System Services

In addition to offering basic voice service, the present invention will also be capable of carrying data. The system is designed to relay data for alarm and security services, telemetry services, facsimile and encryption. Like land-based networks, the satellite constellation will also have the ability to provide a broad spectrum of business services, including AIOD, FX, OPX, 800, and WATS. Subscribers will also be able to use the present invention as a Centrex service which connects related users in a virtual private exchange similar to conventional PBX service. The network disclosed in this application will also support currently available phone company products, such as pay phone, free-of-charge emergency lines such as the 911 service offered in the United States, paging, calling party identification, call forwarding, call transfer, call trace, three-way calling, conference calling, and call pickup.

Technical Specifications of a Preferred Embodiment

Specific details and characteristics of the preferred embodiment of the present invention are supplied in the tables that follow. These specifications are presented as particular examples which may be varied if alternative embodiments are employed to practice the invention. Those persons ordinarily skilled in the electronics and telecommunications arts will appreciate that this data is not intended to limit the scope of the invention, but, rather, provides a more comprehensive disclosure of design details.

TABLE 1B

Preferred Embodiment - Cells over land

| ITEM | Quantity | Percent |
| --- | --- | --- |
| Orbits | 21 | |
| Satellites/Orbit | 40 | |
| Total Satellites | 840 | |
| Maximum Cells/Satellite | 4,096 | |
| Total Earth-Fixed Cells | 1,280,000 | |
| Percent Ocean | 832,000 | 65.00% |
| Cells over Land | 448,00 | 35.00% |

TABLE 1C

Traffic Density Distribution

| ITEM Percent | Cells | E/Cell | Total | Percent | Erlangs | Total |
| --- | --- | --- | --- | --- | --- | --- |
| % Rural | 90.00% | 403,200 | | 1.0 | 403.200 | 5% |
| % Semi-rural | 9.00% | 40,320 | | 30.0 | 1,209,600 | 15% |
| % Suburban | 0.95% | 4,246 | | 346.0 | 1,515,136 | 20% |
| % Big City | 0.05% | 224 | | 21,435.0 | 4,801,440 | 60% |
| Total | 100.00% | 448,000 | | | | 100% |
| Total O&t (E, HD) | | | | | 7,929,376 | |
| Total O&T (E, ABS) | | | | | 5,286,250 | |

TABLE 2

Calculation of Number of Intersatellite Links

| ITEM | Percent | Hops | Quantity | Erlangs | Virtual Trunks |
| --- | --- | --- | --- | --- | --- |
| Intersatellite Traffic | 10.00% | | | 528,625 | |
| Intersatellite 1 hop | 40.00% | 1 | | 211,429 | 211,429 |
| Intersatellite 2 hops | 25.00% | 2 | | 132,156 | 264,312 |
| Intersatellite 3 hops | 18.00% | 3 | | 95,152 | 285,456 |
| Intersatellite 4 hops | 8.00% | 4 | | 42,290 | 169,160 |
| ISL > 4 hops | 9.00% | 5 | | 47,562 | 237,810 |
| Total | | | | | 1,168,167 |
| Number of Sats | 100.00% | | 841 | | |
| Active Sats | 15.00% | | 126 | | |
| Virtual Trunks/Sat | | | | | 9,271 |
| Mbit/s at 64 kbit/s/VT | | | | 593 | |
| ISL/sat at 135 Mbit/s | | | | 4 | |

TABLE 3

Mobile Terminal-Satellite Link (MTSL) RF Plan

| | UPLINK | DOWNLINK |
|---|---|---|
| Frequency Band | 29.5–31 GHz | 19.7–21.2 GHz |
| Polarization | RHCP | RHCP |
| Requested Bandwidth | 198 MHz | 198 MHz |
| Channel Bandwidth | 275 KHz | 275 KHz |
| Number of Channels | 720 | 720 |
| Modulation Format | 8-PSK | 8-PSK |
| Multiplexing | FDMA/TDMA | FDMA/TDMA |
| Duty Cycle | 6.25% | 6.25% |
| Emission Designator | 275 KG1D | 275 KG1D |
| Nominal Peak XTM Pwr | 0.255 W | 0.188 W |
| Max. Peak XTM Pwr | 12.8 W | 1.20 W |
| Max. EIRP Per Channel | 28.6 dBW | 38.8 dBW |
| Max. EIRP Per Beam | 57.2 dBW | 67.4 dBW |
| Peak Flux Density in 1 MHz | $-111$ dBW/m$^2$ | $-95$ dBW/m$^2$ |
| Receiving System Noise Temp | 652° K. | 394° K./504° K. |
| G/T | 9.9 dB/° K. | $-11.5/-12.5$ dB/° K. |

TABLE 4

Fixed Terminal-Satellite Link (FTSL) RF Plan

| | UPLINK | DOWNLINK |
|---|---|---|
| Frequency Band | 27.5–31 GHz | 17.7–21.2 GHz |
| Polarization | RHCP | RHCP |
| Requested Bandwidth | 396 MHz | 396 MHz |
| Channel Bandwidth | 1.1 MHz | 1.1 MHz |
| Number of Channels | 360 | 360 |
| Modulation Format | 8-PSK | 8-PSK |
| Multiplexing | FDMA/TDMA | FDMA/TDMA |
| Emission Designator | 1M10G1D | 1M10G7D |
| Nominal Peak XTM Pwr | 0.064 W | 0.047 W |
| Max. Peak XTM Power | 3.2 W | 0.305 W |
| Max. EIRP per Channel | 34.6 dBW | 32.8 dBW |
| Max. EIRP per Beam | 60.2 dBW | 58.4 dBW |
| Peak Flux Density in 1 MHz | $-112$ dBW/m$^2$ | $-107$ dBW/m$^2$ |
| Receiving System Noise Temp | 652° K. | 394° K./504° K. |
| G/T | 9.9 dB/° K. | 0.5/$-0.5$ dB/° K. |

TABLE 5

Gateway-Satellite Link (GSL) RF Plan

| | UPLINK | DOWNLINK |
|---|---|---|
| Frequency Band | 27.5–29.5 GHz | 17.7–19.7 GHz |
| Polarization | RHCP | RHCP |
| Requested Bandwidth | 612 MHz | 612 MHz |
| Channel Bandwidth | 51 MHz | 51 MHz |
| Number of Channels | 12 | 12 |
| Modulation Format | 32-QAM | 32-QAM |
| Multiplexing | SPATIAL | SPATIAL |
| Emission Designator | 51M0D7D | 51M0D7D |
| Nominal XTM Power | 0.48 W | 0.355 W |
| Maximum XTM Power | 24 W | 2.3 W |
| Max. EIRP per Channel | 58.3 dBW | 44.1 dBW |
| Max. EIRP per Beam | 69.1 dBW | 54.9 dBW |
| Peak Flux Density in 1 MHz | $-108$ dBW/m$^2$ | $-114$ dBW/m$^2$ |
| Receiving System Noise Temp | 652° K. | 394° K./504° K. |
| G/T | 12.4 dB/° K. | 15.51–14.5 dB/° K. |

TABLE 6

Inter-Satellite Link (ISL) RF Plan

| | LINK |
|---|---|
| Frequency Band | 59–64 GHz |
| Polarization | RHCP |
| Requested Bandwidth | 1224 MHz |
| Channel Bandwidth | 51 MHz |
| Number of Channels | 24 |
| Modulation | 32-QAM |
| Multiplexing | SPATIAL |
| Emission Designator | 51M0D7D |
| Minimum XTM Power | 0.5 W |
| Maximum XTM Power | 2 W |
| Max. EIRP per Channel | 52.5 dBW |
| Max. EIRP per Beam | 63.3 dBW |
| Peak Flux Density in 1 MHz | $-96$ dBW/m$^2$ |
| Receiving System Noise Temp | 687° K./4452° K. |
| G/T | 21.1/13.0° K. |

TABLE 7

MTSL Modulation Parameters

| | |
|---|---|
| Source Data Rate | 18 KBPS |
| Packet Efficiency | 512/416 bits/source bit |
| Packet Data Rate | 22.254 KBPS |
| Coding Rate | 2/3 |
| Coded Data Rate | 33.231 KBPS |
| Compression Factor | 20.312 |
| Burst Bit Rate | 675 KBPS |
| Modulation Efficiency | 3 bits/Hz (8-PSK) |
| Symbol Rate | 225 KSPS |

TABLE 8

FTSL Modulation Parameters

| | |
|---|---|
| Source Data Rate | 72 KBPS |
| Packet Efficiency | 512/416 bits/source bit |
| Packet Data Rate | 88.615 KBPS |
| Coding Rate | 2/3 |
| Coded Data Rate | 132.923 KBPS |
| Compression Factor | 20.312 |
| Burst Bit Rate | 2,700 KBPS |
| Modulation Efficiency | 3 bits/Hz (8-PSK) |
| Symbol Rate | 900 KSPS |

TABLE 9

GSL Modulation Parameters

| | |
|---|---|
| Source Data Rate | 138.125 MBPS |
| Packet Efficiency | 512/416 bits/source bit |
| Packet Data Rate | 170 KBPS |
| Coding Rate | 4/5 |
| Coded Data Rate | 212.5 MBPS |
| Modulation Efficiency | 5 bits/Hz (32-QAM) |
| Symbol Rate | 42.5 MSPS |

TABLE 10

ISL Modulation Parameters

| | |
|---|---|
| Source Data Rate | 138.125 MBPS |
| Packet Efficiency | 512/416 bits/source bit |
| Packet Data Rate | 170 KBPS |
| Coding Rate | 4/5 |

TABLE 10-continued

ISL Modulation Parameters

| | |
|---|---|
| Coded Data Rate | 212.5 MBPS |
| Modulation Efficiency | 5 bits/Hz (32-QAM) |
| Symbol Rate | 42.5 MSPS |

Spacecraft Position and Attitude Determination

Each spacecraft in the constellation requires orbital position information about itself and other satellites in the constellation. Each satellite carries a navigation computer which 1000 that depicts a satellite S in low Earth orbit. The satellite is capable of routing communication signals or telephone calls carrying voice, data, and video signals among ground stations 1006 and 1008 and other satellites 1002. The AOD software is used to calculate position information accurate to within 10 km for a constellation of 840 satellites S orbiting at 700 km (435 miles). Although the preferred embodiment employs an orbital altitude of 700 km, the invention may utilize an altitude of from approximately 525 km to approximately 1400 km. The population of the constellation may include one hundred or more satellites, which are deployed in at least eight orbital planes. In the preferred embodiment of the invention, each of the orbital planes is inclined to the equator at an angle of 98.2 degrees. This inclination angle may, however, vary from 65 to 125 degrees. The eccentricity of the orbits may extend from 0.001 to 0.005. A complete listing of the computer software that embodies the AOD software is contained in Appendix A. This software runs on a conventional IBM compatible personal computer and simulates orbital position determination for selected embodiments of the present invention. This software enables a person skilled in the art to which the AOD software pertains to practice this portion of the invention without undue experimentation.

The packets 422 that are transmitted and received by the satellites S include headers 424 which hold address information that enables switching circuitry 438 aboard each spacecraft to route the packet to its proper destination. The header 424 includes time and frequency information that is used by a microprocessor called an orbit determination processor aboard each satellite to generate an inter-satellite almanac packet. Unlike communications packets 422 which are constantly relayed among spacecraft in the system to their final destinations on the ground, inter-satellite almanac packets are broadcast among the entire constellation at least once every day. These inter-satellite packets contain an almanac message that contains information which is used to calculate orbital position.

Ranges between satellites and ground stations can be computed using a pseudo-range algorithm that converts time differences into distances. Two satellites, A and B, each broadcast packets that include a time-tag of the time of transmission. The microprocessors onboard each spacecraft also measure the arrival times of the packets 422. These measurements are then exchanged between satellites. The average of the two measurements is a measure of the range between the two satellites. Alternatively, a satellite can send a package to its neighbors which is addressed back to itself. By measuring the time it takes for the word to return, the range to the adjacent satellite is computed. Alternatively, Doppler shifts 1010 can be measured instead of differences in time. This measurement is made from signals called "pilot tones" which are broadcast by the satellites to steer the antenna beams that transmit the call traffic to ground stations. This alternative measurement process is independent of satellite data links. The measurements of the satellite Doppler shifts observe the range-rate between the satellites.

Figure 80:
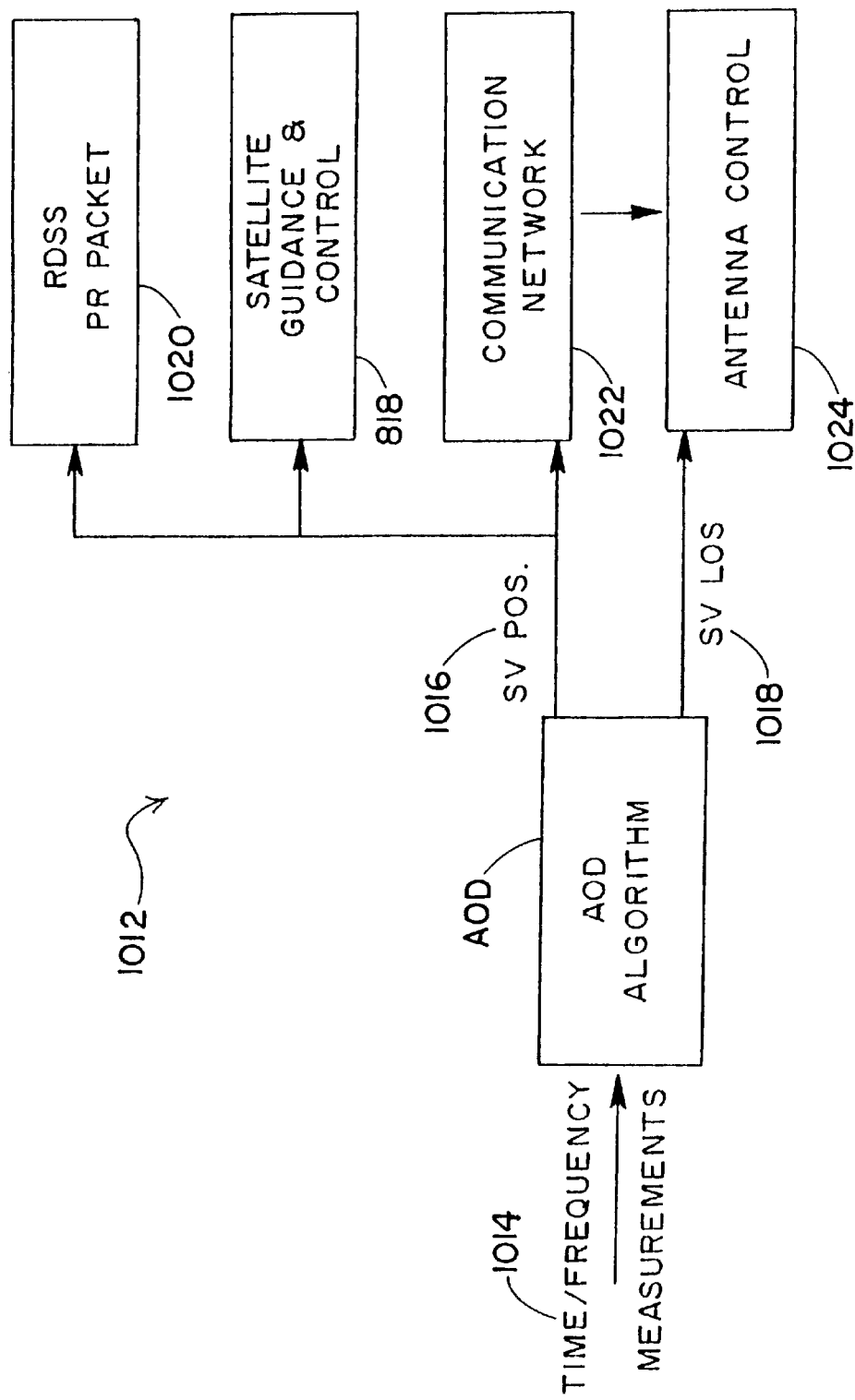
FIG. 80 illustrates the autonomous orbit determination algorithm.

FIG. 80 is a block diagram 1012 that illustrates the functional relationships among the autonomous orbit determination algorithm, time and frequency measurements 1014 that are used as inputs, and related hardware including radio determination satellite service (RDSS) circuitry 1020, satellite guidance and control systems 818, communication circuitry 1022, and antenna control systems 1024.

Figure 81:
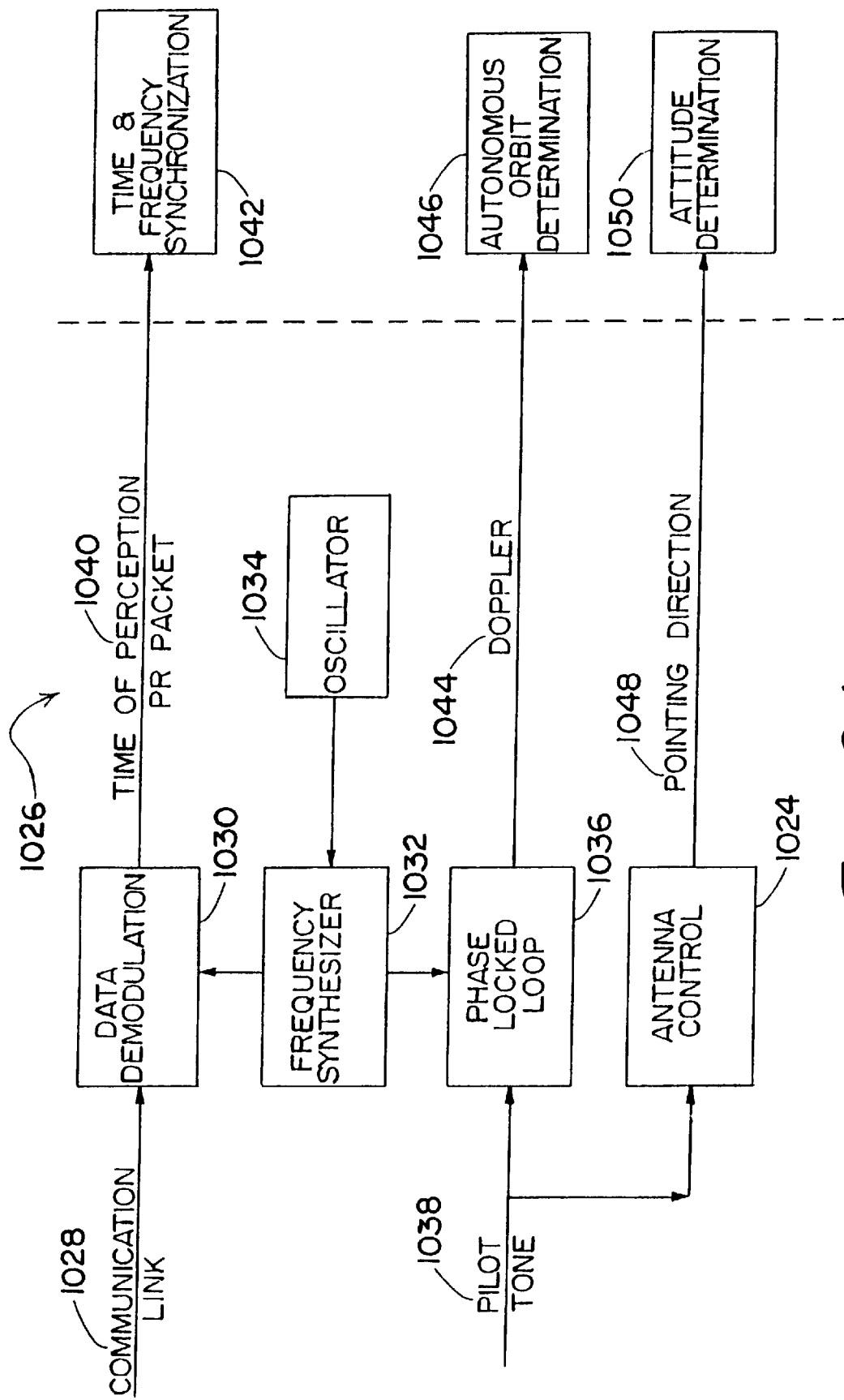
FIG. 81 is a block diagram of position determination circuitry.

FIG. 81 is a block diagram that reveals details of position determination circuitry 1026. A communication link 1028 conveys information to a demodulation stage 1030, which forwards information about the time of perception of packets 1040 to a time and frequency synchronization stage 1042. A frequency synthesizer 1032 is coupled to the data demodulation stage 1030 and to a phase locked loop stage 1036. The frequency synthesizer 1032 is also coupled to an oscillator 1034. The phase locked loop stage 1036 and an antenna control stage 1024 receive pilot tones 1038 as inputs. The phase locked loop stage 1036 measures Doppler shifts 1044, while the antenna control stage 1024 determines correct antenna pointing directions 1048. The Doppler measurements 1044 serve as inputs to an autonomous orbit determination processor 1046. The pointing directions 1048 are used for attitude determination 1050.

Figure 82:
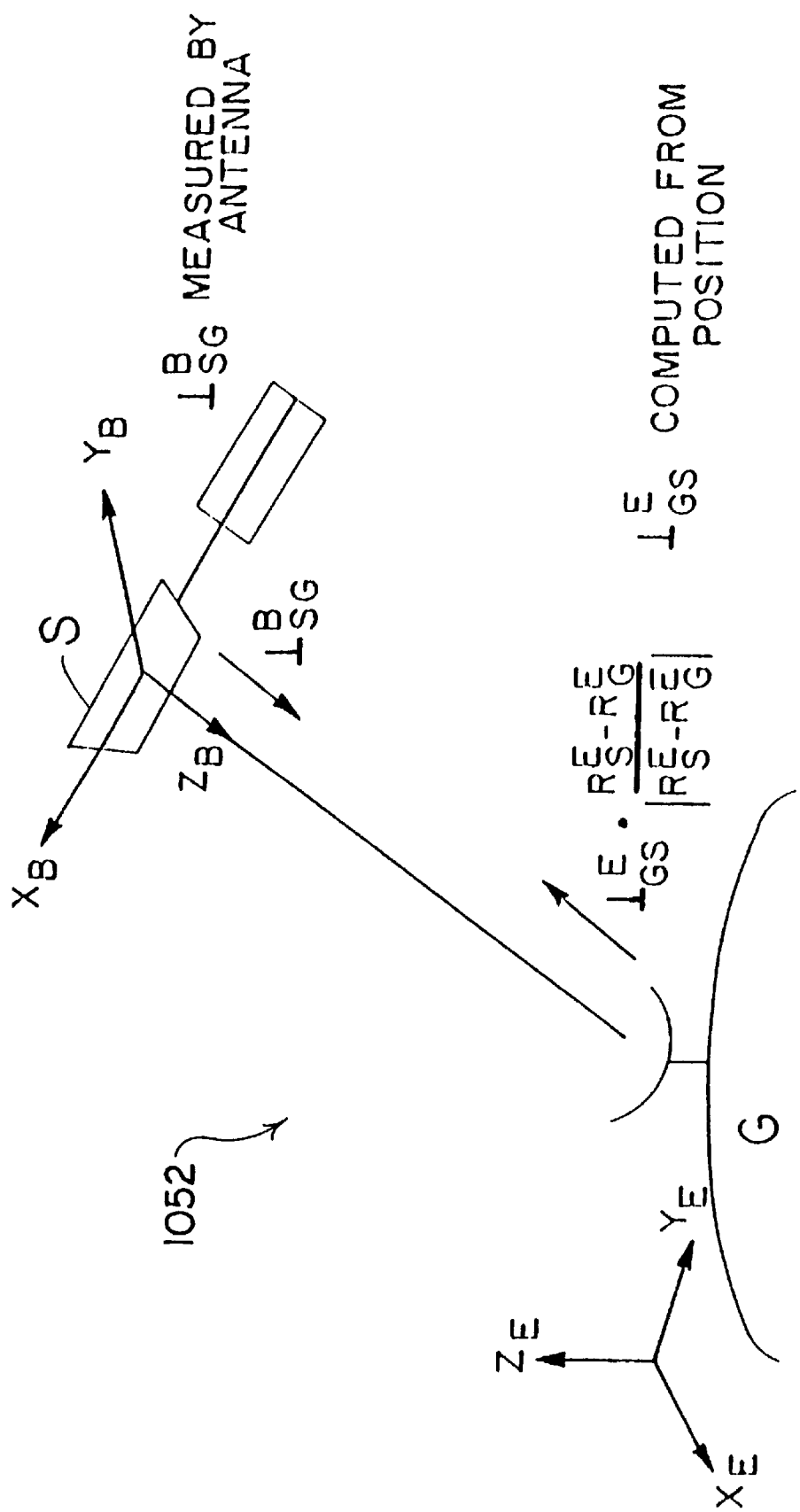
FIG. 82 depicts the autonomous attitude determination method.

FIG. 82 is a schematic diagram 1052 showing a satellite S in orbit communicating with a gateway G. The figure illustrates the calculation of attitude information computed by the spacecraft. The AOD methods not only provide position information which is used to select optimal pathways for routing communications traffic, but also supplies output that is utilized for spacecraft guidance and control and inter-satellite antenna steering and generates pseudo-ranging packets for highly accurate radio determination satellite service (RDSS). The AOD software incorporated in the preferred embodiment is presented in Appendix A. This program autonomously determines the position of each satellite in the constellation on board each satellite, as well as the position of all the other satellites in the constellation. The software also autonomously provides altitude and attitude information for each satellite.

Traffic Routing

Switching circuits about each satellite in the constellation transport packets of data through a low Earth orbit satellite network. Each satellite furnishes intelligent and autonomous on-board switching capabilities and provides synchronous, circuit-switched communication services with uniform end-to-end transmission delays. The routing methods implemented on the switching hardware manage the satellite communication links between the origin and destination of telephone calls which convey voice, data, or video information. The spaceborne switches are capable of selecting the best series of connections from a terrestrial gateway or terminal up through a satellite constellation and back down to Earth. The pathway that is selected for a particular call must be highly adaptive and able to change rapidly in response to the constantly changing geometry of the low Earth orbit constellation. Based upon inputs from the position determination algorithms that define the length of each link in the system, the methods implemented by the present invention determine the optimal route for each transmission from each satellite and also establishes the most efficient distribution pattern of traffic throughout the system.

The preferred embodiment of the traffic routing invention comprises an asynchronous fast packet switched network in which the user bits are collected synchronously but transported in packets having a variable transmission delays. The network employs datagram switching, as opposed to conventional virtual circuit switching techniques. Packets associated with the a single communication signal or phone call do not necessarily travel along the same route, and consequently arrive at their common destinations at different times. Any re-ordering of packets that arrive due to variations in transit delays are re-sequenced by circuitry that resides at the destination node. The network's switching nodes are located aboard the satellites, which are constantly moving relative to each other. This continuous motion causes the propagation delays along the links to vary perpetually. As satellites of the constellation move in their different orbits, the set of satellites visible from any network element, such as a satellite, gateway or user terminal, constantly changes. A satellite that is visible from a gateway at some particular time may not be visible a few minutes later, and a previously invisible satellite may then appear. The underlying network "topology", which is defined as the interconnection geometry among the network elements experiences constant change. Hardware and software that are collectively called the "router" must continuously adapt to the changing topology. The time varying network topology is irregular, unlike conventional regular networks that utilize ring, cube, or star topologies. The present invention uses an arbitrary mesh configuration. The network topology also changes when new satellites are deployed, when the useful lives of old satellites come to an end, or when satellite and link failures occur. The traffic intensity or "load" on links changes randomly due to normal traffic fluctuations. These load changes lead to variable link queuing delays in addition to variable link propagation delays. "News" of events in one portion of the network does not reach all nodes simultaneously, requiring the router to make decisions with imperfect information.

The traffic routing switches overcome the limitations encountered by conventional packet switching using virtual circuits. The present invention utilizes a "datagram" approach that routes every packet conveyed by the system independently at every node in the network. The packets are directed along an optimized pathway through the network by a fast packet switch that directs traffic based on instructions from a microprocessor that continuously runs an adaptive routing algorithm. This microprocessor uses orbital position information generated aboard each spacecraft to monitor the rapidly changing topology of the constellation and the distribution of traffic among its nodes and links.

In general, the hardware that is responsible for traffic routing comprises a self-routing fast packet switch, an input packet processor, a routing cache memory, and an adaptive routing processor. The input packet processor functions like a gatekeeper or guide that extracts the destination node address from each packet and uses it to access routing information stored in the routing cache memory. The adaptive routing processor constantly updates the routing cache memory so each satellite has an accurate "knowledge" of the whereabouts of all its neighbors, and of the expected packet delay from adjacent nodes to all possible destination nodes. Based upon this position and expected delay information, the adaptive routing processor selects the best pathway from a particular satellite to a single neighboring satellite, and the packet is then moved through internal switch circuitry onboard the satellite on its way to other spacecraft in its journey to some eventual destination on Earth. The present invention optimizes the utilization of the network facilities and minimizes transmission delays and variances of transmission delays. By precalculating the optimal route for each packet one step at a time at each satellite, the amount of time required to process individual packets is greatly reduced.

Appendix B contains a complete listing of computer software that embodies the traffic routing methods that are utilized in the various embodiments of the present invention. The software runs on a conventional IBM compatible personal computer and simulates traffic routing for the satellite constellation. This software enables a person skilled in the art to which the ARA software pertains to practice this portion of the present invention without undue explanation.

The Traffic Routing Environment

Although the preferred embodiment of the Satellite Communication System comprises 21 sets of 40 spacecraft traveling in 21 separate orbital planes, the discussion of the traffic routing portion of the invention assumes a satellite constellation comprising 336 satellites traveling in 21 orbits with 16 satellites in each orbit. This smaller embodiment was selected for the purpose of simplifying the scope of the simulation performed by the computer program presented in Appendix B. Appendix B also contains tables which present simulated time delays generated by the software.

The satellite altitude is fixed at 700 km (435 miles). The relatively large number of satellites in the preferred embodiment of the constellation has been selected to provide continuous coverage of the Earth's surface at high angles of radiation with respect to the Earth's surface, thus avoiding foliage, terrain, and minimizing the length of the signal's passage through rain. Each of the individual 336 spacecraft functions as a sovereign switch which knows the position of its neighbors, and independently handles traffic without ground control. The satellites are capable of transporting calls to millions of customers using portable mobile and fixed residential and business terminals, and gateways to public phone networks. The constellation uses the 20 and 30 GHz frequency bands for communications between Earth and the constellation, and the 60 GHz band for communicating among the satellites. The use of these extremely high frequencies allows for the use of relatively low power, miniaturized antenna components both on the ground and aboard the satellites. The entire constellation is designed to serve over twenty million subscribers and 60,000 full time DS-0 (64kbps) circuits. The satellites will be coupled to traditional public and private phone systems on the ground through gateways which each utilize relatively large antennas and handle large volumes of call traffic. In the preferred embodiment of the invention, this interface between the terrestrial systems gateway and the terrestrial network is based on current standard ISDN interfaces to preserve compatibility. Unlike presently available cellular systems which relay calls to subscribers from local radio towers, the present invention offers direct communication between the satellites of the constellation and individuals using lightweight portable mobile and fixed telephones.

One of the important inputs to the fast packet switch circuitry is a continuous stream of orbital position information which is generated aboard each satellite by a navigation computer running Autonomous Orbit Determination algorithms (AOD). The AODs compute ephemeris parameters for each satellite. These parameters are broadcast to every satellite in the constellation, so that all the spacecraft "know" their own positions and the position of every other satellite in the network. One embodiment of the AOD algorithms employs an inter-satellite ranging algorithm that calculates distances between spacecraft by measuring time delays that are inherent in fast-packet switching transmissions. A second embodiment of the AOD software incorporates an algorithm which fixes spacecraft position by computing differences in Doppler shifts of satellite transmissions. A third version uses known location fixed Earth reference stations to determine position. Once the orbital position information is generated, it is used as an input to an adaptive routing processor which runs an adaptive routing algorithm (ARA). The ARA constantly monitors the changing locations of all the spacecraft in the network, and also keeps track of communications traffic congestion among the links and nodes of the system. The adaptive routing processor produces an output called "Next-node-in-path-to-destination". As the name implies, this output contains information and provides instructions for moving communications data through the network one node at a time.

The Traffic Router

Figure 83:
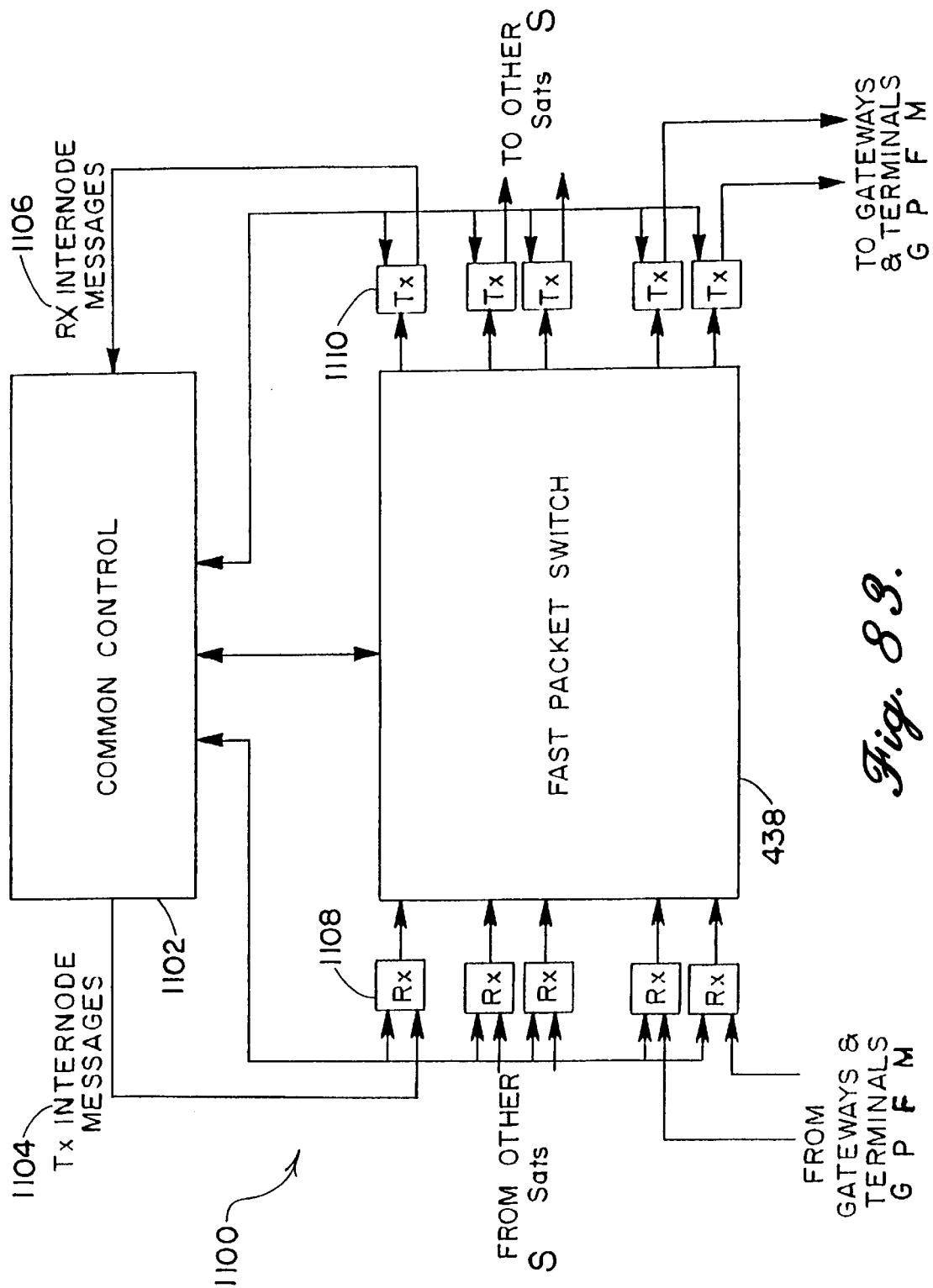
FIG. 83 is a schematic diagram of node hardware architecture.

The Satellite Communication System (SCS) will provide its end users with synchronous circuit switched communication services. Users at a portable P or fixed F terminal or gateway G will receive sequential deliveries of user "bits" regardless of their meaning with uniform end-to-end transmission delays. The SCS network is an asynchronous fast packet switched network in which the user bits are collected synchronously but transported in packets having a variable transmission delay. The efficiency of the network is achieved by employing "datagram" switching, as opposed to virtual circuit switching. Since one communication signal or phone call may comprise many individually routed packets which may take different routes to reach a common destination, the network must include software and hardware systems which account for out-of-sequence arrivals of packets and for variations in packet delays. FIG. 83 presents a block diagram which illustrates the node hardware architecture 1100 employed by the present invention. A common control stage 1102 aboard each spacecraft is capable of conveying inter-node messages 1104 and 1106 to receivers 1108 and transmitters 1110 which communicate with the other satellites S in the constellation. The common control stage 1102 is also linked to a fast packet switch 438.

Figure 84:
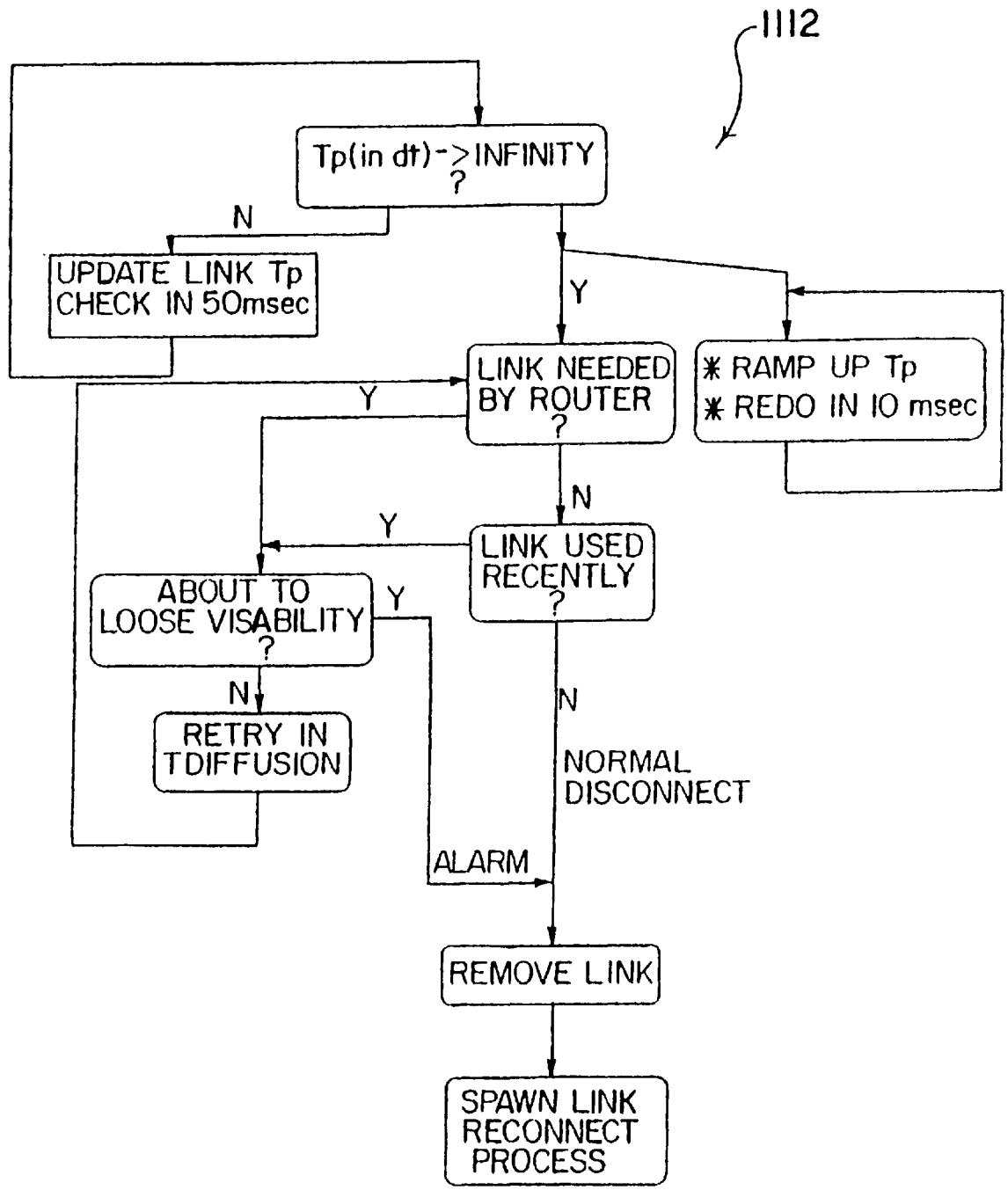
FIG. 84 is a schematic diagram of link control.
Figure 85:
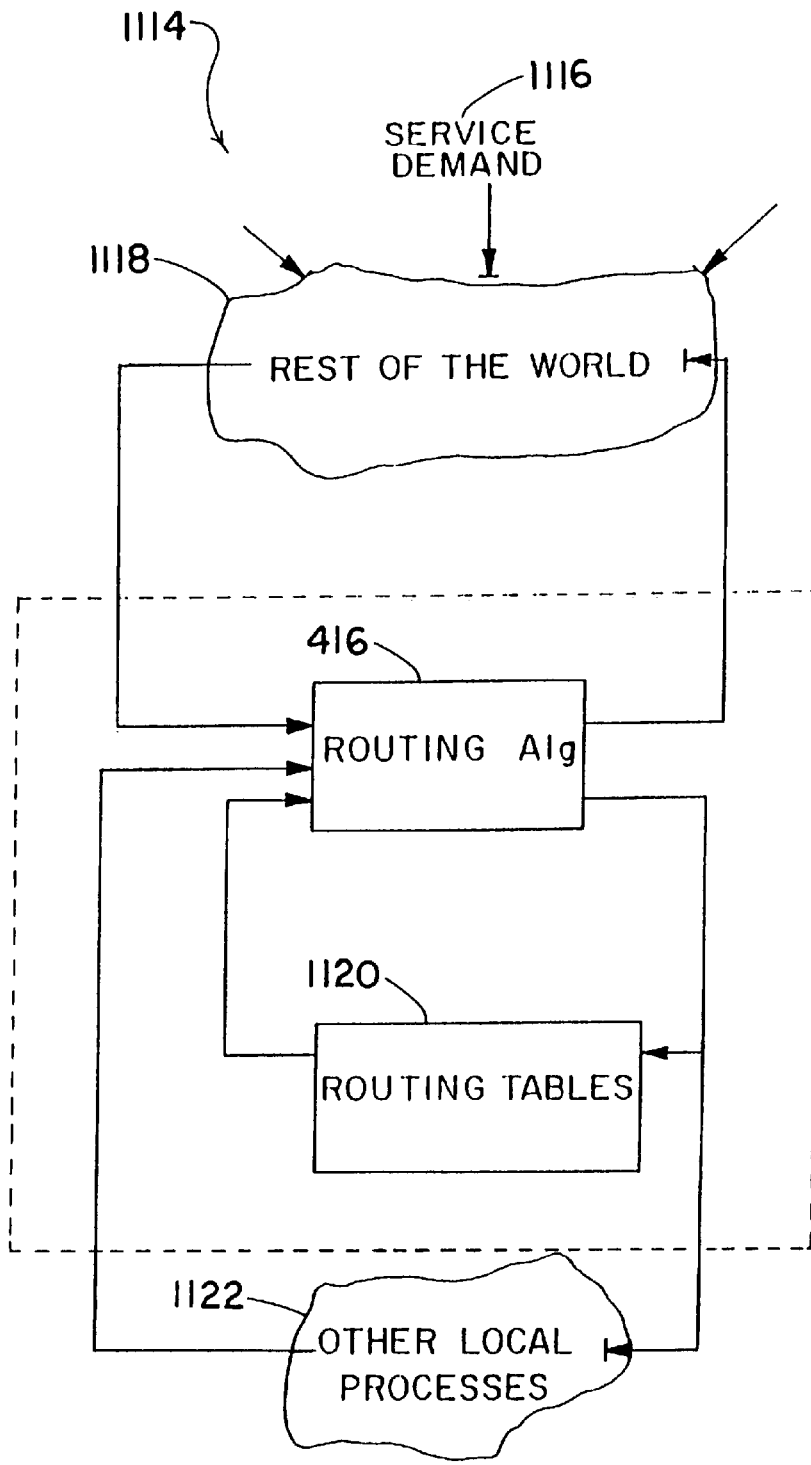
FIG. 85 is a schematic diagram of a routing process.
Figure 86:
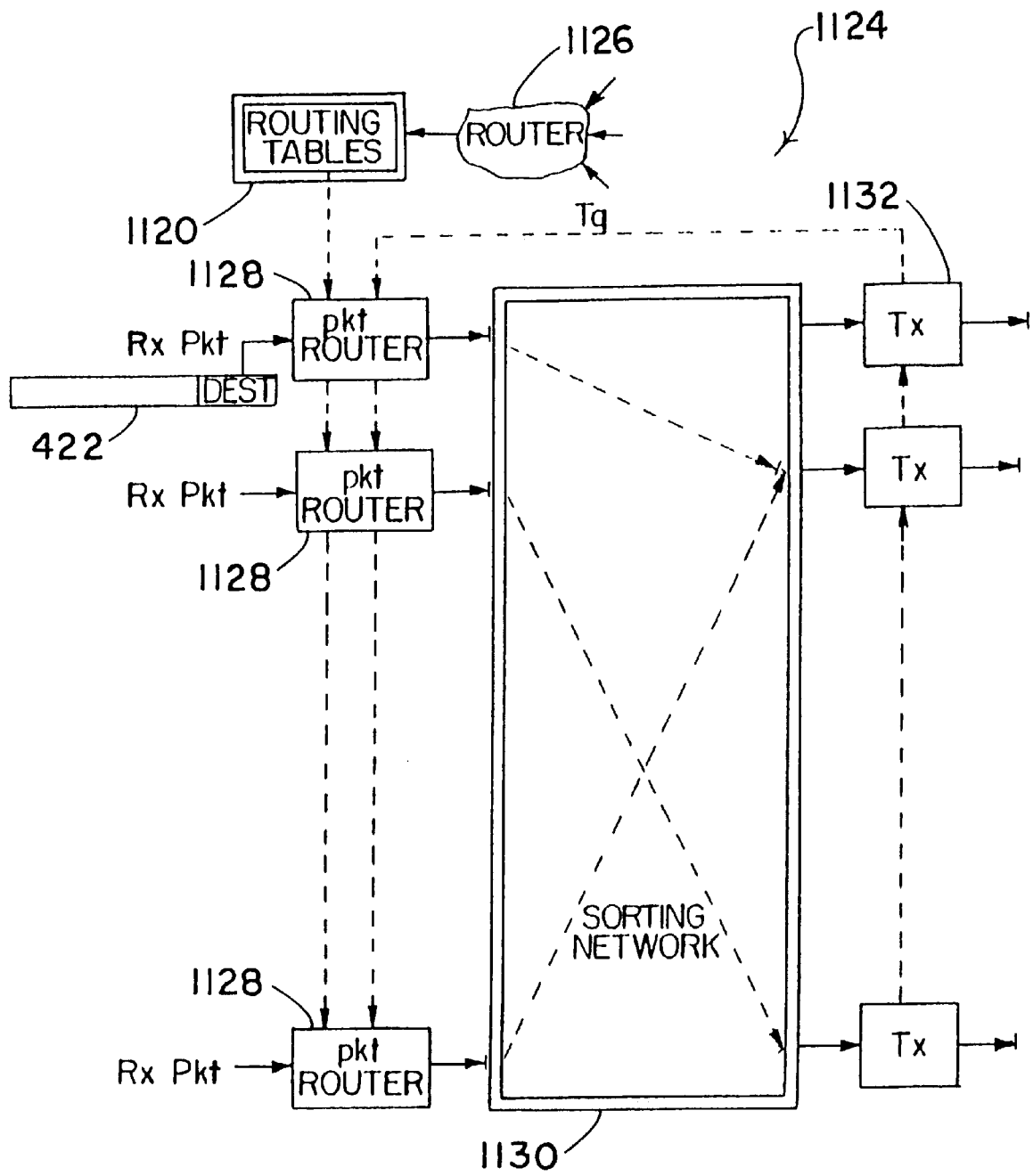
FIG. 86 is a flowchart of dynamic packet routing.
Figure 90:
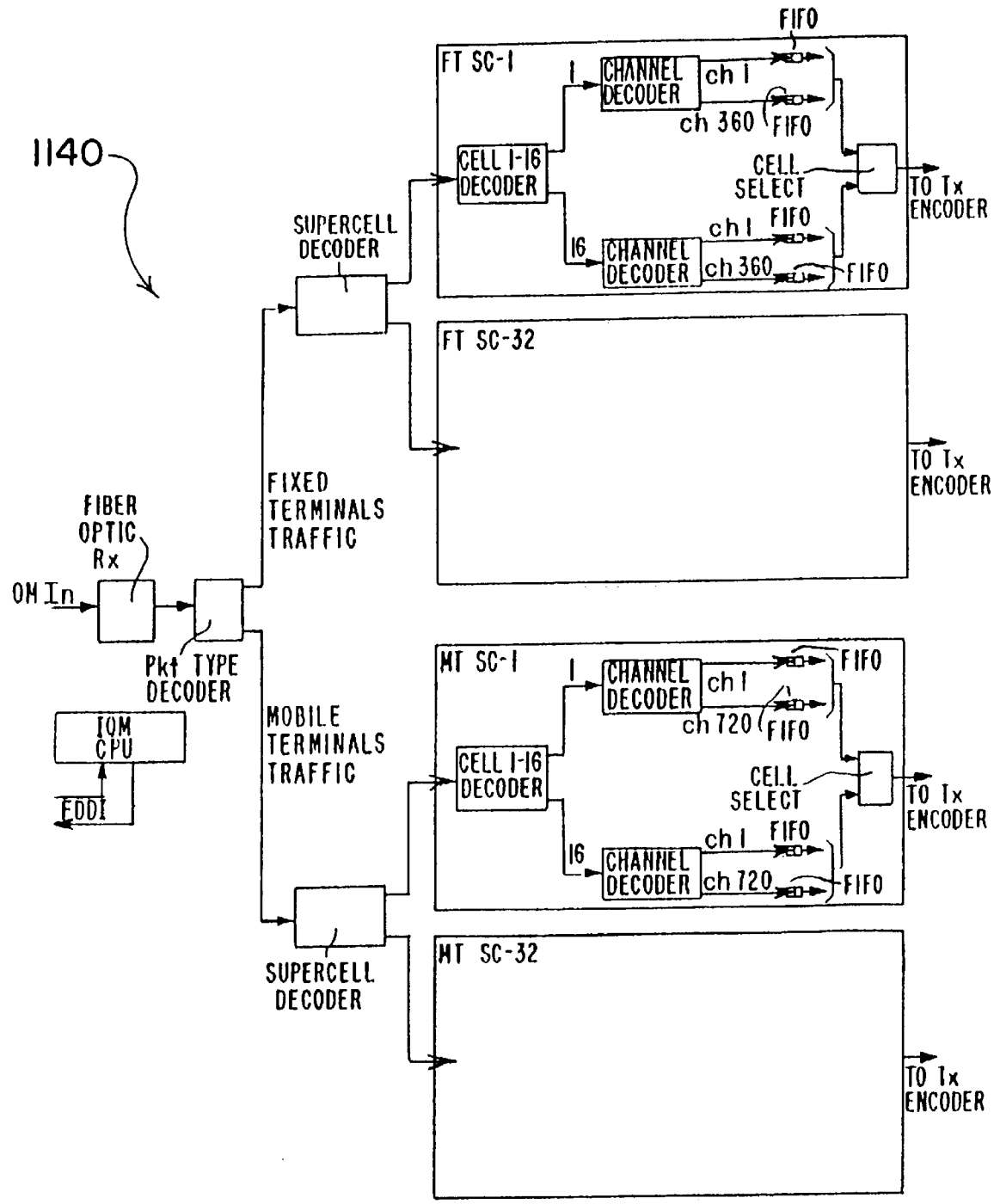
FIG. 90 is a schematic diagram of an output module.
Figure 91:
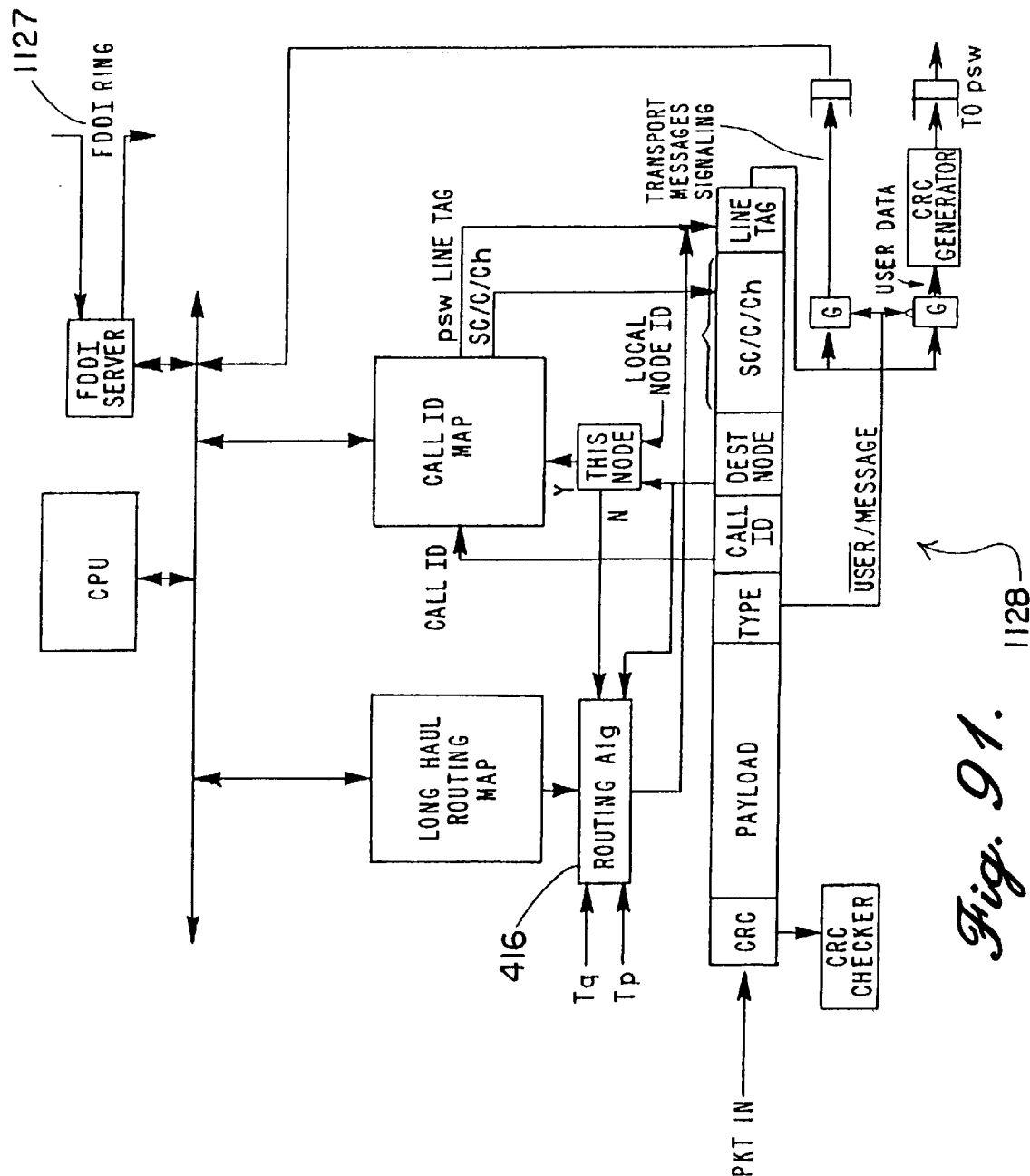
FIG. 91 is a schematic diagram of a packet router.
Figure 92:
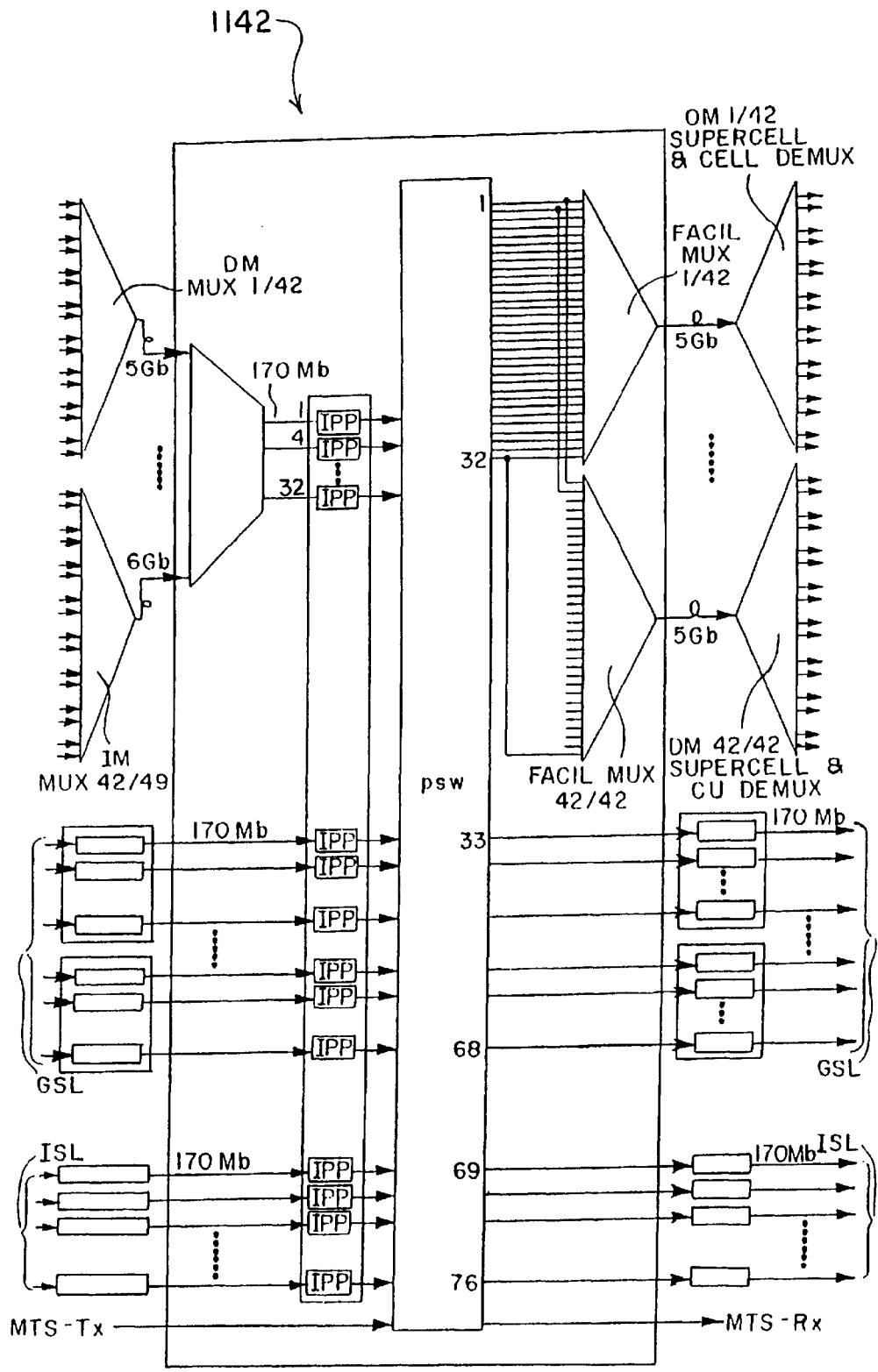
FIG. 92 is a schematic diagram of switching architecture.

The link control process 1112 is summarized in FIG. 84, while the routing process 1114 is illustrated in the flow diagram shown in FIG. 85. Service demand 1116 from subscribers 1118 situated around the world prompt the routing algorithm 416 to determine optimum pathways for call traffic using routing tables 1120 and other local processes 1122. FIG. 86 exhibits the dynamic packet routing method 1124. The router 1126 uses entries stored in routing tables 1120 to instruct packet routers 1128 how to process packets 422 to a sorting network 1130 and associated transmitters 1132. Three disparate rates of diffusion 1134, 1136 and 1138 for routing information diffusing through the constellation are pictured in FIGS. 87, 88 and 89. A block diagram of an output module 1140 is revealed in FIG. 90, the details of the packet router 1128 are displayed in FIG. 91, and FIG. 92 supplies an enhanced view of the switching architecture 1142.

Figure 93:
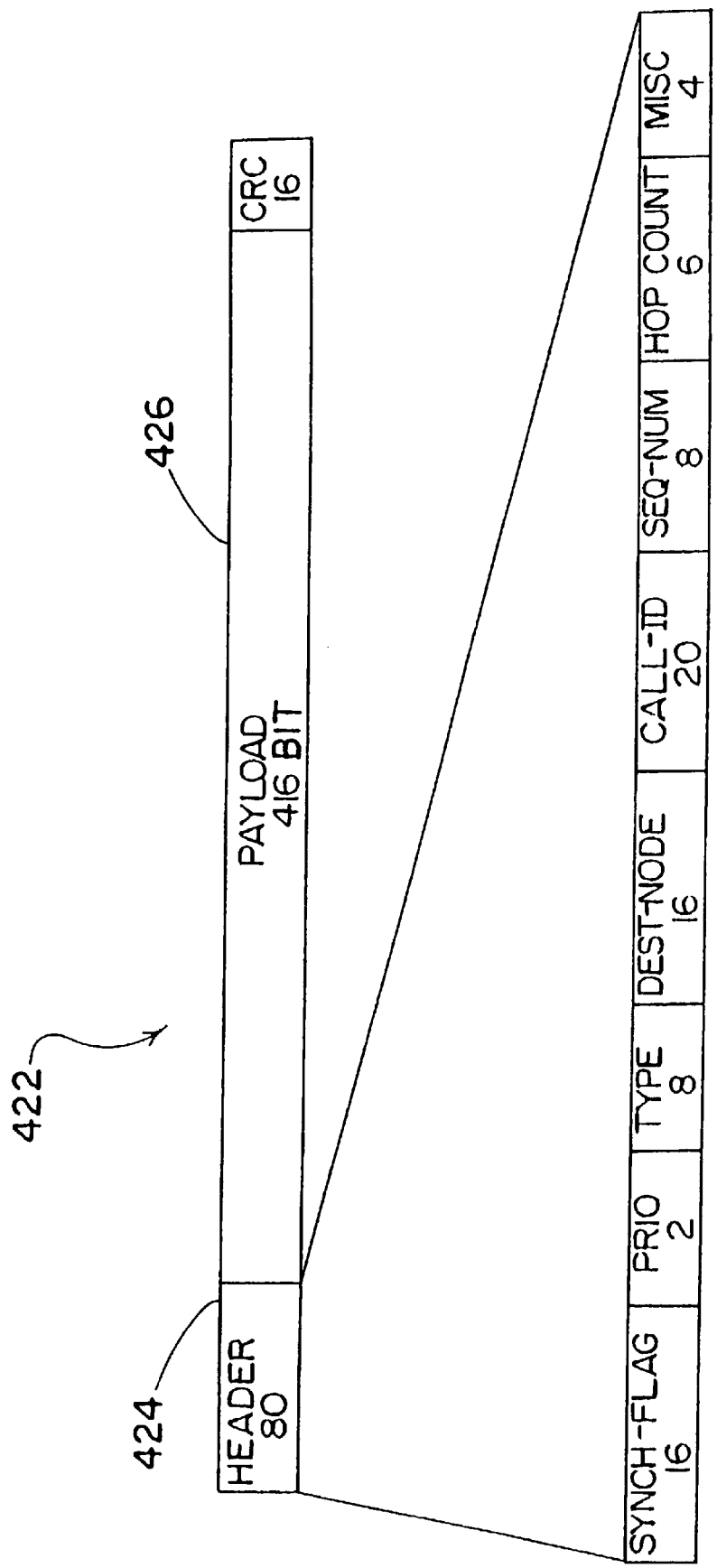
FIG. 93 is another schematic diagram of a packet structure.

FIG. 93 reveals the structure of packets 422 which are conveyed through the network. All packets 422 conveyed through the network are 512 bits long. The first portion of the packet is a header 424 comprising 80 bits. The header 424 is a collection of control fields that define the packet priority and type, and contain routing information. A routing field within the header 424 includes a destination field that contains a destination node and a specific call/delivery identification within the destination node. A 416 bit payload and a 16 bit cyclic redundancy check (CRC) accompany the header. The payload 426 carries the substance of the message which the packet transports, and the CRC is used to detect errors. The structure recited above is used as a basis for all of the discussion and examples which appear in this document. For 150 Mbit links among the nodes of the network, the transmission time for a 512 bit packet is $$T_s = \frac{512}{150,000,000} = 3.413 \text{ microseconds}$$

The discussions and examples which follow are also founded upon the presumption that all the circuits that are employed are type DS0 circuits, which include a 64 Kb channel, and an associated 8K data channel. Since each packet off loads 416 bits at a time and the DS0 can handle a total of 72Kb per second, a DS0 generates $$\frac{72,000}{416} = 173.077 \text{ packets per second}$$

or one packet every 5.777 milliseconds:

$$\frac{416}{72,000} = 5.777 \text{ milliseconds}$$

Each satellite constellation is a switching node which is treated equally as an independent and sovereign member of the network. Since each satellite is constantly moving relative to all the other satellites in the network, the broadcast links, and, therefore, the propagation delays of the packets, also vary. As the satellites move in their orbits, the group of satellites which is visible from any other satellite, gateway or terminal at any given time is constantly changing. A satellite that is visible from a gateway G at a particular time may not be visible a few minutes later, and a previously invisible satellite may come into view within the same few minutes. The underlying network topology, which embodies the interconnection geometry among the network elements, changes continuously, and requires the router to continuously adapt to the changing topology. The time varying network topology is irregular, as opposed to the regular topology of a ring, cube or star, and represents an arbitrary mesh configuration. The network topology also changes when new satellites are deployed, when the useful life of some members of the original constellation come to an end, or when satellite or link failures occur. The traffic load or intensity on links changes randomly due to normal traffic statistics fluctuations and varying call patterns. These load changes lead to variable link queuing delays, in addition to variable link propagation delays. Because "news" occurring in one portion of the network does not reach all the nodes in the network simultaneously, the router must make decisions based upon imperfect information. The deficiencies of the information that is available to the router are caused by both a lack of correctness and the tardiness.

Distributed Routing

Packets 422 generated at traffic sources are switched through the network in a store-and-forward fashion. The router 1128 at each hop forwards the packet to the next hop, minimizing the packet end-to-end delay which the packet experiences in its trip from the source to the destination. The decision of how to forward a packet 422 is determined by each hop independently with no a-priori or static route determination. Routing decisions are based on the latest information available to the router at the switching hop, and reflect dynamic global network considerations as well as the local node considerations. In the preferred embodiment, both satellites S and gateways G possess routing capabilities, so the term "node" is used to refer both to satellites and to gateways. A gateway is treated simply as a stationary satellite. The term "routing" not only includes the process of directing each packet at each node, but embraces the related operations of controlling traffic flow, overloads and congestion; and optimizing traffic distribution.

The router considers data collected locally from the router itself, as well as from other local sources such as the topology manager. Routing data is also received from peer routers located at neighboring nodes. Inter-node message communication is facilitated by the node Message Transport System (MTS). The router forms its local "view of the world" from this information, and shares it with local processes and peers in neighboring nodes. One of the key characteristics of the present invention relates to the method that a router in each node employs to exchange information with its neighboring peers. This exchange permits a node to learn the specific status of its neighbors and its neighbors' views of the rest of the network. Each node can influence or even coerce its neighbors to factor the local node's state into their own actions. The node can then deduce and construct a local routing strategy consistent with the rest of the network, and can also participate in influencing the overall distributed network routing strategy. The final distributed strategy results from the joint cooperation of all nodes. This "self-organizing" approach is accomplished subject to the following objectives:

1. Interaction is permitted only among immediate neighbors. If each of the N network nodes has an average of K neighbors, the total number of "pair-wise" interactions is on the order of K*N instead of the astronomical N*(N−1) pairs of interactions.
2. The routing strategy deduced independently by each node must be correct and consistent throughout the network. In normal operation no routing loops may be created. Major failure events however may lead to temporary but detectable and recoverable routing loops.
3. Minimum end-to-end packet delivery delay must be assured. The optimal performance of the entire network is judged based on both local and global network considerations.
4. The network is configured to permit full routing connectivity so that any node n can optimally communicate with any other node x.
5. Alternate routes are created whenever possible.
6. The network must be adaptive to changes in network load and traffic patterns, and be capable of functioning in an arbitrary network topology.
7. The network must maintain the highest levels asynchronous and time-independent behavior. The network always "tries" to do the best job at any given time with the information and nodes that are currently available.
8. The entire system is self-initializing, and is capable of automatically learning about previously unknown nodes.

Some of the essential parameters of one embodiment of the invention are described in Tables 12 and 13.

TABLE 12

A Basic Satellite Constellation

| | |
|---|---|
| Satellite Altitude | 700 km |
| Orbital Inclination | 70 degrees |
| Elevation Mask Angle | 15 degrees |

TABLE 12-continued

A Basic Satellite Constellation

| | |
|---|---|
| Intra-orbit Overlap Ratio | 0.2238 |
| Band Overlap Ratio | 0.1249 |

TABLE 13

Satellite Deployment in the Basic Constellation

| | |
|---|---|
| Orbits | 21 |
| Satellites per Orbit | 16 |
| Total Satellites | 336 |

Both Tables 12 and 13 refer only to the discussion contained in the section of the specification entitled "Traffic Routing".

Estimating Packet Delays

The router in each node n maintains a local estimate of the delay to any other node x for each of its output links $1, 2, \ldots, L$. The delay from n to x over link $1$ is given by:

$$\text{Algorithm 1: } D(n, x, l) = Tp(l) + Tq(l) + ND1(l^*, x)$$

Tp(l) is the current propagation delay of link $1$ connecting local node n to the neighbor node terminating $1$ at its remote edge. This neighbor is designated $l^*$ (the symbol * is used to mean "the successor of)". Tp(l) varies with time as the distance between n and $l^*$ changes with satellite movement. The node link manager periodically updates the value of Tp(l) for each link. It is the node positioning capability which actually performs the physical measurements of Tp(l). Tq(l) is the current link queuing delay consisting of two components, Tb and Ts. Tb represents the time spent by a packet in the buffer waiting for all the packets ahead of it to be transmitted. Ts is the actual packet transmission time once it gets to the queue head (called the service time). Ts is a function of the packet length and the link transmission bandwidth. Clearly Tb, and therefore Tq, increase as the link load increases. An important fact to realize, however, is that the higher the link bandwidth, the wider the range of the semi-linear dependency of Tq on the offered traffic load. The functional behavior of Tq is described by the following expression:

$$Tq \sim k/(\text{link\_bw} - \text{exerted\_load})$$

Until the exerted load approaches the link bandwidth, Tq is about constant, but beyond this point, Tq is exponential. This behavior is a direct consequence of the law of large numbers which, when applied in this context, suggests that scaling up both the link bandwidth (service capacity) and the traffic load by the same factor results in a decrease of Tq by the same factor. Because of the very high capacity of the 150 Mbit the links, the links between the nodes in the network can be used very efficiently and at loads approaching 100% of the total link bandwidth. Because the value of Tq may change very rapidly, its value is measured by hardware which tracks the link transmit buffer size. This monitoring circuitry provides an instantaneous measured value of Tq. The variable $ND(l^*, x)$ is the delay reported by neighbor $l^*$ to n stating the least delay from itself (from neighbor node $l^*$) to destination node x. The router in n maintains a table $ND1(l^*, x)$ for each of its links, and reflects the most recent delay reported by neighbor $l^*$ to each destination x. The terms Tp and Tq are derived by node n from local information, whereas the term ND1(l*,x) represents the distributed term. From the routers' viewpoint, if load control issues are ignored, the optimal link from n to destination node x is that link 1 for which D(n, x, l) is lowest. The actual link used by n to forward packets to x is not always the optimal link. If objectives concerning traffic load distribution are factored into the decision, another link may be chosen.

The Information Sent by a Node to Its Neighbors

The routing process in each satellite based node n (but not a gateway based node) sends routing data to each of its neighbors, including to its gateway neighbor nodes periodically. The routing data is refreshed about every 50 milliseconds. In additional to the regular updates every 50 msec, routing data is transmitted when a local event has been detected by the local router affecting its own routing tables; upon receiving information from a neighbor transforming the local routing tables in a way that might possibly affect other nodes; and upon a request by another local process, such as the topology manager, when detecting certain events affecting the router. The routing message is transported by the Message Transport System (MTS), and is sent by local node n to one of its neighbors l* (l=1, 2, . . . , L). This message is called the delay vector. It lists each node x known to n and the current minimum delay estimate D(n, x) from n to x:

TABLE 14

The Delay Vector

| Node | D(n, x) |
|------|---------|
| 1    | D(n, 1) |
| 2    | D(n, 2) |
| .    | .       |
| .    | .       |
| .    | .       |
| x    | D(n, x) |
| .    | .       |
| .    | .       |
| .    | .       |
| N    | D(n, N) |

Some entries D(n, x) in the delay vector are not really the true delay from n to x. A link 1 may be in one of the following states:

S1: logically disconnected;
S4: disconnect in progress; or
S5: normal information exchange.

These state names are borrowed from the X25 protocol and have similar meanings.

Generating the Transmission Delay Vector

If a link 1 is not in either state S4 or S5, the neighbor l* is ignored and a delay vector is not sent to it. Given n, x, and l, the value D(n, x) (an entry in the delay vector sent by n over link 1 to neighbor l*) is set by the router of sending node n using a Transmission Delay Vector comprising the following steps:

1. Select next destination node x.
2. If all values of x are processed, go to Step 9.
3. Use Algorithm 1, above, for each link 1 of n to find that link which currently yields the least D(n, x, l) to x. Call that link opt_link. If n can not reach x over any link, set opt_link to NULL.
4. If n is equal to x, set D(n, x) to 0 to reflect the delay from n to itself.
5. Otherwise, if opt_link is NULL, then set D(n, x) to infinity to signify that x can not be reached from n (infinite delay).
6. Otherwise, if opt_link is the same as link 1, the link over which the delay vector is about to be sent to neighbor l*, then set D(n, x) to infinity. This step helps to avoid routing loops. The router signals to l* that it should avoid using n for reaching x because either x is not reachable at all from n (step 3 above) or that n is currently using l* for reaching x.
7. Otherwise, set D(n, x) to D(n, x, opt_link).
8. Repeat Step 1.
9. Send the delay vector to neighbor l*.
10. If Transmission Delay Vector was triggered by the periodic vector, then send process schedule in the next transmission. (This step may be different if the Transmission Delay Vector was triggered by an urgent send request, as is described below.)

Processing Received Delay Vectors

Although each link is treated as a simplex link, the topology manager, in organizing the network topology, assures that if a link exists from node x to node y (x transmitting, y receiving) one will also be established from y to x. Multiple links may exist between the same pair of nodes. Thus if a delay vector is received by node n over the simplex input link 1 (from neighbor l*), a complement output link also exists from n to l*. The input link over which node n (satellite or gateway) receives a delay vector is referred to by the symbol li. Link lo is its complement output link. The vector contains as many entries in it as nodes reachable by reporting node li*. Each entry ND(l*, x) in the vector is the delay from neighbor l* to node x. Upon receiving a delay vector, the local router updates table NDlo(li*,x), and deduces any implied changes. Delay vectors sent subsequently by the router to its neighbors will reflect these changes. If a delay vector is received over an input link having no associated complement output link, the message is ignored and discarded. This transient condition may arise during a link disconnect procedure, which is discussed below. Otherwise, each vector entry is processed as using a Process Reception Delay Vector comprising the following steps:

1. Set variable opt_link_changes=0.
2. If all entries are processed, skip to step 17.
3. If x is the same as l*, then set table entry NDlo(li*, li*)=0.
4. Otherwise, if x is the same as n, then set table entry NDlo(li*, n)=0.
5. Otherwise, if ND(li*, x) is the same as that reported in the previous vector, that is NDlo(li*, x)=ND(li*, x), return to step 2.
6. Set NDlo(li*, x)=ND(li*, x).
7. Set old_opt_link(x) to be the optimal link used to reach x from n up to now.
8. Use Algorithm 1 to compute old_delay(x), which is the delay estimate from n to x with the old parameters.
9. Use Algorithm 1 for each link 1 of n to compute new_opt_link(x): the new optimal link to x factoring in the new parameters.
10. Use Algorithm 1 to compute new_delay(x), which is the delay estimate from n to x with the new parameters.
11. If new_opt_link(x) is the same as old_opt_link(x), then return to step 2. The delay to x may have changed (up or down), but not enough to cause the optimal link to x to switch.
12. Increment variable opt_link_changes.
13. If old_opt_link(x) is NULL and new_opt_link(x) is not NULL, decide that node x is a new node which can now be reached from n via link lo. Enter new x into the routing tables.

14. Otherwise, if old_opt_link(x) is not NULL and new_opt_link(x) is NULL, decide that x has been detached from the net and is no longer reachable from n. Remove x from the routing tables. This conclusion may be premature in the event of a major failure but in that case condition 13 above will occur as soon as the network performs adaptation.

15. Otherwise, if old_opt_link(x) is not NULL and new_opt_link(x) is not NULL, decide that if old_delay(x) is now very high (more than the maximum allowable transmission echo delay of 100 msec), the switch occurred because x is no longer reachable from n via old_opt_link(x), but new_opt_link(x) provides a good alternate route. This event may occur routinely when the network adapts to local or global changes in the network topology. In some cases, the switch occurs because new_opt_link(x) provides a lower delay compared to old_opt_link(x). In this case, old_opt_link(x) may become an alternate route to x.

16. Return to step 2.

17. If opt_link_changes are greater than zero, urgently send the latest delay vector to each neighbor to supply the latest changes.

Network Adaptation Through Information Diffusion

Phase 1: Topology Adaptation

When Algorithm 1 begins running within a given node, that particular node has no information about any other nodes in the network. The first delay vector received from one of its neighbors introduces n to that neighbor alone, since that neighbor itself knows only of itself as well. After a short time, each node recognizes all of its neighbors roughly within an amount of time that is approximately equal to the Tp of the link interconnecting the two neighbors. In the second "wave" of information the level of "node awareness" increases, and each neighbor g of n will report about g's neighbors, which are one or two hops away from n. Since each encounter with a new node x triggers n to urgently send the news (Process Reception Delay Vector, step 17) to its neighbors, a diffusion process is initiated, in which every node n in the network eventually learns of any other node x. Each node learns that x exists, the best way to reach node x and a first order estimate of the delay from n to x. Any subsequent topological change resulting from nodes (satellites or gateways) or links being added or removed also triggers a diffusion and topology adaptation process.

Phase 2: Minimum Delay Adaptation

Although each node has learned some information during the Topology Adaption phase, the adaptation process continues until each node n knows the best way to route packets to each destination x, i.e., how to route packets to achieve absolute minimum end-to-end delays. The Minimum Delay Adaptation Phase is complete when no further optimal link switches occur anywhere in the network. When optimal links are set and do not change, all nodes have jointly agreed on a consistent global solution for routing. This distributed solution is optimal, and though the solution is not necessarily unique, it guarantees that no better solution exists.

Ongoing Adaptation

In the normal course of operation, the link queuing delay, Tq, may change as a result of traffic load variations. The link propagation delay, Tp, varies as well, since the many nodes keep moving with respect to each other. The value of Tp is sampled periodically, while the value of Tq is sampled by the local router just prior to the transmission of a new delay vector. The packet switch uses the instantaneous value of Tq which is measured by hardware. A change in Tq or Tp of link l of node n affects the delay value D(n, x, l) as computed by Algorithm 1 (the delay may increase or decrease). If l is an optimal link for some destination node x, then the delay change may also lead to a local switch in the optimal link opt_link(x). All delay vectors sent subsequently will reflect these changes, informing the neighbors of the local changes. Even a small change in D(n, x, l), which may not even lead to a local optimal link switch (just a change in the delay value), may trigger a switch in some neighbors, which, in turn, may lead to a switch in their own neighbors. As a consequence, a small change in one portion of the network may trigger a diffusion and adaptation process that spans the entire network. The changes in the neighbors of n may, in turn, be reflected back to n to trigger more changes in n. These changes may include optimal link switching, which will again be followed by reflections back to neighbors. In most cases, because Tp is sampled frequently and because Tq may vary rapidly during heavy traffic load conditions, the effects of one local change may not have had a chance to settle down throughout the network before another local change occurs and a new diffusion and adaptation process is triggered.

Adaptation Rate

The nature of the diffusion process is random and very complex. Each node triggers diffusion waves which result from local conditions. Nodes are also influenced by waves of information originating in other nodes. Since nodes are not evenly spaced and their response to newly arrived information occurs at non deterministic times (which depend upon the node internal processing conditions, process scheduling priorities, etc.), the waves of information do not propagate uniformly about the center of the original cause. The propagation delay of an event/cause triggered in some node n to another remote node x depends primarily on two factors: the number of hops between the two, since each intervening hop processes the information and then broadcasts its resultant delay vectors in all directions (including the relative backward direction); and the message transmission times which themselves are determined by links propagation delays and the message system queuing delay.

The diffusion process may generate an avalanche of messages, which are each multiplied when they are received by a node. To limit the memory requirements, a windowing scheme is employed in which messages available for transmission are simply dropped if the window is full. In addition to lowering the amount of message system memory required (to buffer messages), this limitation assures, to the greatest extent possible, that only the latest news is transmitted. In the worst case, news will be transmitted during the periodic vector transmission cycle. It is possible that in heavy message communications loads a node x just one hop away from n (a neighbor) will receive its information from n through another node before receiving the information directly from n.

Diffusion Simulation Results

Computer simulations performed by the inventor indicate that using a small window of size 1 and starting in a state in which no node knows of any other node, Phase 1 (diffusion of all the topology information) is complete in about 138 milliseconds. Phase 2 (formation of an optimal minimum delay network) is complete in about 292 msec. The window size has a small effect on the adaptation time. Increasing the window size to 4 decreases the adaptation time by about ten percent. In the simulation, Tp is sampled every 50 msec and the periodic delay vector transmission process operates every 50 msec. This causes new routing information to be generated before it has a chance to be fully diffused into the network. As a result, the distributed adaptation hunts for the optimal solution continuously and never has a chance to settle down.

Packet Switching

Figure 94:
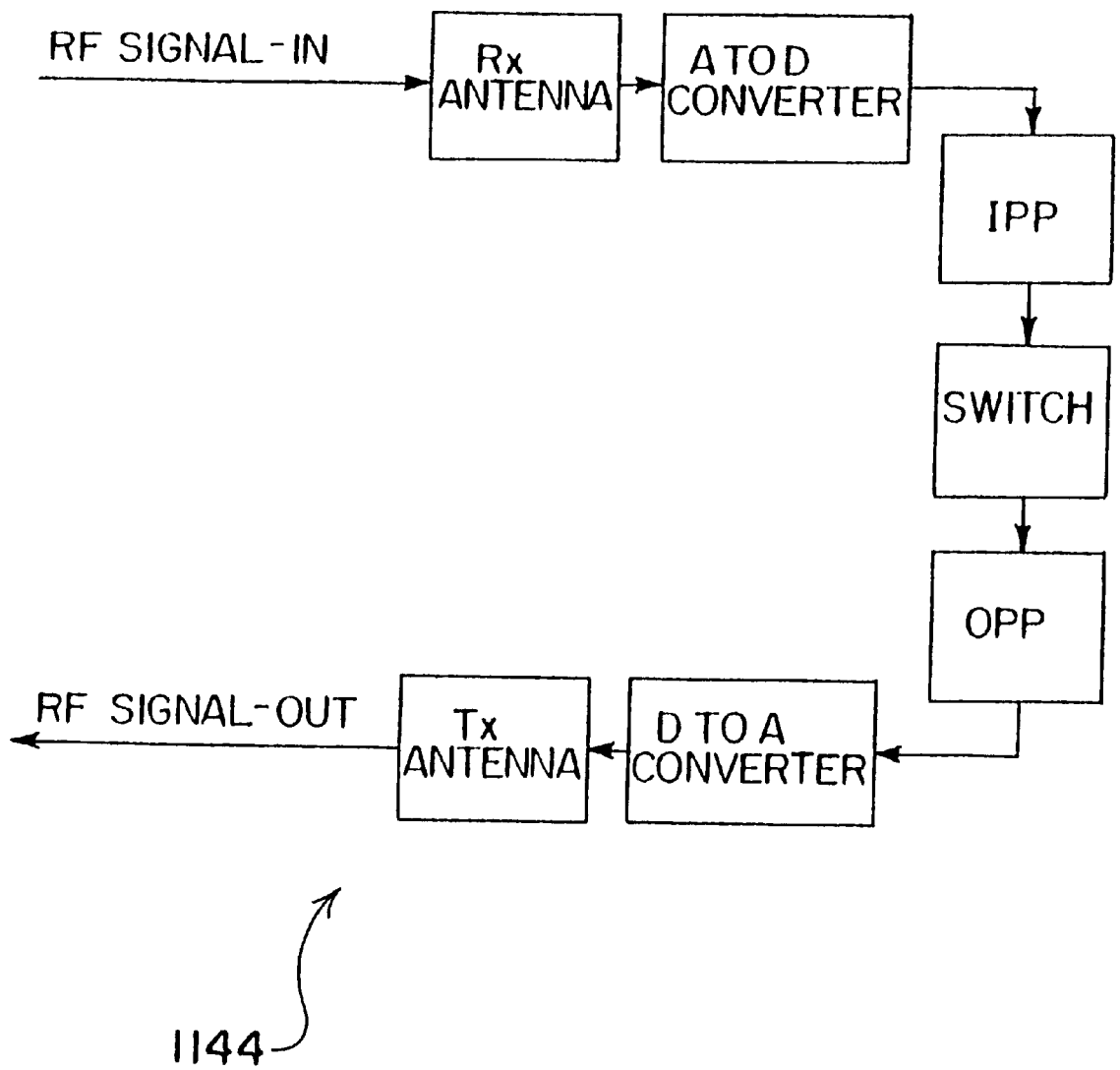
FIG. 94 is a schematic diagram illustrating signal flow.
Figure 95:
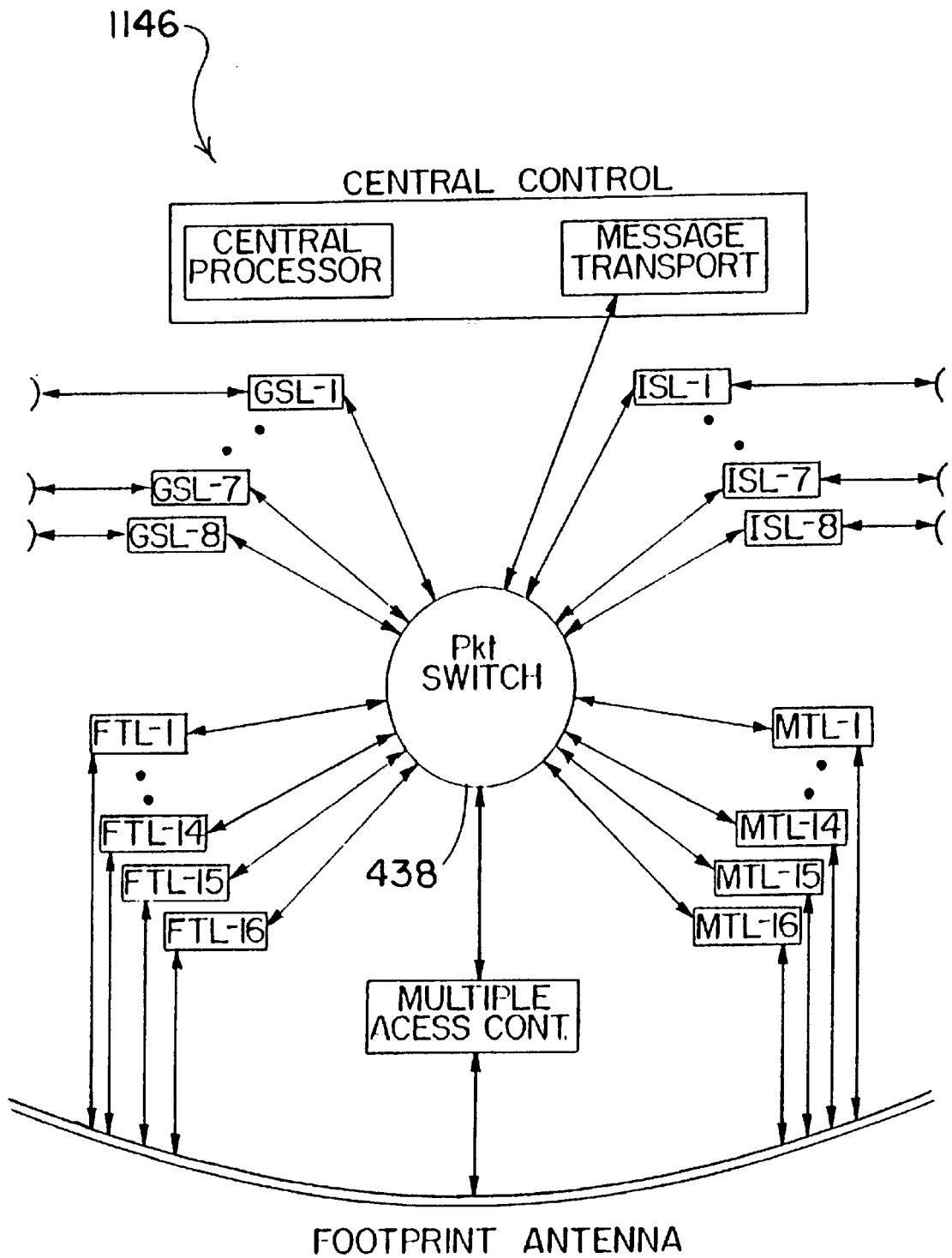
FIG. 95 is a schematic diagram which discloses system architecture.
Figure 96:
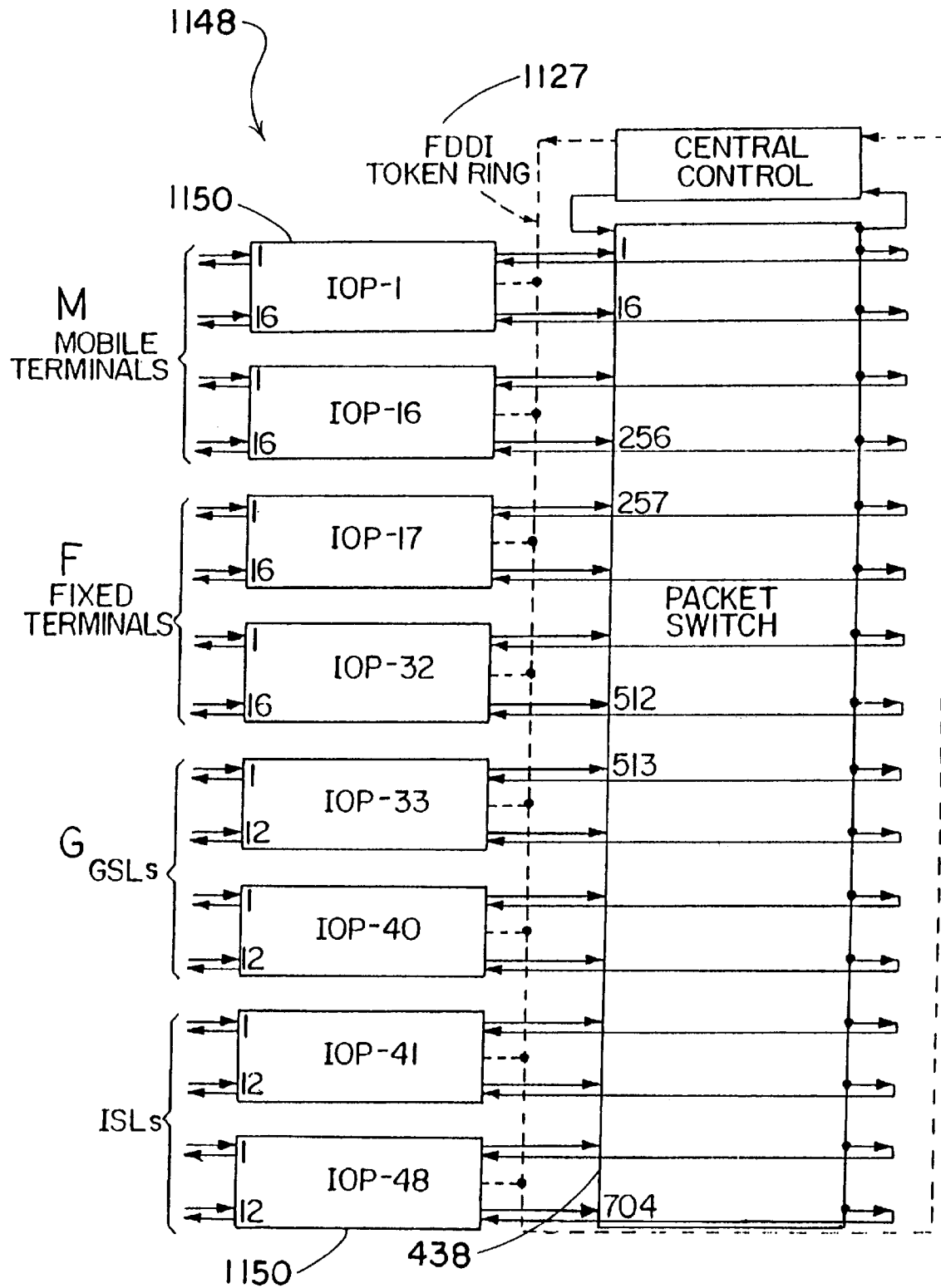
FIG. 96 is a schematic diagram of a packet switch and input output processors in a token ring.
Figure 97:
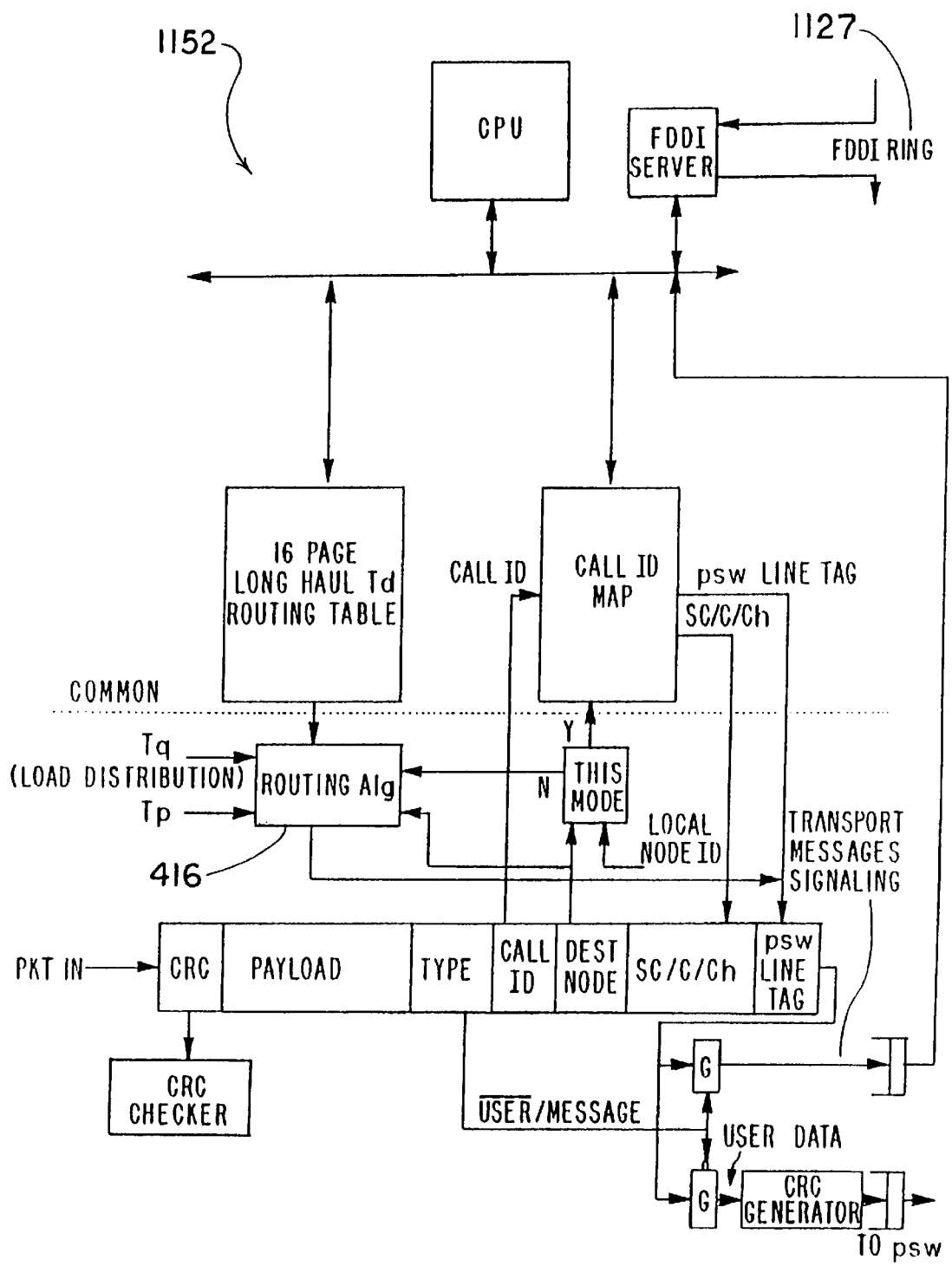
FIG. 97 is another schematic diagram of an input packet processor.
Figure 98:
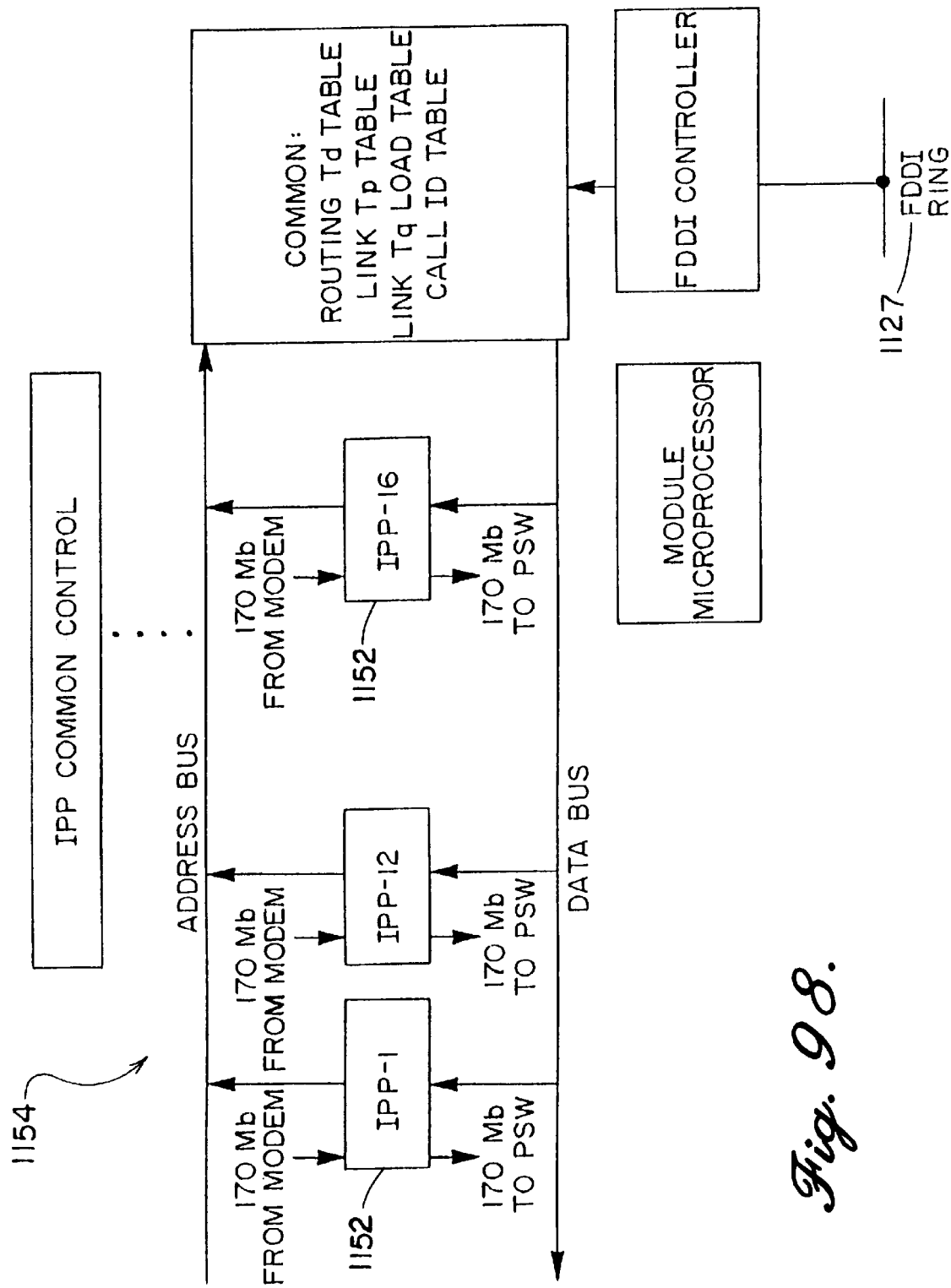
FIG. 98 is a schematic diagram showing IPP common control.
Figure 99:
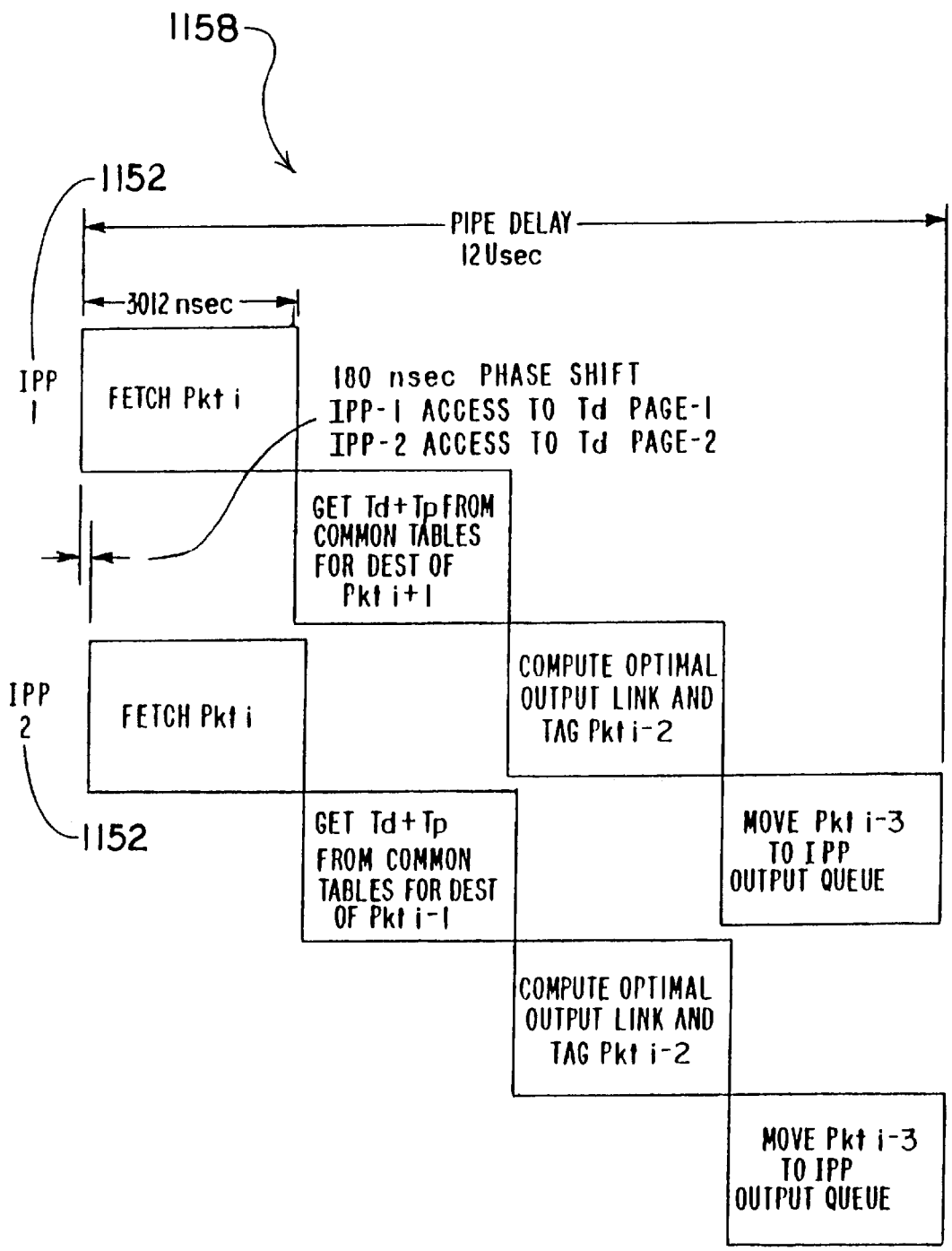
FIG. 99 is a schematic diagram of an IPP 4-stage pipeline.
Figure 100:
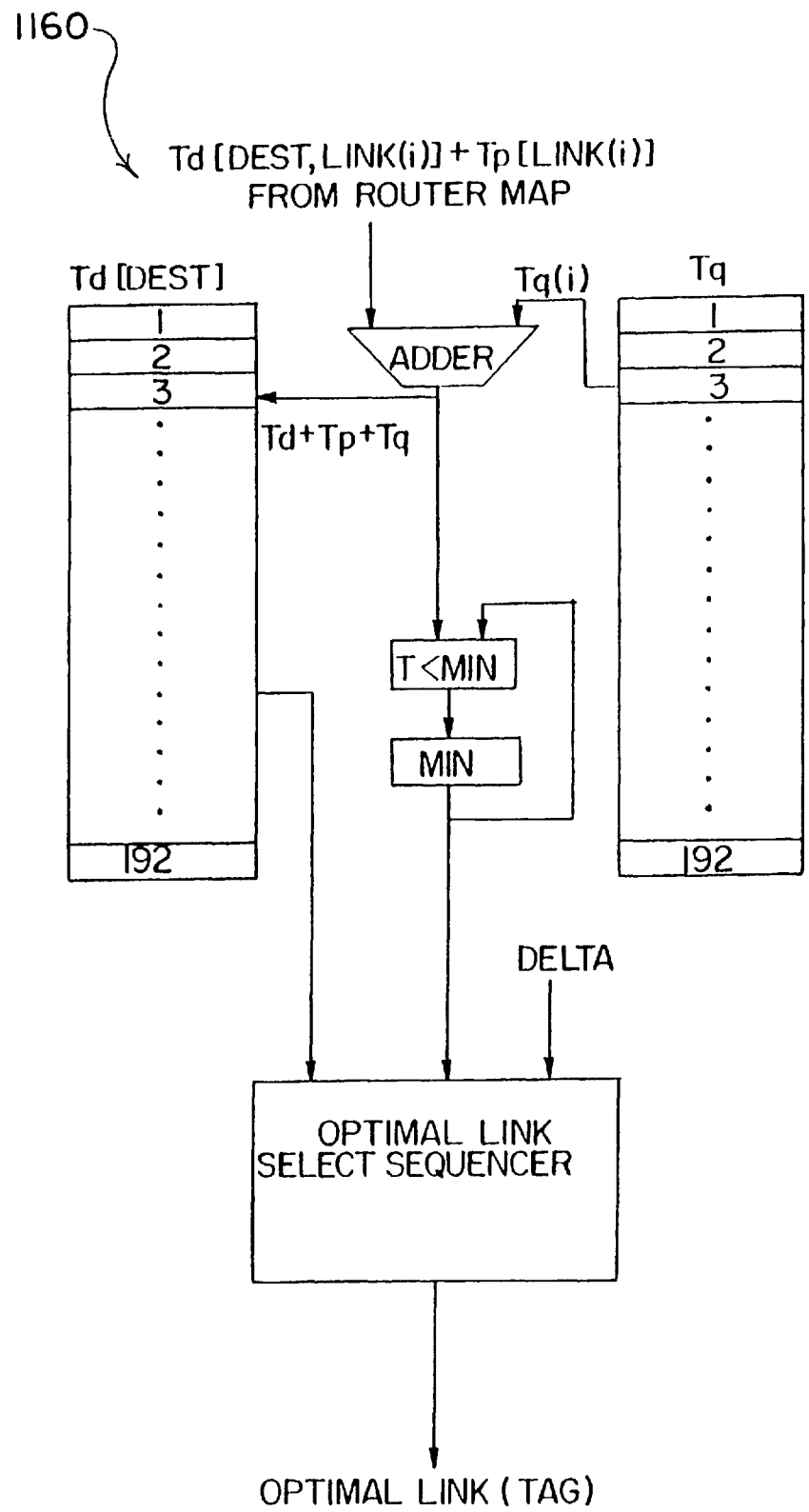
FIG. 100 is a schematic diagram of an IPP optimal route controller.
Figure 101:
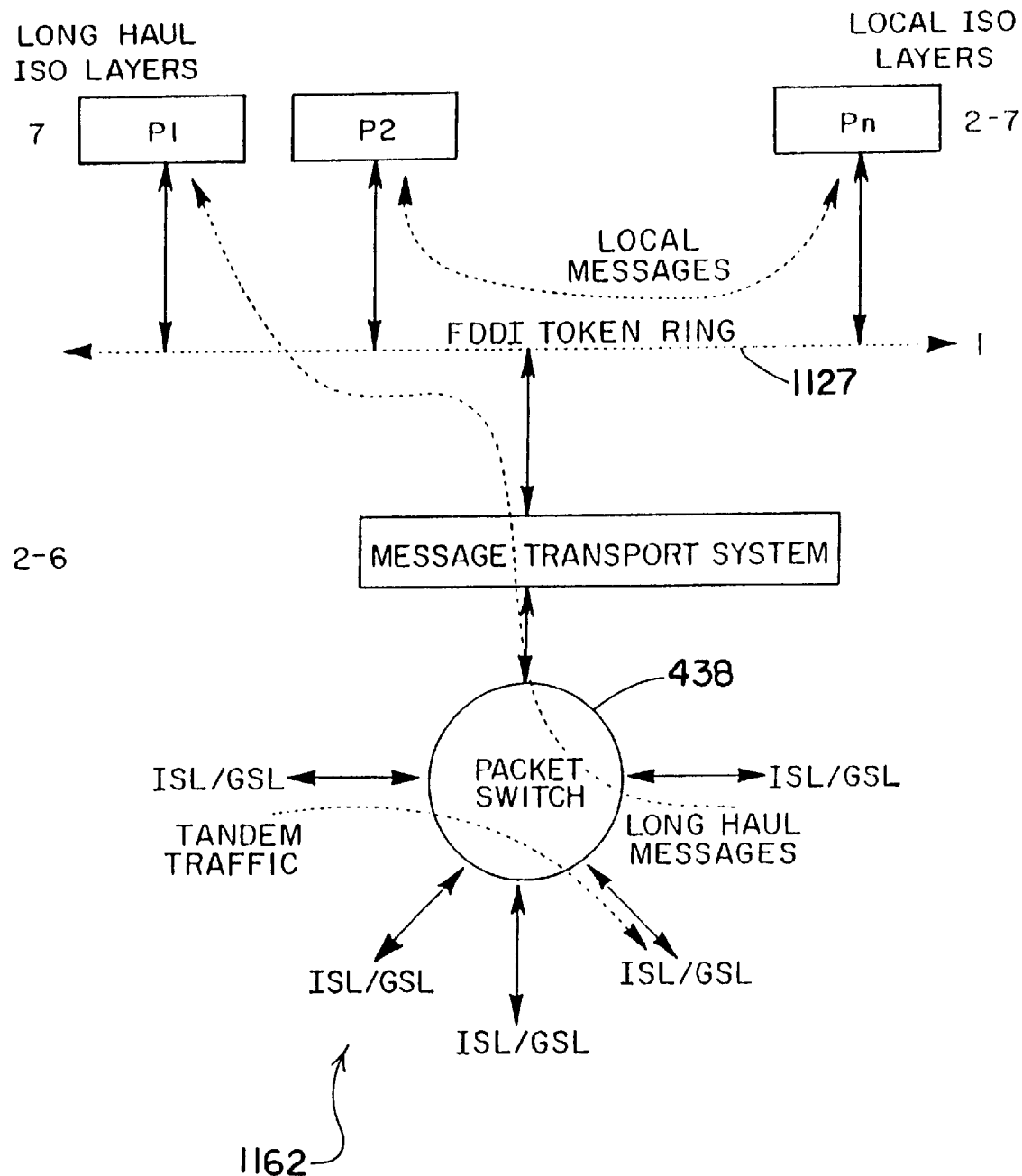
FIG. 101 is a schematic diagram that portrays a message communication.

FIG. 94 is a flow chart which demonstrates the general flow of signals 144 through the fast packet switch 438. FIG. 95 reveals the overall architecture of the satellite node 1146 as it relates to the packet switching process. The relationship among the fast packet switch 438 and Input Output Packet processor (IOP) units 1150 are illustrated in FIG. 96. FIGS. 97 and 98 reveal the details of the input packet processor (IPP) 1152 and IPP common control 1154, and an IPP four stage pipeline 1158 is shown in FIG. 99. FIG. 100 is a flow chart that explains the general process performed by an IPP Optimal Route Controller 1160. Message communication 1162 within the switching hardware is revealed in FIG. 101. Messages are conveyed on a Fiber Distributed Data Interface Token Ring (FDDI) 1127 in FIG. 102 exhibits the pathways within a 128×128 switch 1164, while FIG. 103 is a schematic diagram of a switching cell 1166.

Packets 422 are received from mobile and fixed terminals located under the satellite footprint via Mobile Terminal-Satellite Links (MTSLs) and Fixed Terminal-Satellite Links (FTSLs); gateways used for bringing in traffic from calls originating or terminating on the public network via Gateway to Satellite Links (GSLs); and other satellites via the InterSatellite Links (ISLs). Packets 422 are grouped in two categories, those carrying user data comprising voice, video, digital data, etc.; and those carrying control messages that are used in network administration and control functions. The Fast Packet Switch (FPS) is responsible for switching each incoming packet to its appropriate destination. Packets can be switched to satellites, gateways and terminals. Those destined for other satellites are transported over ISL output links. Packets passing through satellite nodes on their way to their final destinations may contain user data or control messages. Packets directed to a gateway using a GSL output link may also carry user data or control messages. If the packet type is user data, the call associated with the packet originates or terminates on the public network. If the packet conveys a control message, it terminates at the gateway node common control. Mobile and fixed terminals can communicate directly with satellites in orbit. Mobile terminal to satellite links can convey packets at 16Kb per second. Two Kb of the 16Kb MTSL capacity is reserved for a 2 Kb data channel. Fixed terminal to satellite links are 64Kb channels, of which 8Kb is reserved for data. Packets traveling to mobile and fixed terminals include user data packets that carry voice messages, and control message packets bearing call control information. Packets may also be delivered to a node Message Transport System (MTS) if the packet type is a control message.

Packet Switching and Delay Variance

Packet Routing and Link Load Distribution

The Fast Packet Switch utilizes the router to select the currently optimal output link from a local node to a destination node x. The output link is selected anew for each received packet, based on decision factors offered by the router's recommendation, as computed by D(n, x, l), and by instantaneous link load factors. Instead of limiting the choice to using only the absolute optimal link, namely, that l for which D(n, x, l) is lowest, the FPS may use links having delays that are fairly close to the optimal delay, but which have loads Tq that are lower than that of the optimal link. The parameter Delta defines the term "fairly close". In the simulation of one embodiment of the invention, Delta is 50 microseconds. The maximum value of Delta must be significantly lower than the inter-packet generation time or the sequencing of packets may be impaired.

This method of selecting the output link provides automatic link load distribution as well as some degree of link overload control. The method of the invention comprises the following steps:

1. Find the link 1 whose delay D(n, x, l) is lowest. Call that delay Dmin(n, x).
2. Mark all candidate links 1 having delay D(n, x, l)<=Dmin(n, x)+Delta. A link in this set yields a delay of at most Dmin(n, x)+Delta.
3. From among the candidate links, select the one currently having the lowest Tq.
   a. Setting Delta to 0 constrains the router to consider only the optimal link and other links having the exact same delay.
   b. Increasing Delta increases the degree of load distribution, but only at the expense of also increasing the variance in the packet transmission delay. Using sub-optimal links can cause packets to be routed along paths which do not provide absolute minimum delay, but which help meet load distribution objectives.
   c. The (short term) worst case packet delay occurs when the packet happens to be switched over the worse sub-optimal link at each hop along the route and each such sub-optimal link happens to increase the delay by a full Delta above the optimal. With Delta set to 50 microseconds, load distribution will contribute at most 0.5 msec in delay variance to a very long 10 hop circuit, which is still quite low.
   d. The best case occurs when the packet is routed over the optimal link at each hop.
   e. The load distribution process is but a single component contributing to the total variance which is also influenced by normal statistical traffic patterns and intensity fluctuations; continuous changes in Tp due to satellite movement; and topological changes resulting from link disconnects which result from loss of neighbor visibility, and new link connects that replace disconnected links. These topological changes may cause the delay to increase or decrease abruptly by as much as several milliseconds. The greater the number of satellites in the constellation, the lower the change in delays.

To select the packet output link, D(n, x, l) is computed by using routing tables ND1(l*, x), and the current values of Tp and Tq of each link. The value of Tq is a linear function of the number of bits or packets waiting to be transmitted in the output link transmitter buffer. This buffer operates on a first in, first out basis (FIFO). Tp is the latest sampled value and is measured periodically. Once the output link has been selected, its binary identification number is inserted into an N bit tag in front of the packet that is used by the FPS in navigating the packet through its internal switching stages to the selected output link. If the FPS has a total of L output links, then the value of N is equal to the upper bound of log2L. Ttag bit i controls switching stage i.

Earth-Fixed Cell Beam Management Overview

The Earth-Fixed Cell Beam Management apparatus and methods described below are incorporated into the preferred embodiment of the invention and comprise an improvement over the Beam Compensation Methods explained above. The improvement pertains to the allocation of radio beams which are generated by a constellation of satellites orbiting below geosynchronous altitude. These beams are precisely controlled so that they illuminate "Earth-fixed cells", as opposed to "satellite-fixed cells." In previous satellite communication schemes, spacecraft which are not held stationary over one particular location on the Earth in geosynchronous orbits fly over large regions of the Earth very rapidly. The radio beams generated by these fast moving spacecraft sweep across vast regions of the Earth's surface at the same rate of speed. If these beams were visible to the eye, they would paint bright circular and elliptical patches of light on the ground beneath the satellite which emitted them. In a system that employs satellite-fixed cells, the "footprint" of the radio beams propagated by the spacecraft defines the zone on the ground called a "cell" which is illuminated by the spacecraft. This satellite-fixed cell moves constantly as the spacecraft orbits around the globe.

In sharp contrast, an "Earth-fixed cell" is a stationary region mapped to an "Earth-fixed grid" that has permanent fixed boundaries, just like a city or a state. Although the rapidly moving satellites still shine their radio beams over the ground in rapidly moving footprints, the locations of the footprints at any given time do not determine the location of the unchanging Earth-fixed cells. The great advantage provided by using cells having boundaries that are fixed with respect to an Earth-fixed grid is realized when a subscriber being served by one satellite must switch to another beam in the same satellite or to a second satellite because the first is moving out of range below the local horizon. With satellite-fixed cells, this "hand-off" involves the assignment to the terminal of a new communication channel within the new beam or new satellite.

This assignment process takes time and consumes processing capacity at both the terminal and the satellite. It is also subject to blocking, call interruption, and call dropping if there is not an idle communication channel in the next serving beam or satellite. The Earth-fixed cell method avoids these problems by allocating communication channels (frequency, code, and/or time slot) on an Earth-fixed cell basis rather than on a satellite-fixed cell basis. Regardless of which satellite/beam is currently serving a particular cell, the terminal maintains the same channel assignment, thus substantially eliminating the "hand-off" problem.

The present invention uses software that provides position and attitude information about each satellite in the constellation. The Earth's surface is initially mapped into an unchanging "Earth-fixed grid" which each satellite can accurately locate from its position data. Each satellite is capable of steering, transmitting and receiving beams conveying packets of information to the Earth-fixed grid. The beams are continually adjusted to compensate the effects of satellite motion, attitude changes, and the rotation of the Earth. In accordance with the preferred embodiment of the invention, each spacecraft possesses the following capabilities:

to determine in which cell a terminal is located;
to read the destination of each incoming communication packet to determine the cell to which it is directed;
to map from destination cell to the beam currently serving the cell;
to switch packets to the beam currently serving the destination cell;
to "hand-off" a terminal from one beam to the next or from one satellite to the next without changing the channel assignment of the terminal; and
to manage the assignment and release of channels within each cell by the satellite currently responsible for the cell.

The Earth-Fixed Cell Beam Management methods described in this specification and illustrated in the drawings which accompany them may be implemented using a wide variety of satellite hardware. The preferred embodiment of the invention employs a modular spacecraft design called Callingsat™. An alternative embodiment utilizes a spacecraft called Domesat™. Both satellites are described in detail below.

A Detailed Description of Earth Fixed Cells Beam Management

Figure 105:
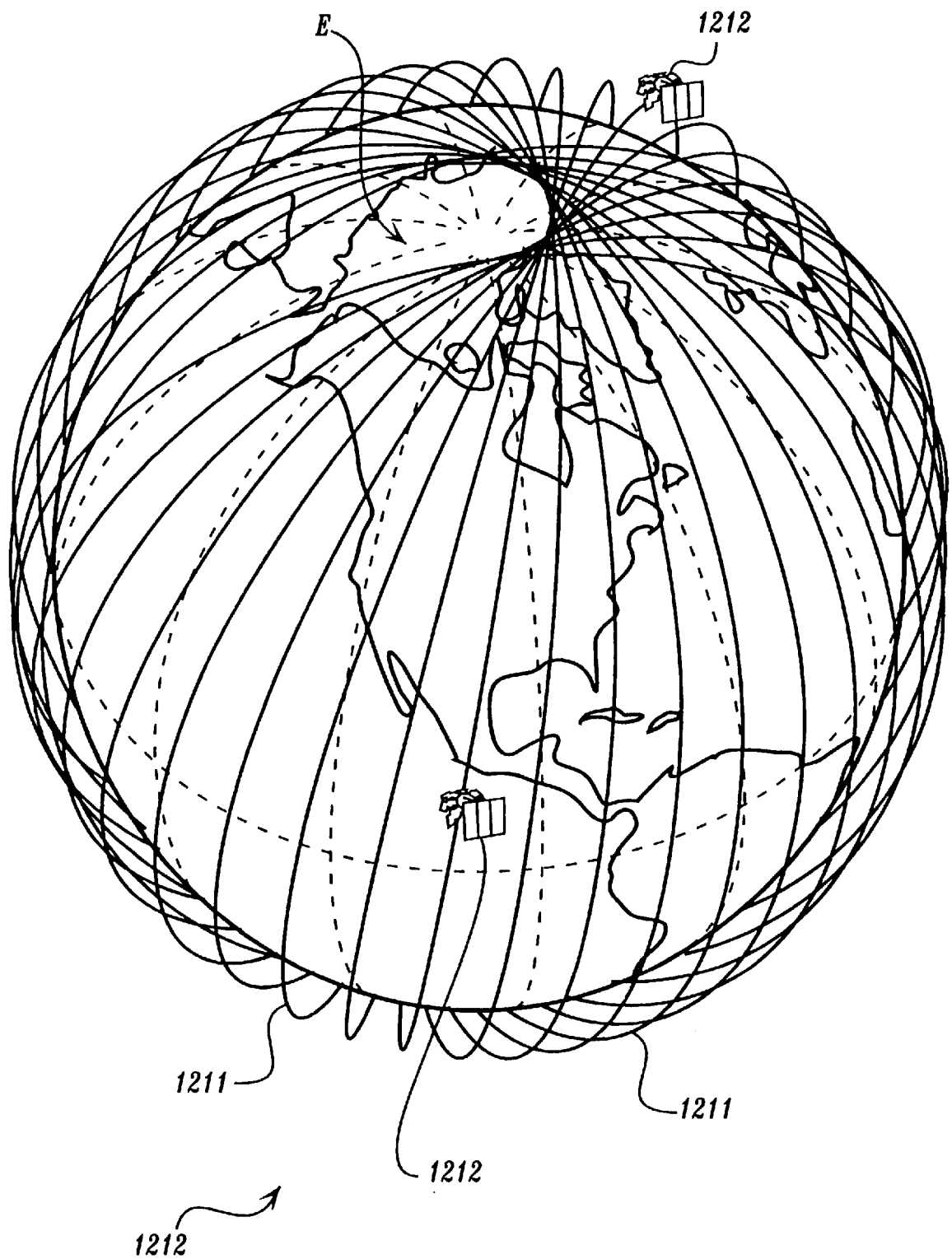
FIG. 105 is a schematic illustration of the Earth and the preferred embodiment of the satellite constellation operating below geosynchronous altitude in twenty-one orbits.

FIG. 105 is a schematic diagram 1210 which illustrates twenty-one orbits 1211 which enclose the Earth E. In the preferred embodiment of the invention, each orbital plane contains forty active satellites 1212 spaced evenly around the orbit 1211, along with up to four spares. The constellation of satellites is designed so that a subscriber's terminal can "see" two or more satellites most of the time. This gives the terminal some protection against shadowing by terrain, allows load sharing among satellites, and also provides redundant coverage in the event of satellite failure. In the specification and claims which follow, the word "terminal" is used to identify portable terminals P like hand-held phones, mobile terminals M such as those mounted in vehicles and fixed terminals F like a permanently installed phone that is available for public use. These terminals are different from gateways G which are generally large terrestrial receiving stations that connect the constellation with public switched networks.

Figure 106:
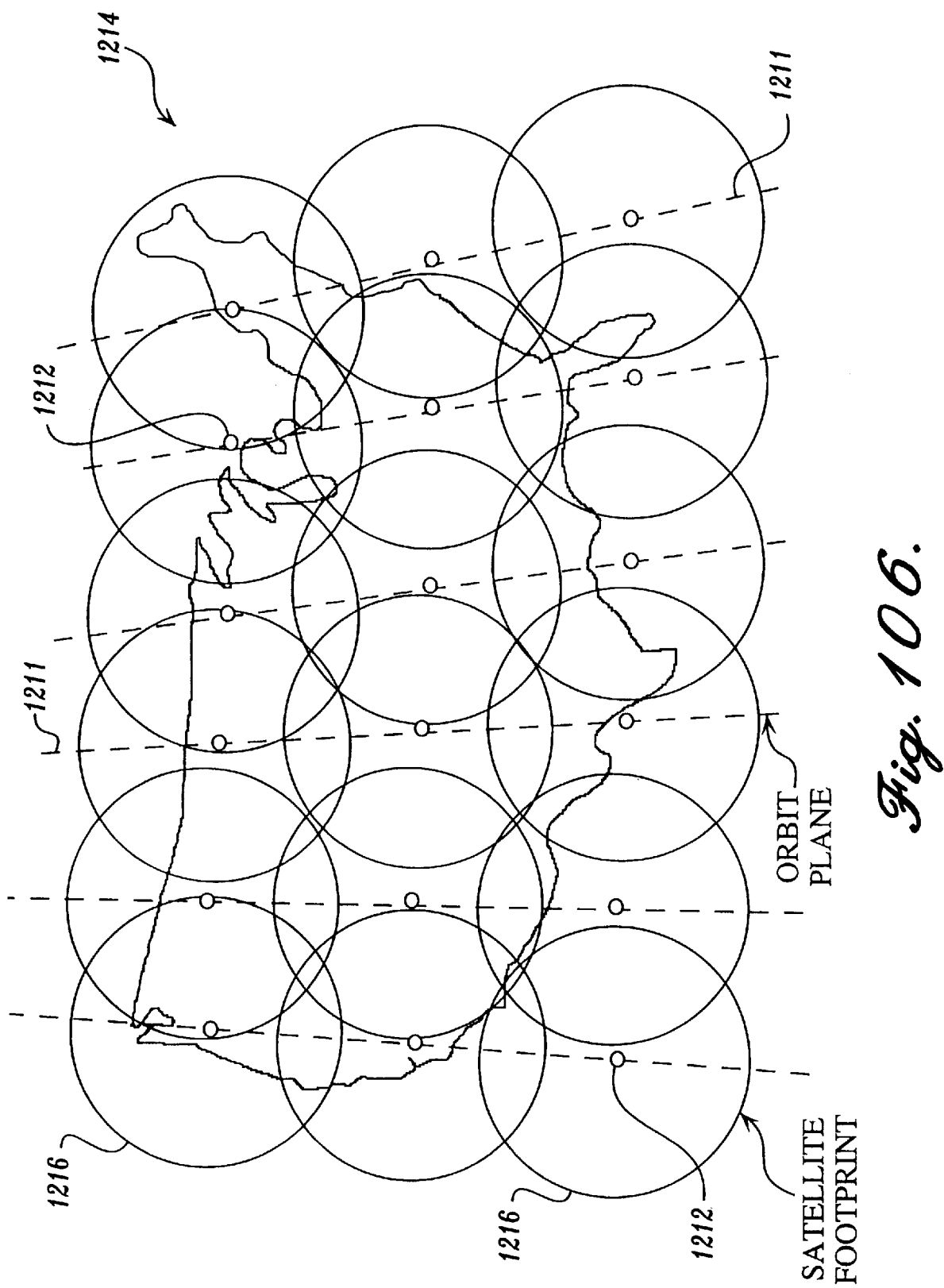
FIG. 106 depicts overlapping satellite footprints of radio beams covering the continental United States.

FIG. 106 is a diagram 1214 that depicts the coverage redundancy of overlapping satellite beams called "footprints" 1216 as they illuminate the continental United States. Due to high inclination of the orbits 1211, at any given time most of the satellites 1212 fly over middle and high latitudes. The result of this orbital deployment results in the optimization of traffic-handling capacity. The footprint coverage diagram shown in FIG. 106 is based on a design feature utilized by the preferred embodiment which insures that there is at least one satellite no lower than 40 degrees above the horizon. This high "mask angle" minimizes blockage from structures and terrain, minimizes interference with terrestrial microwave links, and limits the effects of rain attenuation and multi-path reflections. In an alternative embodiment, a minimum mask angle of 15 degrees may be employed.

When the constellation is deployed, each launch vehicle carries a number of satellites. These satellites 1212 are released in their proper orbit plane 1211, and each satellite then adjusts its position within the plane. Onboard thrusters and an autonomous navigation system continuously monitor and adjust the satellite's altitude, attitude, and position within the orbit plane. A number of spare satellites are placed in orbit along with the first launch of active satellites.

For a satellite in low Earth orbit, the satellite footprint sweeps over the Earth's surface at approximately 25,000 Km/hr. If the cell pattern of the present invention moved with the satellite footprint, a terminal would remain in one cell for only a few seconds before a channel reassignment or "hand-off" to the next cell is required. As is the case with terrestrial cellular systems, frequent hand-offs result in inefficient channel utilization, high processing costs, and lower system capacity.

Figure 107A:
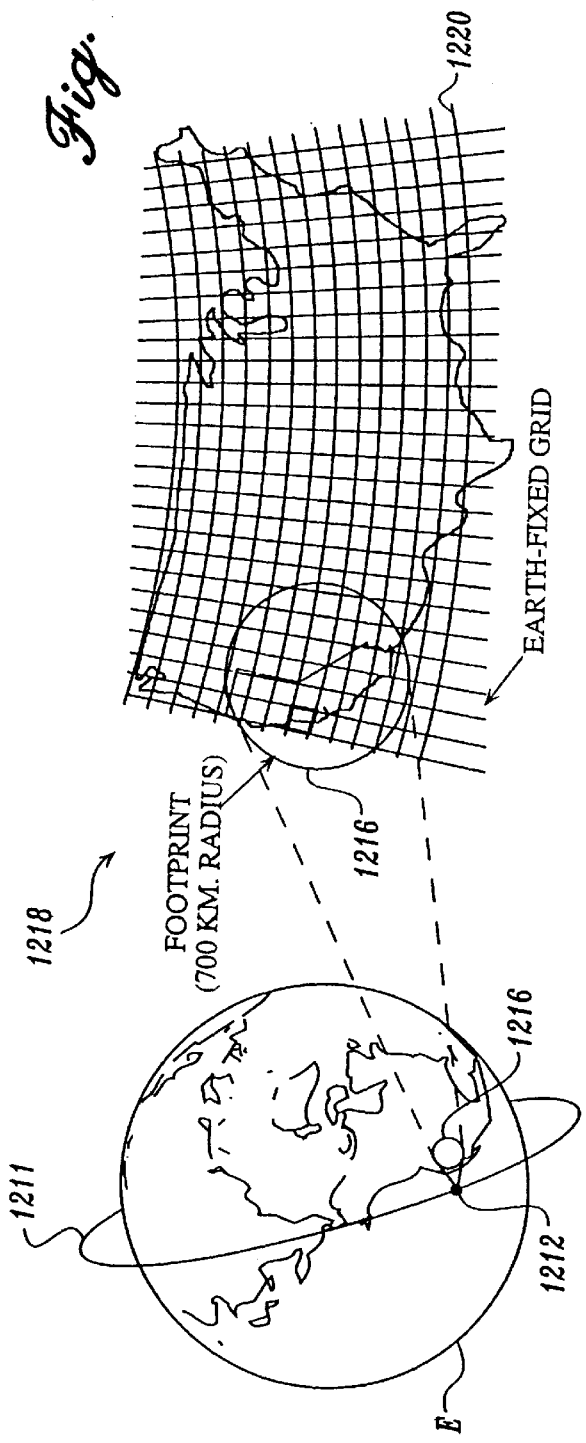
FIG. 107a shows the relationship between a satellite footprint and an unchanging Earth-fixed grid.
Figure 107B:
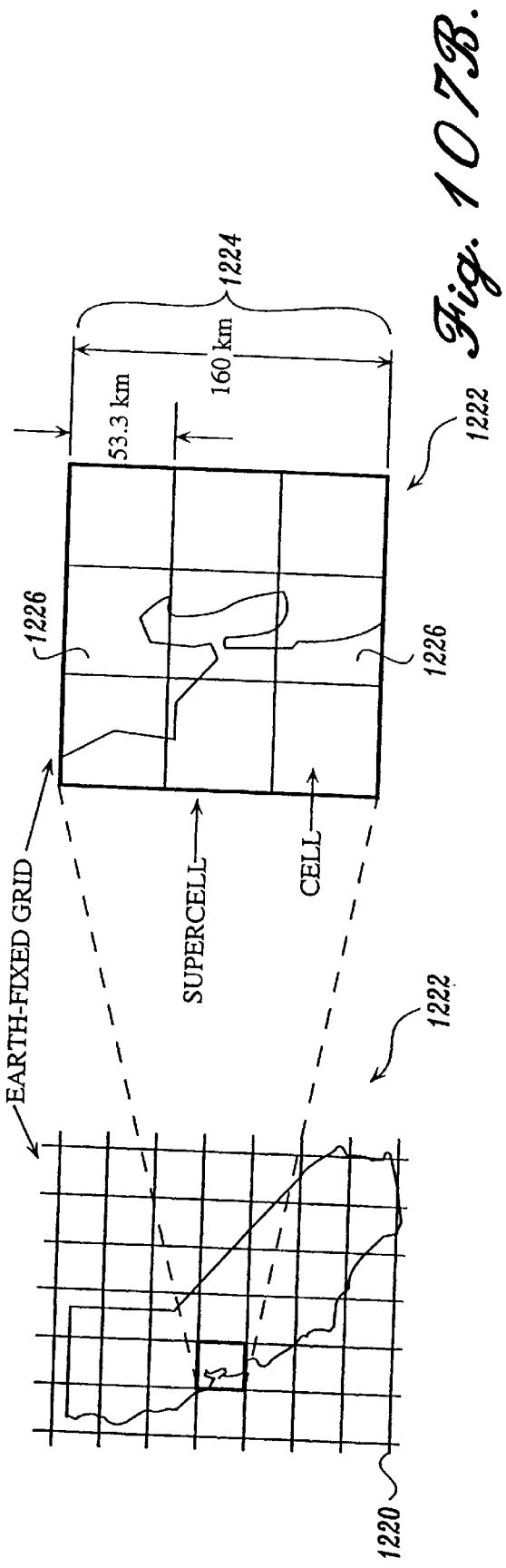
FIG. 107b shows how the Earth-fixed grid pictured in FIG. 107a comprises Earth-fixed supercells, and how each supercell includes nine Earth-fixed cells.

FIGS. 107a and 107b illustrate the preferred embodiment of the invention which substantially eliminates the "hand-off" and frequency coordination problems associated with LEO networks that utilize satellite-fixed cells. FIG. 107a is a view 1218 that reveals the incidence of radio beams from a satellite 1212 that form a footprint 1216 over California.

FIG. 107b is a diagram 1222 that depicts the relationships among the Earth-fixed grid 1220, a supercell 1224 and the nine cells 1226 within the supercell 1224. FIG. 107a shows an Earth-fixed grid 1220 of supercells 1224 covering the continental United States.

In the preferred embodiment, the Earth's surface is mapped into this Earth-fixed grid 1220, which comprises approximately 20,000 "supercells" 1224. Each supercell 1224 contains nine cells 1226. Each supercell is a square 160 km on each side, while each cell 1226 is a square measuring 53.3 km on each side. The supercells 1224 are arranged in bands that are parallel to the Equator. There are approximately 250 supercells 1224 in the band at the Equator, and the number per band decreases in proportion to the cosine of the latitude of their location on the globe. Because the number of supercells per band is not constant, the "north-south" supercell borders in adjacent bands are not aligned. A fixed algorithmic relation defines the mapping between supercell coordinates and latitude-longitude coordinates. A "time-of-day" relation defines which orbital plane has primary coverage responsibility for each supercell 1224, and the satellites' orbital position completes the "Earth-coordinates-to-serving-satellite " relation. This relation makes it possible to determine at any time which satellite has primary coverage responsibility for a terminal based on the terminal location.

The relatively small fixed cells of the preferred embodiment also provide a means to contour service areas to country boundaries, which is impossible to do with large moving satellite-fixed cells. The present invention utilizes a cell database which defines the type of service allowed within each cell, and can be used to turn off service on a country-by-country basis, or to avoid interference with radio astronomy or other specific sites.

Each footprint 1216 encompasses a maximum of 64 supercells, or 576 cells. The actual number of cells 1226 for which a satellite is responsible is a variable that depends on satellite location and spacing between satellites. As a satellite passes over, it steers its antenna beams to the fixed cell locations within its footprint. This beam steering compensates for the satellite's motion as well as for the Earth's rotation. As an analogous example, the beam steering method employed by each satellite to track a cell as the satellite flies overhead is similar to the motion of the tread of a bulldozer over the ground. Each spot on the tread remains in contact with a single point on the ground while the bulldozer moves along. Frequencies and time slots are associated with each cell and are managed by the current "serving" satellite. As long as a terminal remains within the cell, it maintains the same channel assignment for the duration of a call, regardless of how many satellites and beams are involved. Channel reassignments become the exception rather than the normal case, thus eliminating much of the frequency coordination and hand-off overhead.

The high minimum mask angle of 15 degrees employed in the alternative embodiment of the invention results in a small satellite footprint and the large number of satellites in the constellation. The preferred embodiment of the invention employs an even higher mask angle of 40 degrees. For the case of the preferred 40 degree mask angle, the peak density is 0.5 of the simultaneous basic rate channels/Km² averaged over a cell. For the case of a preferred 40 degree mask angle and a 53.3 Km-square cell, 1,440 channels are employed which would serve over 14,000 typical business subscribers.

Figure 108:
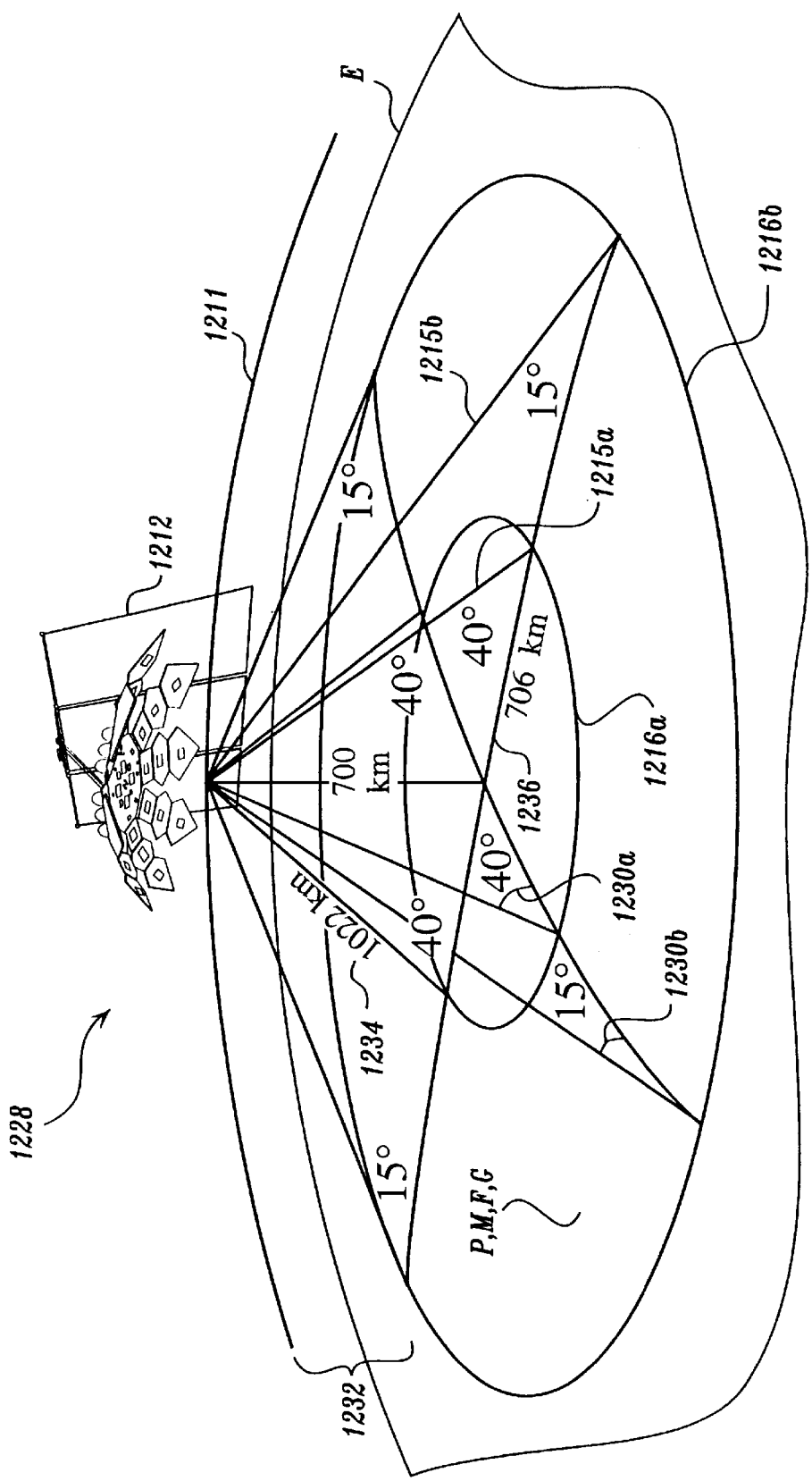
FIG. 108 reveals a single Callingsat™ satellite and the footprint it produces on the Earth's surface directly below it. This figure also identifies the high mask angles employed by various embodiments of the constellation.

FIG. 108 is a drawing 1228 which reveals two footprints 1216a and 1216b that correspond to the use of mask angles 1230a and 1230b of forty degrees and fifteen degrees. The forty degree mask angle is the preferred parameter, while the fifteen degree mask angle is an alternative that yields lower system capacity. In both instances, the altitude 1232 of the satellite 1212 is shown as 700 km. The maximum distance to the footprint perimeter 1234 from the satellite 1212 is 1,022 km when the preferred forty degree mask angle is employed, and the radius 1236 of the footprint 1216a is 706 km. The presence of portable, mobile and fixed terminals and gateways within the footprint are indicated by the reference characters P, F, M and G.

The satellite footprint 1216 comprises a collection of contiguous cells 1226, and is somewhat analogous to a terrestrial cellular system. Each cell 1226 supports a number of communication channels. Terminals within the cell 1226 share these channels using a combination of multiple-access methods that are described in more detail below. Cells are arranged in a pattern which allows frequencies and time slots to be reused many times within a satellite footprint 1216 without interference between adjacent cells 1226. The high gain satellite antennas that will be employed by the preferred embodiment produce small cells (53.3 Km on each side) which result in extremely efficient use of spectrum, high channel density and low power requirements.

Figure 109:
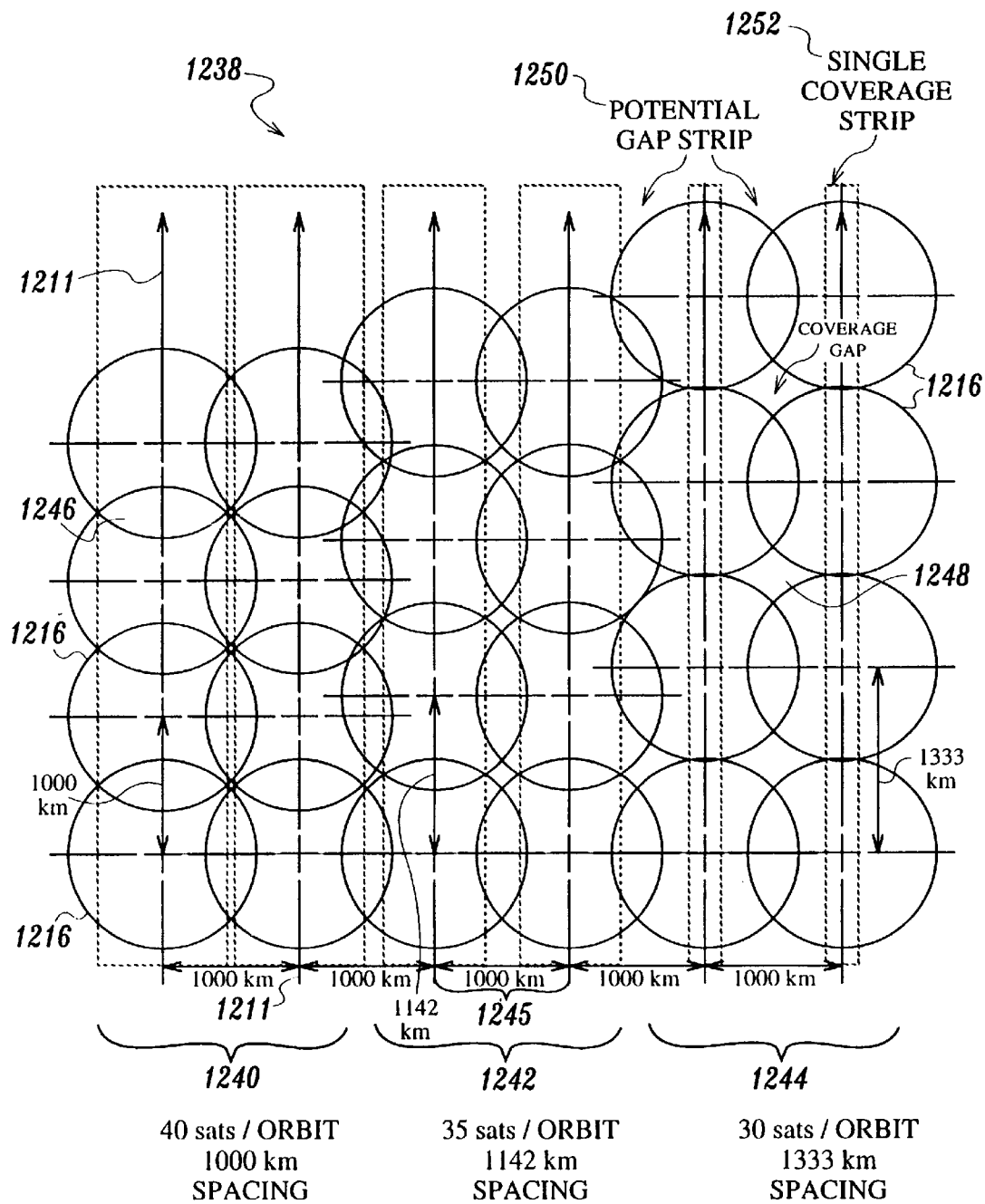
FIG. 109 portrays coverage provided by satellite footprints in the preferred embodiment of the invention and the overlaps and gaps formed by these footprints at the equator.
Figure 110:
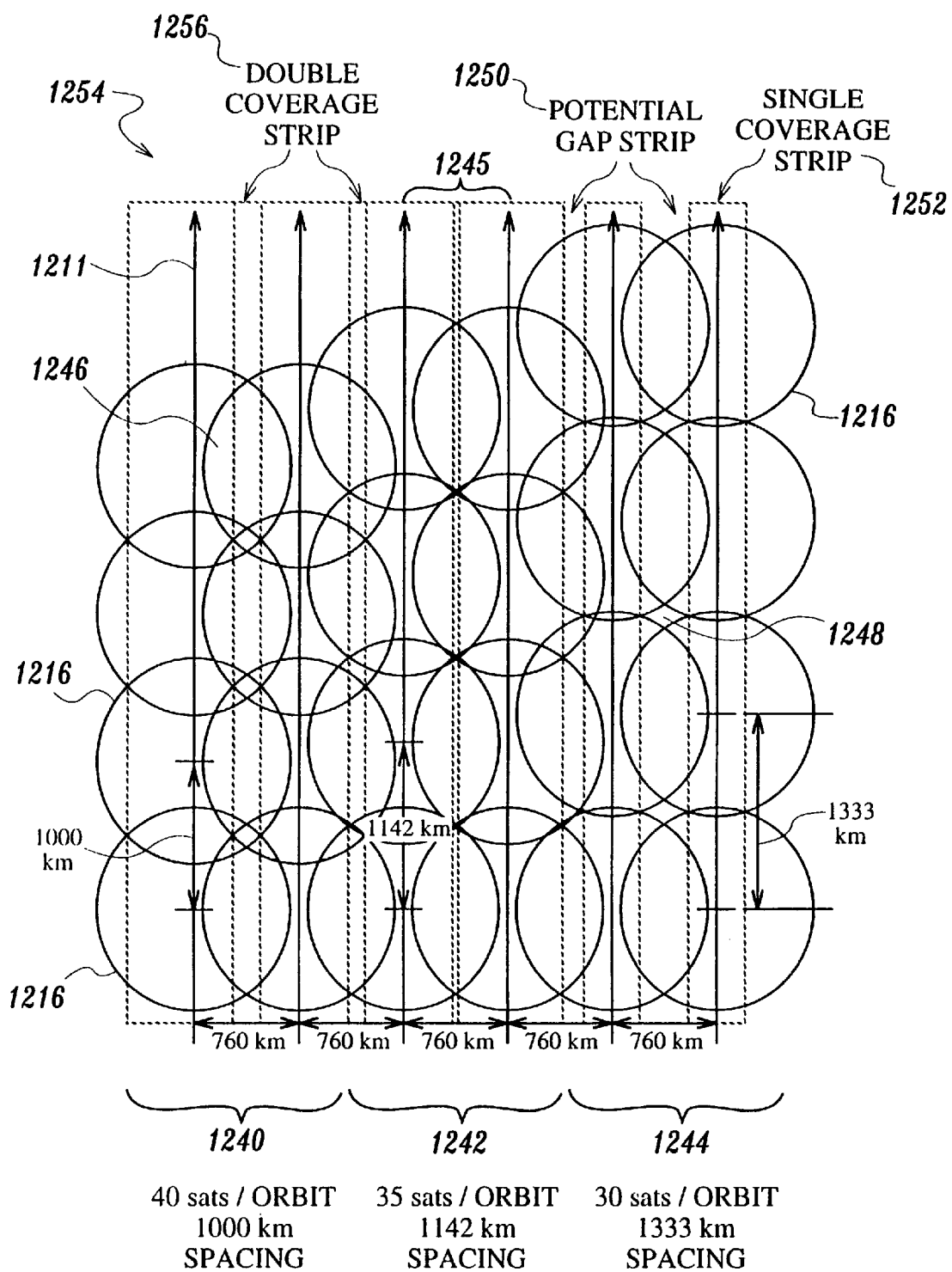
FIG. 110 portrays coverage provided by satellite footprints in the preferred embodiment of the invention and the overlaps and gaps formed by these footprints at a latitude of forty degrees.

FIG. 109 is a diagram 1238 which portrays coverage provided by satellite footprints in the preferred embodiment using a spacing between orbital planes of 1,000 km measured at the Equator. The overlap 1240 corresponds to a network that employs forty satellites per orbit at 1,000 km spacing, while overlaps 1242 and 1244 correspond to networks using 35 satellites per orbit at 1,142 km spacing and 30 satellites per orbit at 1,333 km spacing, respectively. The distances between the footprint centers are delineated by reference numeral 1245, the overlaps are indicated by 1246, and the gaps by 1248. Potential gap strips 1250 and single coverage strips 1252 are also illustrated. FIG. 110 reveals a similar diagram 1254 that depicts satellite footprint overlaps and gaps at 40 degree latitude where the spacing between orbital planes is approximately 760 km. A double coverage strip 1256 is also shown.

FIG. 111a is a schematic diagram 1258 that shows a single satellite 1212 flying over a target Earth-fixed cell 1226t in three sequential positions. At each of the three positions marked Time 1 (T1), Time 2 (T2) and Time 3 (T3), the satellite 1212 steers beams 1219 to a subscriber in a target Earth-fixed cell 1226t using a mobile, portable or fixed terminal or a gateway which communicate with the satellite using a frequency channel that does not change.

In stark contrast, FIG. 111b is a diagram 1260 of a different satellite 1261 which does not implement the present invention because it uses satellite-fixed cells. Much larger footprint beams 1262 result from the extremely low mask angle 1266 of eight and one half degrees. In FIG. 7a, a satellite 1212 using the Earth-fixed cells method applies steering techniques to point cell beams 1219 to regions on the ground. In FIG. 111b, a satellite 1261 uses the satellite-fixed cell method to create footprint and cell SFC beams 1262 & 1264 that move past particular locations on the ground that move with the satellites as it flies past.

Figure 111C:
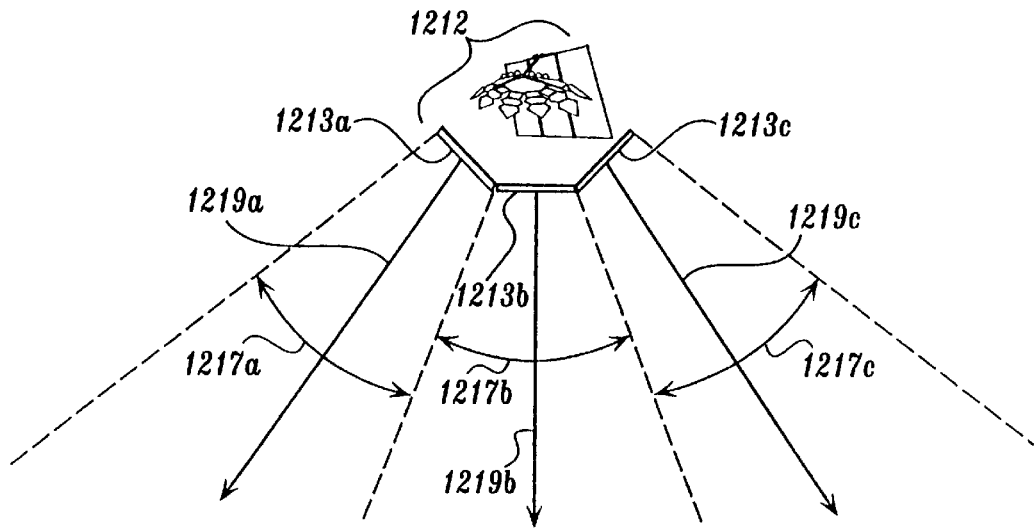
FIGS. 111c is a schematic diagram of three simplified satellite antenna elements that resemble one-half of a hexagon.

FIG. 111c is a schematic diagram of three satellite antenna elements. For the sake of simplicity, these three elements, which resemble the lower half of a hexagon, are used to show how beams 1219a, 1219b and 1219c are steered to cells on the ground. In the actual implementation of the invention, antennas 1358 and 1360 shown in FIG. 15 and described below may be utilized. Antennas located on each of these three elements 1213a, 1213b and 1213c transmit and receive Earth-fixed cell beams 1219*a*, 1219*b* and 1219*c* in directions that are generally perpendicular to the surface of each element. Electronic beam steering is used to alter the direction of the Earth-fixed cell beams 1219*a*, 1219*b* and 1219*c* so that antennas residing on each element 1213*a*, 1213*b* and 1213*c* are capable of transmitting or receiving over the spatial ranges delineated by angles 1217*a*, 1217*b* and 1217*c*. The beam steering may be accomplished by using time-delay and phase shift networks and phased-array antenna technology which are all well known to persons skilled in the antenna arts.

Figure 111D:
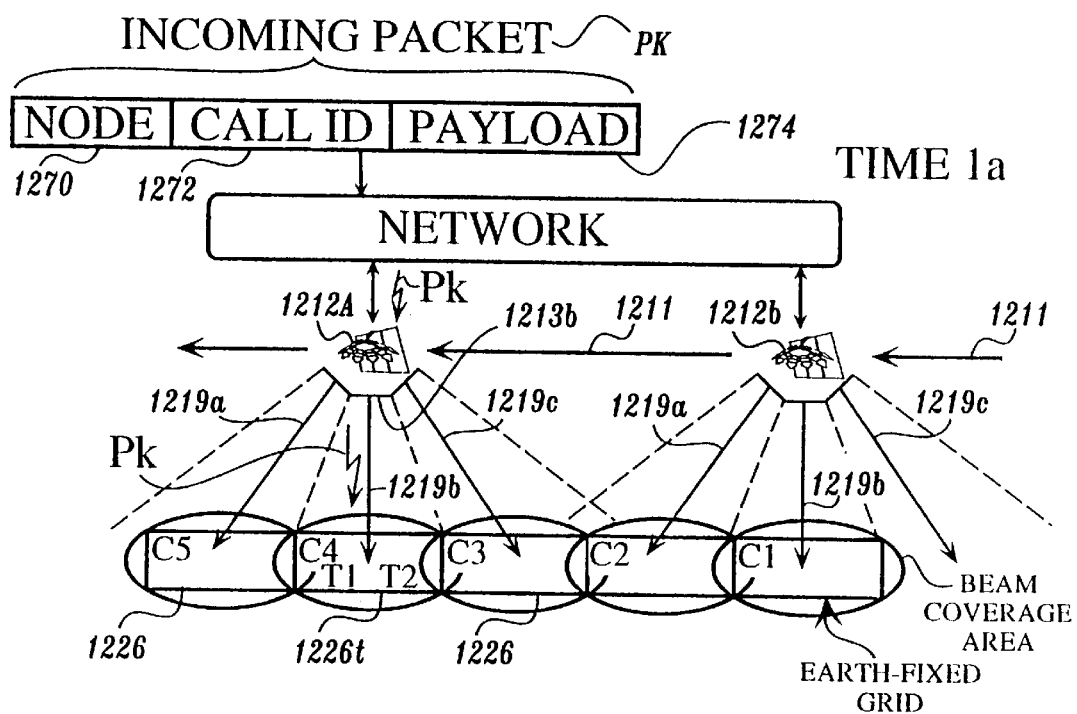
FIGS. 111d, e, f, g, h and i reveal a sequence of views which compare the Earth-fixed cell and satellite-fixed cell methods.
Figure 111E:
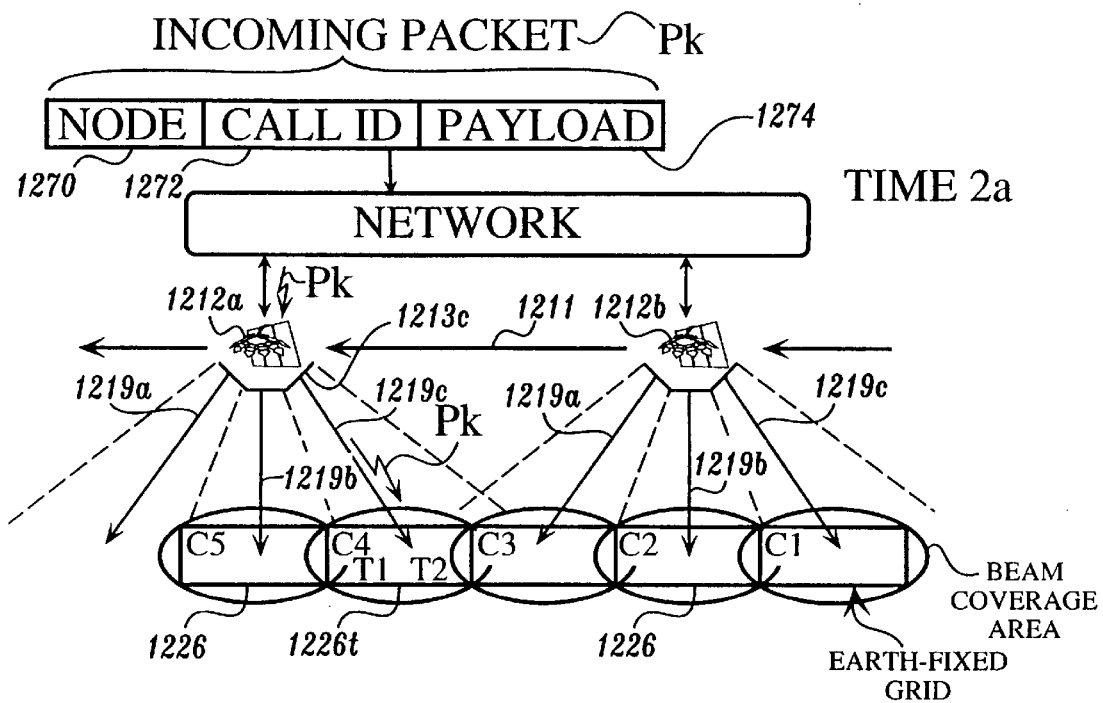
FIG. 111a is a schematic diagram that shows a single satellite flying over a single Earth-fixed cell in three sequential positions. At each of the three positions marked Time 1, Time 2 and Time 3, the satellite steers beams to a subscriber using a mobile, portable or fixed terminal or gateway over a frequency channel that does not change. The satellites shown in FIG. 111a are configured to operate using minimum mask angles of 15 and 40 degrees.
FIG. 111b is an illustration of a communication system that uses satellite-fixed cells and a mask angle of 8.5 degrees.
Figure 111F:
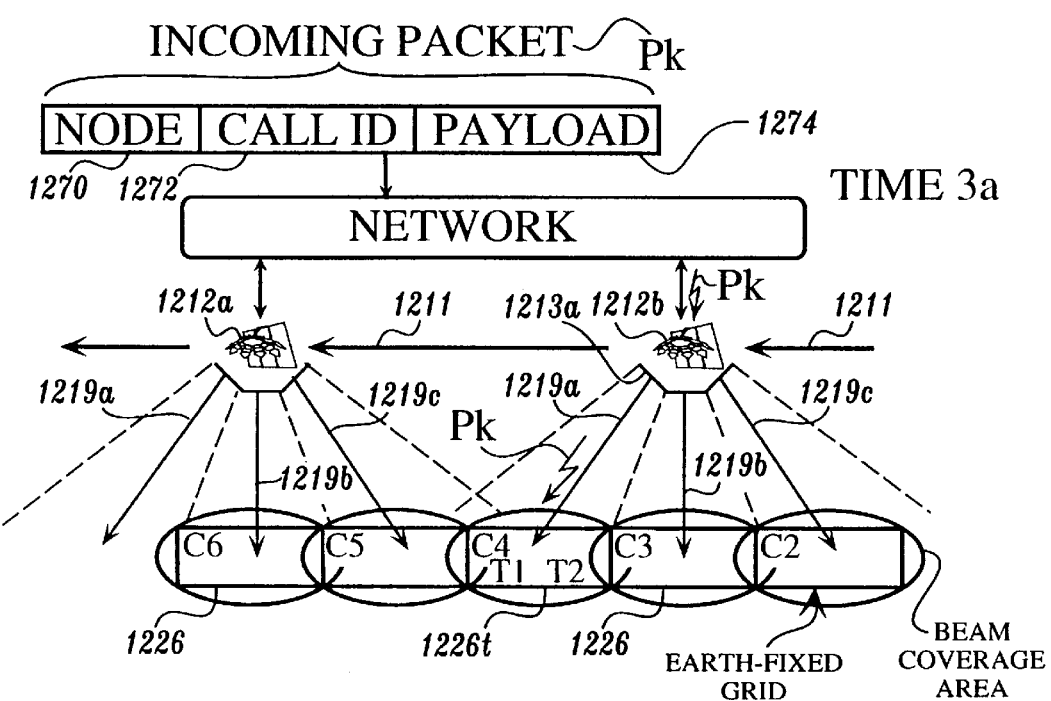

FIGS. 111*d*, 111*e* and 111*f* are simplified views of a hand-off process utilized by the present invention. In each of these three views, two satellites employed by the present invention 1212*a* and 1212*b* flying in the same orbit 1211 use three antenna elements like those shown in FIG. 111*c* to direct packets Pk to subscribers on the ground in a target Earth-fixed cell 1226*t*. Each packet Pk carries a header and a message "payload" 1274. The header includes address information comprising a "destination node" 1270 and a "call ID" 1272. In each of these three drawings, incoming packets Pk have been routed through the network to satellites 1212*a* or 1212*b* on their way to subscribers located in cell 1226*t* using terminals T1 and T2. In this example, these terminals do not change positions, and therefore, remain in the same Earth-fixed cell 1226*t*, which is also identified as C4.

FIG. 111*d* is a "snapshot" of satellites 1212*a* and 1212*b* at time 1*a*. FIGS. 111*e* and 111*f* are similar snapshots of the same satellites, but at slightly later successive times 2*a* and 2*b*. In FIG. 111*d*, beams 1219*b* from the central antenna element 1213*b* of satellite 12*a* provide service to fixed location terminals T1 and T2 in target cell 1226*t* (C4). At slightly later time 2*a* which is pictured in FIG. 111*e*, satellite 12*a* has moved farther away from the terminals in target cell 1226*t*, but the electronic beam steering circuits aboard satellite 1212*a* have switched the service to the same terminals T1 and T2 to a different antenna panel 1213*c*. This "antenna-to-antenna" hand-off is completely undetected by the subscribers using terminals T1 and T2, who continue to enjoy uninterrupted service via beam 1219*c* without changing their assigned communication channel. At an even later time 3*a*, which is frozen in the view offered by FIG. 114*f*, satellite 1212*a* has moved out of range of the unmoving cell C4 in which terminals T1 and T2 are located. Before satellite 1212*a* is no longer capable of servicing T1 and T2, the satellites 1212*a* and 1212*b* cooperatively hand-off responsibility for continuing the supply of packets Pk to these subscribers, and 1212*b* assumes control of the call traffic to T1 and T2 using its own antenna panel 1213*a* and its own beam 1219*a*. Since T1 and T2 remain within their original cell 1226*t*, they maintain the same channel assignment, unlike the rapid hand-offs that would be required if satellite-fixed cells were involved. The simplification of the hand-off process results from the fact that terminals stay in the same cell even though the satellites move. Communication resources are allocated on a cell by cell basis.

The specific algorithm that is employed by the preferred embodiment of the invention involves measuring and comparing the distances between the first satellite 1212*a* that is serving a target Earth-fixed cell 1226*t* at a given time, and the distance between a second next satellite 1212*b* and the target cell 1226*t*. When the distance between the centroid of the target cell 1226*t* to the second next satellite 1212*b* is less than the distance from the same centroid to the first satellite 1212*a*, the satellite-to-satellite hand-off occurs.

Figure 111G:
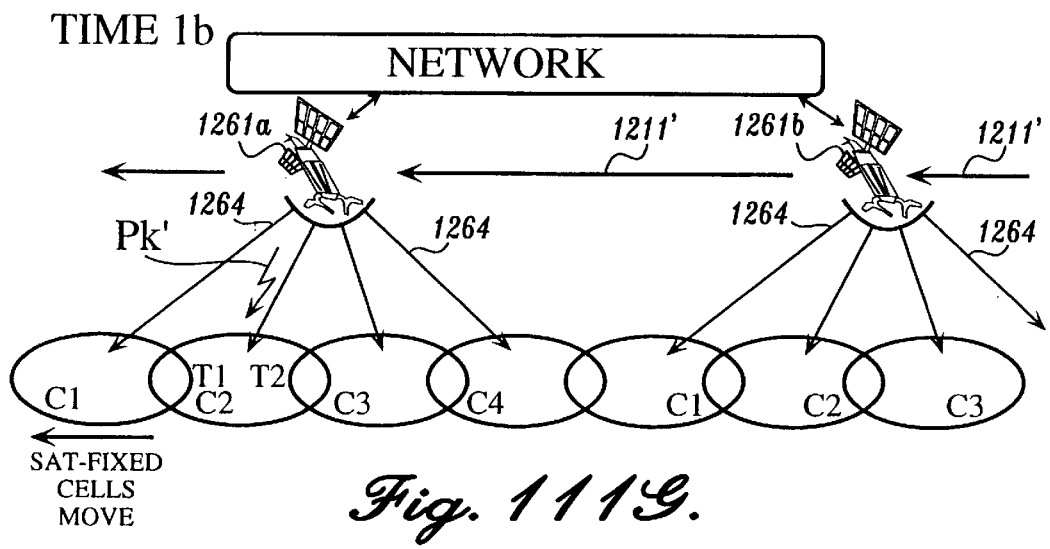
Figure 111H:
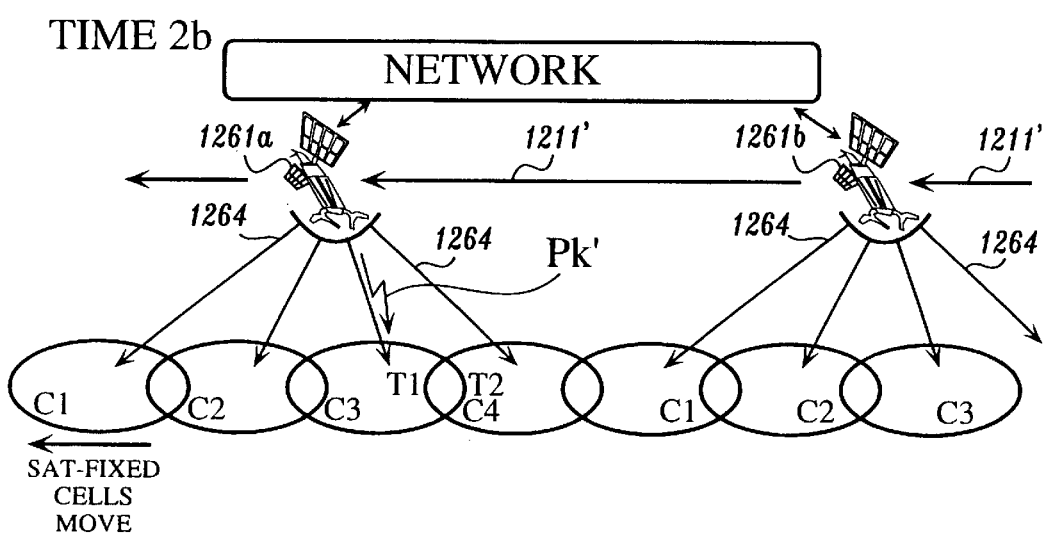

In stark contrast, FIGS. 111*g*, 111*h* and 111*i* reveal the deleterious consequences of furnishing the same service to two fixed location terminals T1 and T2 using a communication system that employs satellite-fixed cells, instead of the Earth-fixed cells scenario pictured in FIGS. 111*d*, 111*e* and 111*f*. Satellites 1261*a* and 1261*b* are shown in orbits 1211' communicating with terminals T1 and T2 via beams 1264 at successive times 1*b*, 2*b* and 3*b*. In FIG. 111*g*, T1 and T2 are illuminated by cell C2 of satellite 1261*a* at time 1*b*. In this system, however, the cells move along with the satellites 1261*a* and 1261*b*, and continually sweep over the Earth's surface. As shown in FIG. 111*h*, at time 2*b*, T1 and T2 are no longer in cell C2 of satellite 1261*a*. At time 2*b*, T1 is in cell C3 of satellite 1261*a* and T2 occupies cell C4 of satellite 1261*a*. As a result of the motion of the cells, which each employ different frequencies to avoid signal interference, satellite 1261*a* had to change the channel assignment for T1 when cell C2 moved past it and cell C3 moved over it. FIG. 111*h* shows that, on some occasions, two relatively close terminals T1 and T2 may be served by different cells. FIG. 111*i* reveals the situation at time 3*b*. Satellite 1261*a* has moved completely out of range of T1 and T2, and cell C2 of satellite 1261*b* has assumed responsibility for the delivery of packets Pk to the subscribers. FIGS. 111*g*, 111*h* and 111*i* exhibit the extremely complex hand-off scheme that must be used by a network using satellite-fixed cells. Each time a terminal is passed from one cell to the next it must be assigned a new communication channel (frequency). These very frequent hand-offs can result in irritating noise during a call, and, in the worst case, a complete drop-out of the call.

Figure 112A:
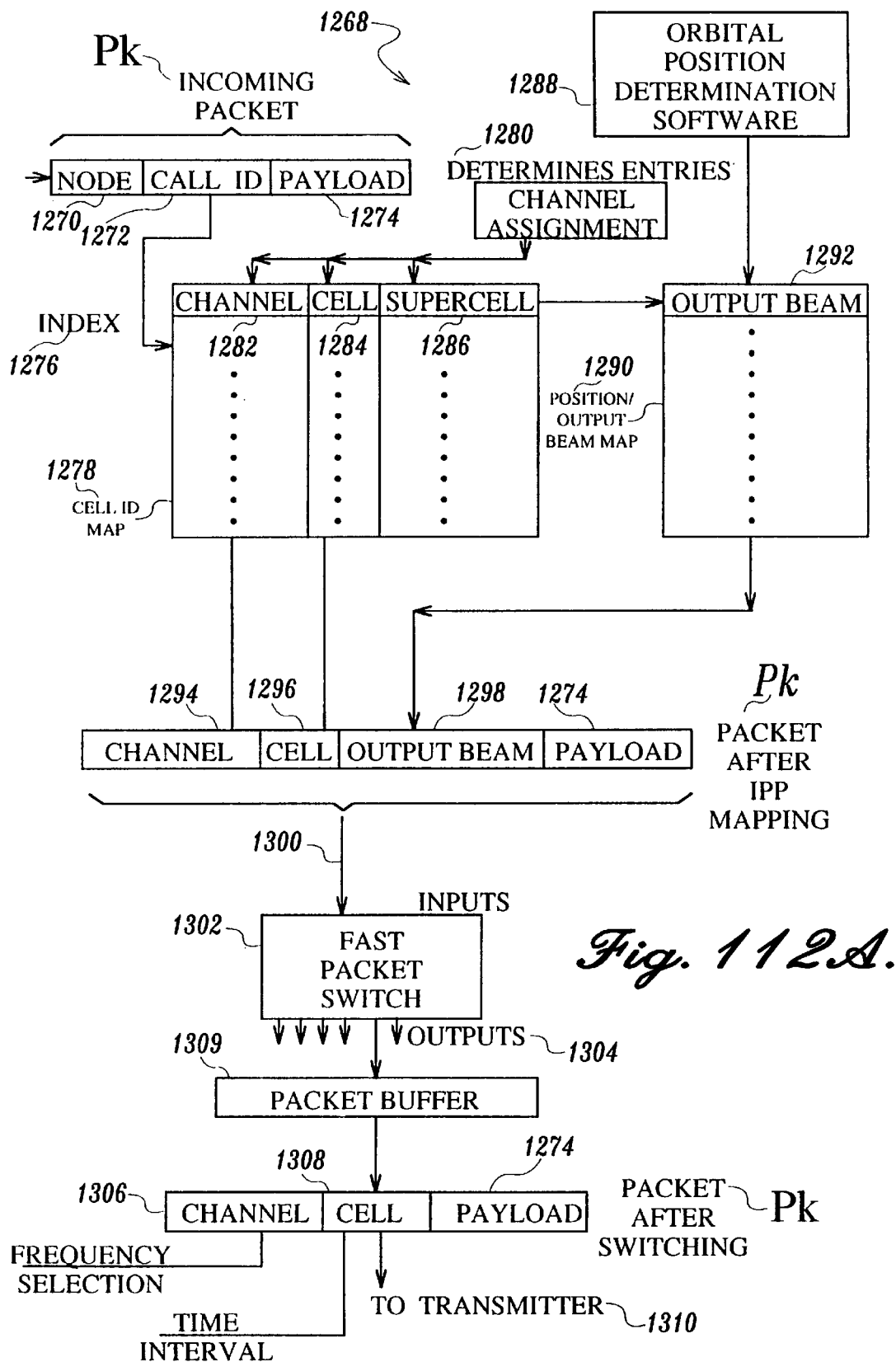
FIGS. 112a and 112b are schematic block diagrams which disclose hardware implementations of preferred embodiments of the present invention. Packets are shown as they progress through mapping and switching hardware which allocates satellite beams to subscribers in Earth-fixed cells.

FIG. 112*a* is a schematic block diagram 1268 which discloses a hardware implementation of the preferred embodiment. An incoming packet Pk is shown as it progresses through mapping and switching hardware which directs the packet Pk to the Earth-fixed cell beam 1219 which is currently serving the Earth-fixed supercell 1224 and cell 1226 in which the destination terminal resides. The incoming packet Pk possesses node and call ID bits 1270 and 1272 that comprise a terrestrial location identification I about the terminal where the call originated. The substance of the phone call, such as voice or video information, has been digitized and is carried as the payload portion 1274 of each packet. The node 1270 identifies the satellite 1212 currently serving the destination terminal. The call ID 1272 is used as an index 1276 to a cell ID map 1278, which is used as a translation device that is upstream from a fast packet switch 1302 that actually selects the Earth-fixed cell beam 1219 that will be used to deliver the payload 1274. The cell ID map 1278 identifies the supercell entry 1286, cell entry 1284, and channel entry 1282 assigned to the destination terminal within this node 1270 as identified by the call ID 1272 in the incoming packet Pk. In the present context, a channel entry 1282 is a portion of beam that has been allocated into several frequencies. The satellite beam which is currently assigned to serve a particular supercell entry 1286 is also a function of the instantaneous position of the satellite which is generating Earth-fixed cell beams 1219 to handle a given call. This position information is produced by an autonomous orbit determination (AOD) algorithm 1288. The output of the cell ID map 1278 is a supercell entry 1286, which is used as an index to a position/output beam map 1290 that, in turn, selects an output beam 1292. Once the channel 1294, cell 1296, and output beam assignments 1298 have been derived, these assignments are appended to the payload 1274 of the packet Pk, replacing the call ID 1272. The packet Pk is then forwarded to the fast packet switch 1302 through input 1300, which uses this information to direct the packet to an output 1304 to a packet buffer 1309.

Figure 112B:
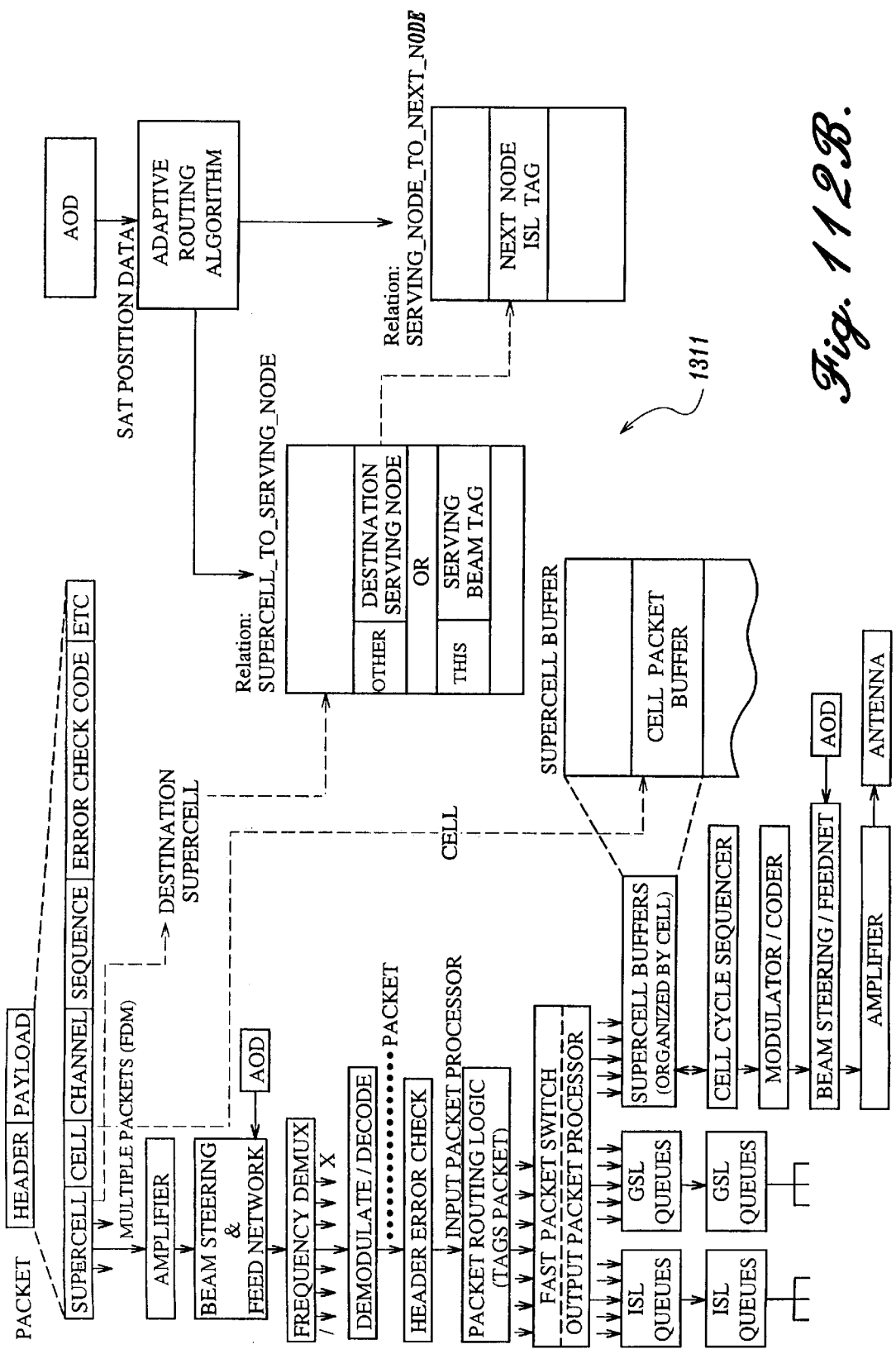
Figure 115:
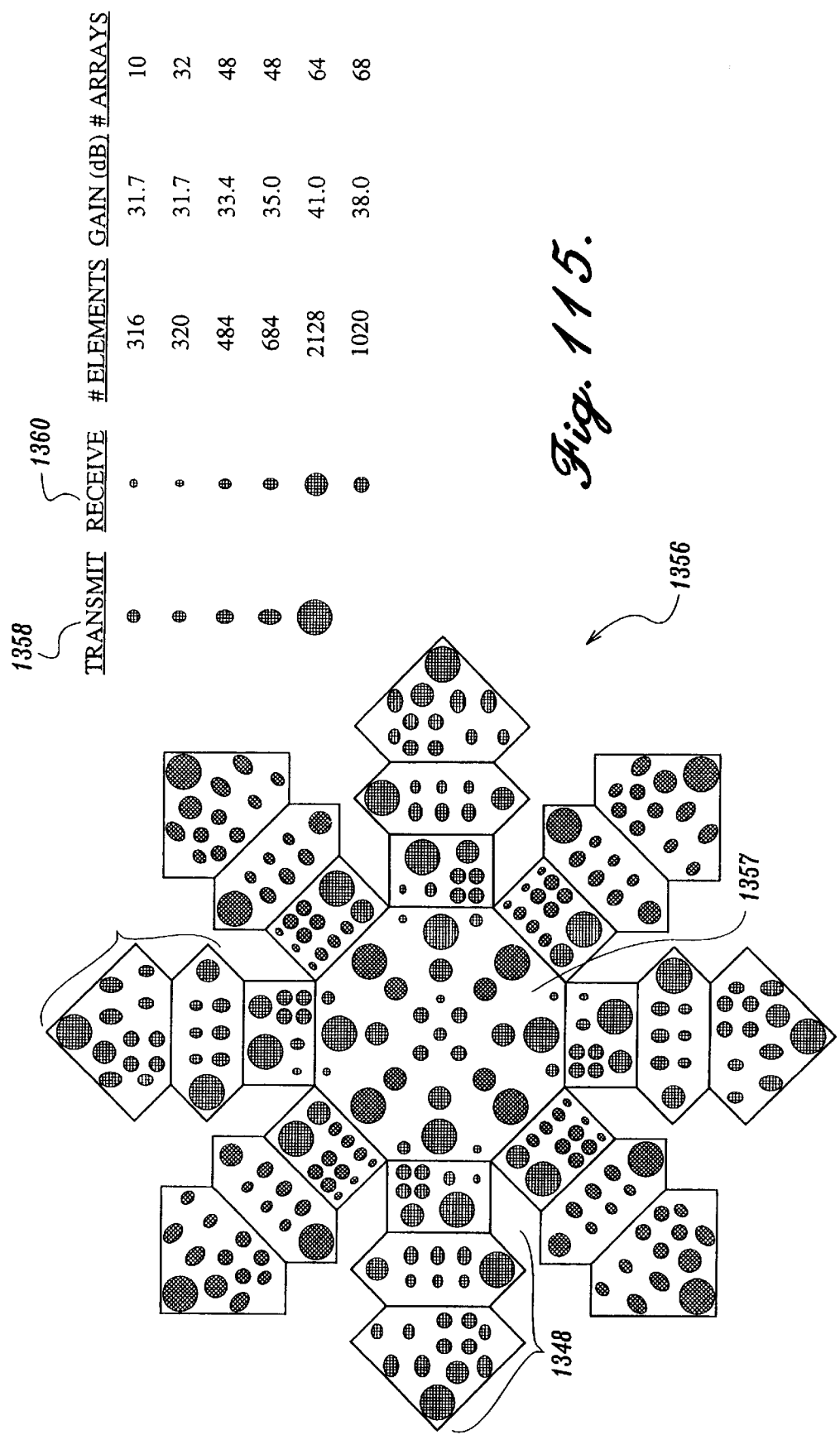
FIG. 115 is a view of the antenna panels on the "underside" of the Callingsat™ satellite illustrated in FIG. 114a as seen from Earth.

Within this buffer 1309, the packet is directed to the appropriate slot in the Earth-fixed cell beam 1219 currently serving a particular supercell. After the packet emerges from the switch 1302, it carries a channel designation 1306 that specifies some combination of time slot, frequency, coding scheme or terminal identifier, as well as a cell designation 1308 that specifies a time interval. The transmitter 1310 determines the frequency that will be used for the transmission of the packet based on the selected channel, and picks the time slot for transmission based on the selected cell. FIG. 112*b* furnishes another schematic block diagram 1311 which may be utilized to implement the present invention.

A Preferred Multiple Access Method

The present invention incorporates a multiple access method to enable multiple terminals to share a common set of communication resources. The preferred embodiment uses a combination of multiple access methods to insure efficient use of these resources, as shown in FIGS. 113*a*, 113*b* and 113*c*. These drawings 1312, 1316 and 1328 depict a cell scan pattern, a cell scan cycle, and channel multiplexing in a cell. Each cell 1226 within a supercell 1224 is assigned to one of nine equal time slots during which all communication takes place between the satellite and the terminals in that cell. The full frequency allocation is available within each cell/time slot. The cells are scanned in a regular cycle by the satellite's transmit and receive beams, resulting in time division multiple access (TDMA) among the cells in a supercell. The scan pattern shown in FIGS. 113*a* resembles a clockwise spiral 1314. The "central" cell of each supercell, shown as cell number nine in the scan pattern illustrated in FIGS. 113*a*, is illuminated in all supercells.

Since the propagation delay varies with path length, satellite transmissions are timed to insure that cell N of all supercells receive transmissions at the same time. Terminal transmissions to a satellite are also timed to insure that transmissions from cell N of all supercells arrive at the satellite at the same time. Physical separation (space division multiple access, or SDMA) eliminates interference between cells scanned at the same time in adjacent supercells. This SDMA method is shown in the diagram 1312 contained in FIG. 113*a*. The nine cells 1318 of each supercell numbered one through nine according to the cell scan pattern rune across the top of the figure, while supercells 1320 numbered one through sixty-four extend down the left side of the drawing. The scan cycle 1322 per supercell is 23.111 msec, and the transmit/receive time 1324 per cell is 2.568 msec. Guard intervals 1326 lasting 0.292 msec eliminate overlap between signals received from time-consecutive cells.

FIG. 113*c* is a schematic depiction 1328 that portrays the details of channel multiplexing in a cell. The left side of the figure pertains to the uplink 1330 and the right side of the figure pertains to the downlink 1332. The bandwidth is indicated by reference numeral 1342. Within each cell time slot, terminals use Frequency Division Multiple Access (FDMA) on the uplink 1330 and Asynchronous Time Division Multiple Access (ATDMA) on the downlink 1332. On the FDMA uplink each active terminal is assigned one or more frequency slots for the call duration, and it can send one packet per slot each scan period (23.111 msec). The number of slots assigned to a terminal determines its maximum available transmission rate. One slot corresponds to a fixed terminal 16 Kbps basic channel with its 2 Kbps signaling and control channel. A 64 Kbps channel with a 8 Kbps control channel requires four frequency slots. A total of 1,440 slots per cell are available for fixed terminals, and ninety are available for mobile terminals.

The ATDMA downlink does not use a fixed assignment of time slots to terminals. During each cell scan interval, the satellite transmits a series of packets addressed to terminals within that cell. Packets are delimited by a unique bit pattern, and a terminal selects those addressed to it by examining each packet's address field. To compensate for the mobile's lower gain antenna, the bit (and packet) duration of packets sent to a mobile terminal is 16 times that for a fixed terminal. The downlink to a cell has 1,440 time slots, which support 1,440 fixed terminal packets per scan period, 90 mobile terminal packets or a combination of the two. The satellite transmits only as long as it takes to send the packets buffered for the cell. ATDMA takes advantage of the bursty nature of most communication: since packets are not transmitted during "silent" intervals, satellite power is conserved. In addition, it minimizes packet delay because a terminal is not limited to one packet per time slot per scan.

The combination of Earth-fixed cells and multiple access methods results in high spectral efficiency. The available channel resources are reused in each supercell 20,000 times across the Earth's surface.

The Preferred Spacecraft Design: Callingsat™ Overview

The preferred embodiment of the present invention utilizes a satellite design named Callingsat™. The preferred embodiment of Callingsat™ includes a foldable, high-gain, electronically steered antenna array which is always pointed toward the Earth, and which resembles an oblate flower. A group of polygonal antenna panels are attached to each other and to a primary bus structure by antenna deployment hinges. The upper portion of the satellite incorporates an array of individual intersatellite antennas, which are always pointed tangentially to the Earth and towards the intersatellite antenna arrays of other satellites within the satellite constellation. An Astromast™ boom is mounted between the space-facing surface of the primary bus structure and an assembly of solar array storage booms. The Astromast™ boom can expand and rotate amorphous silicon solar arrays which are unfurled from within the solar array storage booms. The amorphous silicon solar arrays gather solar radiation to provide power the satellite, and also provide thermal control for the satellite by shielding the satellite from solar radiation. The satellite is capable of being nested or stacked in a compact arrangement that fits within a payload bay of a launch vehicle.

Figure 116:
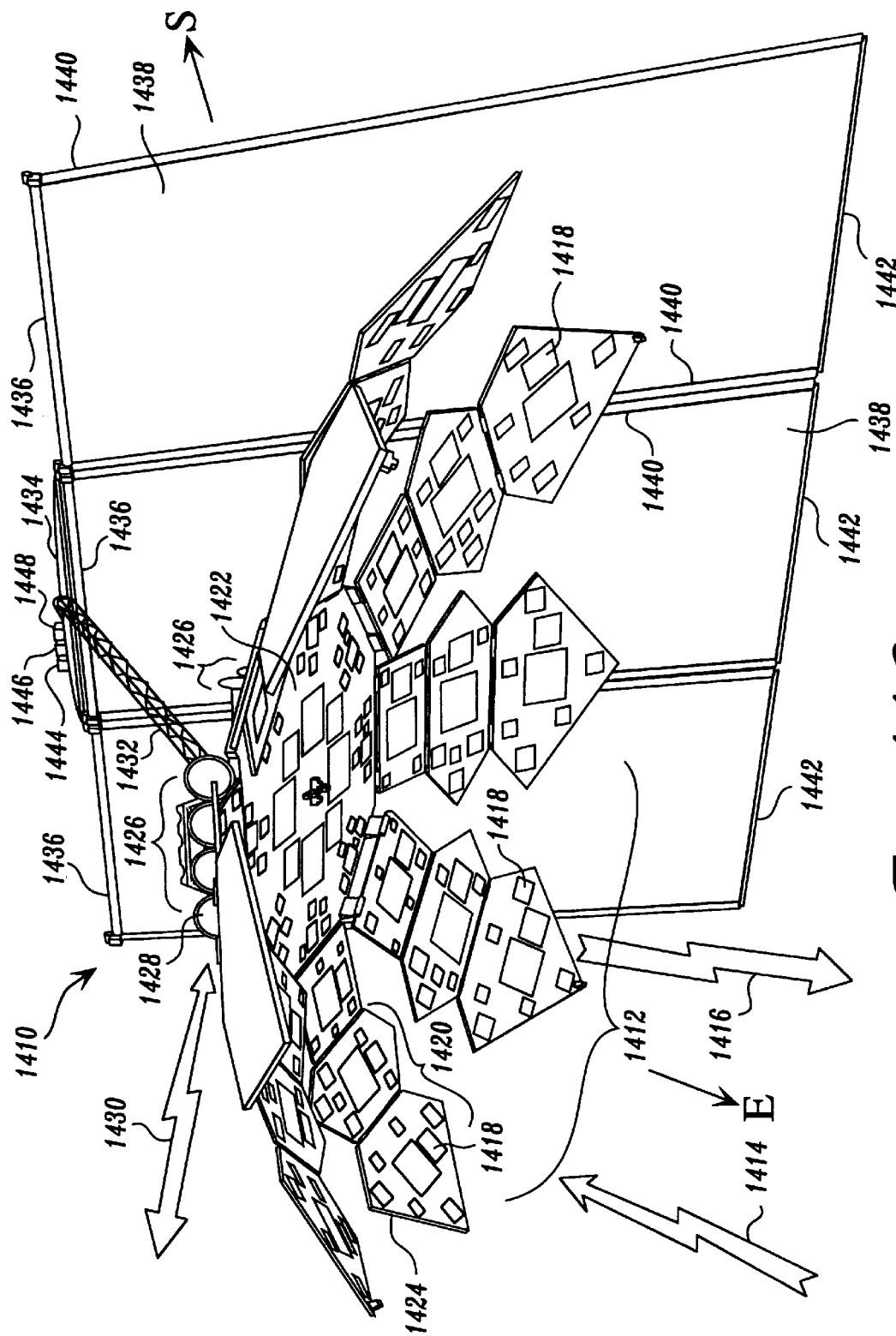
FIG. 116 is an illustration of the Callingsat™ satellite, as it would appear in its fully opened and deployed position in low Earth orbit. This illustration shows how the present invention would be deployed to provide communications links to Earth and to other Callingsats™ in its constellation.

FIG. 116 is an illustration of the Callingsat™ 1410 shown as it would appear in its fully opened and deployed position in low Earth orbit. An Earth-facing antenna array 1412 is used to provide reception of 30 GHz uplinks 1414 and also to provide transmission of 20 GHz downlinks 1416. The Earth-facing antenna array 1412 comprises individual electronically steered phased-array antennas 1418 located on eight mobile, fixed terminal satellite link M/FTSL antenna panel sets 1420 and on the Earth-facing surface of the primary bus structure 1422. Each M/FTSL antenna panel set 1420 has three adjoining antenna facet panels 1424. The M/FTSL panels are deployed at angles with respect to the Earth's surface that limit the required steering angle from the satellite to the portion of the Earth surface served by this antenna. Four intersatellite link ISL antenna arrays 1426 are located on the space-facing surface of the primary bus structure 1422. Four individual ISL antennas 1428 make up each of the ISL antenna arrays 1426. The ISL antennas 1428 are able to receive and to transmit 60 GHz intersatellite links 1430. The 60 GHz intersatellite links 1430 provide communication among the constellation of Callingsats™.

An expandable Astromast™ boom 1432 such as that produced by Astro-Spar of Carpenteria, Calif., is mechanically coupled to the primary bus structure 1422, and at full extension can reach approximately 12 meters in length. A boom crossmast 1434 is mechanically coupled to the far end of the Astromast™ boom 1432. A solar array storage boom 1436 is attached to the boom crossmast 1434. Two more solar array storage booms 1436 are coupled to opposite ends of the first solar array storage boom 1436. An amorphous silicon solar array 1438 extends from each of the solar array storage booms 1436. Inflatable booms 1440 extend from each end of the solar array storage booms 1436, and are attached to the amorphous silicon solar arrays 1438. A cantilever boom 1442 is attached to the far end of each of the amorphous silicon solar arrays 1438, between each pair of inflatable booms 1440. Structural support for each of the thin, generally rectangular, amorphous silicon solar arrays 1438 is provided by the framework created by each solar array storage boom 1436, a pair of inflatable booms 1440, and a cantilever boom 1442.

Pulse plasma thrusters 1444, storage batteries 1446, and shunt regulators 1448 are attached to the boom crossmast 1434. Propulsion for the Callingsat™ 1410 is provided by six pulse plasma thrusters 1444, which in this embodiment are produced by Olin RRC. The pulse plasma thrusters 1444 provide propulsion to accomplish maneuvers such as orbit insertion, drag make-up, station keeping, and de-orbit that is required at the end of the lifetime of a Callingsat™ 1410. Each of the pulse plasma thrusters 1444 is designed to provide 60 kN * sec of thrust. This configuration affords the advantages of redundant propulsion, and also insures reliable service for the lifetime of the satellite 1410.

FIG. 117 is a perspective view 1450 of the assembled Callingsat™ 1410, before it is launched and deployed in low Earth orbit. Many of the components of the Callingsat™ 1410 are designed to be stored, folded, or manipulated to achieve as small a volume as possible. This design provides an extremely compact structure that can be delivered into space at the lowest cost. Four M/FTSL antenna panel sets 1420 located at opposing corners of the primary bus structure 1422 are folded inward to become the inner antenna arrays 1452. The remaining four M/FTSL antenna panel sets 1420 that are also attached to the primary bus structure 1422 are also folded inward to become the outer antenna arrays 1454.

Two component storage compartments 1456 are located on the upper surface of the primary bus structure 1422. Two ISL antenna arrays 1426 are attached to the exterior of the component storage compartments 1456. The amorphous silicon solar arrays 1438 and inflatable booms 1440 are stored inside their respective solar array storage booms 1436, which are folded together and are mounted to the primary bus structure 1422 by two modular aluminum solar array attachment structures 1458. Two additional ISL antenna arrays 1426 are attached to the solar array attachment structures 1458. The component storage compartments 1456 are used to house much of the required internal systems, such as the command and data handling subsystem 1460, the attitude/orbit determination and control subsystem 1462, and the communications payload subsystem 1464.

Figure 118:
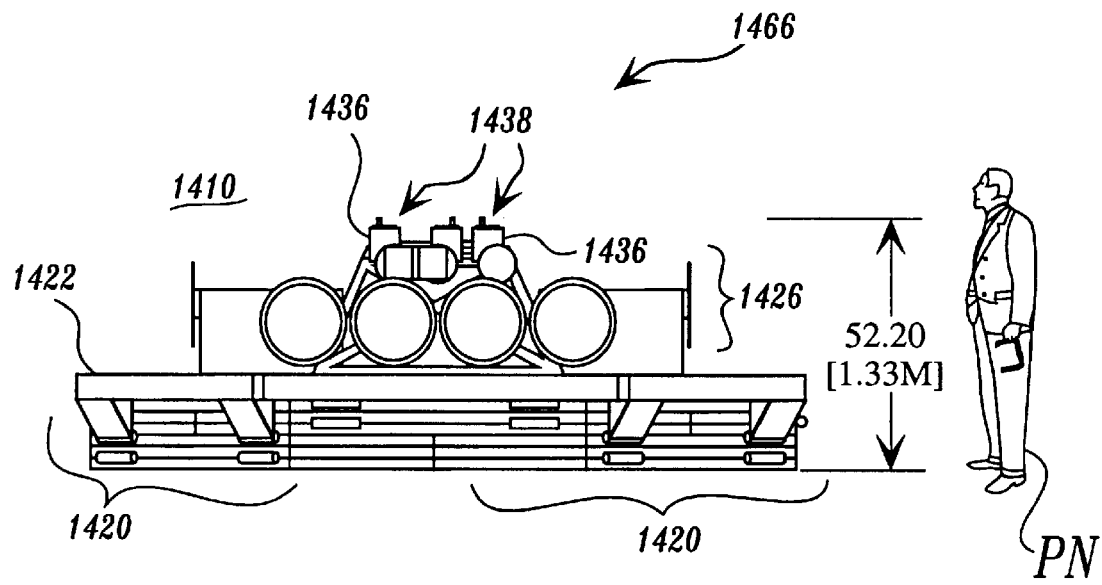
FIG. 118 is a front view of the assembled Callingsat™, which shows a lower region in which the folded antenna arrays are located, and an upper region where intersatellite antennas, extension and storage booms, and solar arrays are located.

FIG. 118 provides a front view 1466 of the assembled Callingsat™ 1410, which shows how the M/FTSL antenna panel sets 1420 are folded underneath the primary bus structure 1422. FIG. 118 also illustrates how the amorphous silicon solar arrays 1438 are stored effectively within the solar array storage booms 1436. The scale of the assembled Callingsat™ 1410 is suggested by a person P standing approximately two meters tall alongside the Callingsat™ 1410.

Figure 119:
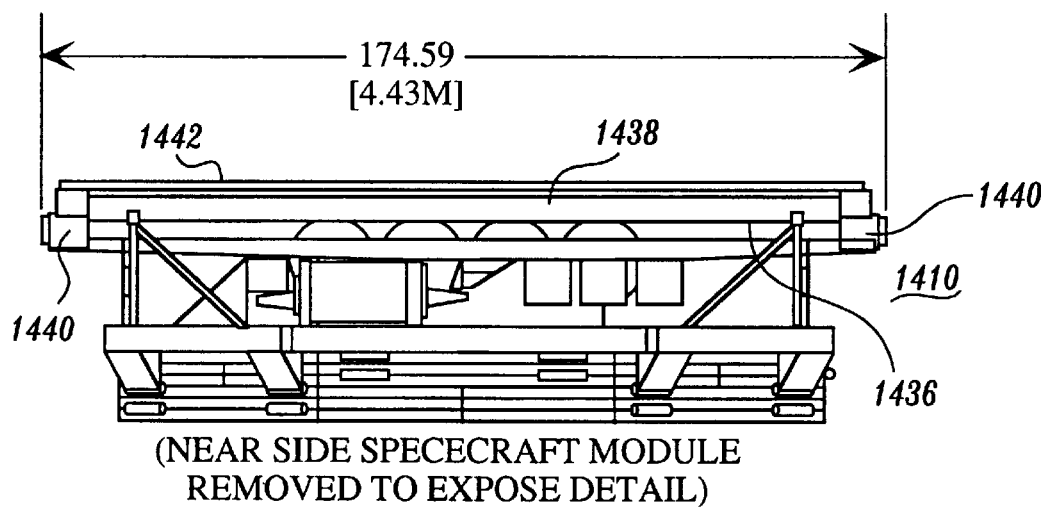
FIG. 119 offers a detailed side view of the assembled Callingsat™ in its predeployed state. From this view, details of one of the three solar array storage booms can be seen.

FIG. 119 offers a detailed side view 1468 of the assembled Callingsat™ 1410. From this view, details of one of the three solar array storage booms 36 can be seen. Cantilever booms 1442 extend between both ends of the solar array storage booms 1436. Before deployment, the amorphous silicon solar arrays 1438 and the inflatable booms 1440 are stored within the solar array storage booms 1436.

Figure 123:
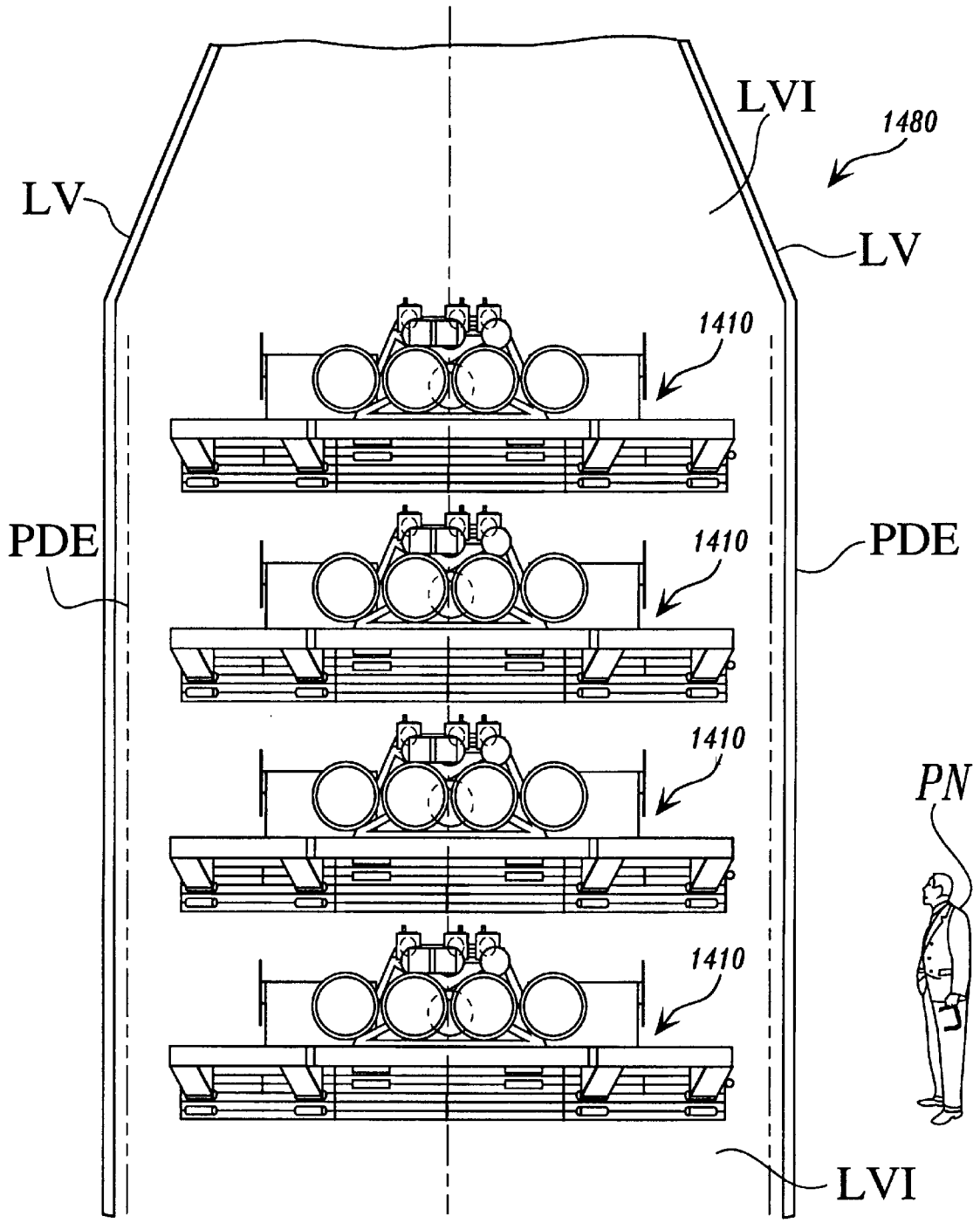
FIG. 123 is a side cutaway view of a launch vehicle with a payload of Callingsats™.

FIG. 120 is a front view 1470 of an assembled Callingsat™ 1410 before being placed into a launch vehicle LV. After a final inspection, the Callingsat™ 1410 is placed in the payload dynamic envelope PDE within the interior LVI of the launch vehicle LV, as seen in the cutaway top view 1474 illustrated in FIG. 122. FIG. 123 provides a bottom cutaway view 1478 of a Callingsat™ 1410 stored within the payload dynamic envelope PDE in the launch vehicle LV. This view shows how the geometric design for the antenna facet panels 1424 is chosen to supply a large amount of surface area for placement of antennas 1418, while simultaneously providing an extremely compact folded structure.

FIG. 123 provides a side cutaway view 1480 of a launch vehicle LV with a payload of Callingsats™ 1410. A number of Callingsats™ 1410 are located within the payload dynamic envelope PDE area of the interior LVI of the launch vehicle LV. The advanced design techniques employed by the present invention allow a large quantity of Callingsats™ 1410 to be placed within the payload dynamic envelope PDE, which insures that each Callingsat™ 1410 is deployed at minimum cost. To provide a sense of scale, a person P approximately two meters tall is shown standing near the launch vehicle LV before it is launched.

Figure 124:
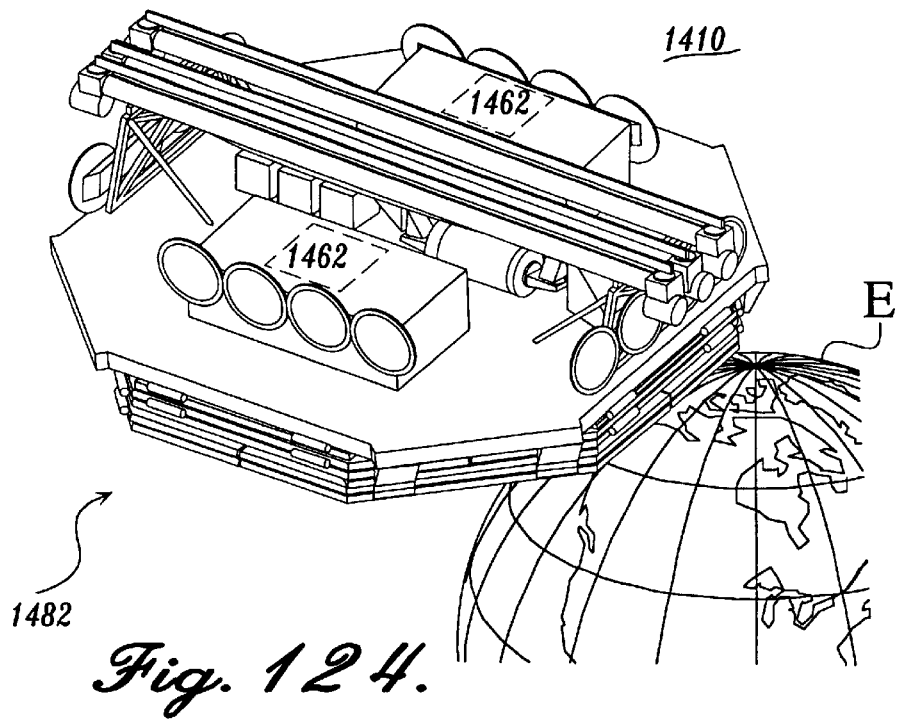
FIG. 124 is an illustration of a Callingsat™ deployed in low Earth orbit.

FIG. 124 is an illustration 1482 of a Callingsat™ 1410 being deployed into a low Earth orbit, after it has been launched from the launch vehicle LV. The launch vehicle LV is capable of deploying Callingsats™ 1410 either one at a time or in multiple groups. The attitude/orbit determination and control subsystem 1462 located within the Callingsat™ 1410 determines its current location, and compares it with the intended orbit location above the Earth. The attitude/orbit determination and control subsystem 1462 then provides the control logic necessary to activate the pulse plasma thrusters 1444 to guide the spacecraft 1410 into its correct orbit location.

Figure 125:
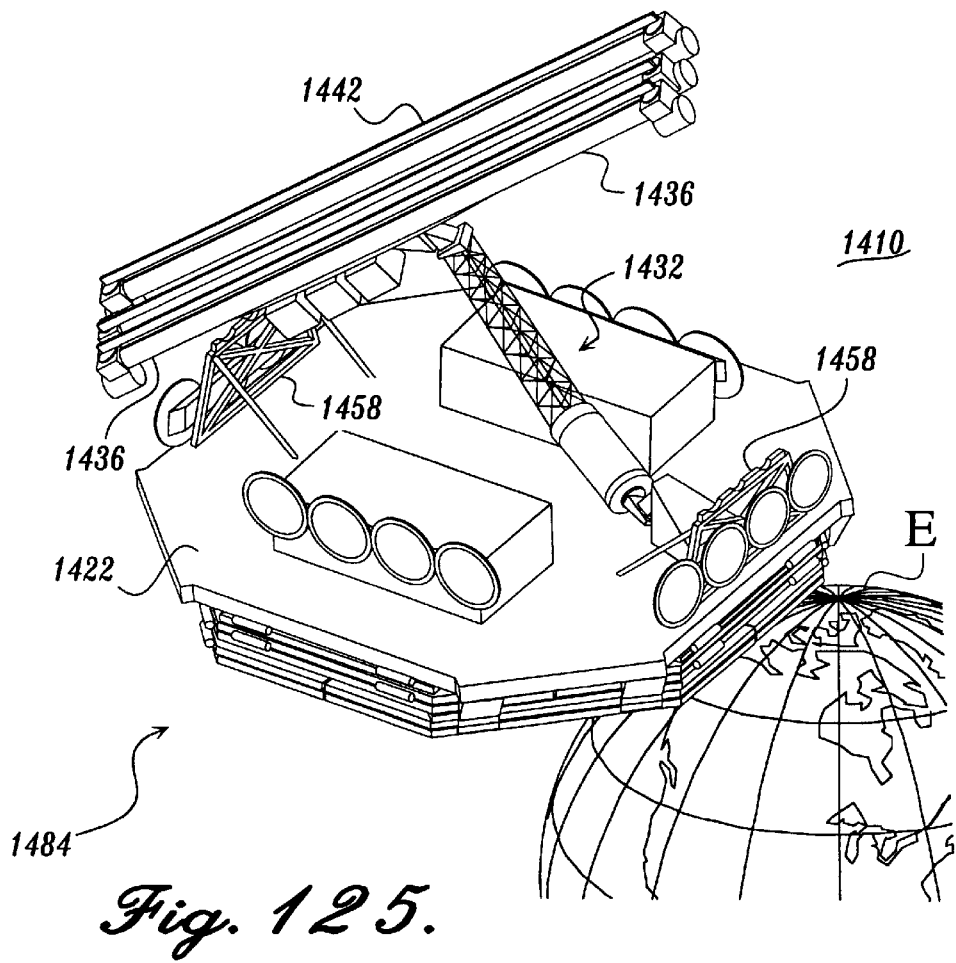
FIG. 125 is an illustration of a deployed Callingsat™ that depicts how the solar array storage booms would first detach from the rest of the satellite.

As the guided Callingsat™ 1410 approaches correct orbit location above the Earth E, the attitude/orbit determination and control subsystem 1462 provides the logic necessary to begin deployment of the Astromast™ boom 1432 and the solar array storage booms 1436. FIG. 125 is an illustration 1484 that shows how the solar array storage booms 1436 are disconnected from the solar array attachment structures 1458, using spring-loaded, pyrotechnic, or other suitable means to promote detachment. Upon detachment, the Astromast™ boom 1432 rotates axially about its couplings with the primary bus structure 1422 and the boom crossmast 1434, while simultaneously expanding lengthwise to move the solar array storage booms 1436 away from the primary bus structure 1422.

Figure 126:
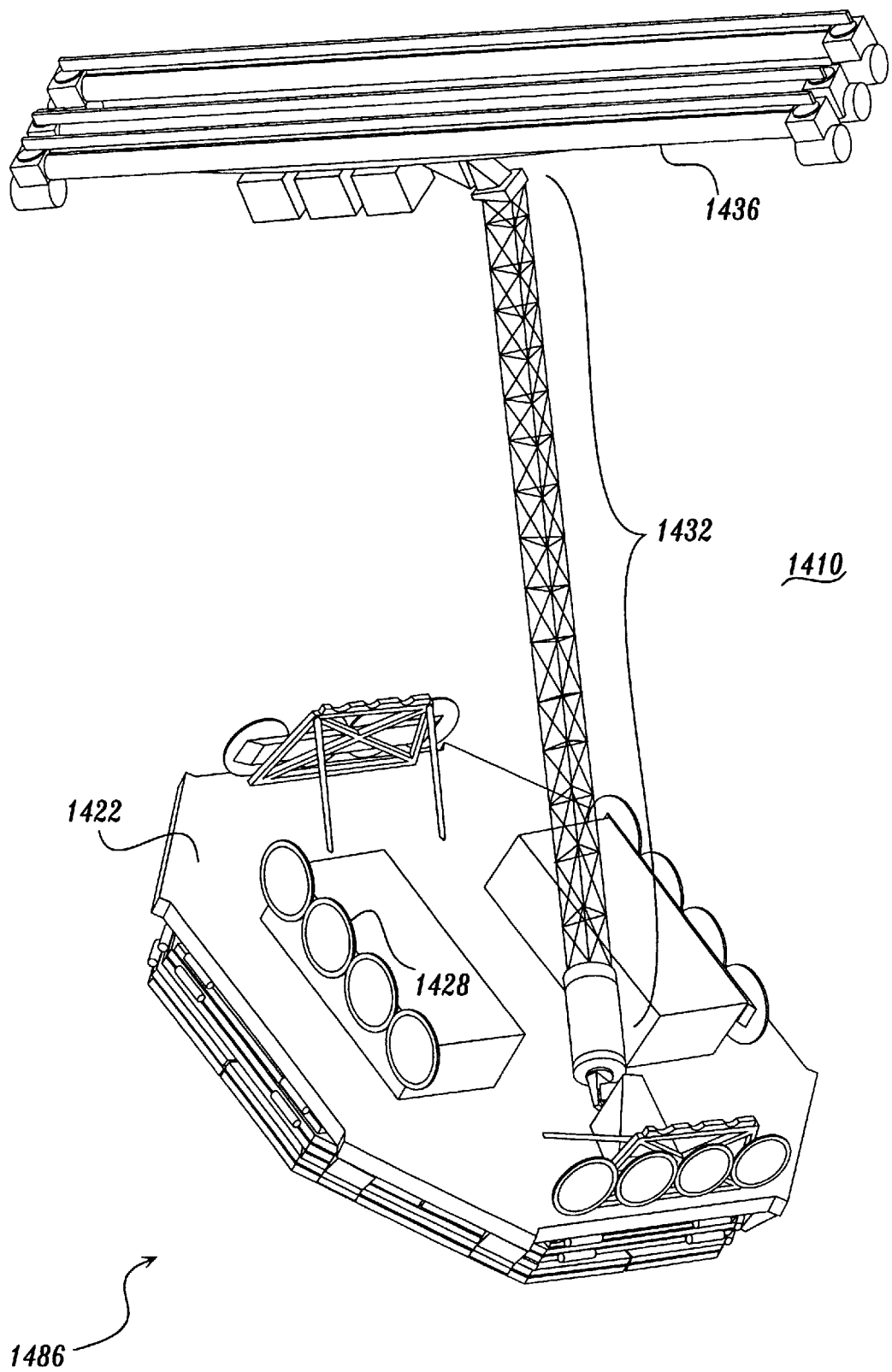
FIG. 126 shows an illustration of a deployed Callingsat™ with an extending Astromast™ boom.

FIG. 126 provides a view 1486 of a deployed Callingsat™ 1410 in which the Astromast™ boom 1432 has expanded to distance the solar array storage booms 1436 from the primary bus structure 1422. The attitude/orbit determination and control subsystem 1462 provides the adjustment for pitch and roll reaction to the inertial moment created by the distance of the solar array storage booms 1436 from the primary bus structure 1422.

The Astromast™ boom 1432 continues to extend to its full length. The satellite antennas and electronics operate most efficiently at low temperatures. They can most effectively dissipate the heat generated in their operation by radiating this heat via the back side of the M/FTSL antenna panel sets 1420 into "cold space" which has an ambient temperature of approximately 4 degrees Kelvin. If the radiation of the suns is allowed to impinge directly on the back surface of the M/FTSL antenna panel sets, this increases the effective ambient temperature, which would result in less efficient thermal dissipation, a higher operating temperature, and less efficiency. The present design uses the amorphous silicon solar arrays 1438 as a sun shade to effectively shield the Callingsat™ 1410 from the sun and thus to reduce the effective ambient temperature of the space into which the Callingsat™ 1410 dissipates heat. This is done by using amorphous silicon solar arrays 1438 that when fully extended on the Astromast™ boom 1432 between the Callingsat™ 1410 and the suns and oriented perpendicular to the suns, casts a shadow that completely covers the Callingsat™ 1410, including all antenna facet panels 1424. The amorphous silicon solar array position that provides maximum shading also provides the most efficient solar energy generation, since the array surface is maintained perpendicular to the sun's rays. The extension of the Astromast™ boom 1432 provides sufficient distance between the primary bus structure 1422 and the amorphous silicon solar arrays 1438, which, in turn, furnishes the required radiation shielding for the antennas 1418 and the ISL antennas 1428. In this embodiment, the Astromast™ boom 1432 is approximately twelve meters long when fully extended.

Figure 127:
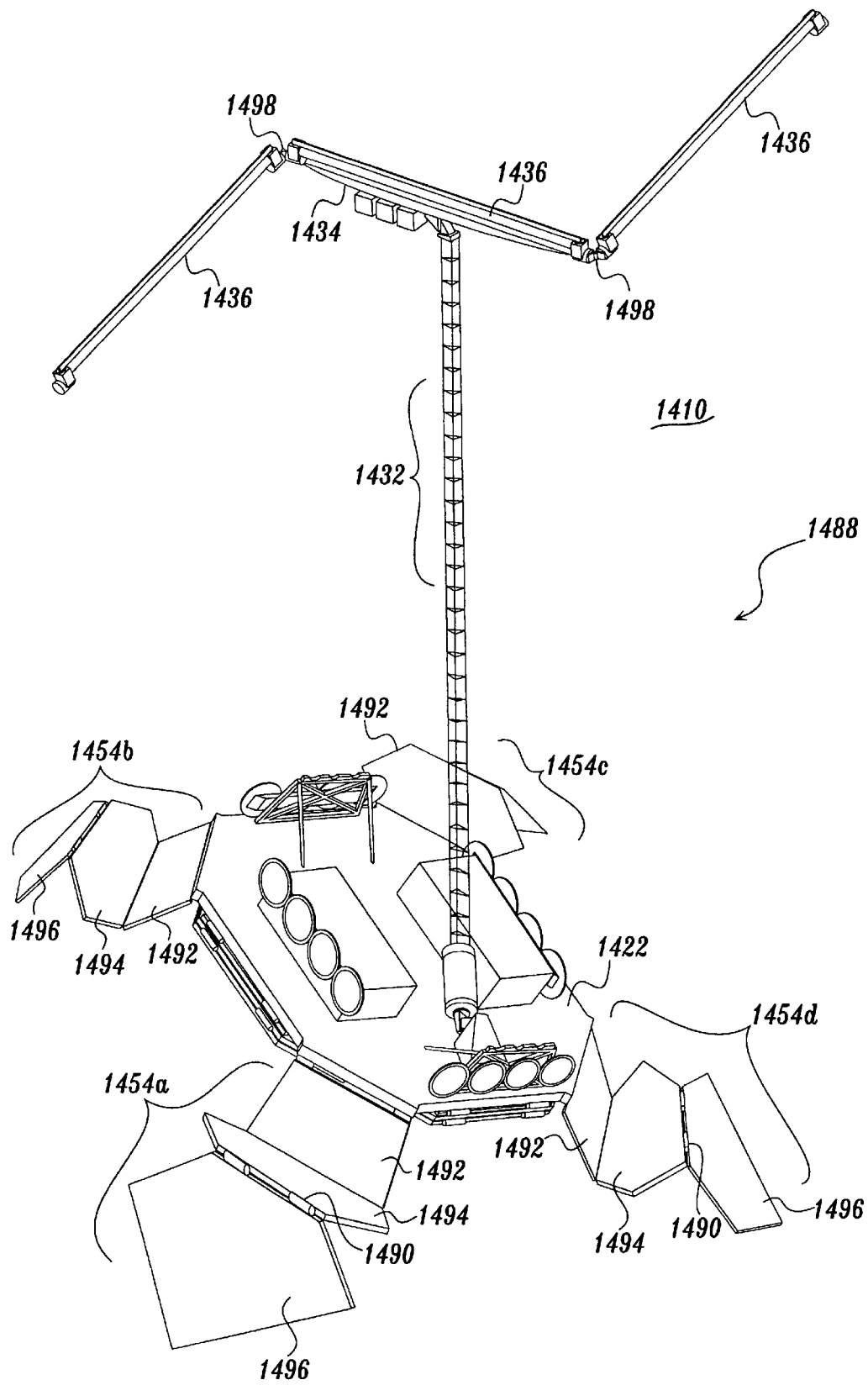
FIG. 127 depicts the expansion of the solar array storage booms and the extension of the outer antenna arrays during deployment of the Callingsat™ in low Earth orbit.

FIG. 127 is a illustration 1488 which depicts the extension of the outer antenna arrays 1454. The outer antenna arrays 1454 are made up of four outer antenna arrays 1454a, 1454b, 1454c, and 1454d. They are located at four opposing corners of the primary bus structure 1422. The outer antenna arrays 1454 are each made up of an inner antenna panel 1492, a central antenna panel 1494, and an outer antenna panel 1496. Each outer antenna panel 1496 coupled in series to a pair of antenna deployment hinges 1490, a central antenna panel 1494, another pair of antenna deployment hinges 1490, an inner antenna panel 1492, another pair of antenna deployment hinges 1490, and to the primary bus structure 1422. When the outer antennas 1454 are expanded, the outer antenna panels 1496, the central antenna panels 1494, and the inner antenna panels 1492 are all unfolded, using the antenna deployment hinges 1490.

FIG. 127 also illustrates the expansion of the solar array storage booms 1436 as the Astromast™ boom 1432 reaches its fully extended length. The solar array storage booms 1436 are coupled to each other using boom hinge mechanisms 1498. The solar array storage booms 1436 use the boom hinge mechanisms 1498 to pivot away from their parallel stored position towards a coaxial arrangement.

FIG. 128 is an illustration 1500 which shows full extension solar array storage booms 1436 and the outer antenna arrays 1454. The solar array storage booms 1436 come into coaxial alignment with each other as the boom hinge mechanisms 1498 that couple them pivot to their extended positions. Each end of each solar array storage boom 1436 is coupled to a deployment mechanism 1508. In FIG. 128 the cantilever booms 1442 can be seen as they would be attached to the solar array storage booms 1436 in a parallel fashion between the deployment mechanisms 1508. The boom crossmast 1434 rotates to position the solar array storage booms 1438 correctly for expansion of the amorphous silicon solar arrays 1436. The pulse plasma thrusters 1444, the storage batteries 1446, and the shunt regulators 1448 are seen as they are located on the boom crossmast 1434.

As the outer antenna arrays 1454a, 1454b, 1454c, and 1454d continue to unfold away from the primary bus structure 1422, they begin to resemble the petals of an oblate flower. The outer antenna array sets 1454 are locked in place when the antenna deployment hinges 1490 reach the end of their designed travel.

FIG. 128 also illustrates how the inner antenna arrays 1452 begin to unfold as the outer antenna arrays 1454 expand away from the primary bus structure 1422. The inner antenna arrays 1452 are made up of four inner antenna arrays 1452a, 1452b, 1452c, and 1452d located at four opposing corners of the primary bus structure 1422, in between each of the outer antenna arrays 1454. The inner antenna arrays 1452 are each made up of an inside antenna panel 1502, a middle antenna panel 1504, and an outside antenna panel 1506. Each outside antenna panel 1506 is coupled in series to a pair of antenna deployment hinges 1490, a middle antenna panel 1504, another pair of antenna deployment hinges 1490, an inside antenna panel 1502, another pair of antenna deployment hinges 1490, and to the primary bus structure 1422. The inside antenna panels 1502 are attached to the primary bus structure 1422 at a different offset distance than the inner antenna panels 1492 of the outer antenna arrays 1454. This offset allows the inner antenna arrays 1452 and the outer antenna arrays 1454 to be advantageously stored in a minimum volume.

The expansion of the inner antenna arrays 1452 is similar to the expansion of the outer antenna arrays 1454, and entails the unfolding of the outside antenna panels 1506, the middle antenna panels 1504, and the inside antenna panels 1502 using the antenna deployment hinges 1490. The large surface area provided by the inner antenna arrays 1452 and the outer antenna arrays 1454 provides adequate room for the numerous antennas 1418 that make up the Earth-facing antenna array 1412, which is designed for large communications traffic within the Satellite Communications System.

Figure 129:
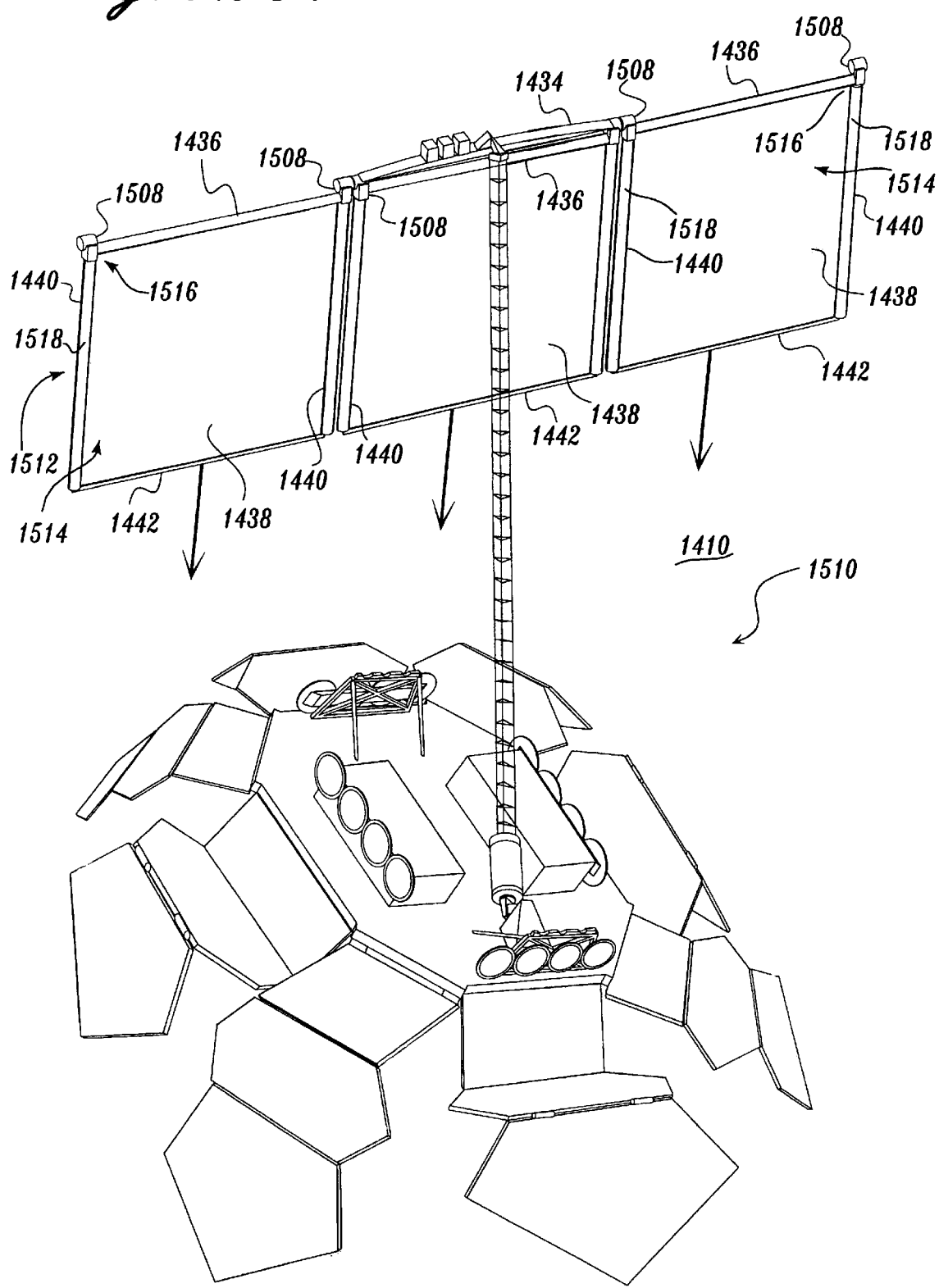
FIG. 129 illustrates the inflation and expansion of solar arrays from the solar array storage booms.

FIG. 129 is an illustration 1510 of the inflation and expansion of the amorphous silicon solar arrays 1438 from the solar array storage booms 1436. The specialized structure of the amorphous silicon solar arrays 1438 and the inflatable booms 1440 enable the large, extremely light weight, amorphous silicon solar arrays 1438 to be deployed from the Callingsat™ 1410 economically and reliably.

The amorphous silicon solar arrays 1438 comprise of photovoltaic cells 1512 located on a thin film substrate 1514. New polymer films, such as Mylar™ or Kapton™ are used for the film substrate 1514, which is attached to the photovoltaic cells 1512. Mylar™ and Kapton™ satisfy all the material requirements of the film substrate 1514, and offer a useful lifetime of many years in outer space.

The inflatable booms 1440 attached to the amorphous silicon solar arrays 1438 are expanded by gas pressure provided by inflation gas 1518 from within the deployment mechanisms 1508. The inflatable booms 1440 expand away from the deployment mechanisms 1508, and are used to unfurl the amorphous silicon solar arrays 1438 from their stored positions within the solar array storage booms 1436. In one embodiment, the inflatable booms 1440 have pleated, "accordion bellows" style structures. In another embodiment, the inflatable booms 1440 roll out to unfurl the amorphous silicon solar arrays 1438, in a similar fashion to a child's party favor. The inflatable booms 1440 provide an extremely effective, light weight means for supporting the light and flexible amorphous silicon solar arrays 1438.

Once the inflatable booms 1440 are fully inflated to unfurl the amorphous silicon solar arrays 1438, they are then rigidized to retain their inflated structure. A small amount of photocurable chemical vapor 1516 is deposited into the inflatable booms 1440 from within the deployment mechanism 1508. The photocurable chemical vapor 1516 mixes with the inflation gas 1518, and cures on the inner surface of the inflatable booms 1440 when it is exposed to ultraviolet radiation provided by the Sun S. As the photocurable chemical vapor 1516 cures, it forms a rigid surface on the inner walls of the inflatable booms 1440. The rigid inflatable booms 1440 then act together with the solar array storage booms 1436 and the cantilever booms 1442 to provide a long lasting ultralightweight framework for the amorphous silicon solar arrays 1438.

Other embodiments of the present invention employ different techniques to provide an efficient framework for the amorphous silicon solar arrays 1438. In one embodiment, continuous gas pressure is provided to provide sufficient rigidity for the inflatable booms 1440. In another embodiment, the amorphous silicon solar arrays 1438 and inflatable booms 1440 are combined to form an inflatable pillow-like structure that can be rigidized with photocurable chemical vapor 1516.

Figure 130:
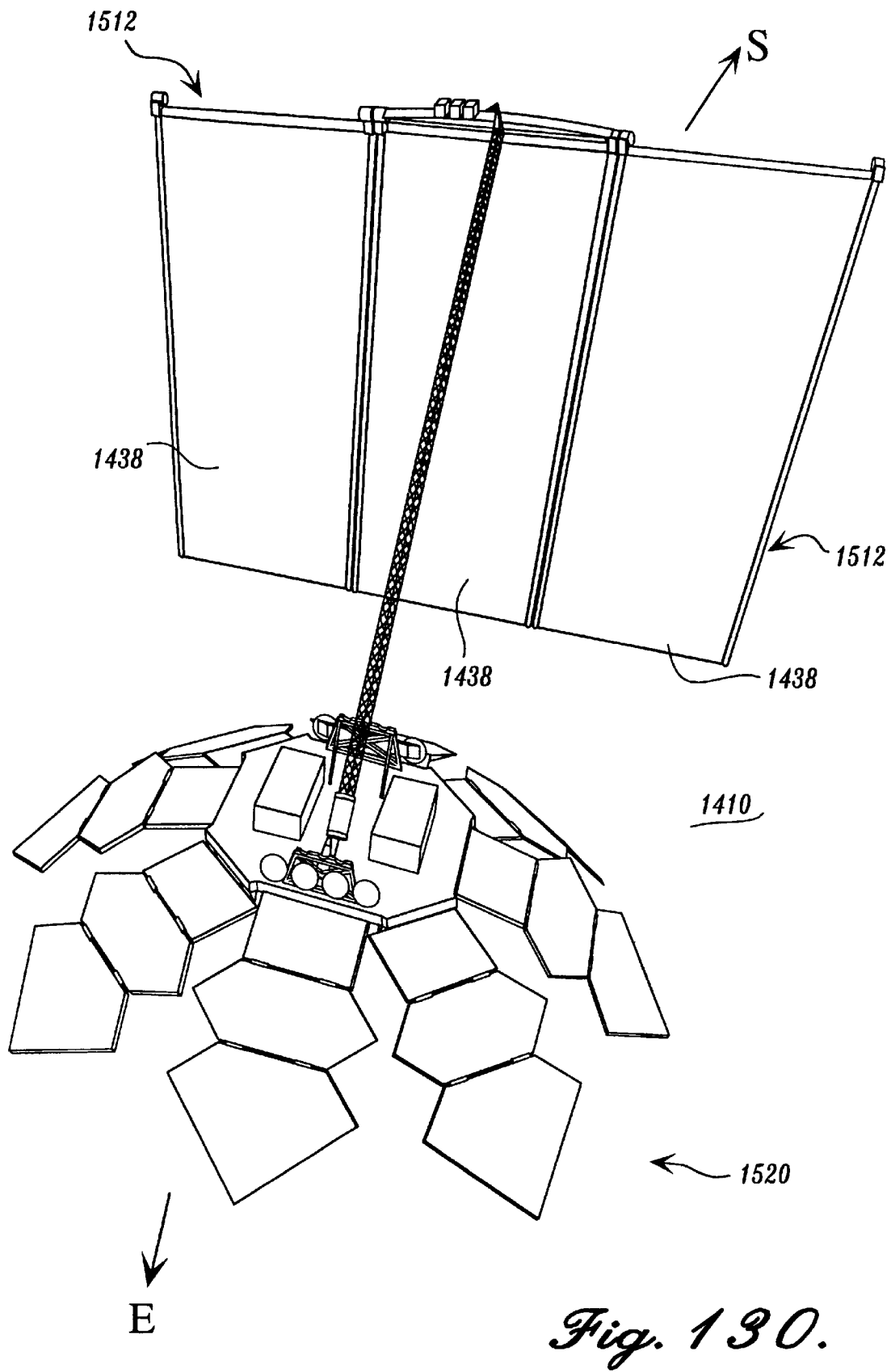
FIG. 130 provides a perspective view of the fully deployed solar arrays on the Callingsat™.

FIG. 130 provides a perspective view 1520 of the fully deployed amorphous silicon solar arrays 1438 on the Callingsat™ 1410. The amorphous silicon solar arrays 1438 provide power for the spacecraft 1410 through the photovoltaic cells 1512. The photovoltaic energy is produced directly from incoming solar energy when photons are absorbed in the semiconductor substrate photovoltaic cells 1512. Amorphous silicon is used in the preferred embodiment, since its irregular, non-crystalline arrangement allows highly efficient light absorption in an ultra-thin film. This amorphous silicon film is very lightweight, and is flexible, reliable, and extremely resistant to physical abuse. Excess power provided by the photovoltaic cells 1512 is stored in the storage batteries 1446. The amorphous silicon solar arrays 1438 also function as a solar heat shield for the Callingsat™ 1410, and provide an extremely lightweight and effective active thermal control device.

Many components in an orbiting satellite function properly only if they are maintained within a rather narrow temperature range. The temperatures of satellite components are influenced by the net thermal energy exchange between the satellite and its thermal environment, which is influenced by the magnitude and distribution of radiation input from the Sun S and the Earth E.

The objective of satellite thermal control design is to provide the proper heat transfer between all satellite elements so that temperature sensitive components remain within their specified temperature limits. Techniques used for satellite thermal control can be passive or active. Passive techniques include thermal coatings, thermal insulation and heat sinks. Active thermal control techniques include heat pipes, louvers, heat shields, and electrical heaters.

A satellite heat pipe is a thermal device that can provide a significant transfer of thermal energy between to regions on the satellite. A heat pipe comprises a closed cylinder whose inner surfaces are lined with a wick that provides a capillary effect. Heat in the warm portion of the pipe vaporizes a working fluid. The resulting pressure difference drive the vapor to the cooler end of the tube, where the vapor condenses and releases its latent heat of vaporization. The loss of liquid in the warmer area creates a capillary pressure that promotes movement of liquid from the cooler region to the warmer region, thus creating the continuous cycle required for heat transfer.

Figure 131:
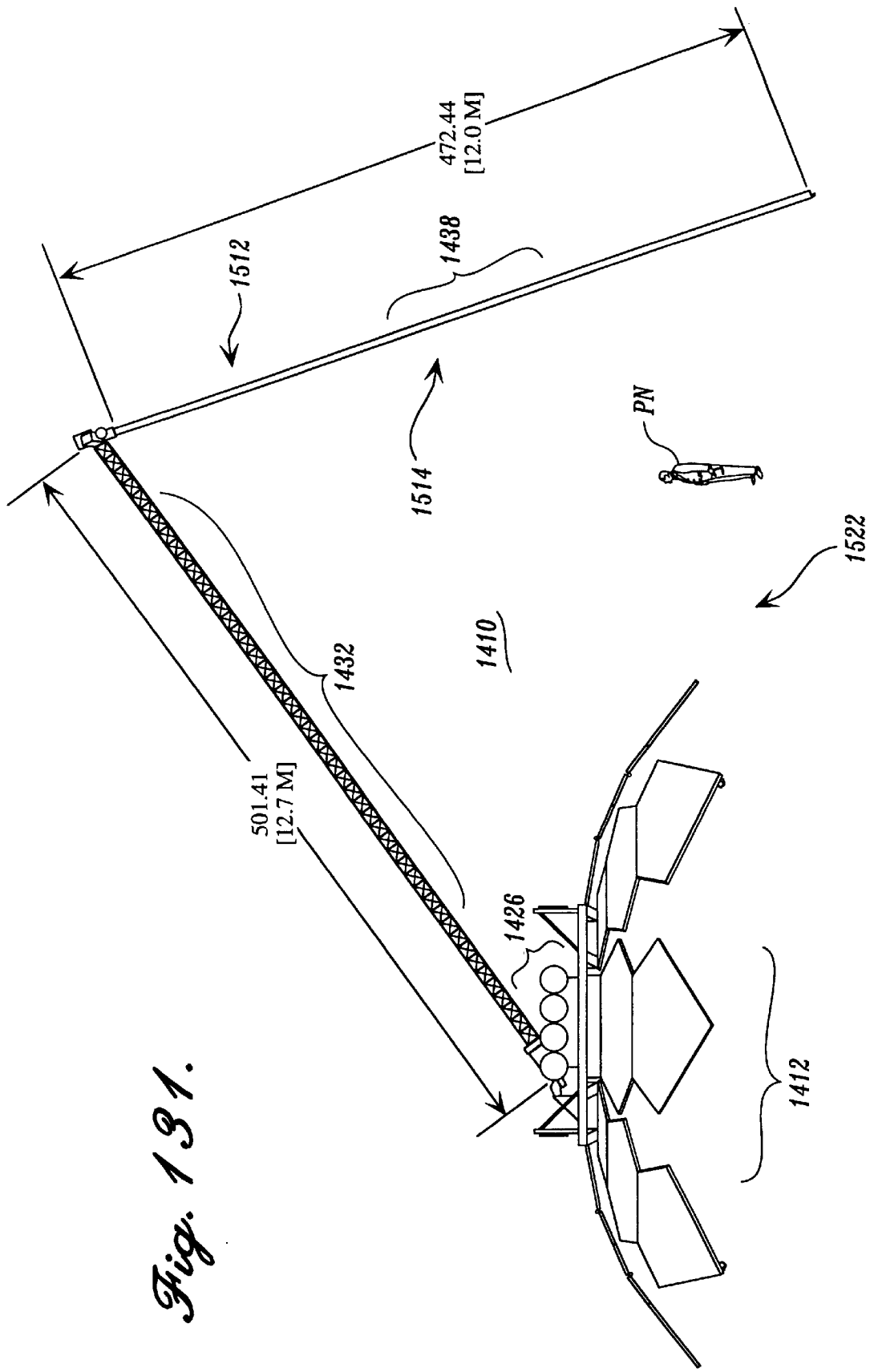
FIG. 131 is a side view of a fully extended and deployed Callingsat™.

FIG. 131 is a side view 1522 of a fully extended and deployed Callingsat™ 1410. This depiction shows how the advanced design of the Callingsat™ 1410 provides a large Earth-facing antenna array 1412 to provide a large volume of 30 GHz uplinks 1414 and 20 GHz downlinks 1416, and ISL antenna arrays 1426 to provide a large volume of 60 GHz intersatellite links 1430. This view also illustrates how the expandable Astromast™ boom 1432 is extended to position the amorphous silicon solar arrays 1438 correctly.

FIG. 132 is a front view 1524 of a fully deployed Callingsat™ 1410. This view portrays the large amorphous silicon solar arrays 1438 and shows how they provide thermal heat shielding for the Callingsat™ 1410. The amorphous silicon solar arrays 1438 supply a large surface area of photovoltaic cells 1512 which collect solar radiation and provide power for the Callingsat™ 1410.

Figure 133:
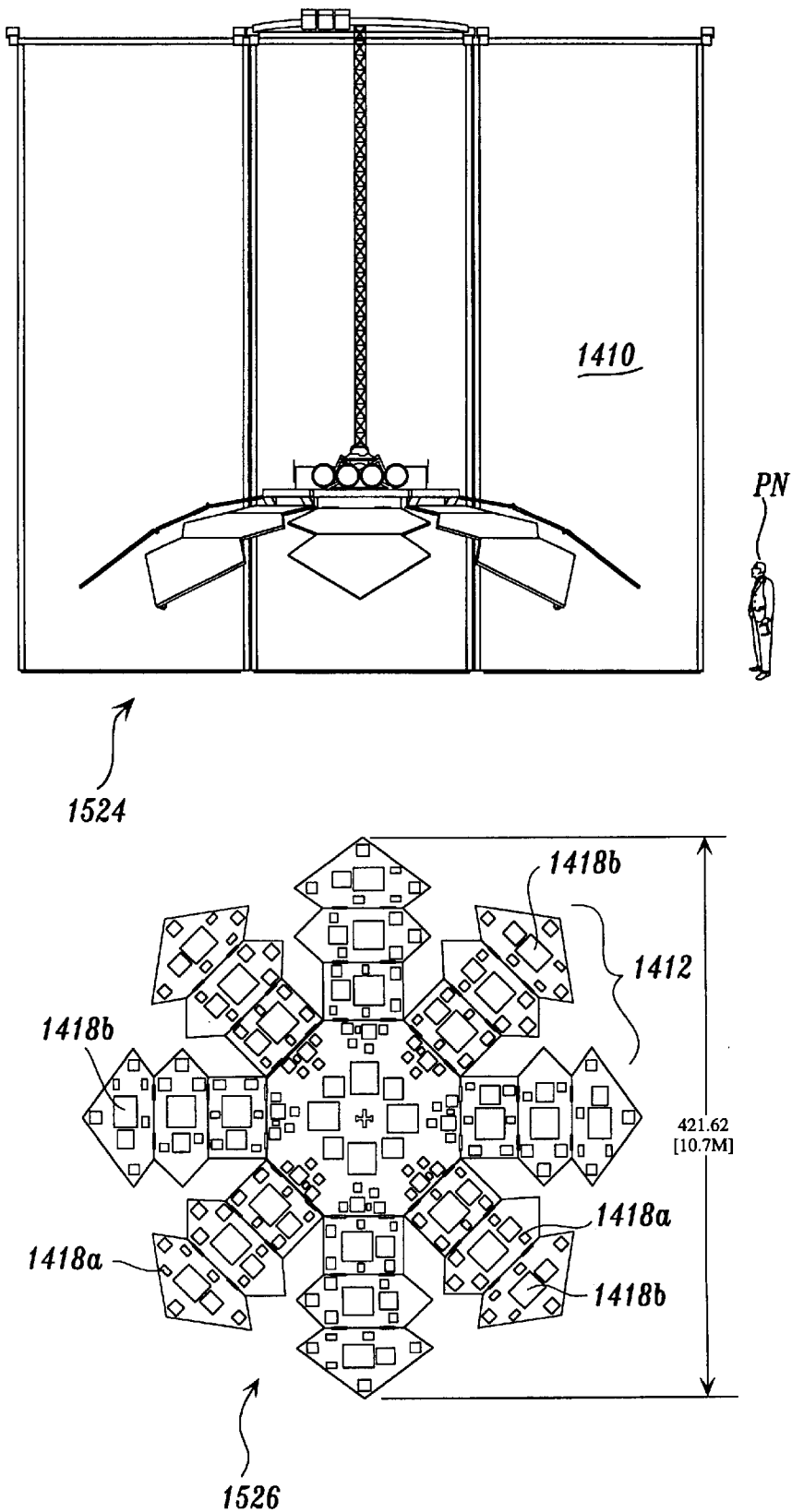
FIG. 133 is an illustration of the fully deployed Earth-facing antenna array used in the present invention.

FIG. 133 is an illustration 1526 of the fully deployed Earth-facing antenna array 1412 used in the present invention. The antennas 1418 located on the inner antenna arrays 1452, the outer antenna arrays 1454, and the primary bus structure 1422 consist of uplink antennas 1418a and downlink antennas 1418b. The uplink antennas 1418a are used to receive 30 GHz uplinks 1414, and the downlink antennas 1418b are used to transmit 20 GHz downlinks 1416.

Figure 134:
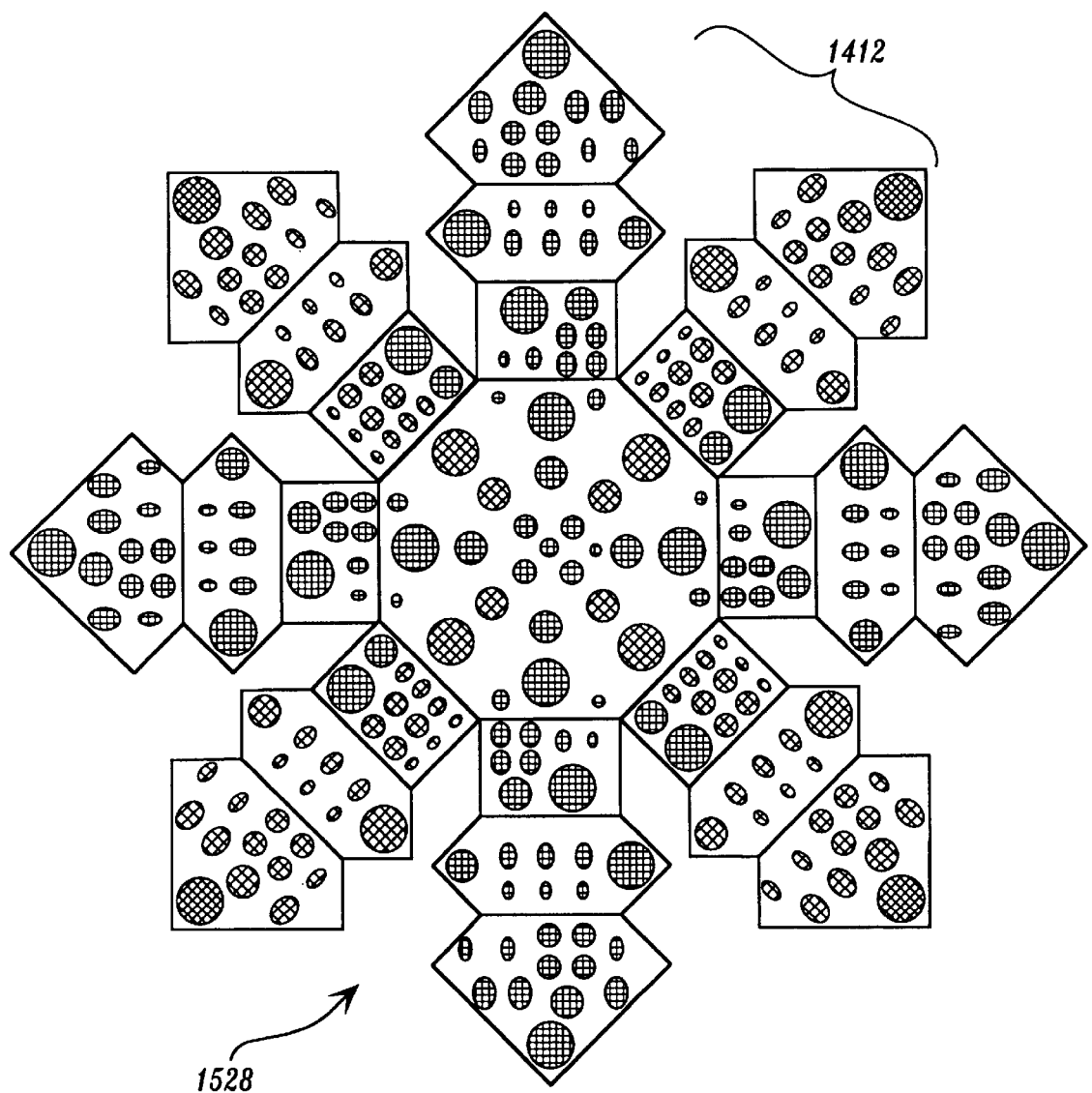
FIG. 134 is an embodiment of the Earth-facing antenna arrays.
Figure 135:
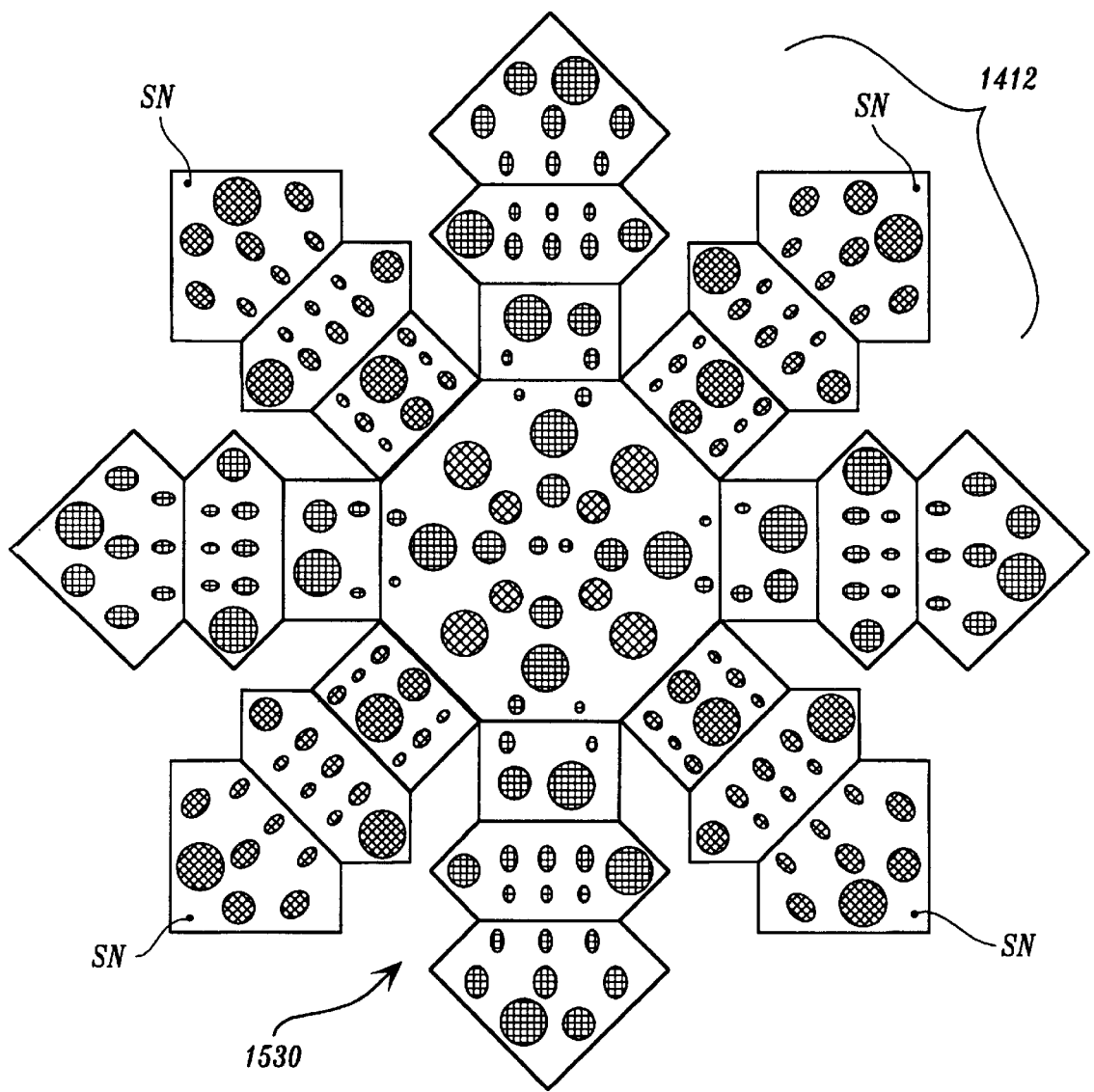
FIG. 135 provides another embodiment for the Earth-facing antenna arrays.

FIG. 134 is an alternate embodiment 1528 of the Earth-facing antenna array 1412. This embodiment features a different arrangement of uplink antennas 1418a and downlink antennas 1418b that are located on the inner antenna arrays 1452, the outer antenna arrays 1454, and the primary bus structure 1422. FIG. 135 illustrates another embodiment 1530 for the Earth-facing antenna array 1412. The pattern shown in FIG. 135 utilizes uplink antennas 1418a and downlink antennas 1418b that reside on the inner antenna arrays 1452, the outer antenna arrays 1454, and the primary bus structure 1422.

Advantages of the Present Invention
The Economics of Wireless Access

The unique competitive advantage of the present invention is its ability to deliver high-bandwidth services at a cost indifferent to location. This makes the present invention an ideal means of delivering high-bandwidth services to areas of moderate or low user density where, in the absence of cross subsidies, wireline access is uneconomic. This will allow the present invention to play a critical role in reconciling the twin policy goals of universal service and increased reliance on market forces in telecommunications.

In the United States, the telecommunications industry has been built around a regulatory structure that has as a central tenet the principle of universal access, which necessarily entails cross subsidization. In the wireline model, the cost of access is a function of the length of the loop. A residential access line costs the same amount for any given distance as a trunk line. However, a residential line might be in use, on average, 15 minutes per day—1% of the time—while a network trunk line might be in use 50% of the time. Obviously, the residential line is economically underutilized in comparison to the trunk line. Moreover, wireline access costs increase as proximity to the local exchange and subscriber density decrease. The cost of access for a distant rural subscriber can run 10 to 20 times (some estimates run as high as 30 times) that for some urban subscribers. Because the costs of wireline access are not uniform, universal access has required heavy cross subsidies from low-cost/high-revenue subscribers to high-cost/low-revenue subscribers.

The trend toward deregulation in telecommunications, if it is to continue, will erode these cross subsidies. Yet the principle of universal access remains fast; indeed, there are strong indications that it will be expanded to include at least some form of broadband service. This apparent conflict between deregulation and universal service is resolved by the economics of wireless access. The cost of wireless access, for the most part, is unrelated to distance from the local exchange and to subscriber density. Moreover, because access costs are not exclusively dedicated to particular end-users, utilization levels can be optimized over many subscribers. Wireless access can be provided to remote, rural subscribers without heavy cross subsidies. This, in turn, can clear the way for an expansion of market forces in the telecommunications industry.

The economics of wireless access apply as well to other countries that don't share the universal access principle. In these countries, the absence of cross subsidies and insufficient investment have often meant a lack of service to remote and many not-so-remote areas. In fact, vast regions of the developing world are completely without telephones. For example, Indonesia has almost 58,000 villages with over 2,000 people that have no access to telephone service; and approximately 535,000 villages in India and 121,000 of the 151,000 villages in Africa have no telephones. Moreover, many existing users in developing countries are served by antiquated telephone networks that require rapid enhancement. For example, some of the telephone systems in the former Soviet bloc are half a century out-of-date and are unsuitable for connection to Western European networks. The need for rapid growth is reflected by China's aggressive expansion plans that call for the addition of up to 80 million telephone lines by the year 2000—more than 50% of the installed base in the U.S.

Although not all unserved and underserved people overseas represent a viable market for services that will be offered by the present invention, many businesses, residences and individuals in these countries have both the ability and willingness-to-pay. The willingness-to-pay is indicated by the 40 million people on waiting lists for telephone service worldwide. Many of these applicants have demonstrated an ability-to-pay by paying very-high application fees years in advance of receiving service. Ability-to-pay is also demonstrated by long waiting lists in those developing countries where telephone service is more expensive than in the U.S. The point is that many of the millions of unserved and underserved people in developing countries have demonstrated the ability and willingness-to-pay for telephone service.

Spectrum Requirements

At lower frequencies, long wavelengths provide good penetration of buildings and foliage, and are not significantly affected by rain. Moreover, antenna technology and associated electronics are mature. As a result, the lower parts of the spectrum are congested. As a practical matter, not enough bandwidth can be aggregated at lower frequencies to achieve the critical mass required for a new wireless broadband service.

Short wavelengths at higher frequencies allow compact terminals and antennas to support high bandwidth applications. However, short wavelengths are more susceptible to terrain blockage and rain attenuation. These disadvantages can be mitigated by sending signals vertically rather than horizontally. This requires a satellite-based system. The lowest part of the spectrum with sufficient bandwidth for broadband applications with international allocation for satellite communications services is the "Ka-band" (20 to 30 GHz). The present invention utilizes a Ka-band satellite system to meet the wireless broadband challenge.

Satellite Systems: Geostationary v. Low Earth Orbit

The quality of real-time service is a function of total end-to-end transmission delay. Geostationary ("GEO") systems must orbit the Earth at an approximate altitude of 36,000 km above the Equator. Even at the speed of light, round-trip signal transmission entails a time delay of approximately a half second which is unacceptable for most real-time applications such as voice, videoconferencing and various data protocols. For this reason, U.S. long-distance carriers have moved most of their domestic and international real-time traffic off geostationary systems in favor of terrestrial and sub-sea fiber optic cables where available.

Moreover, geostationary satellites cannot provide service of uniform quality throughout the U.S. using frequencies that are susceptible to terrain and rain interference. The quality of service is dependent on a number of factors including the angle above the horizon at which the satellite can be "seen," termed the "mask angle." At low mask angles, signals have to penetrate more rain during a storm; also, there is a higher probability that a user's line-of-sight to the satellite will be obstructed by natural or man-made obstructions. For geostationary satellites the mask angle and quality of service depends on the satellites orbital location but generally declines with increasing latitude.

Another disadvantage of geostationary systems is that system assets are centralized in a very small number of satellites (usually just one). This means that any single satellite loss or failure is catastrophic to the system. To reduce this contingency to acceptable levels, satellite reliability must be engineered far along toward the point of diminishing returns where further gains in reliability are achieved only at a very high cost.

Low-Earth-orbit ("LEO") satellite systems operate somewhere above 525 km, to avoid excessive atmospheric drag, and below 1400 km, to avoid damage to satellite electronics and solar cells from charged particles in the inner-Van Allen radiation belt. This low altitude reduces path length and high channel rates reduce information coding delays; together they overcome the problem of excessive transmission delays thereby accommodating real-time applications. A low altitude also reduces signal loss and terminal power requirements. Moreover, in contrast to geostationary systems, the geodesic topology of large LEO systems is inherently more robust; much more so even than terrestrial networks.

The Solution Offered by the Present Invention:

A Constellation of 840 Satellites

The preferred embodiment of the present invention comprises a constellation of 840 satellites plus 84 functioning spares orbiting at an altitude of 700 kilometers. Each satellite is an intelligent switch node in the network and is linked with up to eight adjacent nodes to form a robust mesh topology. This "geodesic" structure is the model for decentralized networks such as the Internet, as opposed to the traditional hierarchical structures of the telephone industry. The number of satellites in the constellation is a function of the altitude of the satellites, the minimum vertical mask angle and other performance criteria. The altitude of 700 km is an optimization of the trade-off between atmospheric drag at lower altitudes and the need for higher powered terminals at higher altitudes. The minimum vertical mask angle of 40 degrees utilized by the preferred embodiment is intended to maximize service quality and reliability. Such a high mask angle minimizes signal path loss and the probability of terrain blocking and rain attenuation at Ka-band frequencies. The result of the design of the preferred embodiment is fiber-like delays over long distances and better than 99.9% availability in most temperate climate areas of the world.

The combination of a preferred 40 degree mask angle and 700 km orbit results in a relatively small footprint for each satellite. Each satellite serves only those users that are within a 700 km radius of the point directly under the satellite. To provide seamless coverage of the Earth's surface thus requires a large number of satellites in the constellation. The large number of satellites and small footprint also enable the use of a small cell size, which yields efficient use of spectrum, high channel densities, high system capacity and low transmitter power per channel.

The evolution from the centralized power of a single geostationary communications satellite to a constellation of smaller yet still powerful LEO communications satellites is similar to the evolution from mainframe computers to PCs. Distributing the system responsibilities among multiple independent satellites reduces the requirements, such as traffic throughput and power, for each individual satellite. Building redundancy into the constellation rather than each individual satellite results in higher system reliability while reducing the complexity and cost of the individual unit. Manufacturing and launching a large number of identical satellites also yields considerable economies of scale.

Global Scope

A geodesic Low-Earth-orbit satellite system is, necessarily, global in its coverage pattern. Utilization of the system assets is maximized through access to as many markets as possible. Like a vacant hotel room or airline seat, satellites idly deployed over a market represent an unrealized opportunity. Any given coverage area will have its own set of market characteristics and regulatory constraints. The network has been designed to provide the maximum degree of flexibility: The end-user can configure the network from moment-to-moment to accommodate everything from a high-quality voice channel (at 16 Kbps) to VCR-quality video using current compression technology (at 1.544 Mbps and beyond). This flexibility allows the present invention to serve the widest range of market demands and helps facilitate access to as many markets as possible.

Low Capital Cost per User

The preferred embodiment of the present invention was designed to achieve a capital cost per user competitive with urban wireline or cellular service. This requires high usable system capacity. Assuming for capacity measurement purposes a user equivalent to a basic 16 Kbps channel at a typical business usage rate (10% of the busy hour), the preferred embodiment can accommodate 20 million users in a realistic distribution pattern over the Earth's land masses. (Of course actual channel size will be higher reflecting a mix of channel bandwidths). At approximately 35% of system capacity the actual capital cost per user crosses below estimated future digital cellular systems, which have a lower cost per user than wireline networks. Unlike terrestrial networks, the low capital cost per user offered by the preferred embodiment is independent of location. This increases the preferred embodiment's comparative cost advantage in areas of moderate or low user density and in regions with inadequate terrestrial infrastructure.

System Capacity

Network capacity is often characterized and compared on the basis of a single parameter such as "number of subscribers," "number of simultaneous connections," "number of call attempts per hour," or "throughput in bits per second." For complex networks no single parameter is adequate to describe capacity, and such comparisons are often misleading. Capacity estimates based on the maximum theoretical capacity under the most favorable, but unrealistic, assumptions are equally misleading but often used. Factors such as the geographical distribution of users, their distribution of calls over time, their channel bandwidth requirements, and a host of other user characteristics and system constraints have a large effect on actual system capacity. The capacity limits of the preferred embodiment have been calculated using realistic, conservative assumptions.

The service area offered by the preferred embodiment of the present invention, the Earth's entire surface, is divided into a grid of 180,000 cells, similar in concept to the cells of terrestrial cellular systems. As a general rule for cellular systems, the smaller the cell, the higher the user density that can be served and the more efficiently the assigned spectrum can be reused within a service area, resulting in a higher system capacity for a given amount of spectrum. The cells are identical 53.3 by 53.3 km squares, with an area roughly equivalent to a large cell in a terrestrial cellular system, but extremely small and efficient compared with other satellite systems. The preferred embodiment uses a spectrum-efficient modulation and coding scheme that yields a capacity of over 1400 simultaneous full-duplex 16 Kbps connections within any cell. This 16 Kbps rate is used as the basic channel because it is the minimum that will support the high-quality voice service expected from a modem network. This equivalent basic channel rate is used to simplify and clarify capacity calculations, although 16 Kbps channels can and will be aggregated into a smaller number of high-rate channels for broadband applications. For example, a 1.544 Mbps T1 line would consume the same network access capacity as almost 100 basic 16 Kbps channels.

One of the advantages of wireless service is that system resources can be shared among users so that a given number of channels can efficiently support the demands of a larger number of users. For example, if the average user only needs a channel for 10% of the network's busy period (this usage level is referred to as 0.1 Erlang), then the preferred embodiment's 1400 channels per cell could support 14,000 users with a low probability that they will be blocked when they request a channel. Obviously, usage level has a large effect on capacity measured by "number of users;" the present invention uses a conservative estimate of 0.1 Erlangs per user.

For a cell-oriented system, network capacity is also a function of how evenly users are distributed among the cells. For capacity calculations it is unrealistic to assume an even distribution. Users tend to avoid locating themselves in vast regions of ocean, desert, and tundra (although the present invention could serve them well there). Instead, they tend to congregate in clusters of varying density, and to place heavier demands on the system during certain periods of the day. The capacity calculations assume that there will be an approximate correlation between user density and population density, and that traffic will follow its typical temporal distribution.

Reflecting these assumptions, the capacity limits of the preferred embodiment network are determined as follows: Starting at the cell level, any single cell can support over 1400 simultaneous basic channels, limited primarily by spectrum assignments and regulatory limits on radiated power density. Absent other constraints, this represents a theoretical global capacity of over 250,000,000 channels. Although this number does not represent realistic capacity, it is a useful indicator of the potential for future generations of the system and of the efficiency of spectrum use.

Resource constraints within each satellite (primarily switch throughput, intersatellite link capacity and power) limit its peak capacity to approximately 100,000 simultaneous connections, which is less than one-third of the total channel capacity of all cells within the average footprint. This reflects the assumption that users will not be evenly distributed among cells in a single footprint. Applying this satellite limit to the entire constellation yields a capacity of 84,000,000 simultaneous connections. However, satellites spend approximately 70% of their time over water (assumed to generate essentially no traffic), and even those satellites over land will not be evenly loaded. Using conservative assumptions for user distribution, the network can realistically support in excess of 2,000,000 simultaneous connections, representing over 20,000,000 users at typical business usage levels, and over 350 billion minutes of use per year.

These calculations assume a basic 16 Kbps channel for illustrative purposes. In fact, system capacity can and will be used for a range of channel bandwidths. For example, in the section of this document that describes revenue potential, a distribution of channel bandwidths is assumed; for the selected distribution the average bandwidth is 384 Kbps. In that calculation, system capacity is shared by just 227,000 "users." To the extent capacity is used for high-rate applications, the concept of "users" becomes rather abstract, as do any attempts to convey system capacity in terms that are easily understood in the more rigid context of conventional phone systems. The essential point is that the network has a very high total system capacity—roughly comparable to a U.S. Regional Bell Operating Company—and that capacity is highly flexible, allowing it to conform to the end-user's needs and location.

System capacity depends entirely on a system of many satellites which uses a high preferred mask angle of at least forty degrees. This critical system parameter is only achievable through the use of a large number of satellites compared to previous proposed systems and of very high communications frequencies. Motorola's Iridium™ system, described in European Patent Application No. 891 184 58.2, is not designed to realize the system capacity and service levels that the present invention will achieve. Iridium™ is intended only as an adjunct or enhancement of conventional terrestrial cellular telephone service. Motorola's Iridium™ system is not designed to be a complete global communications system that is capable of supporting in excess of 2,000,000 simultaneous connections, representing over 20,000,000 users at typical business usage levels, and over 350 billion minutes of use per year. Only a system such as the preferred embodiment, which utilizes 840 satellites at a preferred minimum mask angle of forty degrees can accomplish these challenging objectives.

Definitions Providing Support for Claims

The claims which follow this specification incorporate a number of terms which have specific meanings. These terms are defined below:

Communications constellation:

Any number of satellites which are used in combination to convey electromagnetic signals. The preferred embodiment of the invention utilizes 840 satellites. Alternative embodiments which would provide lower levels of system capacity and service employ fewer satellites.

Satellites:

An apparatus placed in orbit around the Earth. Several embodiments of satellites are described in the specification: Domesat™, Gearsat™, Batsat™ and Callingsat™. The terms satellite and spacecraft are used interchangeably.

Geodesic topology:

A three dimensional shape or configuration that resembles the globe. The term "geodesy" refers to the study of locations on or the shape of large portions of the Earth.

In the preferred embodiment of the invention, 840 satellites in low Earth orbit form a net or web of nodes which, when connected together, resemble the Earth's surface, and, therefore, forms or emulates a geodesic topology. Other proposed communication systems having far fewer satellites, such as Motorola's Iridium system, do not form a geodesic topology. Sixty-six nodes are insufficient to form a geodesic topology that is capable of providing world-wide communications services.

Mask angle:

The angle measured upwards to the position of a satellite in the sky from the local horizon of a portable, mobile or fixed terminal or gateway.

Non-hierarchical:

Without central control. The present invention is non-hierarchical because each satellite is autonomous, sovereign, and acts independently of each of all the other of said satellites in the communications constellation. An example of the opposite, a hierarchical communications system, is the central switching exchange employed by conventional terrestrial telephone companies.

CONCLUSION

Although the present invention has been described in detail with reference to particular preferred and alternative embodiments, persons possessing ordinary skill in the art to which this invention pertains will appreciate that various modifications and enhancements may be made without departing from the spirit and scope of the claims that follow. The various orbital parameters and satellite population and configuration statistics that have been disclosed above are intended to educate the reader about preferred and alternative embodiments, and are not intended to constrain the limits of the invention or the scope of the claims. The List of Reference Characters which follows is intended to provide the reader with a convenient means of identifying elements of the invention in the specification and drawings. This list is not intended to delineate or narrow the scope of the claims.

| LIST OF REFERENCE CHARACTERS | |
|---|---|
| 10 | End-to-end network model |
| 12 | First user terminal |
| 14 | First network interface |
| 16 | Calling network |
| 18 | Second network interface |
| 20 | Second user terminal |
| 22 | Operations traffic |
| 24 | User traffic |
| 26 | Single satellite |
| 28 | Orbital plane |
| 30 | Terminal |
| 31 | Keypad and display |
| 32 | Analog voice signal |
| 33 | Call-progress tones and display circuits |
| 34 | A/D converter |
| 36 | Digitized voice output |
| 38 | Speech encoder |
| 40 | Digital encoded speech |
| 42 | Encryption equipment |
| 44 | Encryption key |
| 46 | Signalling and control processor |
| 48 | Encrypted output |
| 50 | Sequence numbers |
| 52 | Destination addresses |

-continued

LIST OF REFERENCE CHARACTERS

| | |
|---|---|
| 54 | Signal packets |
| 56 | Packet assembler |
| 58 | Packets |
| 60 | Error encoder |
| 62 | Transmit buffer |
| 64 | Transmitter |
| 66 | Power control circuitry |
| 68 | Frame and bit timing circuitry |
| 70 | Antenna |
| 72 | Uplink radio signals |
| 74 | Steering logic circuits |
| 76 | Downlink radio signals |
| 78 | Receiver |
| 80 | Address decoder |
| 82 | Terminal identifier information |
| 84 | Error detector |
| 86 | Header decoder |
| 88 | Signal packets |
| 90 | Speech packets |
| 92 | Packet receive buffer |
| 94 | Timing and packet resequencing stage |
| 96 | Decryption key |
| 98 | Security decryption circuit |
| 100 | Speech decoder |
| 102 | Echo suppressor |
| 104 | Digital analog converter |
| 106 | Gateway antennas |
| 108 | Local receivers |
| 110 | Remote receivers |
| 112 | Local receivers |
| 114 | Remote receivers |
| 116 | Receiver select logic |
| 118 | Fast packet switch |
| 120 | Incoming control circuitry |
| 122 | Outgoing control circuitry |
| 124 | Packet Assembly and Disassembly interface (PAD) |
| 126 | Series of Packet Assembly and Disassembly stages |
| 128 | DS-1 links |
| 130 | Access switching machine |
| 132 | Test access circuitry |
| 134 | Control circuitry |
| 136 | Link for spacecraft access |
| 138 | Switched traffic |
| 140 | Unswitched traffic |
| 142 | Link |
| 144 | Link |
| 146 | Clock |
| 148 | Operating system |
| 150 | DS-1 interface |
| 152 | Custom or standard interface |
| 154 | Outside telephone carrier |
| 156 | "Ping-pong" diagram |
| 158 | Network |
| 160 | Satellite node |
| 162 | Intersatellite link |
| 164 | Gateway-satellite link (GSL) |
| 166 | Gateway interface |
| 168 | Operation support system |
| 170 | Feature processor |
| 172 | Gateway switches |
| 174 | Database systems |
| 176 | Mobile terminal satellite link (MTSL) |
| 178 | Customer |
| 180 | Mobile terminal satellite link (MTSL) |
| 182 | Hand-held and car phones |
| 184 | Fixed terminal satellite link (FTSL) |
| 186 | Subscribers |
| 210 | Terrestrial Antennas |
| 210a | Trapezoidal/Semi-conical embodiment of antenna |
| 210b | Hemispherical embodiment of antenna |
| 210c | Cylindrical embodiment of antenna |
| 212 | Trapezoidal/Semi-conical surface |
| 212a | Upper portion of trapezoidal/semi-conical surface |
| 212b | Lower portion of trapezoidal/semi-conical surface |
| 214 | Top circular surface |
| 216 | Bottom circular surface |
| 218 | Circular antenna element |

-continued

LIST OF REFERENCE CHARACTERS

| | |
|---|---|
| 220 | Conductive patch |
| 222 | Cross-slots |
| 222a | First slot |
| 222b | Second slot |
| 224 | Hemispherical surface |
| 226 | Bottom circular surface |
| 228 | Right-circular cylindrical surface |
| 230 | Top circular surface |
| 232 | Bottom circular surface |
| 234 | Nonconductive substrate layer |
| 236 | Ground plane layer |
| 238 | Five bit, time delay phase shifter |
| 240 | 11.25 degree delay line |
| 242 | 22.50 degree delay line |
| 244 | 45.00 degree delay line |
| 246 | 90.00 degree delay line |
| 248 | 180.00 degree delay line |
| 250 | Hemispherical configuration with dual frequency antenna elements |
| 252 | Upper hemispherical surface |
| 253 | Lower circular surface |
| 254 | Dual frequency antenna element |
| 256 | Upper conductive layer |
| 258 | Lower conductive layer |
| 259 | Conductive via |
| 260 | Conductive via |
| 262 | Foam layer |
| 264 | Dielectric layer |
| 266 | Ground plane layer |
| 268 | Receive circuit |
| 270 | Printed circuit four element subarray |
| 272 | Feeds |
| 274 | First radio frequency amplifier |
| 276 | First band pass filter |
| 278 | Second radio frequency amplifier |
| 280 | Mixer |
| 282 | Source |
| 284 | Output of synthesizer |
| 286 | Third radio frequency amplifier |
| 288 | Decoder |
| 290 | Intermediate frequency band pass filter |
| 292 | Analog-to-digital converter |
| 294 | Digital band pass filter |
| 296 | Threshold detector |
| 297 | Transmit circuit |
| 298 | Printed circuit four element subarray |
| 300 | Feeds |
| 302 | Amplifier |
| 304 | Encoder |
| 306 | Radio frequency source |
| 308 | Synthesizer |
| 310 | Alternate embodiment of miniaturized antenna |
| 312 | Top element |
| 314 | Radiating element |
| 315 | Soft substrate |
| 316 | Ground plane |
| 317 | Dummy element |
| 318 | Top view |
| 320 | 30 GHz printed circuit patch element |
| 322 | 20 GHz patch element |
| 324 | Substrate layer |
| 326 | Cross-sectional side view |
| 328 | Foam layer |
| 330 | Ground plane |
| 332 | Cross-sectional view |
| 334 | Radome |
| 335 | Dummy element |
| 336 | Printed dual frequency printed circuit elements |
| 337 | Printed dual frequency printed circuit elements |
| 338 | Microwave substrate |
| 340 | Feed networks and distribution circuits |
| 342 | Active microwave components |
| 344 | Ground plane and support structure |
| 410 | Flow chart of switching process |
| 412 | Orbital position information |
| 414 | Adaptive routing processor |
| 416 | Adaptive routing algorithm |

LIST OF REFERENCE CHARACTERS

| | |
|---|---|
| 418 | "Next-node-in-path-to-destination" output |
| 420 | Routing cache memory |
| 422 | Packets |
| 424 | Header |
| 426 | Payload |
| 428 | Input packet processor |
| 430 | Next node routing tag |
| 432 | Destination node |
| 434 | Processed packet |
| 436 | Input ports |
| 438 | Fast packet switch |
| 440 | Output port |
| 442 | Satellite switch node |
| 444 | Circuit modules |
| 446 | Receiver |
| 448 | Demodulator |
| 450 | Bit/packet synchronizer |
| 452 | Input packet control modules |
| 454 | Error detection circuits |
| 456 | Packet tagging circuits |
| 458 | Local cache access |
| 460 | Network cache access |
| 462 | Control complex |
| 464 | Call control processor |
| 466 | Maintenance processor |
| 468 | Reload processor |
| 470 | Billing and traffic processor |
| 472 | Satellite ephemerides processor |
| 474 | Local routing and handover processor |
| 476 | Local routing cache |
| 478 | Routing processor |
| 480 | Network routing cache |
| 482 | Communications processor |
| 484 | Spare processor |
| 486 | Steering processor |
| 490 | Output packet control modules |
| 492 | Path history circuits |
| 494 | Error encoding circuits |
| 496 | Output packet control modules |
| 498 | Packet framing circuits |
| 500 | Modulator |
| 502 | Transmitter |
| 504 | 32 × 1 packet priority multiplexor |
| 506 | Serial input signals |
| 508 | Serial-to-parallel converters |
| 510 | First-in, first-out buffering circuits |
| 512 | Status and control circuits |
| 514 | Logic circuitry |
| 516 | Output queue status stage |
| 517 | Eight bit parallel bus |
| 518 | Priority router |
| 520 | 8 × 16K low priority first-in, first-out circuit |
| 522 | 8 × 16K high priority first-in, first-out circuit |
| 524 | Parallel-to-serial converter |
| 526 | 150 MBIT/S serial output |
| 528 | Block diagram of fast packet switch |
| 530 | Serial inputs |
| 532 | 1 × 32 self-routing switch module |
| 534 | 32 × 1 asynchronous packet multiplexor |
| 536 | Schematic diagram of 1 × 32 self-routing switch module |
| 538 | Self-routing cell |
| 540 | Output side |
| 542 | Routed packets |
| 544 | Mobile/fixed satellite link |
| 546 | Radiating array |
| 548 | Feeds |
| 550 | Beam steering computer |
| 552 | Diplexer |
| 554 | Receive beam forming network |
| 556 | Bank of receivers |
| 558 | First controller mux/demux/modem |
| 560 | Synthesizer |
| 562 | Frequency controller |
| 564 | Second controller mux/demux/modem |
| 566 | Bank of transmitters |
| 568 | Transmit beam forming network |
| 602 | Footprints |
| 602a | Footprint |
| 602b | Footprint |
| 602c | Footprint |
| 604 | Earth-fixed supercell |
| 606 | Earth-fixed cell |
| 608 | Cell pattern |
| 610 | Satellite footprint diagram |
| 612 | Column pair |
| 614 | Second and central column pair |
| 615 | Satellite footprint overlaps |
| 616 | Rightmost column pair |
| 617 | Satellite footprint gaps |
| 618 | Flow chart |
| 619 | Destination terminal |
| 620 | "Node" bits |
| 622 | "Call identification" bits |
| 624 | Cell ID map |
| 626 | Channel |
| 628 | Autonomous orbit position determination software |
| 630 | Position/output beam map |
| 632 | Modified packet |
| 700 | Earth-facing antenna array |
| 702 | Hexagonal antenna facets |
| 704 | Solar panel |
| 706 | Space-facing array |
| 708 | Space-facing facets |
| 709 | Electronically steered beams |
| 709a | Set of beams |
| 709b | Set of beams |
| 709c | Set of beams |
| 710 | Line-of-sight radio waves |
| 712 | Geometric plots |
| 714 | Geometric plots |
| 715 | Interior of antenna array |
| 716 | Schematic diagram of a GaAs MMIC time delay network |
| 718 | Active lens |
| 720 | Radiating elements |
| 722 | Time delay circuit |
| 724 | Feed |
| 725 | Time delay steered array |
| 726 | Switch |
| 728 | Time delay path |
| 730 | Transmission lines |
| 732 | Amplifier |
| 800 | Satellite |
| 801 | Launch vehicle |
| 802 | Spacecraft direction of travel |
| 804 | Longitudinal axis of solar panels |
| 806 | Spherical connectors |
| 808 | Tubular connectors |
| 810 | Gearsat ™ |
| 811 | Schematic representation of a person two meters tall |
| 812 | Cylindrical surface at periphery of Gearsat ™ |
| 814 | Rectangular antenna panels on cylindrical surface |
| 816 | Solar panels |
| 818 | Block diagram of satellite subsystems |
| 820 | Bus |
| 822 | Communications Payload |
| 824 | Command and Data Handling Subsystem |
| 826 | Electrical Power Subsystem |
| 828 | Attitude and Orbit Determination and Control Subsystem |
| 830 | Sun sensors |
| 832 | Actuators |
| 834 | Propulsion Subsystem |
| 836 | Cabling Subsystem |
| 838 | Structure Subsystem |
| 840 | Mechanisms Subsystem |
| 842 | Thermal Control Subsystem |
| 844 | Block diagram of satellite subsystems |
| 846 | Local area network |
| 848 | Power Control Subsystem |
| 850 | Batteries |
| 852 | Power Distribution Subsystem |
| 854 | Array switching link |
| 856 | Shunt regulators |
| 858 | Shunt radiators |
| 860 | Block diagram of satellite subsystems |

LIST OF REFERENCE CHARACTERS

| | |
|---|---|
| 862 | Local area network |
| 864 | Bus |
| 866 | Payload |
| 868 | Telemetry and command unit |
| 870 | 1750 microprocessor |
| 872 | Master oscillator |
| 874 | EDAT microprocessor |
| 876 | RISC microprocessor |
| 878 | Block diagram of satellite subsystems |
| 880 | Local Area Network |
| 882 | Acquisition sun sensors |
| 884 | Inertial measurement units |
| 886 | Magnetometers |
| 888 | Attitude Control Electronics unit |
| 890 | Reaction wheels |
| 892 | Magnetic torquers |
| 894 | Batsat ™ |
| 896 | Central body of Batsat ™ |
| 898 | Antenna and solar/thermal panel array |
| 900 | Antenna array |
| 901 | Antenna panel |
| 902 | Antenna panel |
| 903 | Antenna panel |
| 904 | Antenna panel |
| 905 | Antenna panel |
| 906 | Antenna panel |
| 907 | Antenna panel |
| 908 | Antenna panel |
| 909 | Antenna panel |
| 910 | Solar/thermal panel |
| 911 | Solar/thermal panel |
| 912 | Cables |
| 914 | Hinges |
| 1000 | Schematic diagram showing orbit position determination |
| 1002 | Other satellite |
| 1004 | Time synchronizing signals |
| 1006 | Ground station receiver |
| 1008 | Ground station transmitter |
| 1010 | Doppler observation |
| 1012 | Block diagram showing AOD |
| 1014 | Time and frequency measurements |
| 1016 | SV POS |
| 1018 | SV LOS |
| 1020 | RDSS PR packet |
| 1022 | Communication network |
| 1024 | Antenna control |
| 1026 | Position determination circuitry |
| 1028 | Communication link |
| 1030 | Data demodulation stage |
| 1032 | Frequency synthesizer |
| 1034 | Oscillator |
| 1036 | Phase locked loop |
| 1038 | Pilot tone |
| 1040 | Time of perception of PR packet |
| 1042 | Time and frequency synchronization |
| 1044 | Doppler signals |
| 1046 | AOD processor |
| 1048 | Pointing direction signals |
| 1050 | Attitude determination processor |
| 1052 | Schematic diagram showing attitude determination |
| 1100 | Node hardware architecture |
| 1102 | Common control stage |
| 1104 | Internode messages |
| 1106 | Internode messages |
| 1108 | Receivers |
| 1110 | Transmitters |
| 1112 | Link control process |
| 1114 | Routing process |
| 1116 | Service demand |
| 1118 | Subscribers |
| 1120 | Routing tables |
| 1122 | Local processes |
| 1124 | Dynamic packet routing method |
| 1126 | Router |
| 1128 | Packet routers |
| 1130 | Sorting network |
| 1132 | Transmitters |
| 1134 | Diffusion rate |
| 1136 | Diffusion rate |
| 1138 | Diffusion rate |
| 1140 | Output module |
| 1142 | Switching architecture |
| 1144 | Signal flow |
| 1146 | System architecture |
| 1148 | Input Output Packet (IOP) Processor and Fast Packet Switch |
| 1150 | IOP |
| 1152 | Input Packet Processor |
| 1154 | IPP Common Control |
| 1156 | Pipe delay |
| 1158 | IPP four stage pipeline |
| 1160 | IPP Optimal Route Controller |
| 1162 | Message Communication |
| 1164 | 128 × 128 Switch |
| 1166 | Switching Cell |
| 1210 | View of constellation |
| 1211 | Orbit |
| 1212 | Callingsat ™ |
| 1213 | Simplified antenna elements |
| 1214 | View of footprint pattern over United States |
| 1216 | Footprint |
| 1215 | Earth-fixed cell footprint beams from Callingsat ™ |
| 1218 | View of one footprint illuminating Earth-Fixed grid |
| 1219 | Earth-fixed cell beam |
| 1220 | Earth-fixed grid |
| 1222 | Enlarged view of Earth-fixed grid, supercell and cell |
| 1224 | Supercell |
| 1226 | Cell |
| 1226 | Target cell |
| 1228 | View of footprint formed by Callingsat ™ |
| 1230 | Mask angle |
| 1232 | Altitude |
| 1234 | Maximum distance to footprint perimeter from Callingsat ™ |
| 1236 | Diameter of footprint |
| 1238 | View of satellite footprints overlaps and gaps at equator |
| 1240 | Overlap for 40 satellites/orbit @ 1000 km spacing |
| 1242 | Overlap for 35 satellites/orbit @ 1142 km spacing |
| 1244 | Overlap for 30 satellites/orbit @ 1333 km spacing |
| 1245 | Distance between footprint centers |
| 1246 | Overlap |
| 1248 | Gap |
| 1250 | Potential gap strip |
| 1252 | Single coverage strip |
| 1254 | View of satellite footprints overlaps and gaps at 40 degree latitude |
| 1256 | Double coverage strip |
| 1258 | Sequential views of Callingsat ™ providing service to one Earth-fixed cell |
| 1260 | Sequential views of Satellite-Fixed Cell system |
| 1260a | Sequential views of one Satellite-Fixed Cell |
| 1261 | Satellite using Satellite-Fixed Cell method |
| 1262 | Beams with no beam steering |
| 1264 | Earth-fixed cell footprint beam |
| 1265 | Satellite-fixed beam |
| 1266 | Low mask angle |
| 1268 | Flowchart showing packet processing |
| 1270 | Node |
| 1272 | Call ID |
| 1274 | Payload |
| 1276 | Index |
| 1278 | Cell ID Map |
| 1280 | Channel assignment |
| 1282 | Channel entries |
| 1284 | Cell entries |
| 1286 | Supercell entries |
| 1288 | AOD Software |
| 1290 | Position/Output Beam Map |
| 1292 | Output Beam Map |
| 1294 | Channel designation |
| 1296 | Cell designation |
| 1298 | Output beam designation |
| 1300 | Fast Packet Switch input |
| 1302 | Fast Packet Switch |
| 1304 | Fast Packet Switch output |
| 1306 | Channel assignment |

-continued

LIST OF REFERENCE CHARACTERS

| | |
|---|---|
| 1308 | Cell assignment |
| 1309 | Packet buffer |
| 1310 | Transmitter |
| 1311 | Alternative hardware embodiment |
| 1312 | View of cells being scanned |
| 1314 | Cell scan pattern |
| 1316 | View of scanning cycle |
| 1318 | Cell TDM |
| 1320 | Supercell SDM |
| 1322 | Scan cycle |
| 1324 | Transmit/Receive time |
| 1326 | Guard interval |
| 1328 | View of Channel Multiplexing |
| 1330 | Uplink |
| 1332 | Downlink |
| 1334 | Channel |
| 1336 | Time Interval |
| 1338 | Channel |
| 1340 | Time interval |
| 1342 | Bandwidth |
| 1344 | Perspective view of Callingsat ™ in orbit |
| 1346 | Callingsat ™ satellite |
| 1348 | Central octagonal panel |
| 1350 | Mast |
| 1352 | Solar cell and shade |
| 1354 | Intersatellite link antennas |
| 1355 | Domesat ™ |
| 1355a | Space-facing antennas |
| 1355b | Earth-facing antennas |
| 1355c | Solar cells |
| 1356 | View of Callingsat ™ from Earth |
| 1358 | Transmit antennas |
| 1360 | Receive antennas |
| 1410 | Callingsat ™ satellite |
| 1412 | Earth-facing antenna array |
| 1414 | 30 GHz uplinks |
| 1416 | 20 GHz downlinks |
| 1418 | Antennas |
| 1418a | Uplink antennas |
| 1418b | Downlink antennas |
| 1420 | M/FTSL antenna panel set |
| 1422 | Primary bus structure |
| 1424 | Antenna facet panels |
| 1426 | ISL antenna array |
| 1428 | Individual ISL antenna |
| 1430 | 60 GHz intersatellite links |
| 1432 | Astromast ™ boom |
| 1434 | Boom crossmast |
| 1436 | Solar array storage boom |
| 1438 | Amorphous silicon solar array |
| 1440 | Inflatable boom |
| 1442 | Cantilever boom |
| 1444 | Pulse plasma thrusters |
| 1446 | Storage batteries |
| 1448 | Shunt regulators |
| 1450 | Perspective view of assembled Callingsat ™ |
| 1452 | Inner antenna array |
| 1452A | First inner antenna array |
| 1452B | Second inner antenna array |
| 1452C | Third inner antenna array |
| 1452D | Fourth inner antenna array |
| 1454 | Outer antenna array |
| 1454A | First outer antenna array |
| 1454B | Second outer antenna array |
| 1454C | Third outer antenna array |
| 1454D | Fourth outer antenna array |
| 1456 | Component storage compartment |
| 1458 | Solar array attachment structure |
| 1460 | Command and data handling subsystem |
| 1462 | Attitude/orbit determination and control subsystem |
| 1464 | Communications payload subsystem |
| 1466 | Front view of assembled Callingsat ™ |
| 1468 | Side view of assembled Callingsat ™ |
| 1470 | Front view of Callingsat ™ before launch |
| 1474 | Top cutaway view of Callingsat ™ in launch vehicle |
| 1480 | Bottom cutaway view of Callingsat ™ within launch vehicle |
| 1482 | Illustration of Callingsat ™ deployed in low Earth orbit |

-continued

LIST OF REFERENCE CHARACTERS

| | |
|---|---|
| 1484 | Illustration of deployed Callingsat ™ with detached solar array storage booms |
| 1486 | Illustration of deployed Callingsat ™ with extended Astromast ™ boom |
| 1488 | Depiction of expanding solar array boom and extension of outer antenna arrays |
| 1490 | Antenna deployment hinges |
| 1492 | Inner antenna panel on outer array |
| 1494 | Central antenna panel on outer array |
| 1496 | Outer antenna panel on outer array |
| 1498 | Boom hinge mechanism |
| 1500 | Depiction of extended solar array boom and extension of inner antenna arrays |
| 1502 | Inside antenna panel on inner array |
| 1504 | Middle antenna panel on inner array |
| 1506 | Outside antenna panel on inner array |
| 1508 | Deployment mechanism |
| 1510 | Depiction of inflating solar arrays |
| 1512 | Photovoltaic cells |
| 1514 | Film substrate |
| 1516 | Photocurable chemical vapor |
| 1518 | Inflation gas |
| 1520 | Fully deployed solar array |
| 1522 | Side view of fully deployed Callingsat ™ |
| 1524 | Front view of fully deployed Callingsat ™ |
| 1526 | Illustration of fully deployed Earth-facing antenna arrays |
| 1528 | Alternate embodiment of Earth facing antenna arrays |
| 1530 | Another embodiment of Earth facing antenna arrays |
| B | Beam from satellite |
| BP | Battery pack for hand held phone |
| C | Constellation of satellites |
| E | Earth |
| EX | Retractable antenna mast in fully extended position |
| F | Fixed terminal |
| G | Gateway |
| H | Spring Loaded, Self-Latching Hinges |
| K | Keypad |
| L | LCD display screen |
| LV | Launch vehicle |
| LVI | Launch vehicle interior |
| M | Mobile terminal |
| P | Portable terminal |
| PDE | Payload dynamic envelope |
| PN | Person |
| S | Satellite |
| ST | Retractable antenna mast in stowed position |
| TEL | Hand-held portable telephone |
| T | Telephone |
| Z | Zenith |

What is claimed is:

1. A communications system for conveying packet-based communication calls from several sending terminals at geographically diverse sending locations on the earth to several receiving terminals at geographically diverse receiving locations on the earth comprising a multiplicity of satellites each in a low earth orbit such that the satellites are in constant motion over the face of the earth, the satellites receiving packet-based communication calls from earth-based sending terminals and transmitting packet-based received communication calls to earth-based receiving terminals, each packet of a call having a header including a destination field containing information identifying a specific destination receiving terminal and one or more control fields containing information that defines the packet priority and type, the satellites including switch and intersatellite communication means for routing packet-based communication calls from a satellite receiving a communication call from an earth-based sending terminal, by way of one or more other satellites, to a sending satellite for transmitting the communication call to an earth-based receiving terminal thereby establishing a communication link between the sending terminal and the receiving terminal, the switch and intersatellite communication means employing connectionless protocol without establishing or maintaining a virtual circuit through the satellites between the sending terminal and the receiving terminal, and the switch and intersatellite communication means including a microprocessor controlled by an adaptive routing algorithm for determining the next-node-in-path for each packet based at least in part on the information of the header control fields defining the packet priority and type.

2. The system of claim 1, wherein the switch and intersatellite communication means routes the communication calls on a packet-by-packet basis whereby different packets of the same call may follow different routes between the same receiving and sending satellites based at least in part on system congestion.

3. The system of claim 2, in which the receiving terminal includes means for resequencing the packets of a call so that packets of the same call routed differently between the sending terminal and the receiving terminal are ordered at the receiving terminal in the same order in which they were transmitted by the sending terminal.

4. The system of claim 1, in which, for any packet, each satellite in the communication link between the sending terminal and the receiving terminal routes the packet without reference to routing of previous packets.

5. The system of claim 1, in which the switch and intersatellite communication means at each satellite utilizes the information in the control fields to determine a segment of the route for the associated packet independently of preceding segment routing determinations made for other packets of the same call having the same earth-based receiving terminal.

6. A communications system for conveying packet-based communication calls from several sending terminals at geographically diverse sending locations on the earth to several receiving terminals at geographically diverse receiving locations on the earth, each packet of a call having a header including a destination field containing information identifying a specific destination receiving terminal and one or more control fields containing information that defines the packet priority and type, said system comprising a multiplicity of satellites each in a low earth orbit such that the satellites are in constant motion over the face of the earth, the satellites receiving packet-based communication calls from earth-based sending and transmitting packet-based received communication calls to earth-based receiving terminals, the satellites including switch and intersatellite communication means for routing packet-based communication calls from a satellite receiving a communication call from an earth-based sending terminal, by way of one or more other satellites, to a sending satellite for transmitting the communication call to an earth-based receiving terminal thereby establishing a communication link between the sending terminal and the receiving terminal, the switch and intersatellite communication means employing a datagram approach that routes every packet conveyed by the system independently at every satellite in the link between the sending terminal and the receiving terminal based at least in part on the information of the header control fields defining the packet priority and type.

7. A method for conveying packet-based communication calls from several sending terminals at geographically diverse sending locations on the earth to several receiving terminals at geographically diverse receiving locations on the earth by use of a multiplicity of satellites each in a low earth orbit such that the satellites are in constant motion over the face of the earth, the satellites receiving packet-based communication calls from earth-based sending terminals and including switch and intersatellite communication means for routing packet-based communication calls from a satellite receiving a communication call from an earth-based sending terminal, by way of one or more other satellites, to a sending satellite for transmitting the communication call to an earth-based receiving thereby establishing a communication link between the sending terminal and the receiving terminal, said method comprising providing each packet with a header including a destination field containing information identifying a specific destination receiving terminal and one or more control fields containing information that defines the packet priority and type, routing individual packets of a call using a connectionless protocol without establishing or maintaining a virtual circuit through the satellites between the sending terminal and the receiving terminal, and controlling each satellite by a microprocessor having an adaptive routine algorithm for determining the next-node-in-path for each packet based at least in part on the information of the control fields that defines the packet priority and type.

8. The method of claim 7, including routing the communication calls on a packet-by-packet basis whereby different packets of the same call may follow different routes between the same receiving and sending satellites based on system congestion or other factors.

9. The method of claim 7, including resequencing the packets of a signal so that packets of the same signal routed differently between the sending terminal and the receiving terminal are ordered at the receiving terminal in the same order in which they were transmitted by the sending terminal.

10. The method of claim 7, including providing a header for each packet of a call including an address designating the earth-based receiving terminal, and utilizing the address to determine a segment of the route for the associated packet independently of preceding segment routing determinations made for other packets of the same call having the same earth-based receiving terminal.

11. A method for conveying packet-based communication calls from several sending terminals at geographically diverse sending locations on the earth to several receiving terminals at geographically diverse receiving locations on the earth by use of a multiplicity of satellites each in a low earth orbit such that the satellites are in constant motion over the face of the earth, the satellites receiving packet-based communication calls from earth-based sending terminals and including switch and intersatellite, communication means for routing packet-based communication calls from a satellite receiving a communication call from an earth-based sending terminal, by way of one or more other satellites, to a sending satellite for transmitting the communication call to an earth-based receiving terminal thereby establishing a communication link between the sending terminal and the receiving terminal, said method comprising providing each packet with a header including a destination field containing information identifying a specific destination receiving terminal and one or more control fields containing information that defines the packet priority and type, and including employing a datagram approach that routes every packet conveyed by the system independently at every satellite in the link between the sending terminal and the receiving terminal based at least in part on the information of the control fields defining the packet priority and type.

* * * * *